US012163878B2

(12) United States Patent
Bledsoe, Jr. et al.

(10) Patent No.: US 12,163,878 B2
(45) Date of Patent: *Dec. 10, 2024

(54) METHODS AND ASSEMBLIES FOR DETERMINING AND USING STANDARDIZED SPECTRAL RESPONSES FOR CALIBRATION OF SPECTROSCOPIC ANALYZERS

(71) Applicant: MARATHON PETROLEUM COMPANY LP, Findlay, OH (US)

(72) Inventors: Roy Roger Bledsoe, Jr., Findlay, OH (US); Lance T. Campbell, Findlay, OH (US); Randy N. Ridge, Findlay, OH (US); Brian K. Wilt, Findlay, OH (US)

(73) Assignee: MARATHON PETROLEUM COMPANY LP, Findlay, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/526,051

(22) Filed: Dec. 1, 2023

(65) Prior Publication Data

US 2024/0118194 A1 Apr. 11, 2024

Related U.S. Application Data

(63) Continuation of application No. 17/988,239, filed on Nov. 16, 2022, now Pat. No. 11,885,739, which is a (Continued)

(51) Int. Cl.
*G01N 21/31* (2006.01)
*G01J 3/28* (2006.01)
*G01N 21/35* (2014.01)

(52) U.S. Cl.
CPC .............. *G01N 21/31* (2013.01); *G01J 3/28* (2013.01); *G01J 2003/2866* (2013.01); (Continued)

(58) Field of Classification Search
CPC ............ G01N 21/31; G01N 2201/127; G01N 21/35; G01N 2021/3137; G01N 21/274; G01J 3/28; G01J 2003/2866
See application file for complete search history.

(56) References Cited

U.S. PATENT DOCUMENTS

| 981,434 A | 1/1911 | Lander |
| 1,526,301 A | 2/1925 | Stevens |

(Continued)

FOREIGN PATENT DOCUMENTS

| AT | 11772 U1 | 4/2011 |
| BR | PI0701518 | 11/2008 |

(Continued)

OTHER PUBLICATIONS

Platvoet et al., Process Burners 101, American Institute of Chemical Engineers, Aug. 2013.

(Continued)

*Primary Examiner* — Eman A Alkafawi
*Assistant Examiner* — Joseph O Nyamogo
(74) *Attorney, Agent, or Firm* — Womble Bond Dickinson (US) LLP

(57) ABSTRACT

Methods and assemblies may be used for determining and using standardized spectral responses for calibration of spectroscopic analyzers. The methods and assemblies may be used to calibrate or recalibrate a spectroscopic analyzer when the spectroscopic analyzer changes from a first state to a second state, the second state being defined as a period of time after a change to the spectroscopic analyzer causing a need to calibrate or recalibrate the spectroscopic analyzer. The calibration or recalibration may result in the spectroscopic analyzer outputting a standardized spectrum, such that the spectroscopic analyzer outputs a corrected material spectrum for an analyzed material, and defining the stan- (Continued)

dardized spectrum. The corrected material spectrum may include signals indicative of material properties of an analyzed material, the material properties of the material being substantially consistent with material properties of the material output by the spectroscopic analyzer in the first state.

30 Claims, 50 Drawing Sheets

Related U.S. Application Data continuation of application No. 17/652,431, filed on Feb. 24, 2022.

(60) Provisional application No. 63/153,452, filed on Feb. 25, 2021, provisional application No. 63/268,456, filed on Feb. 24, 2022.

(52) U.S. Cl.
CPC ..... *G01N 2021/3137* (2013.01); *G01N 21/35* (2013.01); *G01N 2201/127* (2013.01)

(56) References Cited

U.S. PATENT DOCUMENTS

| | | |
|---|---|---|
| 1,572,922 A | 2/1926 | Govers et al. |
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,312,645 A | 1/1982 | Mavros |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,583,859 A | 4/1986 | Hall, II |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,798,463 A | 11/1989 | Koshi |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |

(56) References Cited

U.S. PATENT DOCUMENTS

| | | | |
|---|---|---|---|
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,115,686 A | 5/1992 | Walker et al. |
| 5,120,517 A | 6/1992 | Elshout |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A * | 9/1993 | Maggard | G01N 21/274 702/90 |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,302,294 A | 4/1994 | Schubert |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,415,025 A | 5/1995 | Bartman et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,446,681 A | 8/1995 | Gethner et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,516,969 A | 5/1996 | Krasznai et al. |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,681,749 A | 10/1997 | Ramamoorthy |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,751,415 A | 5/1998 | Smith et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |
| 6,015,440 A | 1/2000 | Noureddini |
| 6,025,305 A | 2/2000 | Aldrich et al. |
| 6,026,841 A | 2/2000 | Kozik |

(56) References Cited

U.S. PATENT DOCUMENTS

| | | |
|---|---|---|
| 6,047,602 A | 4/2000 | Lynnworth |
| 6,056,005 A | 5/2000 | Piotrowski et al. |
| 6,062,274 A | 5/2000 | Pettesch |
| 6,063,263 A | 5/2000 | Palmas |
| 6,063,265 A | 5/2000 | Chiyoda et al. |
| 6,070,128 A | 5/2000 | Descales et al. |
| 6,072,576 A | 6/2000 | McDonald et al. |
| 6,076,864 A | 6/2000 | Levivier et al. |
| 6,087,662 A | 7/2000 | Wilt et al. |
| 6,093,867 A | 7/2000 | Ladwig et al. |
| 6,099,607 A | 8/2000 | Haslebacher |
| 6,099,616 A | 8/2000 | Jenne et al. |
| 6,100,975 A | 8/2000 | Smith et al. |
| 6,102,655 A | 8/2000 | Kreitmeier |
| 6,105,441 A | 8/2000 | Conner et al. |
| 6,107,631 A | 8/2000 | He |
| 6,117,812 A | 9/2000 | Gao et al. |
| 6,130,095 A | 10/2000 | Shearer |
| 6,140,647 A | 10/2000 | Welch et al. |
| 6,153,091 A | 11/2000 | Sechrist et al. |
| 6,155,294 A | 12/2000 | Cornford et al. |
| 6,162,644 A | 12/2000 | Choi et al. |
| 6,165,350 A | 12/2000 | Lokhandwala et al. |
| 6,169,218 B1 | 1/2001 | Hearn |
| 6,171,052 B1 | 1/2001 | Aschenbruck et al. |
| 6,174,501 B1 | 1/2001 | Noureddini |
| 6,190,535 B1 | 2/2001 | Kalnes et al. |
| 6,203,585 B1 | 3/2001 | Majerczak |
| 6,235,104 B1 | 5/2001 | Chattopadhyay et al. |
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,592,448 B1 | 7/2003 | Williams |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov et al. |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,194,369 B2 | 3/2007 | Lundstedt et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Watzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B1 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B2 | 1/2011 | Walters |
| 7,895,011 B2 | 2/2011 | Youssefi et al. |
| 7,914,601 B2 | 3/2011 | Farr et al. |
| 7,931,803 B2 | 4/2011 | Buchanan |
| 7,932,424 B2 | 4/2011 | Fujimoto et al. |
| 7,939,335 B1 | 5/2011 | Triche et al. |
| 7,981,361 B2 | 7/2011 | Bacik |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B2 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,518,131 B2 | 8/2013 | Mattingly et al. |
| 8,524,180 B2 | 9/2013 | Canari et al. |
| 8,569,068 B2 | 10/2013 | Carpenter et al. |
| 8,579,139 B1 | 11/2013 | Sablak |

(56) References Cited

U.S. PATENT DOCUMENTS

| | | |
|---|---|---|
| 8,591,814 B2 | 11/2013 | Hodges |
| 8,609,048 B1 | 12/2013 | Beadle |
| 8,647,415 B1 | 2/2014 | De Haan et al. |
| 8,670,945 B2 | 3/2014 | Van Schie |
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,784,645 B2 | 7/2014 | Iguchi et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 | 3/2015 | Droubi et al. |
| 8,999,011 B2 | 4/2015 | Stern et al. |
| 8,999,012 B2 | 4/2015 | Kelly et al. |
| 9,011,674 B2 | 4/2015 | Milam et al. |
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B1 | 9/2015 | Glover et al. |
| 9,216,376 B2 | 12/2015 | Liu et al. |
| 9,272,241 B2 | 3/2016 | Königsson |
| 9,273,867 B2 | 3/2016 | Buzinski et al. |
| 9,279,748 B1 | 3/2016 | Hughes et al. |
| 9,289,715 B2 | 3/2016 | Høy-Petersen et al. |
| 9,315,403 B1 | 4/2016 | Laur et al. |
| 9,371,493 B1 | 6/2016 | Oyekan |
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,453,169 B2 | 9/2016 | Stippich, Jr. et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,662,597 B1 | 5/2017 | Formoso |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 | 10/2017 | Forsell |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 | 3/2018 | Botti |
| 9,982,788 B1 | 5/2018 | Maron |
| 9,988,585 B2 | 6/2018 | Hayasaka et al. |
| 10,047,299 B2 | 8/2018 | Rubin-Pitel et al. |
| 10,048,100 B1 * | 8/2018 | Workman, Jr. ........ G01D 18/00 |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 | 8/2019 | Balcik |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B1 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,164,406 B2 | 11/2021 | Meroux et al. |
| 11,168,270 B1 | 11/2021 | Moore |
| 11,175,039 B2 | 11/2021 | Lochschmied et al. |
| 11,203,719 B2 | 12/2021 | Cantley et al. |
| 11,203,722 B2 | 12/2021 | Moore et al. |
| 11,214,741 B2 | 1/2022 | Davdov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,542,441 B2 | 1/2023 | Larsen et al. |
| 11,578,638 B2 | 2/2023 | Thobe |
| 11,634,647 B2 | 4/2023 | Cantley et al. |
| 11,667,858 B2 | 6/2023 | Eller et al. |
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 11,860,069 B2 | 1/2024 | Bledsoe, Jr |
| 11,891,581 B2 | 2/2024 | Cantley et al. |
| 11,898,109 B2 | 2/2024 | Sexton et al. |
| 11,905,468 B2 | 2/2024 | Sexton et al. |
| 11,905,479 B2 | 2/2024 | Eller et al. |
| 11,906,423 B2 | 2/2024 | Bledsoe, Jr. et al. |
| 11,920,096 B2 | 3/2024 | Woodchick et al. |
| 11,921,035 B2 | 3/2024 | Bledsoe, Jr. et al. |
| 11,970,664 B2 | 4/2024 | Larsen |
| 11,975,316 B2 | 5/2024 | Zalewski |
| 12,000,720 B2 | 6/2024 | Langlois, III |
| 12,018,216 B2 | 6/2024 | Larsen et al. |
| 12,031,094 B2 | 7/2024 | Sexton et al. |
| 12,031,676 B2 | 7/2024 | Craig et al. |
| 12,037,548 B2 | 7/2024 | Larsen et al. |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |

(56) References Cited

U.S. PATENT DOCUMENTS

| | | |
|---|---|---|
| 2003/0113598 A1 | 6/2003 | Chow et al. |
| 2003/0188536 A1 | 10/2003 | Mittricker |
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0216214 A1* | 9/2005 | Gorin .................. G01R 23/16 702/76 |
| 2005/0229777 A1 | 10/2005 | Brown |
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0091059 A1 | 5/2006 | Barbaro |
| 2006/0162243 A1 | 7/2006 | Wolf |
| 2006/0169305 A1 | 8/2006 | Jansen et al. |
| 2006/0210456 A1 | 9/2006 | Bruggendick |
| 2006/0169064 A1 | 10/2006 | Anschutz et al. |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0220586 A1 | 9/2011 | Levitt |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2012/0222550 A1 | 9/2012 | Ellis |
| 2012/0272715 A1 | 11/2012 | Kriel et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0192339 A1 | 8/2013 | Kriel et al. |
| 2013/0225897 A1 | 8/2013 | Candelon et al. |
| 2013/0288355 A1 | 10/2013 | DeWitte et al. |
| 2013/0302738 A1 | 11/2013 | Rennie |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0251129 A1 | 9/2014 | Upadhyay |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0007720 A1 | 1/2015 | Vu |
| 2015/0034570 A1 | 2/2015 | Andreussi |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0045918 A1 | 2/2016 | Lapham |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0175749 A1 | 6/2016 | Suda |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0128859 A1 | 5/2017 | Levitt |
| 2017/0131728 A1 | 5/2017 | Lambert et al. |
| 2017/0151526 A1 | 6/2017 | Cole |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2017/0234335 A1 | 8/2017 | LeBlanc et al. |
| 2017/0269559 A1 | 9/2017 | Trygstad |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0094809 A1 | 4/2018 | Lochschmied |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |

(56) References Cited

U.S. PATENT DOCUMENTS

| | | |
|---|---|---|
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1 | 9/2019 | McBride |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0041481 A1 | 2/2020 | Burgess |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1 | 4/2020 | Moore et al. |
| 2020/0181502 A1 | 6/2020 | Paasikallio et al. |
| 2020/0191385 A1 | 6/2020 | Carroll |
| 2020/0199462 A1 | 6/2020 | Klussman et al. |
| 2020/0208068 A1 | 7/2020 | Hossain et al. |
| 2020/0246743 A1 | 8/2020 | Sorensen |
| 2020/0291316 A1 | 9/2020 | Robbins et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |
| 2021/0318280 A1* | 10/2021 | Ludlum ............ G01N 33/0036 |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041939 A1 | 2/2022 | Titta et al. |
| 2022/0041940 A1 | 2/2022 | Pradeep et al. |
| 2022/0048019 A1 | 2/2022 | Zalewski et al. |
| 2022/0268694 A1 | 8/2022 | Bledsoe et al. |
| 2022/0298440 A1 | 9/2022 | Woodchick et al. |
| 2022/0299170 A1 | 9/2022 | Raynor et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0011898 A1 | 1/2024 | Bledsoe, Jr. et al. |
| 2024/0115996 A1 | 4/2024 | Rudd |
| 2024/0117262 A1 | 4/2024 | Eller |
| 2024/0124790 A1 | 4/2024 | Sexton |
| 2024/0132786 A1 | 4/2024 | Sexton |
| 2024/0182803 A1 | 6/2024 | Woodchick |
| 2024/0189753 A1 | 6/2024 | Esquivel |
| 2024/0294837 A1 | 9/2024 | Larsen |
| 2024/0327723 A1 | 10/2024 | Larsen |

FOREIGN PATENT DOCUMENTS

| | | |
|---|---|---|
| CA | 2949201 | 11/2015 |
| CA | 2822742 | 12/2016 |
| CA | 3009808 | 7/2017 |
| CA | 2904903 | 8/2020 |
| CA | 3077045 | 9/2020 |
| CA | 2947431 | 3/2021 |
| CA | 3004712 | 6/2021 |
| CA | 2980055 | 12/2021 |
| CA | 2879783 | 1/2022 |
| CA | 2991614 | 1/2022 |
| CA | 2980069 | 11/2022 |
| CA | 3109606 | 12/2022 |
| CH | 432129 | 3/1967 |
| CN | 2128346 | 3/1993 |
| CN | 201264907 Y | 7/2009 |
| CN | 201306736 | 9/2009 |
| CN | 201940168 | 8/2011 |
| CN | 102120138 | 12/2012 |
| CN | 203453713 | 2/2014 |
| CN | 103627433 | 3/2014 |
| CN | 203629938 | 6/2014 |
| CN | 203816490 | 9/2014 |
| CN | 104353357 | 2/2015 |
| CN | 204170623 | 2/2015 |
| CN | 103331093 | 4/2015 |
| CN | 204253221 | 4/2015 |
| CN | 204265565 | 4/2015 |
| CN | 105148728 | 12/2015 |
| CN | 204824775 | 12/2015 |
| CN | 103933845 | 1/2016 |
| CN | 105289241 | 2/2016 |
| CN | 105536486 | 5/2016 |
| CN | 105804900 | 7/2016 |
| CN | 103573430 | 8/2016 |
| CN | 205655095 | 10/2016 |
| CN | 104326604 | 11/2016 |
| CN | 104358627 | 11/2016 |
| CN | 106237802 | 12/2016 |
| CN | 205779365 | 12/2016 |
| CN | 106407648 | 2/2017 |
| CN | 105778987 | 8/2017 |
| CN | 207179722 | 4/2018 |
| CN | 207395575 | 5/2018 |
| CN | 108179022 | 6/2018 |
| CN | 108704478 | 10/2018 |
| CN | 109126458 | 1/2019 |
| CN | 109423345 | 3/2019 |
| CN | 109499365 | 3/2019 |
| CN | 109705939 | 5/2019 |
| CN | 109722303 | 5/2019 |
| CN | 110129103 | 8/2019 |
| CN | 110229686 | 9/2019 |
| CN | 209451617 | 10/2019 |
| CN | 110987862 | 4/2020 |

(56) References Cited

FOREIGN PATENT DOCUMENTS

| | | |
|---|---|---|
| CN | 111336612 A | 6/2020 |
| CN | 213762571 U | 7/2021 |
| CN | 213824075 U | 7/2021 |
| CN | 215263512 U | 12/2021 |
| CN | 215288592 | 12/2021 |
| CN | 113963818 | 1/2022 |
| CN | 114001278 | 2/2022 |
| CN | 217431673 | 9/2022 |
| CN | 218565442 | 3/2023 |
| DE | 10179 | 6/1912 |
| DE | 3721725 | 1/1989 |
| DE | 19619722 | 11/1997 |
| DE | 102010017563 | 12/2011 |
| DE | 102014009231 A1 | 1/2016 |
| EP | 0142352 | 5/1985 |
| EP | 0527000 | 2/1993 |
| EP | 0783910 A1 | 7/1997 |
| EP | 0949318 | 10/1999 |
| EP | 0783910 B1 | 12/2000 |
| EP | 0801299 | 3/2004 |
| EP | 1413712 | 4/2004 |
| EP | 1600491 | 11/2005 |
| EP | 1870153 | 12/2007 |
| EP | 2047905 | 4/2009 |
| EP | 2955345 | 12/2015 |
| EP | 3130773 | 2/2017 |
| EP | 3139009 | 3/2017 |
| EP | 3239483 | 11/2017 |
| EP | 3085910 | 8/2018 |
| EP | 3355056 | 8/2018 |
| EP | 2998529 | 2/2019 |
| EP | 3441442 | 2/2019 |
| EP | 3569988 | 11/2019 |
| EP | 3878926 | 9/2021 |
| FR | 2357630 | 2/1978 |
| FR | 3004722 | 3/2016 |
| FR | 3027909 | 5/2016 |
| FR | 3067036 | 12/2018 |
| FR | 3067037 | 12/2018 |
| FR | 3072684 | 4/2019 |
| FR | 3075808 | 6/2019 |
| GB | 775273 | 5/1957 |
| GB | 933618 | 8/1963 |
| GB | 1207719 | 10/1970 |
| GB | 2144526 | 3/1985 |
| GB | 2516441 | 1/2015 |
| IN | 202111016535 | 7/2021 |
| JP | 59220609 | 12/1984 |
| JP | 2003129067 | 5/2003 |
| JP | 2005147478 A | 6/2005 |
| JP | 3160405 | 6/2010 |
| JP | 2015059220 | 3/2015 |
| JP | 2019014275 | 1/2019 |
| KR | 101751923 | 7/2017 |
| KR | 101823897 | 3/2018 |
| KR | 20180095303 | 8/2018 |
| KR | 20190004474 | 1/2019 |
| KR | 20190004475 | 1/2019 |
| RU | 2673558 | 11/2018 |
| RU | 2700705 | 9/2019 |
| RU | 2760879 | 12/2021 |
| TW | 320682 | 11/1997 |
| WO | 94/08225 | 4/1994 |
| WO | 199640436 | 12/1996 |
| WO | 1997033678 | 9/1997 |
| WO | 199803249 | 1/1998 |
| WO | 1999041591 | 8/1999 |
| WO | 2001051588 | 7/2001 |
| WO | 2002038295 | 5/2002 |
| WO | 2006126978 | 11/2006 |
| WO | 2008088294 | 7/2008 |
| WO | 2010/144191 | 12/2010 |
| WO | 2012026302 | 3/2012 |
| WO | 2012062924 | 5/2012 |
| WO | 2012089776 | 7/2012 |
| WO | 2012108584 | 8/2012 |
| WO | 2014053431 | 4/2014 |
| WO | 2014096703 | 6/2014 |
| WO | 2014096704 | 6/2014 |
| WO | 2014191004 | 7/2014 |
| WO | 2014177424 | 11/2014 |
| WO | 2014202815 | 12/2014 |
| WO | 2016167708 | 10/2016 |
| WO | 2017067088 | 4/2017 |
| WO | 2017207976 | 12/2017 |
| WO | 2018017664 | 1/2018 |
| WO | 2018073018 | 4/2018 |
| WO | 2018122274 | 7/2018 |
| WO | 2018148675 | 8/2018 |
| WO | 2018148681 | 8/2018 |
| WO | 2018231105 | 12/2018 |
| WO | 2019053323 | 3/2019 |
| WO | 2019104243 | 5/2019 |
| WO | 2019155183 | 8/2019 |
| WO | 2019178701 | 9/2019 |
| WO | 2020035797 | 2/2020 |
| WO | 2020160004 | 8/2020 |
| WO | 2021058289 | 4/2021 |
| WO | 2022133359 | 6/2022 |
| WO | 2022144495 | 7/2022 |
| WO | 2022149501 | 7/2022 |
| WO | 2022219234 | 10/2022 |
| WO | 2022220991 | 10/2022 |
| WO | 2023020797 | 2/2023 |
| WO | 2023038579 | 3/2023 |
| WO | 2023137304 | 7/2023 |
| WO | 2023164683 | 8/2023 |
| WO | 2023242308 | 12/2023 |

OTHER PUBLICATIONS

Luyben, W. L., Process Modeling, Simulation, and Control for Chemical Engineers, Feedforward Control, pp. 431-433.
Cooper et al., Calibration transfer of near-IR partial least squares property models of fuels using standards, Wiley Online Library, Jul. 19, 2011.
ABB Measurement & Analytics, Using FT-NIR as a Multi-Stream Method for CDU Optimization, Nov. 8, 2018.
Modcon Systems LTD., On-Line NIR Analysis of Crude Distillation Unit, Jun. 2008.
ABB Measurement & Analytics, Crude distillation unit (CDU) optimization, 2017.
Guided Wave Inc., The Role of NIR Process Analyzers in Refineries to Process Crude Oil into Useable Petrochemical Products, 2021.
ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.
Bueno, Alexis et al., Characterization of Catalytic Reforming Streams by NIR Spectroscopy, Energy & Fuels 2009, 23, 3172-3177, Apr. 29, 2009.
Caricato, Enrico et al., Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.
Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.
Rodriguez, Elena et al., Coke deposition and product distribution in the co-cracking of waste polyolefin derived streams and vacuum gas oil under FCC unit conditions, Fuel Processing Technology 192 (2019), 130-139.
Passamonti, Francisco J. et al., Recycling of waste plastics into fuels, PDPE conversion in FCC, Applied Catalysis B: Environmental 125 (2012), 499-506.
De Rezende Pinho, Andrea et al., Fast pyrolysis oil from pinewood chips co-processing with vacuum gas oil in an FCC unit for second generation fuel production, Fuel 188 (2017), 462-473.

(56) References Cited

OTHER PUBLICATIONS

Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.
Hanson et al., An atmospheric crude tower revamp, Digital Refining, Article, Jul. 2005.
Lopiccolo, Philip, Coke trap reduces FCC slurry exchanger fouling for Texas refiner, Oil & Gas Journal, Sep. 8, 2003.
Martino, Germain, Catalytic Reforming, Petroleum Refining Conversion Processes, vol. 3, Chapter 4, pp. 101-168, 2001.
Baukal et al., Natural-Draft Burners, Industrial Burners Handbook, CRC Press 2003.
Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.
United States Department of Agriculture, NIR helps Turn Vegetable Oil into High-Quality Biofuel, Agricultural Research Service, Jun. 15, 1999.
NPRA, 2006 Cat Cracker Seminar Transcript, National Petrochemical & Refiners Association, Aug. 1-2, 2006.
Niccum, Phillip K. et al. KBR, CatCracking.com, More Production—Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.
Fluid Catalytic Cracking and Light Olefins Production, Hydrocarbon Publishing Company, 2011, http://www.hydrocarbonpublishing.com/store10/product.php?productid+b21104.
Zhang et al., Multifunctional two-stage riser fluid catalytic cracking process, Springer Applied Petrocchemical Research, Sep. 3, 2014.
Reid, William, Recent trends in fluid catalytic cracking patents, part V: reactor section, Dilworth IP, Sep. 3, 2014.
Akah et al., Maximizing propylene production via FCC technology, SpringerLink, Mar. 22, 2015.
Vogt et al., Fluid Catalytic Cracking: Recent Developments on the Grand Old Lady of Zeolite Catalysis, Royal Society of Chemistry, Sep. 18, 2015.
Zhou et al., Study on the Integration of Flue Gas Waste He Desulfuization and Dust Removal in Civilian Coalfired Heating Furnance, 2020 IOP Conf. Ser.: Earth Environ. Sci. 603 012018.
Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.
International Standard, ISO 8217, Petroleum products—Fuels (class F)—Specifications of marine fuels, Sixth Edition, 2017.
International Standard, ISO 10307-1, Petroleum products—Total sediment in residual fuel oils—, Part 1: Determination by hot filtration, Second Edition, 2009.
International Standard, ISO 10307-2, Petroleum products—Total sediment in residual fuel oils—, Part 2: Determination using standard procedures for aging, Second Edition, 2009.
Ebner et al., Deactivatin and durability of the catalyst for Hotspot™ natural gas processing, OSTI, 2000, https://www.osti/gov/etdeweb/servlets/purl/20064378, (Year: 2000).

Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.
Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.
Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.
Meng et al., In bed and downstream hot gas desulphurization during solid fuel gasification: A review, Fuel Processing Technology 91, pp. 964-981, 2010.
Okonkwo et al., Role of Amine Structure on Hydrogen Sulfide Capture from Dilute Gas Streams Using Solid Adsorbents, Energy Fuels, 32, pp. 6926-6933, 2018.
Okonkwo et al., Selective removal of hydrogen sulfide from simulated biogas streams using sterically hindered amine adsorbents, Chemical Engineering Journal 379, pp. 122-349, 2020.
Lerh et al., Feature: IMO 2020 draws more participants into Singapore's bunkering pool., S&P Global Platts, www.spglobal.com, Sep. 3, 2019.
Cremer et al., Model Based Assessment of the Novel Use of Sour Water Stripper Vapor for NOx Control in CO Boilers, Industrial Combustion Symposium, American Flame Research Committee 2021, Nov. 19, 2021.
Frederick et al., Alternative Technology for Sour Water Stripping, University of Pennsylvania, Penn Libraries, Scholarly Commons, Apr. 20, 2018.
Da Vinci Laboratory Solutions B. V., DVLS Liquefied Gas Injector, Sampling and analysis of liquefied gases, https://www.davinci-ls.com/en/products/dvls-products/dvls-liquefied-gas-injector.
Wasson ECE Instrumentation, LPG Pressurization Station, https://wasson-ece.com/products/small-devices/lpg-pressurization-station.
Mechatest B. V., Gas & Liquefied Gas Sampling Systems, https://www.mechatest.com/products/gas-sampling-system/.
La Rivista dei Combustibili, The Fuel Magazine, vol. 66, File 2, 2012.
Zulkefi et al., Overview of H2S Removal Technologies from Biogas Production, International Journal of Applied Engineering Research ISSN 0973-4562, vol. 11, No. 20, p. 10060-10066, ©Research India Publications, 2016.
Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.
Doolin et al., "Catalyst Regeneration and Continuous Reforming Issues", Catalytic Naptha Reforming, 2004.
Pashikanti et al., "Predictive modeling of large-scale integrated refinery reaction and fractionation systems from plant. Data. Part 3: Continuous Catalyst Regeneration (CCR) Reforming Process," Energy & Fuels 2011, 25, 5320-5344 (Year: 2011).
Bollas et al., "Modeling Small-Diameter FCC Riser Reactors. A Hydrodynamic and Kinetic Approach", Industrial and Engineering Chemistry Research, 41(22), 5410-5419, 2002.
Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.
Lloyd's Register, Using technology to trace the carbon intensity of sustainable marine fuels, Feb. 15, 2023.
"Development of Model Equations for Predicting Gasoline Blending Properties", Odula et al., American Journal of Chemical Engineering, vol. 3, No. 2-1, 2015, pp. 9-17.

* cited by examiner

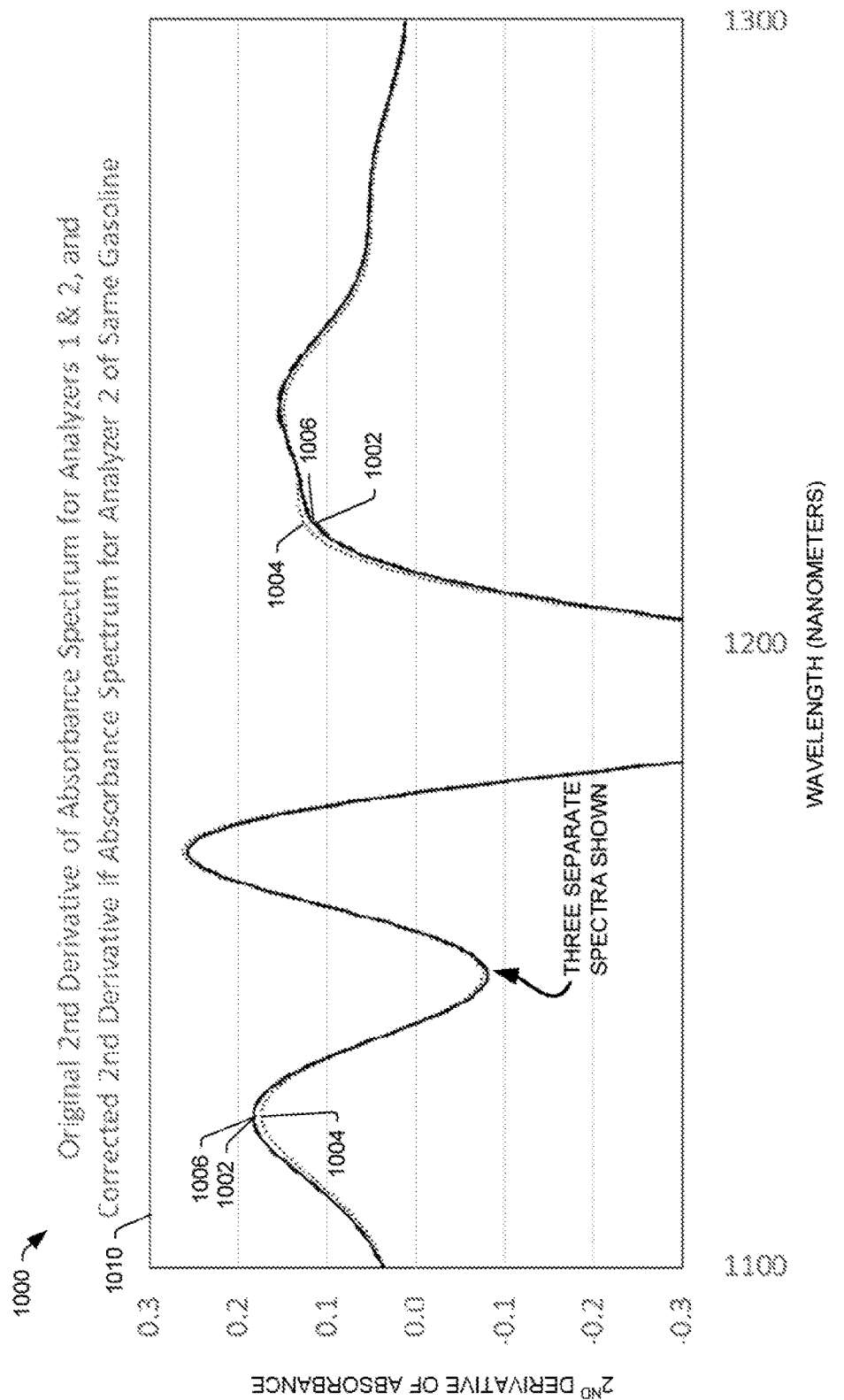

FIG. 13D

METHODS AND ASSEMBLIES FOR DETERMINING AND USING STANDARDIZED SPECTRAL RESPONSES FOR CALIBRATION OF SPECTROSCOPIC ANALYZERS

PRIORITY CLAIMS

This is a continuation of U.S. Non-Provisional application Ser. No. 17/988,239, filed Nov. 16, 2022, titled "METHODS AND ASSEMBLIES FOR DETERMINING AND USING STANDARDIZED SPECTRAL RESPONSES FOR CALIBRATION OF SPECTROSCOPIC ANALYZERS," which is a continuation of U.S. Non-Provisional application Ser. No. 17/652,431, filed Feb. 24, 2022, titled "METHODS AND ASSEMBLIES FOR DETERMINING AND USING STANDARDIZED SPECTRAL RESPONSES FOR CALIBRATION OF SPECTROSCOPIC ANALYZERS," which claims priority to and the benefit of U.S. Provisional Application No. 63/153,452, filed Feb. 25, 2021, titled "METHODS AND ASSEMBLIES FOR DETERMINING AND USING STANDARDIZED SPECTRAL RESPONSES FOR CALIBRATION OF SPECTROSCOPIC ANALYZERS," and U.S. Provisional Application No. 63/268,456, filed Feb. 24, 2022, titled "ASSEMBLIES AND METHODS FOR ENHANCING CONTROL OF FLUID CATALYTIC CRACKING (FCC) PROCESSES USING SPECTROSCOPIC ANALYZERS," the disclosures of all of which are incorporated herein by reference in their entireties.

TECHNICAL FIELD

The present disclosure relates to methods and assemblies for determining and using standardized spectral responses for calibration of spectroscopic analyzers and, more particularly, to methods and assemblies for determining and using standardized spectral responses for calibration of spectroscopic analyzers to enhance prediction of material properties.

BACKGROUND

Spectroscopic analyzers may be used to non-invasively predict (or determine) properties associated with materials. For example, a sample of material may be fed to a spectroscopic analyzer for analysis, and a beam of electromagnetic radiation may be transmitted into the material sample, resulting in the spectroscopic analyzer measuring a spectral response representative of the chemical composition of the sample material, which may be used to predict (or determine) properties of the sample material via the use of modeling. The spectral response may include a spectrum related to the absorbance, transmission, transflectance, reflectance, or scattering intensity caused by the material sample over a range of wavelengths, wavenumbers, or frequencies of the electromagnetic radiation.

Calibration of spectroscopic analyzers may be a tedious and time-intensive process. For example, to calibrate some spectroscopic analyzers for certain uses, it may be necessary to analyze hundreds or thousands of material samples having known material properties to achieve a desired level of response accuracy for the spectroscopic analyzer. If more than one spectroscopic analyzer needs to be calibrated, the time required for calibration may be multiplied. In manufacturing situations, this may lead to excessive down-time for monitoring, optimization, or other control of a production process, resulting in production and financial inefficiencies.

An attempt to improve a process of calibrating spectroscopic analyzers is described in U.S. Pat. No. 5,243,546 to Maggard et al. ("the '546 patent"). The '546 patent describes methods for calibrating spectroscopic analyzers that modify a calibration equation of the spectroscopic analyzer. As described by the '546 patent, the calibration equation is an equation that transforms spectral data of a particular sample at a variety of wavelengths to a calculated value for a chemical or physical property. The form of such calibration equations is that of a linear combination of absorbances, or mathematical transforms of absorbances, measured by the spectroscopic analyzers for each sample.

Applicant has recognized that the methods of '546 patent may still result in a tedious and time-intensive process and may suffer from other possible drawbacks. For example, although the calibration equations may be helpful in calibrating spectroscopic analyzers, to obtain a desired level of accuracy, reproducibility, and consistency for many applications, the methods described in the '546 patent may still additionally require analyzing an undesirably high number of material samples.

Applicant also has recognized that over time the results of analysis using a spectroscopic analyzer may change, for example, due to changes or degradation of the components of the spectroscopic analyzer, such as its lamp, laser, detector, or grating. Changing or servicing components of the spectroscopic analyzer may alter its spectral responses relative to the spectral responses outputted prior to the changes, necessitating recalibration. Further, for some applications, more than one spectroscopic analyzer may be used in association with analysis of materials at, for example, a production facility, and it may be desirable for two or more of the spectroscopic analyzers to generate results that are reproducible and consistent with one another to enhance control of the production process. Due to the complex nature, sensitivity, and principle of operation of spectroscopic analyzers, however, two spectroscopic analyzers may not be likely to provide equivalent results within the variability of the primary test method with which calibration models were made without additional activity, even when analyzing the same sample of material. This may result in a lack of reproducibility or consistency of results across different spectroscopic analyzers, potentially rendering comparisons between the results outputted by two or more spectroscopic analyzers of little value, unless the spectroscopic analyzers have been calibrated to achieve the same spectral responses.

Accordingly, it can be seen that a need exists for methods and assemblies that reduce the number of material samples and time required for calibrating a spectroscopic analyzer while achieving desired levels of accuracy, reproducibility, and/or consistent results. The present disclosure may address one or more of the above-referenced drawbacks, as well as other possible drawbacks.

SUMMARY

As referenced above, calibration of spectroscopic analyzers may be a tedious and time-intensive process. Additionally, Applicant has recognized that over time the results of analysis using a spectroscopic analyzer may change due to changing or servicing components of the spectroscopic analyzer that may alter its spectral responses relative to the spectral responses outputted prior to the changes, necessitating recalibration or other activity. Moreover, for some applications, it may be desirable for two or more of the spectroscopic analyzers to output results that are reproducible and consistent with one another to enhance control of a production process. However, two spectroscopic analyzers may not be likely to provide equivalent results within the necessary variability for the predicted (or determined) property/ies, even when analyzing the same sample of material, which may result in a lack of the desired reproducibility or consistency of results across different spectroscopic analyzers, potentially rendering comparisons between the results outputted by two or more spectroscopic analyzers of little value, unless additional adjustments are performed or the spectroscopic analyzers have been standardized to achieve the same spectral responses.

The present disclosure is generally directed to methods and assemblies for determining and using standardized spectral responses for calibration of spectroscopic analyzers. For example, in some embodiments, the methods and assemblies may be used to calibrate or recalibrate a spectroscopic analyzer when the spectroscopic analyzer changes from a first state to a second state, for example, the second state being defined as a period of time after a change to the spectroscopic analyzer causing a need to calibrate the spectroscopic analyzer. In some embodiments, the recalibration may result in the spectroscopic analyzer outputting a standardized spectrum, for example, such that the spectroscopic analyzer outputs a corrected material spectrum for an analyzed material, including one or more of an absorption-corrected spectrum, a transmittance-corrected spectrum, a transflectance-corrected spectrum, a reflectance-corrected spectrum, or an intensity-corrected spectrum and defining the standardized spectrum. In some embodiments, the corrected material spectrum, output when the calibrated or recalibrated spectroscopic analyzer is in the second state, may include a plurality of signals indicative of a plurality of material properties of an analyzed material based at least in part on the corrected material spectrum, the plurality of material properties of the material being substantially consistent with a plurality of material properties of the material outputted by the spectroscopic analyzer in the first state. This may enhance the accuracy, reproducibility, and/or consistency of results outputted by the second-state recalibrated spectroscopic analyzer prior to recalibration relative to results outputted by the first-state spectroscopic analyzer.

In some embodiments, using calibration of a first spectroscopic analyzer to calibrate one or more additional spectroscopic analyzers may include using standardized analyzer spectra for calibration of a spectroscopic analyzer, for example, such that each of the one or more spectroscopic analyzers outputs a corrected material spectrum, including a plurality of signals indicative of a plurality of material properties of an analyzed material based at least in part on the corrected material spectrum, such that the plurality of material properties of the material are substantially consistent with a plurality of material properties of the material outputted by the first spectroscopic analyzer. In some embodiments, this may result in achieving desired levels of accuracy, reproducibility, and/or consistent results from a plurality of spectroscopic analyzers, potentially rendering comparisons between the results outputted by two or more spectroscopic analyzers more valuable, for example, when incorporated into a complex process including a plurality of different material altering processes.

According to some embodiments, a method for determining and using standardized analyzer spectral responses to enhance a process for calibration of a spectroscopic analyzer when a spectroscopic analyzer changes from a first state to a second state, the second state being defined as a period of time after a change to the spectroscopic analyzer causing a need to calibrate or recalibrate the spectroscopic analyzer, may include analyzing, via the spectroscopic analyzer when in the first state, a selected plurality of multi-component samples to output first-state sample spectra. The analyzing of the selected plurality of multi-component samples may occur during a first-state time period. The method further may include determining one or more spectral models based at least in part on the first-state sample spectra and corresponding sample data. The method still further may include analyzing, via the spectroscopic analyzer when in the first state, a selected one or more first-state portfolio samples to output a standardized analyzer spectra portfolio for the selected one or more first-state portfolio samples. The standardized analyzer spectra portfolio may include a first-state portfolio sample spectrum for each of the first-state portfolio samples. The method also may include analyzing, via a spectroscopic analyzer when in the second state, a selected one or more second-state portfolio samples to output second-state portfolio sample spectra for the selected one or more second-state portfolio samples. Each of the second-state portfolio sample spectra may be associated with a corresponding second-state portfolio sample. The analyzing of the selected one or more second-state portfolio samples may occur during a second-state time period. The multi-component samples may include a significantly greater number of samples than a number of samples included in the second-state portfolio samples, and the second-state time period for analyzing the second-state portfolio samples may be significantly less than the first-state time period. The method still further may include comparing one or more of the second-state portfolio sample spectra for the selected one or more second-state portfolio samples to one or more of the first-state portfolio sample spectra of the standardized analyzer spectra portfolio corresponding to first-state portfolio samples of the spectroscopic analyzer as analyzed and output when in the first state during the first-state time period. The method further may include determining, based at least in part on the comparison, for the one or more of the selected one or more second-state portfolio samples of the second-state portfolio sample spectra, a variance at one or more of a plurality of wavelengths or over a range of wavelengths between the second-state portfolio sample spectra output by the spectroscopic analyzer when in the second state and the first-state portfolio sample spectra of the standardized analyzer spectra portfolio. The standardized analyzer spectra portfolio may be used to reduce the variance between the second-state portfolio sample spectra and the first-state portfolio sample spectra.

In some embodiments, the method also may include analyzing, via the spectroscopic analyzer when in the second state, a material received from a material source to output a material spectrum. The method still further may include transforming, based at least in part on the standardized analyzer spectra portfolio, the material spectrum to output a corrected material spectrum for the material when in the second state. The corrected material spectrum may include one or more of an absorption-corrected spectrum, a transmittance-corrected spectrum, a transflectance-corrected spectrum, a reflectance-corrected spectrum, or an intensity-corrected spectrum and may define a standardized spectrum, for example, and/or a mathematical treatment of the material spectrum, such as, for example, a second derivative of the material spectrum.

According to some embodiments, a method for determining and using standardized analyzer spectral responses to enhance a process for calibration of a plurality of spectroscopic analyzers such that for a given material each of the plurality of spectroscopic analyzers outputs a plurality of signals indicative of a plurality of material properties of the material, the plurality of material properties of the material output by each of the plurality of spectroscopic analyzers being substantially consistent with one another, may include transferring one or more spectral models to each of the plurality of spectroscopic analyzers. Each of the one or more spectral models may be indicative of relationships between a spectrum or spectra and one or more of the plurality of material properties of one or more materials. The method also may include analyzing, via the first spectroscopic analyzer when in a first state, a selected one or more first-state portfolio samples to output a standardized analyzer spectra portfolio for the selected one or more first-state portfolio samples. The standardized analyzer spectra portfolio may include a first-state portfolio sample spectrum for each of the first-state portfolio samples. The method further may include analyzing, via each of a remainder of the plurality of spectroscopic analyzers when in a second state a selected one or more second-state portfolio samples to output second-state portfolio sample spectra for the selected one or more second-state portfolio samples. Each of the second-state portfolio sample spectra may be associated with a corresponding second-state portfolio sample. The analysis of the selected one or more second-state portfolio samples may occur during a second-state time period. The multi-component samples may include a significantly greater number of samples than a number of samples included in the second-state portfolio samples, and the second-state time period for analyzing the second-state portfolio samples may be significantly less than the first-state time period. The method also may include comparing one or more of the second-state portfolio sample spectra for the selected plurality of portfolio samples to the first-state sample spectra of a selected plurality of corresponding first-state multi-component samples. The method still further may include determining, based at least in part on the comparison, for the one or more of the selected plurality of portfolio samples of the second-state portfolio sample spectra, a variance at one or more of a plurality of wavelengths or over a range of wavelengths between the second-state portfolio sample spectra output by each of the remainder of the plurality of spectroscopic analyzers when in the second state and the first-state sample spectra corresponding to the selected one or more first-state multi-component material samples output by the first spectroscopic analyzer in the first state.

In some embodiments, the method still further may include analyzing, via one or more of the remainder of the plurality of spectroscopic analyzers when in the second state, a material received from a material source to output a material spectrum. The method also may include transforming, based at least in part on the standardized analyzer spectra portfolio, the material spectrum to output a corrected material spectrum for the material when in the second state, the corrected material spectrum including one or more of an absorption-corrected spectrum, transmittance-corrected spectrum, a transflectance-corrected spectrum, a reflectance-corrected spectrum, or an intensity-corrected spectrum and defining a standardized spectrum, for example, and/or a mathematical treatment of the material spectrum, such as, for example, a second derivative of the material spectrum.

According to some embodiments, a method for determining and using standardized analyzer spectral responses to enhance a process for calibration of a spectroscopic analyzer when a spectroscopic analyzer changes from a first state to a second state, the second state being defined as a period of time after a change to the spectroscopic analyzer causing a need to calibrate or recalibrate the spectroscopic analyzer, the spectroscopic analyzer including one or more detectors, may include analyzing, via the spectroscopic analyzer when in the first state, a selected plurality of multi-component samples to output first-state sample spectra. The analysis of the selected plurality of multi-component samples may occur during a first-state time period. The method further may include determining one or more spectral models based at least in part on the first-state sample spectra and corresponding sample data. The method still further may include analyzing, via the spectroscopic analyzer when in the first state, a selected one or more first-state portfolio samples to output a standardized analyzer spectra portfolio for the selected one or more first-state portfolio samples. The standardized analyzer spectra portfolio may include a first-state portfolio sample spectrum for each of the first-state portfolio samples. The method still further may include analyzing, via a spectroscopic analyzer when in the second state, a selected one or more second-state portfolio samples to output second-state portfolio sample spectra for the selected one or more second-state portfolio samples. Each of the second-state portfolio sample spectra may be associated with a corresponding second-state portfolio sample. The analysis of the selected one or more second-state portfolio samples may occur during a second-state time period. The multi-component samples may include a significantly greater number of samples than a number of samples included in the second-state portfolio samples, and the second-state time period for analyzing the second-state portfolio samples may be significantly less than the first-state time period. The method also may include comparing one or more of the second-state portfolio sample spectra for the selected one or more second-state portfolio samples to one or more of the first-state portfolio sample spectra of the standardized analyzer spectra portfolio corresponding to first-state portfolio samples of the spectroscopic analyzer as analyzed and output when in the first state during the first-state time period. The method also may include determining, based at least in part on the comparison, for the one or more of the selected one or more second-state portfolio samples of the second-state portfolio sample spectra, a variance at one or more of a plurality of wavelengths or over a range of wavelengths between the second-state portfolio sample spectra output by the spectroscopic analyzer when in the second state and the first-state portfolio sample spectra of the standardized analyzer spectra portfolio. The standardized analyzer spectra portfolio may be used to reduce the variance between the second-state portfolio sample spectra and the first-state portfolio sample spectra.

In some embodiments, the method further may include analyzing, via the spectroscopic analyzer when in the second state, a material received from a material source to output a material spectrum. The method still further may include altering, based at least in part on the standardized analyzer spectra portfolio, a gain associated with one or more of the one or more analyzer sources, the one or more detectors, or one or more detector responses at one or more of the wavelengths to output a corrected material spectrum for the material when in the second state, the corrected material spectrum including one or more of an absorption-corrected spectrum, a transmittance-corrected spectrum, a transflectance-corrected spectrum, a reflectance-corrected spectrum, or an intensity-corrected spectrum and defining a standardized spectrum, for example, and/or a mathematical treatment of the material spectrum, such as, for example, a second derivative of the material spectrum.

In some embodiments, a spectroscopic analyzer assembly to determine and use standardized analyzer spectral responses to enhance a process for calibration of a spectroscopic analyzer when a spectroscopic analyzer changes from a first state to a second state, the second state being defined as a period of time after a change to a spectroscopic analyzer causing a need to calibrate or recalibrate the spectroscopic analyzer, may include a spectroscopic analyzer and an analyzer controller in communication with the spectroscopic analyzer. The analyzer controller may be configured to output, based at least in part on one or more signals received from the spectroscopic analyzer when in the first state during a first-state time period, first-state sample spectra for each of a selected plurality of multi-component samples. The analyzer controller further may be configured to determine one or more spectral models based at least in part on the first-state sample spectra and corresponding sample data. The analyzer controller still further may be configured to output, based at least in part on one or more signals received from the spectroscopic analyzer when in the first state, a standardized analyzer spectra portfolio for a selected one or more first-state portfolio samples. The standardized analyzer spectra portfolio may include a first-state portfolio sample spectrum for each of the first-state portfolio samples. The analyzer controller still further may be configured to output, based at least in part on one or more signals received from the spectroscopic analyzer when in the second state during a second-state time period, a second-state portfolio spectrum for each of a selected one or more second-state portfolio samples. Each of the second-state portfolio sample spectra may be associated with a corresponding second state portfolio sample. The multi-component samples may include a significantly greater number of samples than a number of samples included in the second-state portfolio samples, and the second-state time period for analyzing the second-state portfolio samples may be significantly less than the first-state time period. The analyzer controller also may be configured to compare one or more of the second-state portfolio sample spectra for the selected one or more second-state portfolio samples to a first-state sample spectra of a selected plurality of corresponding first-state portfolio samples of the spectroscopic analyzer as analyzed and output when in the first state during the first-state time period. Each of the first-state portfolio sample spectra may be associated with a corresponding first-state portfolio sample. The analyzer controller further may be configured to determine, based at least in part on the comparing, for the one or more of the selected one or more second-state portfolio samples of the second-state portfolio sample spectra, a variance at one or more of a plurality of wavelengths or over a range of wavelengths between the second-state portfolio sample spectra output by the spectroscopic analyzer when in the second state and the first-state portfolio sample spectra of the standardized analyzer spectra portfolio. The standardized analyzer spectra portfolio may be used to reduce the variance between the second-state portfolio sample spectra and the first-state portfolio sample spectra.

In some embodiments, the analyzer controller also may be configured to analyze, when in the second state, a material received from a material source to output a material spectrum. The analyzer controller further may be configured to transform, based at least in part on the standardized analyzer spectra portfolio, the material spectrum to output a corrected material spectrum for the material when in the second state, the corrected material spectrum including one or more of an absorption-corrected spectrum, a transmittance-corrected spectrum, a transflectance-corrected spectrum, a reflectance-corrected spectrum, or an intensity-corrected spectrum and defining a standardized spectrum, for example, and/or a mathematical treatment of the material spectrum, such as, for example, a second derivative of the material spectrum.

Still other aspects, examples, and advantages of these exemplary aspects and embodiments, are discussed in more detail below. It is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, may become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the exemplary embodiments discussed herein and the various ways in which they may be practiced. According to common practice, the various features of the drawings discussed below are not necessarily drawn to scale. Dimensions of various features and elements in the drawings may be expanded or reduced to more clearly illustrate the embodiments of the disclosure.

FIG. 10C is a blow-up view of another example range of wavelengths of a portion of the graph shown in FIG. 10A of the first-state material second derivative spectrum, the second-state material second derivative spectrum, and a third material second derivative spectrum (a corrected second derivative spectrum) and highlighting the variance between the first-state and second-state material second derivative spectra shown in FIG. 10A and the similarity of the third material second derivative spectrum to the first-state material second derivative spectrum, according to embodiments of the disclosure.

FIG. 13D is a graph illustrating examples of the second derivative material spectra outputted by a first-state spectroscopic analyzer and multiple second-state spectroscopic analyzers, respectively, of the same example multi-component material of FIGS. 13A-13C, gasoline, corrected to be consistent with the first-state material spectrum, according to embodiments of the disclosure.

DETAILED DESCRIPTION

Figure 1A:
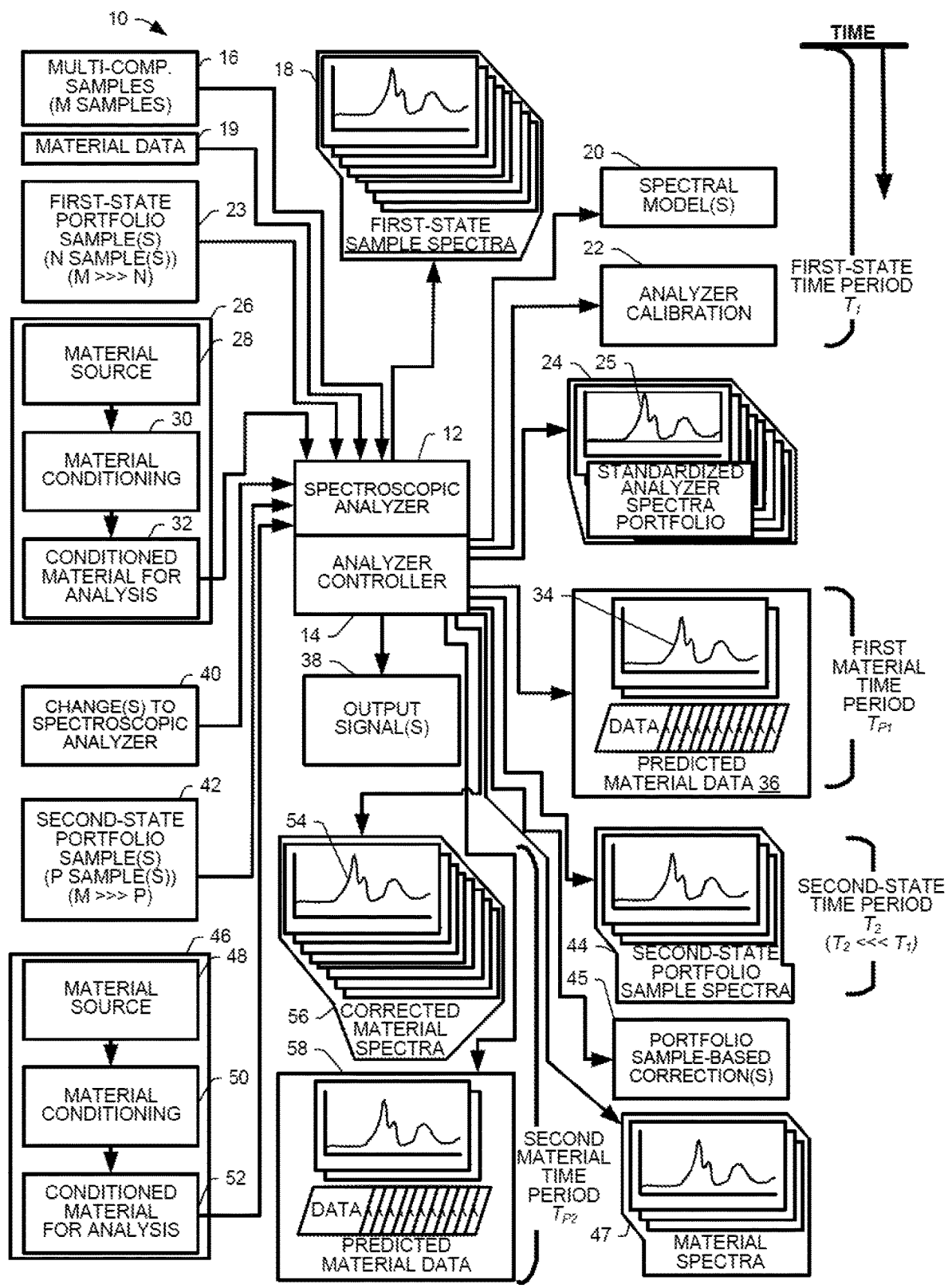
FIG. 1A is a block diagram of an example spectroscopic analyzer assembly including a single spectroscopic analyzer and analyzer controller receiving example inputs and outputting example outputs in relation to an example timeline, according to embodiments of the disclosure.

Referring now to the drawings in which like numerals indicate like parts throughout the several views, the following description is provided as an enabling teaching of exemplary embodiments, and those skilled in the relevant art will recognize that many changes can be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and can even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. A multi-component sample may refer to a single (one) sample including a plurality of components, such as two or more components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not necessarily, by itself, connote any priority, precedence, or order of one claim element over another or the temporal order in which acts of a method are performed, but are used merely as labels to distinguish one claim element having a certain name from another element having a same name (but for use of the ordinal term) to distinguish claim elements.

FIG. 1A is a block diagram of an example spectroscopic analyzer assembly 10 including a spectroscopic analyzer 12 and an analyzer controller 14 receiving example inputs and generating example outputs in relation to an example timeline depicting the passage of time from the top to the bottom of FIG. 1A according to embodiments of the disclosure. The spectroscopic analyzer 12 may be a near-infrared spectroscopic analyzer, a mid-infrared spectroscopic analyzer, a combination of a near-infrared spectroscopic analyzer and a mid-infrared spectroscopic analyzer, or a Raman spectroscopic analyzer, as will be understood by those skilled in the art. As shown in FIG. 1A, in some embodiments, the spectroscopic analyzer assembly 10 may be used to determine and use standardized analyzer spectral responses for calibration of the spectroscopic analyzer 12 when the spectroscopic analyzer 12 changes from a first state to a second state, such as a period of time after a change to the spectroscopic analyzer 12 causing a need to calibrate (or recalibrate) the spectroscopic analyzer 12. For example, in some embodiments, using the standardized analyzer spectra may include the use of a prior spectral model developed on the spectroscopic analyzer 12 when in the first state after a change to the same spectroscopic analyzer 12, such that, when in the second state, analysis by the spectroscopic analyzer 12 of a first multi-component material results in generation of a second-state spectrum that is consistent with a first-state spectrum outputted by the spectroscopic analyzer 12, when in the first state, resulting from analysis of the first multi-component material. Thus, in some embodiments, the spectroscopic analyzer 12 will be capable of generating the substantially same spectrum both before and after an event causing the need to calibrate (or recalibrate) the spectroscopic analyzer 12 (e.g., a change to the spectroscopic analyzer 12, such as maintenance and/or component replacement). In some embodiments, this may improve one or more of the accuracy, reproducibility, or consistency of results outputted by the spectroscopic analyzer 12 after a change in state from the first state to the second state. For example, the spectroscopic analyzer 12 with the analyzer controller 14 may be configured to analyze a multi-component material and output a plurality of signals indicative of a plurality of material properties of the material based at least in part on a corrected material spectrum, such that the plurality of material properties of the material are consistent with (e.g., are similar to, substantially match, are substantially equivalent to, or are substantially the same as) a plurality of material properties of the material outputted by the spectroscopic analyzer 12 in the first state, for example, prior to calibrating or recalibrating the spectroscopic analyzer 12. As used herein, "material properties" and "material data" may in at least some instances be substantially synonymous, although in some instances, "material properties" may be a subset of "material data." "Material data" and "material properties" may in at least some instances be substantially synonymous with "sample data" and "sample properties," respectively.

Referring to FIG. 1A, in some embodiments, the analyzer controller 14 may be in communication with the spectroscopic analyzer 12. In some embodiments, the analyzer controller 14 may be configured for use with a corresponding spectroscopic analyzer 12 for pre-processing and/or post-processing steps or procedures related to a spectroscopic analysis, as will be understood by those skilled in the art. In some embodiments, the analyzer controller 14 may be physically connected to the spectroscopic analyzer 12. In some such embodiments, spectroscopic analyzer 12 may include a housing, and at least a portion of the analyzer controller 14 may be contained in the housing. In some such embodiments, the analyzer controller 14 may be in communication with the spectroscopic analyzer 12 via a hard-wired and/or wireless communications link. In some embodiments, the analyzer controller 14 may be physically separated from the spectroscopic analyzer 12 and may be in communication with the spectroscopic analyzer 12 via a hard-wired communications link and/or a wireless communications link. In some embodiments, physical separation may include being spaced from one another, but within the same building, within the same facility (e.g., located at a common manufacturing facility, such as a refinery), or being spaced from one another geographically (e.g., anywhere in the world). In some physically separated embodiments, both the spectroscopic analyzer 12 and the analyzer controller 14 may be linked to a common communications network, such as a hard-wired communications network and/or a wireless communications network. Such communications links may operate according to any known hard-wired and/or wireless communications protocols as will be understood by those skilled in the art.

As shown in FIG. 1A, in some embodiments, the analyzer controller 14 may be configured to determine standardized analyzer spectral responses for calibration of the spectroscopic analyzer 12 when a spectroscopic analyzer 12 changes from the first state to the second state. For example, the analyzer controller 14, while in the first state and during a first-state time period $T_1$, may be configured to analyze a plurality of different multi-component samples 16 and, based at least in part on the multi-component samples 16, output first-state sample spectra 18 of the different multi-component samples 16. In some embodiments, each of the first-state sample spectra 18 may be collected and stored, for example, in a database. In some embodiments, each of the first-state sample spectra 18 may be associated with a corresponding different multi-component sample 16 and may be indicative of a plurality of different multi-component sample properties. In some embodiments, the first-state sample spectra 18, in combination with material data 19 associated with each of the multi-component samples 16, may be used to output one or more spectral model(s) 20, which, in turn, may be used to calibrate the spectroscopic analyzer 12 with (e.g., and/or) the analyzer controller 14, resulting in an analyzer calibration 22. The material data 19 may include any data related to one or more properties associated with one or more of the respective multi-component samples 16. For the sake of clarity in the drawings, FIGS. 1A-2A show the material data 19 being input or communicated to the spectroscopic analyzers 12. It is contemplated that the material data 19 may be input or communicated to the analyzer controllers 14 (and/or the spectroscopic analyzers 12). The one or more spectral model(s) 20 may be indicative of relationships between a spectrum or spectra of the first-state sample spectra 18 and one or more properties associated with one or more of respective multi-component samples 16, and the relationships may be used to provide the analyzer calibration 22. In some embodiments, as will be understood by those skilled in the art, the one or more spectral model(s) 20 may represent a univariate or multivariate regression (e.g., a least-squares regression, a multiple linear regression (MLR), a partial least squares regression (PLS), a principal component regression (PCR)), such as a regression of material data (e.g., one or more properties of the multi-component sample) against a corresponding spectrum of the first-state sample spectra 18. In some embodiments, the one or more spectral model(s) 20 may represent topological modeling by use of nearest neighbor positioning to calculate properties, based on the material data (e.g., one or more properties of the multi-component sample) against a corresponding spectrum of the first-state sample spectra 18, as also will be understood by those skilled in the art. This may facilitate prediction of one or more properties of a material analyzed by the spectroscopic analyzer 12, once calibrated, based at least in part on a spectrum associated with the material.

In some embodiments, the plurality of different multi-component samples 16 may include a number of multi-component samples ranging, for example, from about 10 samples to about 2,500 samples, from about 50 samples to about 2,000 samples, from about 75 samples to about 1,500 samples, from about 100 samples to about 1,000 samples, from about 100 samples to about 900 samples, from about 100 samples to about 800 samples, from about 100 samples to about 700 samples, from about 100 samples to about 600 samples, from about 100 samples to about 500 samples, from about 100 samples to about 400 samples, from about 200 samples to about 900 samples, from about 300 samples to about 800 samples, from about 400 samples to about 700 samples, from about 500 samples to about 600 samples, or from about 450 samples to about 650 samples. For example, in some embodiments, in order to calibrate the spectroscopic analyzer 12 with the analyzer controller 14 to a desired level of accuracy and/or reproducibility, it may be necessary to analyze hundreds or thousands of multi-component samples 16. Due to the relatively large number of multi-component samples 16 used for calibration, the first-state time period $T_1$, which may generally correspond to a time period during which the number of multi-component samples 16 are analyzed, may range, for example, from about 8 hours to about 200 hours, from about 12 hours to about 175 hours, from about 20 hours to about 150 hours, from about 20 hours to about 130 hours, from about 20 hours to about 110 hours, from about 20 hours to about 90 hours, from about 20 hours to about 70 hours, from about 20 hours to about 50 hours, from about 20 hours to about 40 hours, from about 30 hours to about 150 hours, from about 40 hours to about 130 hours, from about 40 hours to about 110 hours, or from about 50 hours to about 90 hours. For example, in some embodiments, in order to calibrate the spectroscopic analyzer 12 with the analyzer controller 14 to a desired level of accuracy and/or reproducibility, due to the relatively large number of samples analyzed, the first-state time period $T_1$ may take dozens of hours to complete, as will be understood by those skilled in the art.

As shown in FIG. 1A, following calibration of the spectroscopic analyzer 12 with the analyzer controller 14, the spectral responses of the spectroscopic analyzer 12 with the analyzer controller 14 may be standardized, for example, by analyzing one or more first-state portfolio sample(s) 23 to output a standardized analyzer spectra portfolio 24 including one or more first-state portfolio sample spectra 25. For example, the spectroscopic analyzer 12 with the analyzer controller 14, when in the first state, may be used to analyze one or more first-state portfolio sample(s) 23 to output the standardized analyzer spectra portfolio 24 including a first-state portfolio spectrum 25 for each of the one or more first-state portfolio sample(s) 23. In some embodiments, the respective first-state portfolio sample spectrum 25 associated with a respective first-state portfolio sample 23 may be stored to develop the standardized analyzer spectra portfolio 24, which may be used to reduce a variance between a second-state portfolio sample spectrum (outputted during a second state) and a corresponding first-state portfolio sample spectrum 25 of the standardized analyzer spectra portfolio 24, for example, as described herein. The first-state portfolio sample(s) 23 may include one or more samples, and the one or more samples may include a pure compound, a mixture of compounds, and/or one or more multi-component samples.

As shown in FIG. 1A, following calibration and/or standardization of the spectroscopic analyzer 12 with the analyzer controller 14, the spectroscopic analyzer 12 with the analyzer controller 14 may be used to analyze multi-component materials to predict properties of the analyzed multi-component materials, as will be understood by those skilled in the art. For example, in some embodiments, the spectroscopic analyzer 12 with the analyzer controller 14 may be used as part of a manufacturing process, for example, as described herein with respect to FIGS. 2A, 2B, 4, 6A, and 6B. For example, the spectroscopic analyzer 12 with the analyzer controller 14 may be used to analyze multi-component materials, and the corresponding material properties predicted (or determined) from the analyses may be used to assist with at least partial control of the manufacturing process or processes.

For example, as schematically shown in FIG. 1A, a manufacturing process 26 may include a material source 28 for multi-component materials (e.g., fluids, such as gases and/or liquids) of the manufacturing process 26, and multi-component materials associated with the manufacturing process 26 may be diverted for analysis by the spectroscopic analyzer 12 with the analyzer controller 14. In some embodiments, for example, as shown in FIG. 1A, the multi-component materials may be conditioned via material conditioning 30 to output conditioned material for analysis 32 by the spectroscopic analyzer 12 with the analyzer controller 14. In some embodiments, material conditioning 30 may include one or more of filtering particulates and/or fluid contaminants from the multi-component material, controlling the temperature of the multi-component material (e.g., reducing or increasing the temperature to be within a desired range of temperatures), or controlling the pressure of the multi-component material (e.g., reducing or increasing the pressure to be within a desired range of pressures).

Upon analysis of the multi-component materials from the material source 28, which may be a feed to a processing unit and/or an output from a processing unit, the spectroscopic analyzer 12 with the analyzer controller 14, using the analyzer calibration 22, may output a plurality of material spectra 34 and, based at least in part on the material spectra 34, predict (or determine) a plurality of material properties associated with the multi-component materials. In some embodiments, the material spectra 34 and the associated predicted or determined material properties may be stored in a database as predicted (or determined) material data 36. It is contemplated that additional material data associated with the multi-component materials analyzed may also be included in the database to supplement the predicted or determined material properties. For example, the database may define a library including material data including correlations between the plurality of material spectra and the plurality of different material sample properties of the corresponding material sample.

In some embodiments, the analysis of the multi-component materials may occur during a first material time period TPI, as shown in FIG. 1A. As shown in FIG. 1A, in some embodiments, the analyzer controller 14 may also be configured to output one or more output signals 38 indicative of the multi-component material properties. The output signal(s) 38 may be used to at least partially control a manufacturing process, for example, as described with respect to FIGS. 2C, 4, 6A, and 6B (e.g., output signals 38a through 38n). In some examples, at least some of the output signal(s) 38 may be communicated to one or more display devices, such as, for example, a computer monitor and/or portable output devices, such as a laptop computer, a smartphone, a tablet computing device, etc., as will be understood by those skilled in the art. Such communications may be enabled by a communications link, such as a hard-wired and/or wireless communications link, for example, via one or more communications networks.

As referenced above, in some embodiments, the analyzer controller 14 may be configured to transfer the standardized analyzer spectra 20 to calibrate or recalibrate the spectroscopic analyzer 12 when a spectroscopic analyzer 12 changes from a first state to a second state, wherein the second state is a period of time after a change to the spectroscopic analyzer 12 causing a need to recalibrate the spectroscopic analyzer 12. For example, as shown in FIG. 1A, such change(s) 40 to the spectroscopic analyzer 12 that might necessitate calibration or recalibration may include, but are not limited to, for example, maintenance performed on the spectroscopic analyzer 12, replacement of one or more components of the spectroscopic analyzer 12, cleaning of one or more components of the spectroscopic analyzer 12, re-orienting one or more components of the spectroscopic analyzer 12, a change in path length (e.g., relative to the path length for prior calibration), or preparing the spectroscopic analyzer 12 for use, for example, prior to a first use and/or calibration of the spectroscopic analyzer 12 specific to the materials to which it is intended to analyze.

In some embodiments, as explained herein, using the standardized analyzer spectra 20 to calibrate or recalibrate the spectroscopic analyzer 12 when a spectroscopic analyzer 12 changes from a first state to a second state may result in the spectroscopic analyzer 12 with the analyzer controller 14 generating analyzed material spectra and/or predicting corresponding material properties in a manner substantially consistent with a plurality of material properties of the material outputted by the spectroscopic analyzer 12 with the analyzer controller 14 in the first state, for example, in a state prior to the change(s) 40 to the spectroscopic analyzer 12.

For example, as shown in FIG. 1A, in some embodiments, the analyzer controller 14 may be configured to analyze, via the spectroscopic analyzer 12, when in the second state, a selected one or more second-state portfolio sample(s) 42 to output second-state portfolio sample spectra 44 for the selected one or more second-state portfolio sample(s) 42. In some embodiments, each of the second-state portfolio sample spectra 44 may be associated with a corresponding different second-state portfolio sample 42. The second-state portfolio sample(s) 42 may include one or more samples, and the one or more samples may include a pure compound, a mixture of compounds, and/or one or more multi-component samples. As shown in FIG. 1A, in some embodiments, as explained in more detail herein, the selected one or more second-state portfolio sample(s) 42 (and/or the number of first-state portfolio sample(s) 23) may include a number of samples significantly lower than the number of samples of the plurality of multi-component samples 16. For example, the one or more second-state portfolio sample(s) 42 may include a number of multi-component samples ranging, for example, from about 1 sample to about 100 samples, from about 2 samples to about 75 samples, from about 3 samples to about 50 samples, from about 4 samples to about 45 samples, from about 4 samples to about 35 samples, from about 4 samples to about 25 samples, from about 5 samples to about 20 samples, from about 5 samples to about 15 samples, from about 5 samples to about 10 samples, from about 5 samples to about 8 samples, from about 5 samples to about 7 samples, or from 5 samples to 6 samples. For example, in some embodiments, in order to recalibrate the spectroscopic analyzer 12 with the analyzer controller 14 after the change(s) 40 to achieve a desired level of accuracy and/or reproducibility, for example, an accuracy and/or reproducibility substantially equal to or better than the level of accuracy and/or reproducibility of the spectroscopic analyzer 12 with the analyzer controller 14 prior to the change(s) 40, in some embodiments, it may only be necessary to analyze as few as ten or fewer of the second-state portfolio sample(s) 42, as explained in more detail herein.

In some examples, at least some (e.g., all) of the first-state portfolio sample(s) 23 and respective corresponding second-state portfolio sample(s) 42 are the same or substantially the same. In some embodiments, one or more of the first-state portfolio sample(s) 23 and/or one or more of the second-state portfolio sample(s) 42 may include a substantially pure compound and/or a blend of substantially pure compounds. In some examples, at least some of the first-state portfolio sample(s) 23 and the respective second-state portfolio sample(s) 42 may be different from one another. For example, a given first-state portfolio sample 23 and a corresponding second-state portfolio sample 42 may be manufactured according to a common specification, for example, by a different entity and/or at a different time (e.g., in a different manufacturing batch), although the intention may be for the given first-state portfolio sample 23 and the corresponding second-state portfolio sample 42 to be the same, for example, within manufacturing tolerances. For example, the first-state portfolio sample(s) 23 may include Sample A, Sample B, and Sample C through Sample N, and the second-state portfolio sample(s) 42 may include respective corresponding Sample A, Sample, B, and Sample C through Sample N. In some embodiments, each of Sample A, Sample B, and Sample C through Sample N may be different from one another.

As shown in FIG. 1A, in some embodiments, because it may be necessary to only analyze substantially fewer second-state portfolio sample(s) 42 (and/or first-state portfolio sample(s) 23) than the number of multicomponent samples 16 to achieve results substantially consistent with the results achieved prior to the change(s) 40, a second-state time period T₂ during which the second-state portfolio sample(s) 42 are analyzed may be significantly less than the first-state time period T₁, during which the multi-component samples 16 are analyzed. For example, as noted above, in some embodiments, the first-state time period T₁ may range, for example, from about 8 hours to about 200 hours, as compared with the second-state time period T₂, which may be less than 20 hours (e.g., less than 16 hours, less than 10 hours, less than 8 hours, less than 4 hours, or less than 2 hours). For example, the second-state time period T₂, which may generally correspond to a time period during which the number of second-state portfolio sample(s) 42 or the first-state portfolio sample(s) 23 are analyzed, may range, for example, from about 1 hour to about 20 hours, from about 1 hour to about 17 hours, from about 3 hours to about 15 hours, from about 3 hours to about 12 hours, from about 3 hours to about 10 hours, from about 3 hours to about 8 hours, from about 3 hours to about 6 hours, or from about 3 hours to about 5 hours.

Thus, in some embodiments, the spectroscopic analyzer 12 with the analyzer controller 14 may be configured to be calibrated or recalibrated to achieve substantially the same accuracy and/or reproducibility of analysis as the spectroscopic analyzer 12 with the analyzer controller 14 was able to achieve prior to the change(s) 40, while using significantly fewer portfolio samples for recalibration and requiring significantly less time for recalibration. In some embodiments, the calibrated or recalibrated spectroscopic analyzer 12 with the analyzer controller 14, calibrated or recalibrated in such a manner, may be capable of generating substantially the same spectra following recalibration as outputted prior to recalibration, which may result in improved accuracy and/or reproducibility. Such accuracy and/or reproducibility may provide the ability to compare analysis results outputted by the spectroscopic analyzer 12 with the analyzer controller 14 before and after the change(s) 40, which may render the spectroscopic analyzer 12 more useful, for example, when incorporated into a manufacturing process involving the processing of multi-component materials received from material sources, such as material sources 28 and 48 shown in FIG. 1A, for example, a petroleum refining-related process, a pharmaceutical manufacturing process, or other processes involving the processing of materials.

As shown in FIG. 1A, in some embodiments, the analyzer controller 14 also may be configured to compare one or more of the second-state portfolio sample spectra 44 for the second-state portfolio sample(s) 42 to one or more of the first-state portfolio sample spectra 25 of the first-state portfolio sample(s) 23. Based at least in part on the comparison of the second-state portfolio sample spectra 44 to the first-state portfolio sample spectra 25, the analyzer controller 14 further may be configured to determine for one or more of the second-state portfolio sample(s) 42 of the second-state portfolio sample spectra 44, a variance for one or more individual wavelengths, wavenumbers, and/or frequencies, and/or over a range of wavelengths, wavenumbers, and/or frequencies between the second-state portfolio sample spectra 44 outputted by the spectroscopic analyzer 12 when in the second state and the first-state portfolio sample spectra 25 corresponding to the first-state portfolio sample(s) 23 outputted by the spectroscopic analyzer 12 in the first state. For example, in some embodiments, the analyzer controller 14 may be configured to determine a difference in magnitude between the second-state portfolio sample spectra 44 and the respective corresponding first-state portfolio sample spectra 25 for each of the one or more individual wavelengths, wavenumbers, and/or frequencies, and/or for each of a plurality of wavelengths, wavenumbers, and/or frequencies over one or more ranges of wavelengths, wavenumbers, and/or frequencies.

In some embodiments, the analyzer controller 14 may be configured to determine the variance by determining a variance at individual wavelengths, wavenumbers, and/or frequencies, a plurality of variances at different individual wavelengths, wavenumbers, and/or frequencies, a mean average variance, one or more ratios of variances at respective individual wavelengths, or a combination thereof, for a plurality of wavelengths, wavenumbers, and/or frequencies over a range of wavelengths, wavenumbers, and/or frequencies, respectively. In some embodiments, the analyzer controller 14 may be configured to determine a relationship for a plurality of wavelengths, wavenumbers, and/or frequencies over the range of wavelengths, wavenumbers, and/or frequencies, respectively, between the second-state portfolio sample spectra 44 and the first-state portfolio sample spectra 25 (and/or manipulations thereof, such as, for example, one or more derivatives of the second-state portfolio sample spectra 44 and the first-state portfolio sample spectra 25), and the relationship may include one or more of a ratio, an addition, a subtraction, a multiplication, a division, one or more derivatives, or an equation.

As shown in FIG. 1A, in some embodiments, the analyzer controller 14 still further may be configured to reduce the variance between the second-state portfolio sample spectra 44 and the first-state portfolio sample spectra 25 (and/or manipulations thereof). For example, the analyzer controller 14 may be configured to use the previously outputted standardized analyzer spectra portfolio 24, including the first-state portfolio sample spectra 25, to reduce the variance between the second-state portfolio sample spectra 44 and the first-state portfolio sample spectra 25, so that the spectroscopic analyzer 12 with the analyzer controller 14 is able to output, when in the second state following the change(s) 40, a plurality of signals indicative of a plurality of material properties of an analyzed multi-component material, such that the plurality of material properties of the multi-component material are substantially consistent with a plurality of material properties of the multi-component material that were, or would be, outputted by the spectroscopic analyzer 12 with the analyzer controller 14 in the first state prior to the change(s) 40 to the spectroscopic analyzer 12 with the analyzer controller 14. For example, as shown in FIG. 1A, the spectroscopic analyzer 12 with the analyzer controller 14 may be configured to output portfolio sample-based correction(s) 45, which may be used to reduce or substantially eliminate the variance between the second-state portfolio sample spectra 44 and the first-state portfolio sample spectra 25 (and/or manipulations thereof), for example, such that the second-state portfolio sample spectra 44 and the first-state portfolio sample spectra 25 are consistent with one another (e.g., are similar to, substantially match, are substantially equivalent to, or are substantially the same as on another). In some embodiments, the variance may be or include the variance between one or more derivatives of (and/or other manipulations of) the second-state portfolio sample spectra 44 and the first-state portfolio sample spectra 25. In some such embodiments, the spectroscopic analyzer 12 with the analyzer controller 14 may be configured to thereafter output corrected spectra upon analysis of a portion of multi-component materials received from a material processing operation, for example, to assist with control of the material processing operation, for example, as described herein. In some embodiments, the portfolio sample-based correction(s) 45 may be, or include, a relationship such as a mathematical relationship, for individual wavelengths and/or a plurality of wavelengths over a range of wavelengths, and the mathematical relationship may include one or more of a ratio, an addition, a subtraction, a multiplication, a division, one or more derivatives, an equation, or a combination thereof.

As shown in FIG. 1A, in some embodiments, following the change(s) 40 to the spectroscopic analyzer 12 with the analyzer controller 14 and the recalibration in the second state, the spectroscopic analyzer 12 and analyzer controller 14 may be used to analyze multi-component materials, for example, as will be understood by those skilled in the art. For example, as shown in FIG. 1A, during a second material time period $T_{P2}$, a manufacturing process 46 may include a material source 48 for multi-component materials (e.g., fluids, such as gases and/or liquids) of the manufacturing process 46, and a portion of multi-component material associated with the manufacturing process 46 may be diverted for analysis by the spectroscopic analyzer 12 with the analyzer controller 14. In some embodiments, for example, as shown in FIG. 1A, the multi-component material may be conditioned via material conditioning 50 to provide conditioned material for analysis 52 by the spectroscopic analyzer 12 with the analyzer controller 14. In some embodiments, material conditioning 50 may include one or more of filtering particulates and/or fluid contaminants from the multi-component material, controlling the temperature of the multi-component material (e.g., reducing or increasing the temperature to be within a desired range of temperatures), or controlling the pressure of the multi-component material (e.g., reducing or increasing the pressure to be within a desired range of pressures for a multi-component gas). In some embodiments, the manufacturing process 46, the material source 48, the material conditioning 50, and/or the conditioned material for analysis 52, may substantially correspond to previously-discussed manufacturing process 26, material source 28, the material conditioning 30, and/or the conditioned material for analysis 32. In some embodiments, the manufacturing process 46, the material source 48, the material conditioning 50, and/or the conditioned material for analysis 52, may be substantially different than the previously-discussed manufacturing process 26, material source 28, the material conditioning 30, and/or the conditioned material for analysis 32.

In some embodiments, the spectroscopic analyzer 12 and/or the spectroscopic analyzer controller 14 may be configured to analyze, when in the second state, the multi-component material received from the material source 48 and output a material spectrum 47 corresponding to the multi-component material. As shown in FIG. 1A, the spectroscopic analyzer 12 with the analyzer controller 14 also may be configured to transform, for example, using the portfolio sample-based correction(s) 45, based at least in part on the standardized analyzer spectra portfolio 24, the material spectrum 47 to output a corrected material spectrum 54 for the multi-component material and/or corrected material spectra 56. In some embodiments, the corrected material spectrum 54 may include one or more of an absorption-corrected spectrum, a transmittance-corrected spectrum, a transflectance-corrected spectrum, a reflectance-corrected spectrum, or an intensity-corrected spectrum, for example, and/or a mathematical treatment of the spectrum, such as, for example, a second derivative of the spectrum. For example, based at least in part on the corrected material spectrum 54, the analyzer controller 14 may be configured to output a plurality of signals indicative of a plurality of material properties of the multi-component material, and the plurality of material properties may be substantially consistent with (e.g., substantially the same as) a plurality of material properties of the multi-component material that were (or would be) outputted by the spectroscopic analyzer 12 with the analyzer controller 14 in the first state (i.e., prior to the change(s) 40 to the spectroscopic analyzer 12). Thus, in some such embodiments, the corrected material spectrum 54 may be used as a standardized spectrum, such that the corrected material spectrum 54 has been standardized based at least in part on the standardized analyzer spectra portfolio 24, so that the corrected material spectrum 54 is the substantially the same material spectrum that would be outputted by the spectroscopic analyzer 12 with the analyzer controller 14 prior to the change(s) 40, for example, during the first state. In some embodiments, the corrected material spectrum 54 may be added to the first-state sample spectra 18 and the one or more spectral model(s) 20 may be updated based at least in part on the first-state sample spectra 18 including the corrected material spectrum 54.

In some embodiments, this may render it possible to directly compare the results of analysis by the spectroscopic analyzer 12 with the analyzer controller 14 made during the second state with results of an analysis made during the first state. In addition, as noted above, in some embodiments, using the portfolio sample-based correction(s) 45 to calibrate or recalibrate the spectroscopic analyzer 12 with the analyzer controller 14 to achieve the standardization may require the analysis of significantly fewer samples (e.g., the second-state portfolio samples 44) as compared to the original calibration of the spectroscopic analyzer 12 and/or analyzer controller 14 during the first state. This may also significantly reduce the time required to calibrate or recalibrate the spectroscopic analyzer 12 with the analyzer controller 14.

Upon analysis of the multi-component materials from the material source 48, which may be a feed to a processing unit and/or an output from a processing unit, the spectroscopic analyzer 12 with the analyzer controller 14, using the corrected material spectrum 54, may establish a plurality of corrected material spectra 56 and, based at least in part on the corrected material spectra 56, predict a plurality of material properties associated with the multi-component materials. In some embodiments, the corrected material spectra 56 and the associated predicted or determined material properties may be stored in a database as predicted (or determined) material data 58. It is contemplated that additional material data associated with the multi-component materials analyzed may also be included in the database to supplement the predicted or determined material properties. For example, the database may define a library including material data including correlations between the plurality of material spectra and the plurality of different material sample properties of the corresponding material sample.

In some embodiments, the analysis of the multi-component materials may occur during a second material time period $T_{P2}$, as shown in FIG. 1A. As shown in FIG. 1A, in some embodiments, the analyzer controller 14 may also be configured to output one or more output signals 38 indicative of the multi-component material properties, as will be understood by those skilled in the art. The output signal(s) 38 may be used to at least partially control a manufacturing process, for example, as described with respect to FIGS. 2B, 4, 6A, and 6B (e.g., output signals 38a through 38n). In some examples, at least some of the output signal(s) 38 may be communicated to one or more display devices, such as, for example, a computer monitor and/or portable output devices, such as a laptop computer, a smartphone, a tablet computing device, etc., as will be understood by those skilled in the art. Such communication may be enabled by a communications link, such as a hard-wired and/or wireless communications link, for example, via one or more communications networks.

In some embodiments, generating the first-state portfolio sample spectra 25 and generating the second-state portfolio sample spectra 44 may occur at a common location. For example, the common location may include a manufacturing site, such as a petroleum refining-related processing facility, a pharmaceutical manufacturing process site, or any other processing sites involving the processing of materials and/or chemicals. In some embodiments, generating the first-state portfolio sample spectra 25 and generating the second-state portfolio sample spectra 44 may occur at different geographic locations. The first-state portfolio sample spectra 25 and the second-state portfolio sample spectra 44, in some embodiments, may be outputted at a temperature within five degrees Fahrenheit of a common temperature. For example, the common temperature may be a temperature associated with one or more of an environment surrounding the spectroscopic analyzer(s), the first-state portfolio samples, the second-state portfolio samples, or the spectroscopic analyzer(s). The common temperature may range, for example, from about 50 degrees Fahrenheit to about 200 degrees Fahrenheit, for example, from about 60 degrees Fahrenheit to about 175 degrees Fahrenheit, from about 60 degrees Fahrenheit to about 150 degrees Fahrenheit, from about 60 degrees Fahrenheit to about 125 degrees Fahrenheit, from about 60 degrees Fahrenheit to about 100 degrees Fahrenheit, from about 60 degrees Fahrenheit to about 85 degrees Fahrenheit, from about 60 degrees Fahrenheit to about 75 degrees Fahrenheit, or from about 65 degrees Fahrenheit to about 75 degrees Fahrenheit. In some embodiments, this may enhance the reproducibility and/or consistency of the results of the material analysis during the first state and the second state. In some embodiments, generating the first-state portfolio sample spectra 25 and generating the second-state portfolio sample spectra 44 may occur at substantially equal pressures, for example, if at least a portion of the material being analyzed is in the form of a gas (e.g., as compared to a liquid).

Figure 1B:
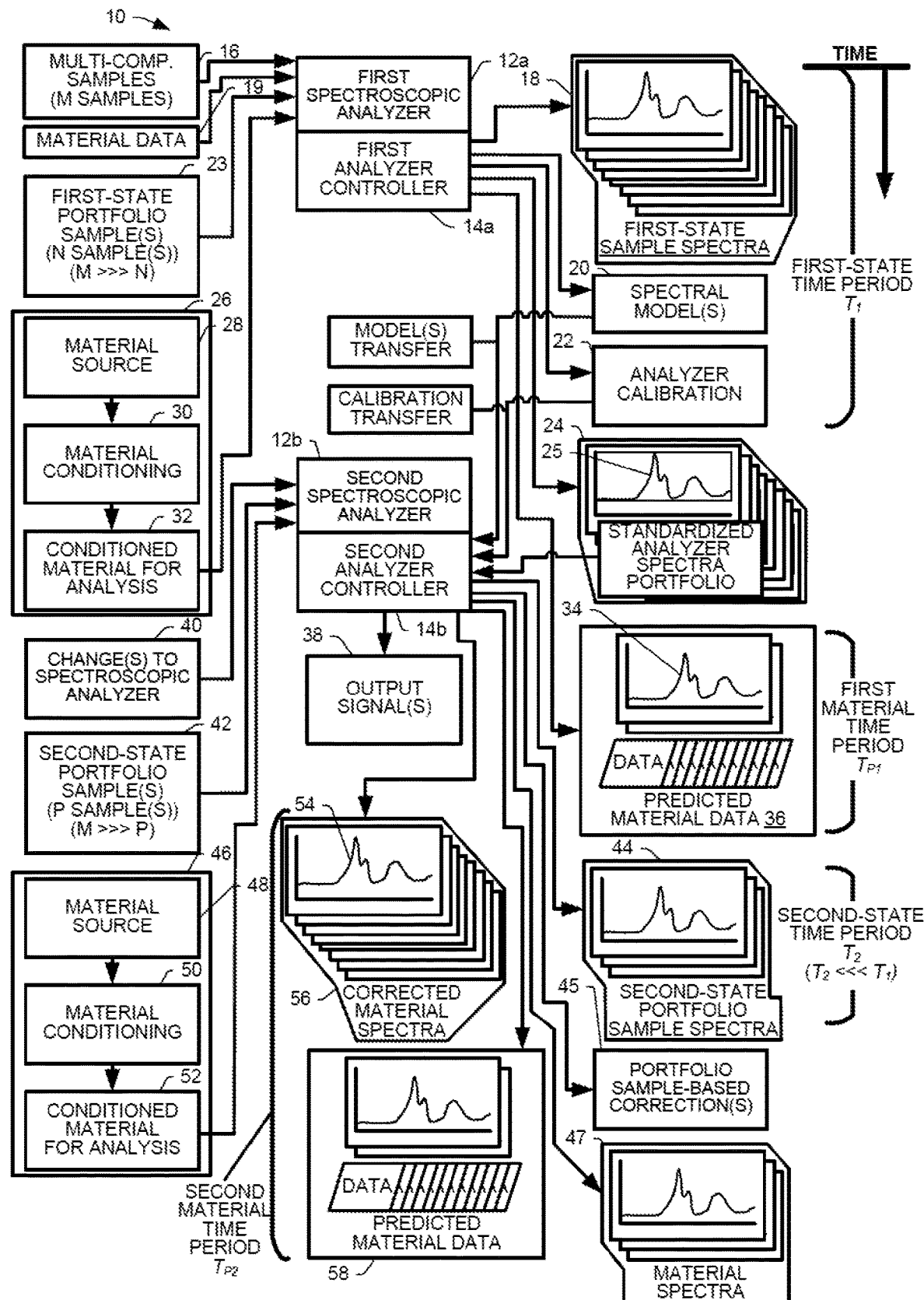
FIG. 1B is a block diagram of another spectroscopic analyzer assembly including first and second spectroscopic analyzers and respective first and second analyzer controllers receiving example inputs and generating example outputs in relation to an example timeline, according to embodiments of the disclosure.

FIG. 1B is a block diagram of another spectroscopic analyzer assembly 10 including a first spectroscopic analyzer 12a with an associated first analyzer controller 14a, and a second spectroscopic analyzer 12b with an associated second analyzer controller 14b. As shown in FIG. 1i, the first spectroscopic analyzer 12a, the associated first analyzer controller 14a, the second spectroscopic analyzer 12b, and/or the associated second analyzer controller 14b may be configured to receive inputs and output outputs based at least in part on the inputs in relation to an example timeline according to embodiments of the disclosure.

The spectroscopic analyzers 12a and 12b may be near-infrared spectroscopic analyzers, mid-infrared spectroscopic analyzers, a combination of a near-infrared spectroscopic analyzers and mid-infrared spectroscopic analyzers, or Raman spectroscopic analyzers, as will be understood by those skilled in the art. The spectroscopic analyzers 12a and 12b may be the same type of spectroscopic analyzer or different types of spectroscopic analyzers (e.g., two NIR spectroscopic analyzers having different designs, or one spectroscopic analyzer that is an NIR spectroscopic analyzer without multi-plexing capability, and a second spectroscopic analyzer that is an NIR spectroscopic analyzer with multi-plexing capability). As shown in FIG. 1B, in some embodiments, the spectroscopic analyzer assembly 10 may be used to determine standardized analyzer spectra via the first spectroscopic analyzer 12a with the first analyzer controller 14a for calibration of the second spectroscopic analyzer 12b by transferring the spectral models to the second spectroscopic analyzer 12b with second analyzer controller 14b for calibration of the second spectroscopic analyzer 12b when the second spectroscopic analyzer 12b is in a second state, such as a period of time after one or more change(s) 40 to the second spectroscopic analyzer 12b causing a need to calibrate (or recalibrate) the second spectroscopic analyzer 12b.

For example, in some embodiments, using the standardized analyzer spectra portfolio 24 may include the use of one or more prior spectral model(s) developed on the first spectroscopic analyzer 12a when in the first state to standardize spectral responses of the second spectroscopic analyzer 12b after a change to the second spectroscopic analyzer 12b (e.g., an initial setup of the second spectroscopic analyzer 12b or performance of maintenance on the second spectroscopic analyzer 12b), such that, when in the second state, analysis by the second spectroscopic analyzer 12b of a first multi-component material results in generation of a second-state spectrum that is consistent with a first-state spectrum outputted by the first spectroscopic analyzer 12a, when in the first state, resulting from analysis of the first multi-component material. Thus, in some embodiments, the first spectroscopic analyzer 12a and the second spectroscopic analyzer 12b will be capable of generating the substantially same spectrum after an event causing the need to calibrate (or recalibrate) the second spectroscopic analyzer 12b (e.g., a change to the second spectroscopic analyzer 12b, such as maintenance and/or component replacement). In some embodiments, this may improve one or more of the accuracy, reproducibility, or consistency of results outputted by the second spectroscopic analyzer 12b after the change in state from the first state to the second state. For example, the second spectroscopic analyzer 12b with the second analyzer controller 14b may be configured to analyze a multi-component material and output a plurality of signals indicative of a plurality material spectra from which a plurality of material properties of the material may be predicted or determined based at least in part on a corrected material spectrum, which may be determined using portfolio sample-based correction(s), such that the plurality of material properties determined by the second spectroscopic analyzer 12b with the second analyzer controller 12b are substantially consistent with (e.g., substantially the same as) a plurality of material spectra from which a plurality of material properties may be predicted or determined by the first spectroscopic analyzer 12a with first analyzer controller 14a in the first state. This may result in standardizing the second spectroscopic analyzer 12b with the second analyzer controller 12b based at least in part on the first spectroscopic analyzer 12a with the first analyzer controller 12a.

Referring to FIG. 1B, in some embodiments, the spectroscopic analyzer assembly 10 may be configured to determine and use standardized analyzer spectral responses for calibration of the second spectroscopic analyzer 12b when the second spectroscopic analyzer 12b is in a second state, the second state being defined as a period of time after a change to the second spectroscopic analyzer 12b causing a need to calibrate or recalibrate the second spectroscopic analyzer 12b. In some embodiments, the second analyzer controller 14b may be in communication with the second spectroscopic analyzer 12b. For example, the second analyzer controller 14b may be physically connected to the second spectroscopic analyzer 12b, as will be understood by those skilled in the art. In some such embodiments, second spectroscopic analyzer 12b may include a housing and at least a portion of the second analyzer controller 14b may be contained in the housing. In some such embodiments, the second analyzer controller 14b may be in communication with the second spectroscopic analyzer 12b via a hard-wired and/or wireless communications link.

In some embodiments, the second analyzer controller 14b may be physically separated from the second spectroscopic analyzer 12b and may be in communication with the second spectroscopic analyzer 12b via a hard-wired communications link and/or a wireless communications link. In some embodiments, physical separation may include being spaced from one another, but within the same building, within the same facility (e.g., located at a common manufacturing facility, such as a refinery), or being spaced from one another geographically (e.g., anywhere in the world). In some physically separated embodiments, both the second spectroscopic analyzer 12b and the second analyzer controller 14b may be linked to a common communications network, such as a hard-wired communications network and/or a wireless communications network. Such communications links may operate according to any known hard-wired and/or wireless communications protocols as will be understood by those skilled in the art. Although FIG. 1B schematically depicts the first analyzer controller 14a and the second analyzer controller 14b as being separate analyzer controllers, in some embodiments, the first and second analyzer controllers 14a and 14b may be part of a common analyzer controller configured to control one or more of the first spectroscopic analyzer 12a or the second spectroscopic analyzer 12b.

As shown in FIG. 1B, in some embodiments, the first analyzer controller 14a may be configured to determine standardized analyzer spectra for calibration of the second spectroscopic analyzer 12b. For example, the first analyzer controller 14a, while in the first state and during a first-state time period $T_1$, may be configured to analyze a plurality of different multi-component samples 16 and, based at least in part on the multi-component samples 16, output first-state sample spectra 18 of the different multi-component samples 16. In some embodiments, each of the first-state sample spectra 18 may be collected and stored, for example, in a database. In some embodiments, each of the first-state sample spectra 18 may be associated with a corresponding different multi-component sample 16 and may be indicative of a plurality of different multi-component sample properties. In some embodiments, the first-state sample spectra 18, in combination with material data 19 associated with each of the multi-component samples 16, may be used to output one or more spectral model(s) 20, which, in turn, may be used to calibrate the first spectroscopic analyzer 12a with the first analyzer controller 14a, resulting in an analyzer calibration 22. The material data 19 may include any data related to one or more properties associated with one or more of the respective multi-component samples 16. In some embodiments, the multi-component samples 16 may be provided from (or supplemented by) one or more of the material source 28, the conditioned material for analysis 32, the material source 48, or the conditioned material for analysis. The one or more spectral model(s) 20 may be indicative of relationships between a spectrum or spectra of the first-state sample spectra 18 and one or more properties associated with one or more of respective multi-component samples 16, and the relationships may be used to provide the analyzer calibration 22. As noted previously herein, in some embodiments, as will be understood by those skilled in the art, the one or more spectral model(s) 20 may represent a univariate or multivariate regression (e.g., a least-squares regression, a multiple linear regression (MLR), a partial least squares regression (PLS), a principal component regression (PCR)), such as a regression of material data (e.g., one or more properties of the multi-component sample) against a corresponding spectrum of the first-state sample spectra 18. In some embodiments, the one or more spectral model(s) 20 may represent topological modeling by use of nearest neighbor positioning to calculate properties, based on the material data (e.g., one or more properties of the multi-component sample) against a corresponding spectrum of the first-state sample spectra 18, as also will be understood by those skilled in the art. This may facilitate prediction of one or more properties of a material analyzed by the first spectroscopic analyzer 12a, once calibrated, based at least in part on a spectrum associated with the material.

In some embodiments, the plurality of different multi-component samples 16 may include a number of multi-component samples ranging, for example, from about 10 samples to about 2,500 samples, from about 50 samples to about 2,000 samples, from about 75 samples to about 1,500 samples, from about 100 samples to about 1,000 samples, from about 100 samples to about 900 samples, from about 100 samples to about 800 samples, from about 100 samples to about 700 samples, from about 100 samples to about 600 samples, from about 100 samples to about 500 samples, from about 100 samples to about 400 samples, from about 200 samples to about 900 samples, from about 300 samples to about 800 samples, from about 400 samples to about 700 samples, from about 500 samples to about 600 samples, or from about 450 samples to about 650 samples. For example, in some embodiments, in order to calibrate the first spectroscopic analyzer 12a with the first analyzer controller 14a to a desired level of accuracy and/or reproducibility, it may be necessary to analyze hundreds or thousands of multi-component samples 16, as will be understood by those skilled in the art. Due to the relatively large number of multi-component samples 16 used for calibration, the first-state time period $T_1$, which may generally correspond to a time period during which the number of multi-component samples 16 analyzed, may range, for example, from about 10 samples to about 2,500 samples, from about 50 samples to about 2,000 samples, from about 75 samples to about 1,500 samples, from about 20 hours to about 150 hours, from about 20 hours to about 130 hours, from about 20 hours to about 110 hours, from about 20 hours to about 90 hours, from about 20 hours to about 70 hours, from about 20 hours to about 50 hours, from about 20 hours to about 40 hours, from about 30 hours to about 150 hours, from about 40 hours to about 130 hours, from about 40 hours to about 110 hours, or from about 50 hours to about 90 hours. For example, in some embodiments, in order to calibrate the first spectroscopic analyzer 12a with the first analyzer controller 14a to a desired level of accuracy and/or reproducibility, due to the relatively large numbers of samples analyzed, the first-state time period $T_1$ may take dozens of hours to complete.

Following calibration of the first spectroscopic analyzer 12a with the first analyzer controller 14a, the spectral responses of the first spectroscopic analyzer 12a with the first analyzer controller 14a may be standardized, for example, by analyzing one or more first-state portfolio sample(s) 23 to output a standardized analyzer spectra portfolio 24 including one or more first-state portfolio sample spectra 25. For example, the first spectroscopic analyzer 12a with the first analyzer controller 14a, when in the first state, may be used to analyze one or more first-state portfolio sample(s) 23 to output a respective first-state portfolio spectrum 25. In some embodiments, the respective first-state portfolio sample spectrum 25 associated with a respective first-state portfolio sample 23 may be stored to develop the standardized analyzer spectra portfolio 24, which may be used to reduce a variance between a second-state portfolio sample spectrum (outputted during a second state) and a corresponding first-state portfolio sample spectrum 25 of the standardized analyzer spectra portfolio 24, for example, as described herein.

As shown in FIG. 1B, following calibration and/or standardization of the first spectroscopic analyzer 12a with the first analyzer controller 14a, the first spectroscopic analyzer 12a with the first analyzer controller 14a may be used to analyze multi-component materials to predict (or determine) properties of the analyzed multi-component materials, as will be understood by those skilled in the art. For example, in some embodiments, the first spectroscopic analyzer 12a with the first analyzer controller 14a may be used as part of a manufacturing process, for example, as described herein with respect to FIGS. 2A, 2B, 4, 6A, and 6B. For example, the first spectroscopic analyzer 12a with the first analyzer controller 14a may be used to analyze multi-component materials, and the corresponding material properties predicted (or determined) from the analyses may be used to assist with at least partial control of the manufacturing process or processes.

For example, as shown in FIG. 1B, a manufacturing process 26 may include a material source 28 for multi-component material (e.g., fluids, such as gases and/or liquids) of the manufacturing process 26, and a portion of multi-component material associated with the manufacturing process 26 may be diverted for analysis by the first spectroscopic analyzer 12a with the first analyzer controller 14a. In some embodiments, it may not be necessary to divert a portion of the multi-component material to be analyzed. Rather, the first spectroscopic analyzer 12a with the first analyzer controller 14a may include a probe or similar structure in contact with and/or extending into a flow of the multi-component material to analyze a portion of the multi-component material. In some embodiments, for example, as shown in FIG. 1B, the multi-component material may be conditioned via material conditioning 30 to output conditioned material for analysis 32 by the first spectroscopic analyzer 12a with the first analyzer controller 14a. In some embodiments, material conditioning 30 may include one or more of filtering particulates and/or fluid contaminants from the multi-component material, controlling the temperature of the multi-component material (e.g., reducing or increasing the temperature to be within a desired range of temperatures), or controlling the pressure of the multi-component material (e.g., reducing or increasing the pressure to be within a desired range of pressures when the multi-component material includes a gas).

Upon analysis of the multi-component materials from the material source 28, which may be a feed to a processing unit and/or an output from a processing unit, the first spectroscopic analyzer 12a with the analyzer controller 14a, using the analyzer calibration 22, may output a plurality of material spectra 34 and, based at least in part on the material spectra 34, predict a plurality of material properties associated with the multi-component materials. In some embodiments, the material spectra 34 and the associated predicted or determined material properties may be stored in a database as predicted (or determined) material data 36. It is contemplated that additional material data associated with the multi-component materials analyzed may also be included in the database to supplement the predicted or determined material properties. For example, the database may define a library including material data and/or including correlations between the plurality of material spectra and the plurality of different material sample properties of the corresponding material.

In some embodiments, the analysis of the multi-component materials may occur during a first material time period TPI, as shown in FIG. 1B. As shown in FIG. 1B, in some embodiments, the first analyzer controller 14a may also be configured to output one or more output signals 38 indicative of the multi-component material properties. The output signal(s) 38 may be used to at least partially control a manufacturing process, for example, as described with respect to FIGS. 2B, 4, 6A, and 6B (e.g., output signals 38a through 38n). In some examples, at least some of the output signal(s) 38 may be communicated to one or more display devices, such as, for example, a computer monitor and/or portable output devices, such as a laptop computer, a smartphone, a tablet computing device, etc., as will be understood by those skilled in the art. Such communication may be enabled by a communications link, such as a hard-wired and/or wireless communications link, for example, via one or more communications networks.

As referenced above, in some embodiments, the first analyzer controller 14a may be configured to use the first-state portfolio sample spectra 25 of the standardized analyzer spectra portfolio 24 to calibrate or recalibrate the second spectroscopic analyzer 12b when in the second state, which is a period of time after a change to the second spectroscopic analyzer 12b causing a need to calibrate or recalibrate the second spectroscopic analyzer 12b. For example, as shown in FIG. 1B, such change(s) 40 to the second spectroscopic analyzer 12b that might necessitate recalibration may include, but are not limited to, for example, an initial set-up of the second spectroscopic analyzer 12b, maintenance performed on the second spectroscopic analyzer 12b, replacement of one or more components of the second spectroscopic analyzer 12b, cleaning of one or more components of the second spectroscopic analyzer 12b, re-orienting one or more components of the second spectroscopic analyzer 12b, a change in path length (e.g., relative to the path length for prior calibration), or preparing the second spectroscopic analyzer 12b for use, for example, prior to a first use and/or calibration of the second spectroscopic analyzer 12b specific to the materials to which it is intended to analyze.

In some embodiments, as explained herein, using the first-state portfolio sample spectra 25 to calibrate or recalibrate the second spectroscopic analyzer 12b may result in the second spectroscopic analyzer 12b with the second analyzer controller 14b generating analyzed material spectra and/or predicting corresponding material properties in a manner substantially consistent with a plurality of material properties outputted by the first spectroscopic analyzer 12a with the first analyzer controller 14a in the first state.

For example, as shown in FIG. 1B, in some embodiments, the second analyzer controller 14b may be configured to analyze, via the second spectroscopic analyzer 12b, when in the second state, a selected one or more second-state portfolio sample(s) 42 to output second-state portfolio sample spectra 44 for the selected one or more second-state portfolio sample(s) 42. In some embodiments, each of the second-state portfolio sample spectra 44 may be associated with a corresponding second-state portfolio sample 42. As shown in FIG. 1B, in some embodiments, as explained in more detail herein, the selected one or more second-state portfolio sample(s) 42 (and/or the first-state portfolio sample(s) 23) may include a number of samples significantly lower than the number of samples of the plurality of multi-component samples 16. For example, the one or more second-state portfolio sample(s) 42 may include a number of (one or more) pure compounds and/or multi-component samples ranging, for example, from about 1 sample to about 100 samples, from about 2 samples to about 75 samples, from about 3 samples to about 50 samples, from about 4 samples to about 45 samples, from about 4 samples to about 35 samples, from about 4 samples to about 25 samples, from about 5 samples to about 20 samples, from about 5 samples to about 15 samples, from about 5 samples to about 10 samples, from about 5 samples to about 8 samples, from about 5 samples to about 7 samples, or from 5 samples to 6 samples. For example, in some embodiments, in order to calibrate or recalibrate the second spectroscopic analyzer 12b with the second analyzer controller 14b after the change(s) 40 to achieve a desired level of accuracy and/or reproducibility, for example, an accuracy and/or reproducibility substantially consistent with or better than the level of accuracy and/or reproducibility of the first spectroscopic analyzer 12a with the first analyzer controller 14a prior to the change(s) 40, in some embodiments, it may only be necessary to analyze as few as ten or fewer of the second-state portfolio sample(s) 42, as explained in more detail herein.

As shown in FIG. 1B, in some embodiments, because it may be necessary to only analyze substantially fewer second-state portfolio sample(s) 42 (and/or first-state portfolio sample(s) 23) to achieve results substantially consistent with the results achieved prior to the change(s) 40, a second-state time period $T_2$ during which the second-state portfolio sample(s) 42 are analyzed may be significantly less than the first-state time period $T_1$. For example, as noted above, in some embodiments, the first-state time period $T_1$ may exceed 100 hours, as compared with the second-state time period $T_2$, which may be less than 20 hours (e.g., less than 16 hours, less than 10 hours, less than 8 hours, less than 4 hours, or less than 2 hours). For example, the second-state time period $T_2$, which may generally correspond to the time period during which the number of second-state portfolio sample(s) 42 are analyzed, may range, for example, from less than about 1 hour, form less than about 2 hours, from less than about 3 hours, from about 3 hours to about 20 hours, from about 3 hours to about 17 hours, from about 3 hours to about 15 hours, from about 3 hours to about 12 hours, from about 3 hours to about 10 hours, from about 3 hours to about 8 hours, from about 3 hours to about 6 hours, or from about 3 hours to about 5 hours.

In some examples, at least some (e.g., all) of the first-state portfolio sample(s) 23 and respective corresponding second-state portfolio sample(s) 42 are the same or substantially the same. In some embodiments, one or more of the first-state portfolio sample(s) 23 and/or one or more of the second-state portfolio sample(s) 42 may include a substantially pure compound and/or a blend of substantially pure compounds. In some examples, at least some of the first-state portfolio sample(s) 23 and the respective second-state portfolio sample(s) 42 may be different from one another. For example, a given first-state portfolio sample 23 and a corresponding second-state portfolio sample 42 may be manufactured according to a common specification, for example, by a different entity and/or at a different time (e.g., in a different manufacturing batch), although the intention may be for the given first-state portfolio sample 23 and the corresponding second-state portfolio sample 42 to be the same, for example, within manufacturing tolerances. For example, the first-state portfolio sample(s) 23 may include Sample A, Sample B, and Sample C through Sample N, and the second-state portfolio sample(s) 42 may include respective corresponding Sample A, Sample B, and Sample C through Sample N. In some embodiments, each of Sample A, Sample B, and Sample C through Sample N may be different from one another.

Thus, in some embodiments, the second spectroscopic analyzer 12b with the second analyzer controller 14b may be configured to be calibrated or recalibrated to achieve substantially the same accuracy and/or reproducibility of analysis as the first spectroscopic analyzer 12a with first analyzer controller 14a, while using significantly fewer samples for the calibration or recalibration to calibrate or recalibrate the second spectroscopic analyzer 12b with the second analyzer controller 14b as compared to the number of multi-component samples 16 analyzed to calibrate or recalibrate the first spectroscopic analyzer 12a with the first analyzer controller 14a, thus also requiring significantly less time for calibration or recalibration. In some embodiments, the calibrated or recalibrated second spectroscopic analyzer 12b with the second analyzer controller 14b, calibrated or recalibrated in such a manner, may be capable of generating substantially the same spectra following calibration or recalibration as was (or would be) outputted by the first spectroscopic analyzer 12a with the first analyzer controller 14a, which may result in improved accuracy and/or reproducibility by the second spectroscopic analyzer 12b. Such accuracy and/or reproducibility may provide the ability to directly compare analysis results outputted by either the first spectroscopic analyzer 12a or the second spectroscopic analyzer 12b, which may result in the first and second spectroscopic analyzers 12a and 12b being relatively more useful, for example, when incorporated into a manufacturing process involving the processing of multi-component materials received from material sources, such as material sources 28 and 48 shown in FIG. 1A, for example, a petroleum refining-related process, a pharmaceutical manufacturing process, or other processes involving the processing of materials.

As shown in FIG. 1B, in some embodiments, the second analyzer controller 14b also may be configured to compare one or more of the second-state portfolio sample spectra 44 for the second-state portfolio sample(s) 42 to the first-state portfolio sample spectra 25 of the standardized analyzer spectra portfolio 24. Based at least in part on the comparison of the second-state portfolio sample spectra 44 to the first-state portfolio sample spectra 25, the second analyzer controller 14b further may be configured to determine, for one or more of the second-state portfolio sample(s) 42 of the second-state portfolio sample spectra 44, a variance over a range of wavelengths, wavenumbers, and/or frequencies between the second-state portfolio sample spectra 44 outputted by the second spectroscopic analyzer 12b and the first-state portfolio sample spectra 25 corresponding to the first-state portfolio sample(s) 23 outputted by the first spectroscopic analyzer 12a. For example, in some embodiments, the second analyzer controller 14b may be configured to determine a difference in magnitude between the second-state portfolio sample spectra 44 and the first-state portfolio sample spectra 25 for each of a plurality of wavelengths, wavenumbers, and/or frequencies over one or more ranges of wavelengths, wavenumbers, and/or frequencies, respectively.

In some embodiments, the second analyzer controller 14b may be configured to determine the variance by determining a variance at an individual wavelength, wavenumber, and/or frequency, a plurality of variances at different individual wavelengths, wavenumbers, and/or frequencies, a mean average variance, one or more ratios of variances at respective individual wavelengths, or a combination thereof, for a plurality of wavelengths, wavenumbers, and/or frequencies over a range of wavelengths, wavenumbers, and/or frequencies, respectively. In some embodiments, the second analyzer controller 14b may be configured to determine a relationship for a plurality of wavelengths, wavenumbers, and/or frequencies over the range of wavelengths, wavenumbers, and/or frequencies, respectively, between the second-state portfolio sample spectra 44 and the first-state portfolio sample spectra 25, and the relationship may include one or more of a ratio, an addition, a subtraction, a multiplication, a division, one or more derivatives, or an equation.

As shown in FIG. 1B, in some embodiments, the second analyzer controller 14b still further may be configured to reduce the variance between the second-state portfolio sample spectra 44 and the first-state portfolio sample spectra 25. For example, the second analyzer controller 14b may be configured to use the previously outputted standardized analyzer spectra portfolio 24 and second-state portfolio sample spectra 44 to produce a portfolio sample-based correction 45 to reduce the variance between the second-state portfolio sample spectra 44 and the first-state portfolio sample spectra 25, so that the second spectroscopic analyzer 12b with the second analyzer controller 14b is able to output, when in the second state following the change(s) 40, a plurality of signals indicative of a plurality of material properties of an analyzed multi-component material, such that the plurality of material properties of the multi-component material are substantially consistent with a plurality of material properties of the multi-component material that were, or would be, outputted by the first spectroscopic analyzer 12a with the first analyzer controller 14a. For example, as shown in FIG. 1B, the second spectroscopic analyzer 12b with the second analyzer controller 14b may be configured to output a portfolio sample-based correction 45, which may be used to reduce or substantially eliminate the variance between the second-state portfolio sample spectra 44 and the first-state portfolio sample spectra 25. In some embodiments, the variance may be or include the variance between one or more derivatives of (and/or other manipulations of) the second-state portfolio sample spectra 44 and the first-state portfolio sample spectra 25. In some embodiments, the portfolio sample-based correction 45 may be, or include, a relationship such as a mathematical relationship, for an individual wavelength and/or a plurality of wavelengths over a range of wavelengths, and the mathematical relationship may include one or more of a ratio, an addition, a subtraction, a multiplication, a division, one or more derivatives, an equation, or a combination thereof.

As shown in FIG. 1B, in some embodiments, following the change(s) 40 to the second spectroscopic analyzer 12b with the second analyzer controller 14b and the calibration or recalibration in the second state, the second spectroscopic analyzer 12b and second analyzer controller 14b may be used to analyze multi-component materials. For example, as shown in FIG. 1i, during a second material time period $T_{P2}$, a manufacturing process 46 may include a material source 48 for multi-component materials (e.g., fluids, such as gases and/or liquids) of the manufacturing process 46, and a portion of multi-component material associated with the manufacturing process 46 may be diverted for analysis by the second spectroscopic analyzer 12b with the second analyzer controller 14b. In some embodiments, for example, as shown in FIG. 1i, the multi-component material may be conditioned via material conditioning 50 to provide conditioned material for analysis 52 by the second spectroscopic analyzer 12b with the second analyzer controller 14b. In some embodiments, material conditioning 50 may include one or more of filtering particulates and/or fluid contaminants from the multi-component material, controlling the temperature of the multi-component material (e.g., reducing or increasing the temperature to be within a desired range of temperatures), or controlling the pressure of the multi-component material (e.g., reducing or increasing the pressure to be within a desired range of pressures). In some embodiments, the manufacturing process 46, the material source 48, the material conditioning 50, and/or the conditioned material for analysis 52, may substantially correspond to the previously-discussed manufacturing process 26, material source 28, material conditioning 30, and/or the conditioned material for analysis 32. In some embodiments, the manufacturing process 46, the material source 48, the material conditioning 50, and/or the conditioned material for analysis 52, may be substantially different than the previously-discussed manufacturing process 26, the material source 28, the material conditioning 30, and/or the conditioned material for analysis 32.

In some embodiments, the second spectroscopic analyzer 12b with the second analyzer controller 14b may be configured to analyze, when in the second state, the multi-component material received from the material source 48 and output a material spectrum 47 corresponding to the multi-component material received from the material source 48. As shown in FIG. 1B, the second spectroscopic analyzer 12b with the second spectroscopic analyzer controller 14b also may be configured to transform, based at least in part on the standardized analyzer spectra portfolio 24 (e.g., based at least in part on the portfolio sample-based correction(s) 45), the material spectrum 47 to output a corrected material spectrum 54 for the multi-component material. In some embodiments, the corrected material spectrum 54 may include one or more of an absorption-corrected spectrum, a transmittance-corrected spectrum, a transflectance-corrected spectrum, a reflectance-corrected spectrum, or an intensity-corrected spectrum, for example, and/or a mathematical treatment of the spectrum, such as, for example, one or more derivatives of the spectrum, such as, for example, a second derivative of the spectrum. For example, based at least in part on the corrected material spectrum 54, the second analyzer controller 14b may be configured to output a plurality of signals indicative of a plurality of material properties of the multi-component material, and the plurality of material properties may be substantially consistent with (e.g., substantially the same as) a plurality of material properties of the multi-component material that were (or would be) outputted by the first spectroscopic analyzer 12a with the first analyzer controller 14a in the first state (i.e., prior to the change(s) 40 to the second spectroscopic analyzer 12b that necessitated calibrating or recalibrating the second spectroscopic analyzer 12b). Thus, in some such embodiments, the corrected material spectrum 54 may be used as a standardized spectrum, such that the corrected material spectrum 54 has been standardized based at least in part on the standardized analyzer spectra portfolio 24, so that the corrected material spectrum 54 is the substantially the same material spectrum that would be outputted by the first spectroscopic analyzer 12a with the first analyzer controller 14a during the first state.

In some embodiments, this may render it possible to directly compare the results of analysis by the second spectroscopic analyzer 12b with the second analyzer controller 14*b* made during the second state with results of analysis by the first spectroscopic analyzer 12*a* with the first analyzer controller 14*a* made during the first state. In addition, as noted above, in some embodiments, using the portfolio sample-based correction(s) 45 to calibrate or recalibrate the second spectroscopic analyzer 12*b* with the second analyzer controller 14*b* to achieve the standardization may require the analysis of significantly fewer samples (e.g., the second-state portfolio samples 44) as compared to the original calibration of the first spectroscopic analyzer 12*a* with first analyzer controller 14*a* during the first state. This may also significantly reduce the time required to calibrate or recalibrate the second spectroscopic analyzer 12*b* with second the analyzer controller 14*b*.

Upon analysis of the multi-component materials from the material source 48, which may be a feed to a processing unit and/or an output from a processing unit, the second spectroscopic analyzer 12*b* with the second analyzer controller 14*b*, using the corrected material spectrum 54, may establish a plurality of corrected material spectra 56 and, based at least in part on the corrected material spectra 56, predict a plurality of material properties associated with the multi-component materials. In some embodiments, the corrected material spectra 56 and the associated predicted or determined material properties may be stored in a database as predicted (or determined) material data 58. It is contemplated that additional material data associated with the multi-component materials analyzed may also be included in the database to supplement the predicted or determined material properties. For example, the database may define a library including material data and/or including correlations between the plurality of material spectra and the plurality of different material sample properties of the corresponding material sample.

In some embodiments, the analysis of the multi-component materials may occur during a second material time period $T_{P2}$, as shown in FIG. 1B. As shown, in some embodiments, the second analyzer controller 14*b* may also be configured to output one or more output signals 38 indicative of the multi-component material properties. The output signal(s) 38 may be used to at least partially control a manufacturing process, for example, as described with respect to FIGS. 2B, 4, 6A, and 6B (e.g., output signals 38*a* through 38*n*). In some examples, at least some of the output signal(s) 38 may be communicated to one or more display devices, such as, for example, a computer monitor and/or portable output devices, such as a laptop computer, a smartphone, a tablet computing device, etc., as will be understood by those skilled in the art. Such communication may be enabled by a communications link, such as a hard-wired and/or wireless communications link, for example, via one or more communications networks. In some examples, the one or more output signal(s) 38 may be used to one or more of determine, verify, or characterize one or more components of the material analyzed by the spectroscopic analyzer with analyzer controller.

In some embodiments, generating the first-state portfolio sample spectra 25 using the first spectroscopic analyzer 12*a* and generating the second-state portfolio sample spectra 44 using the second spectroscopic analyzer 12*b* may occur at a common location. For example, the common location may include a manufacturing site, such as a petroleum refining-related processing facility, a pharmaceutical manufacturing process site, or any other processing sites involving the processing of materials and/or chemicals. In some embodiments, generating the first-state portfolio sample spectra 25 and generating the second-state portfolio sample spectra 44 may occur at different geographic locations. The first-state portfolio sample spectra 25 and the second-state portfolio sample spectra 44, in some embodiments, may be outputted at a temperature within five degrees Fahrenheit of a common temperature. For example, the common temperature may be ambient temperature, and the ambient temperature may range, for example, from about 65 degrees Fahrenheit to about 75 degrees Fahrenheit. For example, in some embodiments, the temperature in the vicinity of the spectroscopic analyzer 12*b* may be controlled, and/or the temperature of the sample being analyzed may be controlled, and the temperature of the sample may be varied depending, at least in part, on, for example, the material content of the sample. This may enhance the reproducibility and/or consistency of the results of material analyses using the first spectroscopic analyzer 12*a* and the second spectroscopic analyzer 12*b*. In some embodiments, generating the first-state portfolio sample spectra 25 and generating the second-state portfolio sample spectra 44 may occur at substantially equal pressures, for example if at least a portion of the material being analyzed is in the form of a gas.

In some embodiments, the corrected material spectrum 54 may be added to the first-state sample spectra 18, and the one or more spectral model(s) 20 may be updated based at least in part on the first-state sample spectra 18 including the corrected material spectrum 54. In some embodiments, the corrected material spectrum 54 may be output by the second spectroscopic analyzer 12*b* with the second analyzer controller 14*b*, the corrected material spectrum 54 output by the second spectroscopic analyzer 12*b* with the second analyzer controller 14*b* may be added to the first-state sample spectra 18, and the one or more spectral model(s) 20 may be updated based at least in part on the first-state sample spectra 18 including the corrected material spectrum 54 output by the second spectroscopic analyzer 12*b* with the second analyzer controller 14*b*.

Figure 1C:
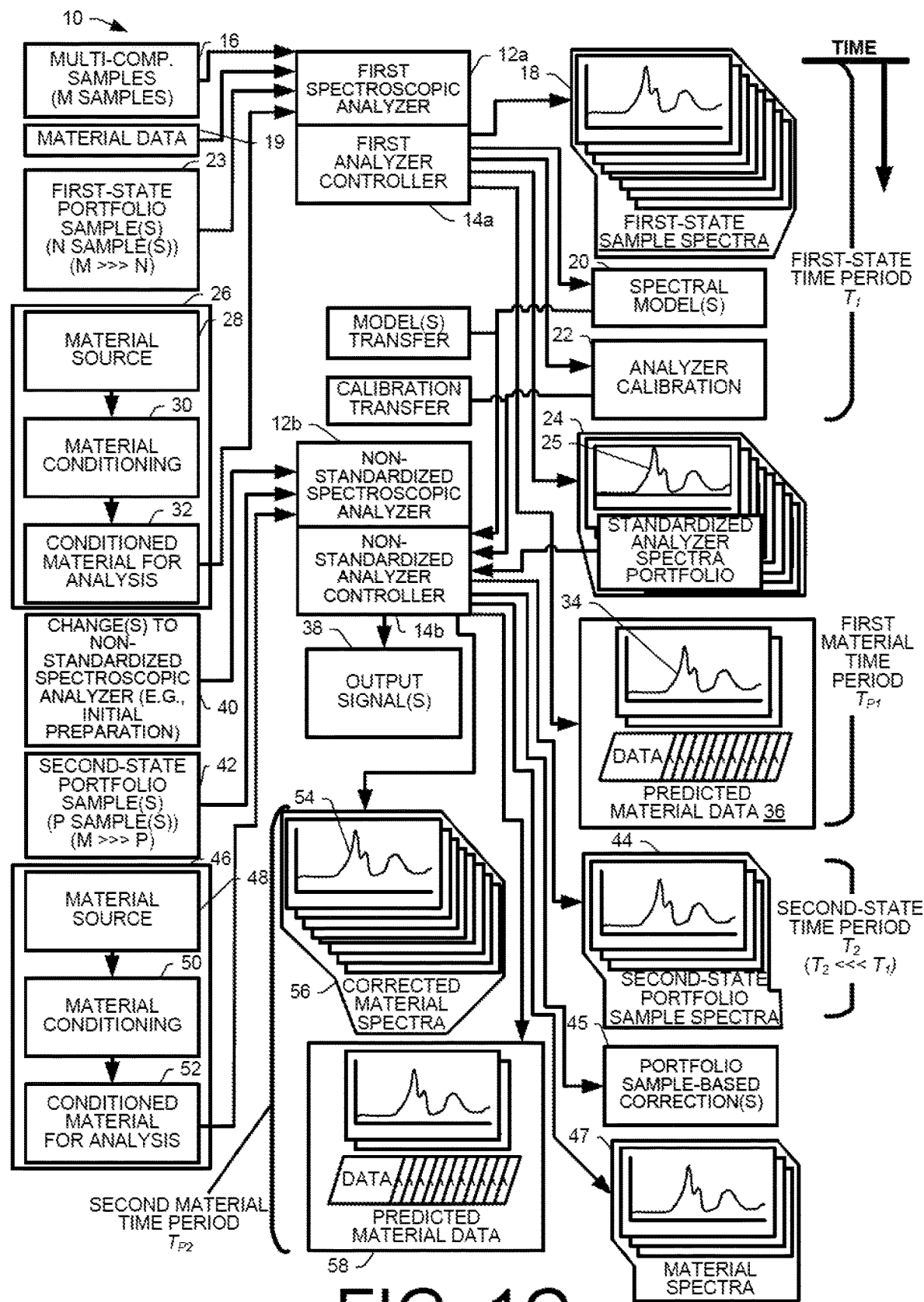
FIG. 1C is a block diagram of another spectroscopic analyzer assembly including a first standardized spectroscopic analyzer and first analyzer controller standardizing a second spectroscopic analyzer and second analyzer controller showing example inputs and example outputs in relation to an example timeline, according to embodiments of the disclosure.

FIG. 1C is a block diagram of another spectroscopic analyzer assembly 10 including a first spectroscopic analyzer 12*a* and a first analyzer controller 14*a* for standardizing a second spectroscopic analyzer 12*b* and a second analyzer controller 14*b* showing example inputs and example outputs in relation to an example timeline according to embodiments of the disclosure. In the example shown in FIG. 1C, the second spectroscopic analyzer 12*b* and second spectroscopic analyzer controller 14*b* are a non-standardized spectroscopic analyzer and a non-standardized analyzer controller. In some such examples, the first spectroscopic analyzer 12*a* with the first analyzer controller 14*a* may be used in a manner substantially similar to the spectroscopic analyzer assembly 10 and related processes described previously herein with respect to FIG. 1B. For example, the first spectroscopic analyzer 12*a* and the first analyzer controller 14*a* may be used to develop or determine spectral responses for calibration and standardization of the second spectroscopic analyzer 12*b* and the second analyzer controller 14*b*, for example, so that the second spectroscopic analyzer 12*b* with the second analyzer controller 14*b* may be configured to transform, based at least in part on a standardized analyzer spectra portfolio 24, a material spectrum of a multi-component material being analyzed by the second spectroscopic analyzer 12*b* to output a corrected material spectrum 54 for the multi-component material. In some embodiments, the corrected material spectrum 54 may include one or more of an absorption-corrected spectrum, a transmittance-corrected spectrum, a transflectance-corrected spectrum, a reflectance-corrected spectrum, or an intensity-corrected spectrum, for example, and/or a mathematical treatment of the material spectrum 47, such as, for example, one or more derivatives of the material spectrum 47, such as, for example, a second derivative of the material spectrum 47. For example, based at least in part on the corrected material spectrum 54, the second analyzer controller 14*b* may be configured to output a plurality of signals indicative of a plurality of material properties of the analyzed multi-component material, and the plurality of material properties may be substantially consistent with (e.g., substantially the same as) a plurality of material properties of the multi-component material that were (or would be) outputted by the first spectroscopic analyzer 12*a* with the first analyzer controller 14*a* in the first state. Thus, in some such embodiments, the corrected material spectrum 54 may be used as a standardized spectrum, such that the corrected material spectrum 54 has been standardized based at least in part on the standardized analyzer spectra portfolio 24, so that the corrected material spectrum 54 is the substantially the same material spectrum that would be outputted by the first spectroscopic analyzer 12*a* with the first analyzer controller 14*a* during the first state.

Figure 1D:
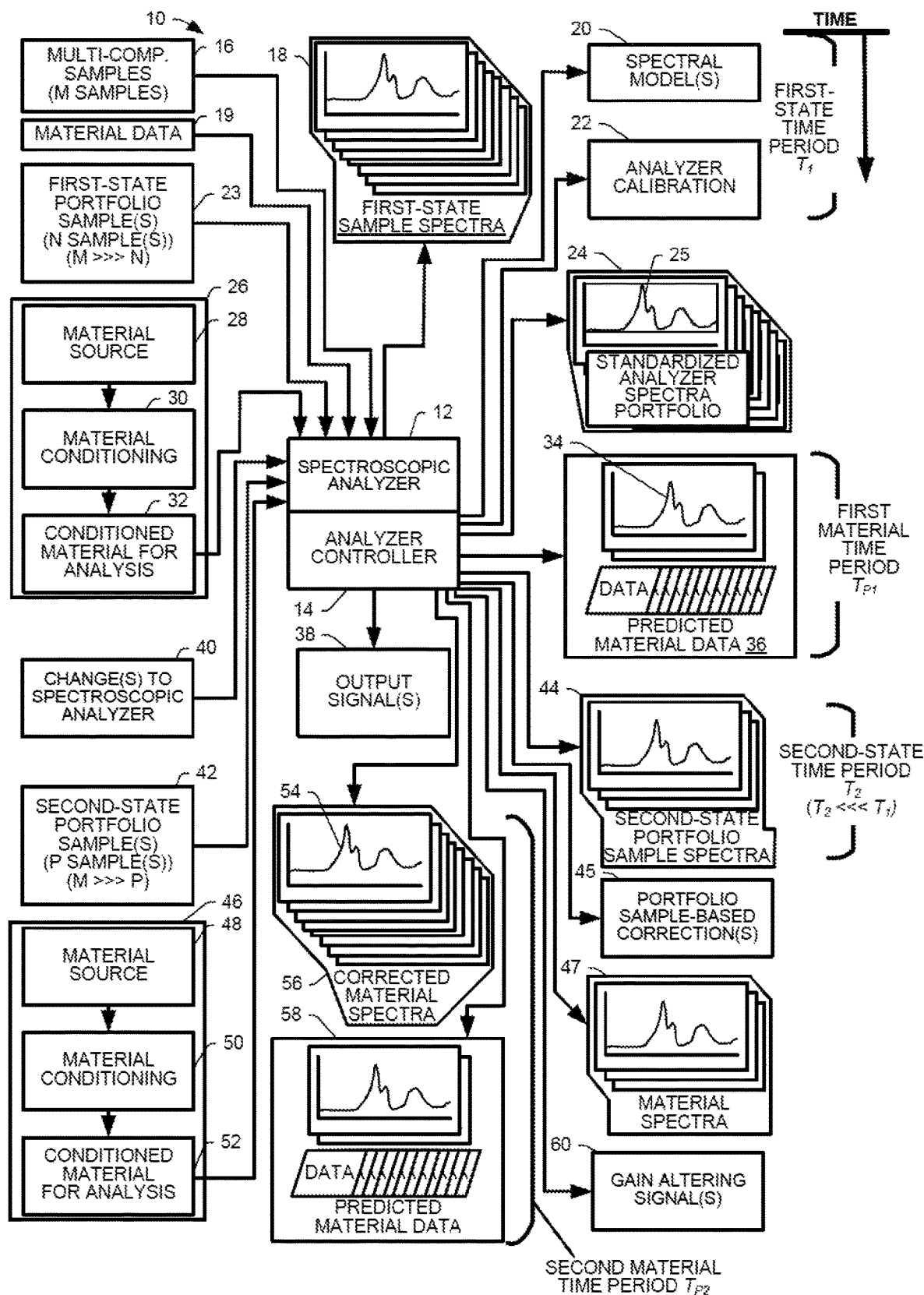
FIG. 1D is a block diagram of the example spectroscopic analyzer assembly shown in FIG. 1A including an example analyzer controller configured to output example gain signal(s) for analyzer detector(s) and/or detector response(s) for changing gain, according to embodiments of the disclosure.

FIG. 1D is a block diagram of the example spectroscopic analyzer assembly 10 shown in FIG. 1A including an example analyzer controller 14 configured to output example gain altering signal(s) 60 for analyzer source(s), analyzer detector(s), and/or detector response(s) for changing gain, according to embodiments of the disclosure. For example, in some embodiments, the spectroscopic analyzer 12 may include one or more detectors, as will be understood by those skilled in the art, and transforming the material spectrum 47 to output the corrected material spectrum 54 for a multi-component material being analyzed by the spectroscopic analyzer 12 may include altering a gain associated with one or more of the one or more detectors or a detector response associated with one or more of the wavelengths, wavenumbers, or frequencies of the material spectrum 47.

Figure 1E:
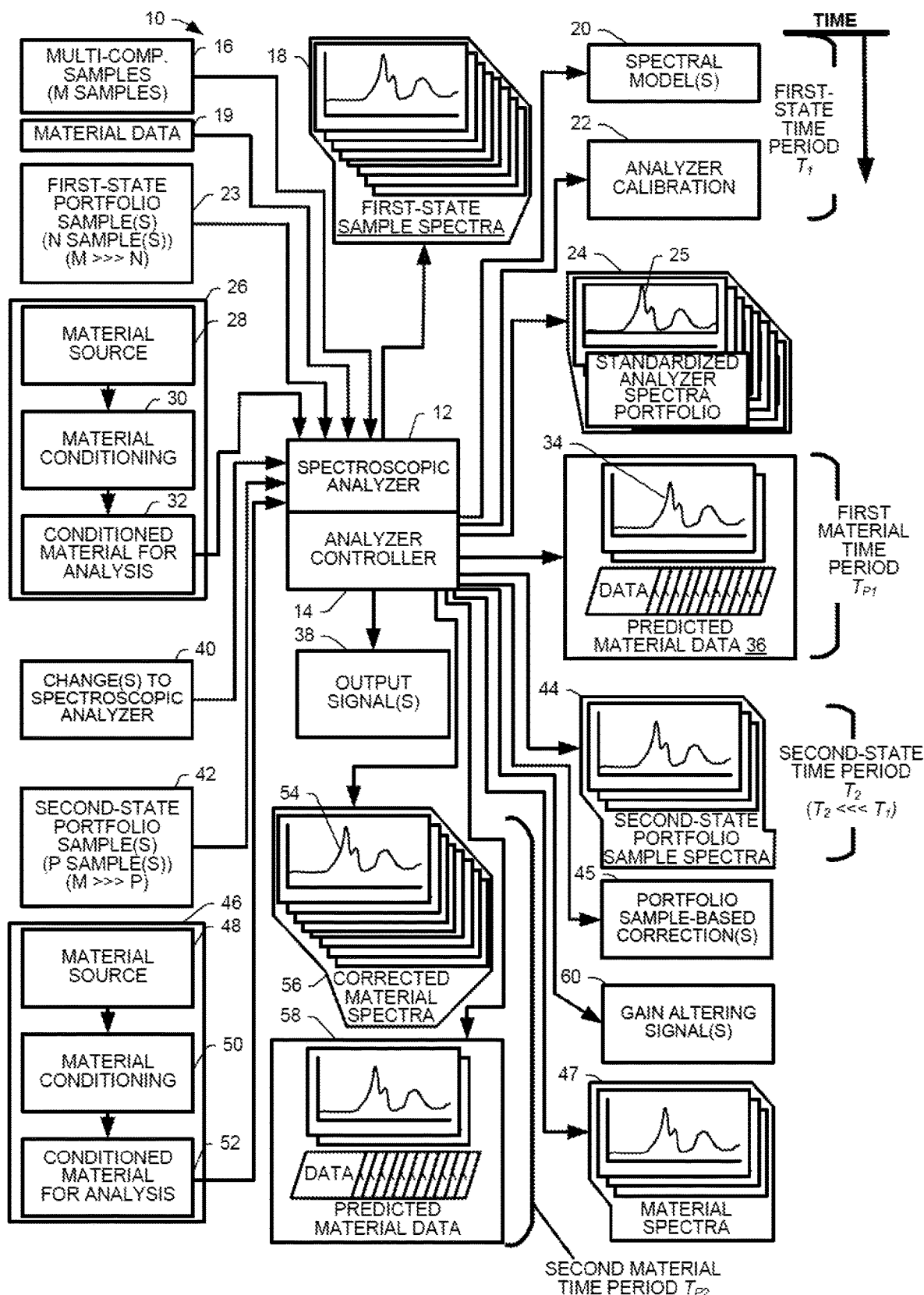
FIG. 1E is a block diagram of the example spectroscopic analyzer assembly shown in FIGS. 1A and 1D including an example analyzer controller configured to output example gain signal(s) for an analyzer source for changing gain, according to embodiments of the disclosure.

Referring to FIG. 1E, in some embodiments, the spectroscopic analyzer 12 may include one or more analyzer sources, such as electromagnetic radiation emitters and/or lasers (e.g., lamps, such as tungsten-halogen lamps), for transmitting electromagnetic radiation into a material sample being analyzed, as will be understood by those skilled in the art. In some such embodiments, the gain altering signal(s) 60 may cause a change in the energy input to the analyzer source(s) to increase or decrease the output signals of the spectroscopic analyzer 12, for example, by altering the voltage, current, and/or resistance associated with the analyzer source(s) to achieve a desired source intensity. In some embodiments, transforming the material spectra 47 to output the corrected material spectrum 54 (or corrected material spectra 56) for a multi-component material being analyzed by the spectroscopic analyzer 12 may include altering a gain associated with the energy input to the analyzer source(s) associated with one or more of the wavelengths, wavenumbers, or frequencies of the material spectra 47, thereby causing the material spectra 47 to be output as the corrected material spectra 56. For example, the voltage and/or current input to the analyzer source(s) may be changed based at least in part on the gain altering signal(s) 60. Although the material spectra 47 and the corrected material spectra 56 are shown in FIG. 1E as separate outputs, in some embodiments, the corrected material spectra 56 may be output without necessarily outputting the material spectra 47, based at least in part on the gain altering signal(s) 60, which, in turn, may be based at least in part on the portfolio sample-based correction(s) 45. In this example manner, the gain of the spectroscopic analyzer 12 may be changed by the gain altering signal(s) 60, such that the spectroscopic analyzer 12 may output the corrected material spectra 56 instead of outputting the material spectra 47 and thereafter changing (or correcting) the material spectra 47 to achieve the corrected material spectra 56, for example, as described herein with respect to FIG. 1D.

In the example embodiment shown in FIG. 1D, the analyzer controller 14, based at least in part on the portfolio sample-based correction(s) 45, may be configured to output one or more gain signals 60 for controlling one or more analyzer source(s), analyzer detectors, and/or detector responses, such that the spectroscopic analyzer 12 with the analyzer controller 14, when analyzing a multi-component material, outputs a corrected material spectrum or spectra that is standardized according to the portfolio sample-based correction(s) 45 to the standardized analyzer spectra portfolio 24. Thus, in some embodiments, rather than generating a material spectrum when analyzing a multi-component material, and thereafter correcting the material spectrum 47 based at least in part on the variance to output a corrected material spectrum 54, the spectroscopic analyzer 12 with the analyzer controller 14 may be configured to output a corrected material spectrum 54 based on adjusting the gain, for example, without prior generation of a material spectrum, which is thereafter corrected. Rather, in some embodiments, based at least in part on the variance, the spectroscopic analyzer 12 with the analyzer controller 14 may be configured to adjust the gain, so that the spectroscopic analyzer 12 and/or analyzer controller 14 output(s) a corrected material spectrum 56 that reduces or substantially eliminates the variance.

In some embodiments, altering the gain associated with the one or more of the one or more analyzer sources, detectors, or the detector responses may include altering the gain associated with one or more ranges of wavelengths, ranges of wavenumbers, and/or ranges of frequencies. In some embodiments, altering the gain associated with the one or more of the one or more analyzer sources, detectors, or the detector responses may include applying a mathematically-derived correction to the gain associated with one or more of one or more of the wavelengths, one or more ranges of wavelengths, or the material spectrum. In some embodiments, altering the gain associated with the one or more of the one or more analyzer sources, detectors, or the detector responses may include applying a mathematically-derived correction to the gain associated with one or more of one or more wavenumbers, one or more frequencies, ranges of wavenumbers, or ranges of frequencies. Applying the mathematically-derived correction may include altering the gain by one or more of a defined average over a range of wavelengths, determined differences at one or more of the wavelengths, or a ratio for one or more of the wavelengths. Similarly, in some embodiments, this may be applied to wavenumbers and/or frequencies.

In some embodiments, this may render it possible to directly compare the results of analysis by the second spectroscopic analyzer 12*b* with the second analyzer controller 14*b* with results of analysis by the first spectroscopic analyzer 12*a* with the first analyzer controller 14*a* made during the first state. In addition, as noted above, in some embodiments, using the portfolio sample-based correction(s) 45 to calibrate or recalibrate the second spectroscopic analyzer 12*b* with the second analyzer controller 14*b* to achieve the standardization may require the analysis of significantly fewer samples as compared to the number of multi-component samples 16 used to initially calibrate the first spectroscopic analyzer 12*a* with first analyzer controller 14a during the first state. This may also significantly reduce the time required to calibrate or recalibrate the second spectroscopic analyzer 12b with second the analyzer controller 14b.

Figure 1F:
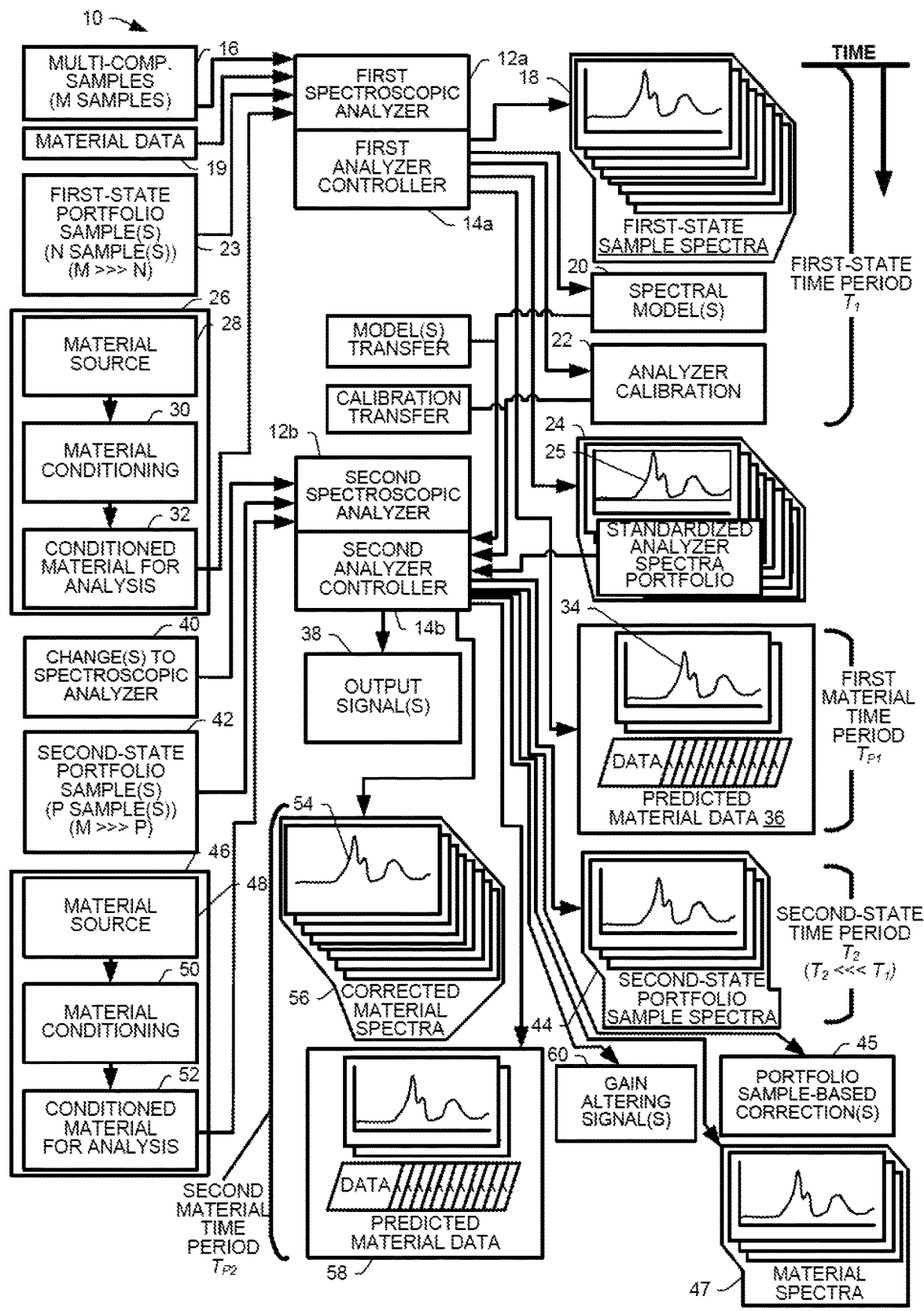
FIG. 1F is a block diagram of the example spectroscopic analyzer assembly shown in FIG. 1B including an example second analyzer controller configured to output example gain signal(s) for analyzer detector(s) and/or detector response(s) for changing gain, according to embodiments of the disclosure.

FIG. 1F is a block diagram of the example spectroscopic analyzer assembly 10 shown in FIG. 1B including an example second spectroscopic analyzer 12b and a second analyzer controller 14b configured to output example gain signal(s) 60 for analyzer source(s), analyzer detector(s), and/or detector response(s) according to embodiments of the disclosure. In some embodiments, the second spectroscopic analyzer 12b may include one or more detectors, as will be understood by those skilled in the art, and transforming the material spectrum 47 to output the corrected material spectrum 54 for a multi-component material being analyzed by the second spectroscopic analyzer 12b includes altering a gain associated with one or more of the one or more analyzer sources, detectors, or a detector responses associated with one or more of the wavelengths, wavenumbers, or frequencies of the material spectrum 47.

Similar to the example embodiment shown in FIG. 1B, in some embodiments, the spectroscopic analyzer assembly 10 may be used to determine standardized analyzer spectra via the first spectroscopic analyzer 12a with the first analyzer controller 14a for calibration (or recalibration) of the second spectroscopic analyzer 12b by using the standardized analyzer spectral responses to calibrate the second spectroscopic analyzer 12b with second analyzer controller 14b, for example, at a period of time after one or more change(s) 40 to the second spectroscopic analyzer 12b causing a need to calibrate (or recalibrate) the second spectroscopic analyzer 12b.

For example, in some embodiments, using the standardized analyzer spectra may include the use of a prior spectral model developed on the first spectroscopic analyzer 12a when in the first state to standardize spectral responses of the second spectroscopic analyzer 12b after a change to the second spectroscopic analyzer 12b, such that, when in the second state, analysis by the second spectroscopic analyzer 12b of a first multi-component material results in generation of a second-state spectrum that is consistent with a first-state spectrum outputted by the first spectroscopic analyzer 12a, when in the first state, resulting from analysis of the first multi-component material. Thus, in some embodiments, the first spectroscopic analyzer 12a and the second spectroscopic analyzer 12b will be capable of generating the substantially same spectrum after an event causing the need to calibrate (or recalibrate) the second spectroscopic analyzer 12b (e.g., such as a change to the second spectroscopic analyzer 12b, such as maintenance and/or component replacement). In some embodiments, this may improve one or more of the accuracy, reproducibility, or consistency of results outputted by the second spectroscopic analyzer 12b after applying the portfolio sample-based correction(s) 45 to the material spectrum 47. For example, the second spectroscopic analyzer 12b with the second analyzer controller 14b may be configured to analyze a multi-component material and output plurality of signals indicative of a plurality of material properties of the material based at least in part on a second-state corrected material spectrum or portfolio sample-based correction 45, such that the plurality of material properties of the material determined by the second spectroscopic analyzer 12b with the second analyzer controller 12b are substantially consistent with (e.g., substantially the same as) a plurality of material properties outputted by the first spectroscopic analyzer 12a with first analyzer controller 14a in the first state, for example, prior to calibrating or recalibrating the second spectroscopic analyzer 12b. This may result in standardizing the second spectroscopic analyzer 12b with the second analyzer controller 14b based at least in part on the first spectroscopic analyzer 12a with the first analyzer controller 14a.

As shown in FIG. 1F, similar to the example embodiment shown in FIG. 1D, the second analyzer controller 14b, based at least on part on the portfolio sample-based correction 45, may be configured to output one or more detector gain signals 60 for controlling one or more analyzer detectors and/or detector responses, such that the second spectroscopic analyzer 12b with the second analyzer controller 14b, when analyzing a multi-component material, outputs a corrected material spectrum or spectra that is standardized according to the standardized analyzer spectra portfolio 24. Thus, in some embodiments, rather than generating a material spectrum 47 when analyzing a multi-component material, and thereafter correcting the material spectrum 47 based at least in part on the variance and the portfolio sample-based correction(s) 45 to output a corrected material spectrum 54, the second spectroscopic analyzer 12b and/or the second analyzer controller 14b may be configured to output a corrected material spectrum 54 by adjusting the gain, for example, without prior generation of a material spectrum, which is thereafter corrected. Rather, in some embodiments, based at least in part on the variance, the second spectroscopic analyzer 12b with the second analyzer controller 14b may be configured to adjust the gain associated with the analyzer sources, detectors, and/or detector responses, so that the second spectroscopic analyzer 12b with second analyzer controller 14b output a corrected material spectrum 56 that reduces or substantially eliminates the variance. In some embodiments consistent with FIG. 1F, the spectroscopic analyzer 12b may include one or more analyzer sources, such as electromagnetic radiation emitters and/or lasers, for transmitting electromagnetic radiation into a material sample being analyzed, as will be understood by those skilled in the art. In some such embodiments, the gain altering signal(s) 60 may cause a change in the energy input to the analyzer source(s) to increase or decrease the output signals of the spectroscopic analyzer 12b. For example, in some embodiments, in a manner at least similar to the embodiment shown in FIG. 1E, the gain of the spectroscopic analyzer 12b may be changed by the gain altering signal(s) 60, such that the spectroscopic analyzer 12b may output the corrected material spectra 56 instead of outputting the material spectra 47 and thereafter changing (or correcting) the material spectra 47 to achieve the corrected material spectra 56.

In some embodiments, altering the gain associated with the one or more of the one or more detectors or the detector response may include altering the gain associated with one or more ranges of wavelengths, ranges of wavenumbers, and/or ranges of frequencies. In some embodiments, altering the gain associated with the one or more of the one or more analyzer sources, detectors, or the detector responses may include applying a mathematically-derived correction to the gain associated with one or more of one or more of the wavelengths, one or more ranges of wavelengths, or the material spectrum. In some embodiments, altering the gain associated with the one or more of the one or more analyzer sources, detectors, or the detector responses may include applying a mathematically-derived correction to the gain associated with one or more of one or more wavenumbers, one or more frequencies, ranges of wavenumbers, or ranges of frequencies. Applying the mathematically-derived correction may include altering the gain by one or more of a defined average over a range of wavelengths, determined differences at one or more of the wavelengths, or a ratio for one or more of the wavelengths. Similarly, in some embodiments, this may be applied to the wavenumbers and/or the frequencies.

In some embodiments, this may result in it being possible to directly compare the results of analysis by the second spectroscopic analyzer 12b with the second analyzer controller 14b with results of analysis by the first spectroscopic analyzer 12a with the first analyzer controller 14a made during the first state. In addition, as noted above, in some embodiments, using the portfolio sample-based correction(s) 45 to calibrate or recalibrate the second spectroscopic analyzer 12b with the second analyzer controller 14b to achieve the standardization may require the analysis of significantly fewer samples (e.g., the second-state portfolio samples 44) as compared to the original calibration of the first spectroscopic analyzer 12a with first analyzer controller 14a during the first state. This may also significantly reduce the time required to calibrate or recalibrate the second spectroscopic analyzer 12b with the second analyzer controller 14b.

Figure 1G:
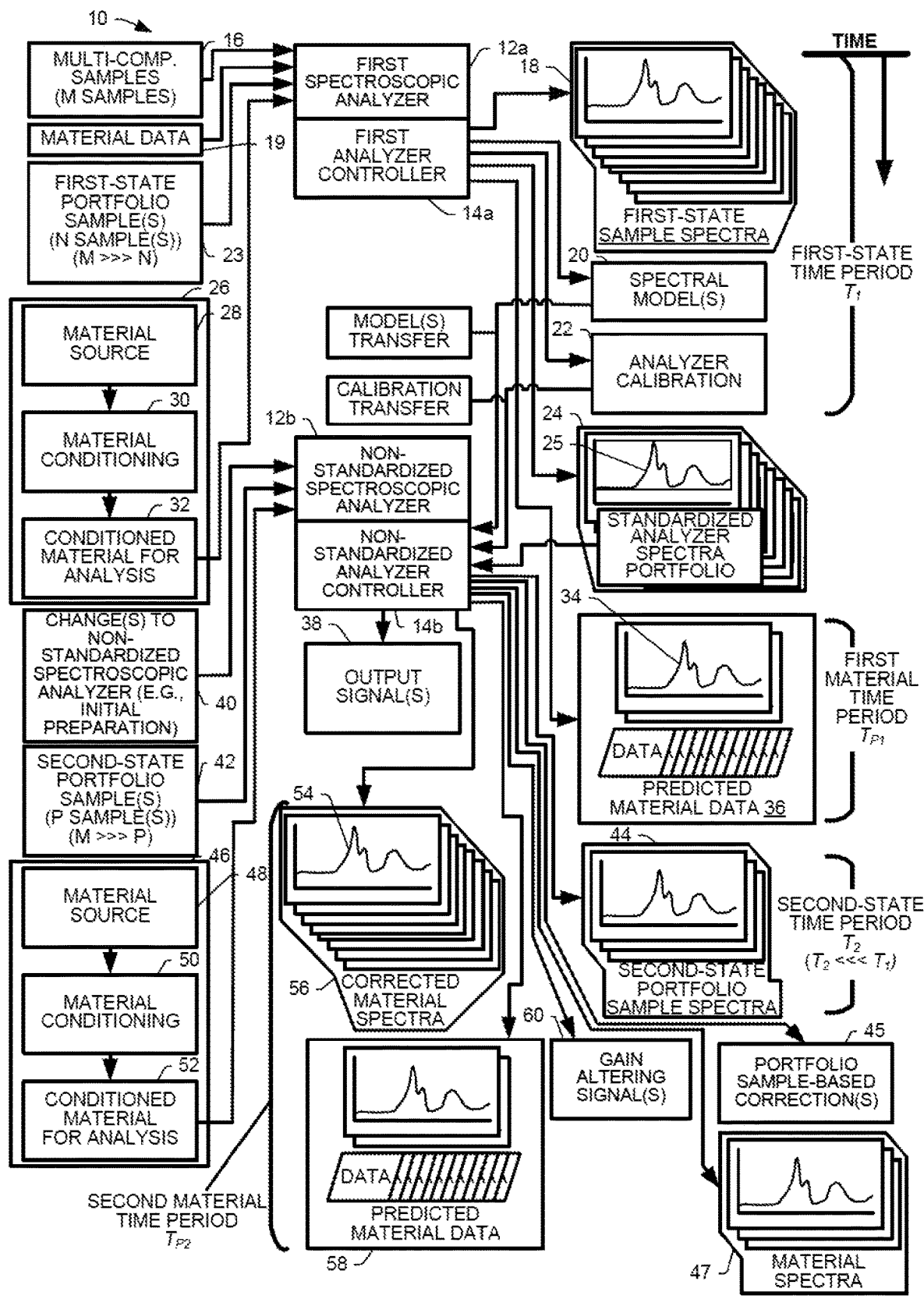
FIG. 1G is a block diagram of the example spectroscopic analyzer assembly shown in FIG. 1C including a second analyzer controller configured to output example gain signal(s) for analyzer detector(s), and/or detector response(s) for changing gain, according to embodiments of the disclosure.

FIG. 1G is a block diagram of the example spectroscopic analyzer assembly 10 shown in FIG. 1C including a second spectroscopic analyzer 12b and a second analyzer controller 14b configured to output example gain signal(s) 60 for analyzer source(s), analyzer detector(s), and/or detector response(s) according to embodiments of the disclosure. In the example shown in FIG. 1G, the second spectroscopic analyzer 12b and second analyzer controller 14b are a non-standardized spectroscopic analyzer and a non-standardized analyzer controller. In some such examples, the first spectroscopic analyzer 12a with the first analyzer controller 14a may be used in a manner substantially similar to the spectroscopic analyzer assembly 10 and related processes described previously herein with respect to FIG. 1F. For example, the first spectroscopic analyzer 12a and the first analyzer controller 14a may be used to determine one or more spectral models and/or a standardized analyzer spectra portfolio for calibration and standardization of the second spectroscopic analyzer 12b and the second spectroscopic analyzer controller 14b, for example, so that the second spectroscopic analyzer 12b with the second spectroscopic analyzer controller 14b may be configured to transform, based at least in part on the portfolio sample-based correction(s) 45 to the standardized analyzer spectra portfolio, a material spectrum 47 of a multi-component material being analyzed by the second spectroscopic analyzer 12b to output a corrected material spectrum 54 for the multi-component material. In some embodiments, this may result in the second spectroscopic analyzer 12b with the second analyzer controller 14b outputting spectral responses consistent with spectral responses that would be output by the first spectroscopic analyzer 12a with the first analyzer controller 14a (e.g., the spectral responses would be similar to, substantially match, be substantially equivalent to, or be substantially the same).

For example, the second analyzer controller 14b, based at least in part on the portfolio sample-based correction(s) 45, may be configured to output one or more detector gain signals 60 for controlling one or more analyzer detectors and/or detector responses, such that the second spectroscopic analyzer 12b with the second analyzer controller 14b, when analyzing a multi-component material, outputs a corrected material spectrum or spectra that is standardized according to the standardized analyzer spectra portfolio 24. Thus, in some embodiments, rather than generating a material spectrum when analyzing a multi-component material, and thereafter correcting the material spectrum 47 based at least in part on the variance to output a corrected material spectrum 54, the second spectroscopic analyzer 12b and/or the second analyzer controller 14b may be configured to output a corrected material spectrum 54 by adjusting the gain, for example, without prior generation of a material spectrum 47, which is thereafter corrected. Rather, in some embodiments, based at least in part on the variance, the second spectroscopic analyzer 12b with the second analyzer controller 14b may be configured to adjust the gain associated with the analyzer sources, detectors, and/or detector responses, so that the second spectroscopic analyzer 12b with second analyzer controller 14b output a corrected material spectrum 56 that reduces or substantially eliminates the variance.

In some embodiments consistent with FIG. 1G, the spectroscopic analyzer 12b may include one or more analyzer sources, such as electromagnetic radiation emitters and/or lasers, for transmitting electromagnetic radiation into a material sample being analyzed, as will be understood by those skilled in the art. In some such embodiments, the gain altering signal(s) 60 may cause a change in the energy input to the analyzer source(s) to increase or decrease the output signals of the spectroscopic analyzer 12b. For example, in some embodiments, in a manner at least similar to the embodiment shown in FIG. 1E, the gain of the spectroscopic analyzer 12b may be changed by the gain altering signal(s) 60, such that the spectroscopic analyzer 12b may output the corrected material spectra 56 instead of outputting the material spectra 47 and thereafter changing (or correcting) the material spectra 47 to achieve the corrected material spectra 56.

In some embodiments, this may render it possible to directly compare the results of an analysis by the second spectroscopic analyzer 12b with the second analyzer controller 14b with results of an analysis by the first spectroscopic analyzer 12a with the first analyzer controller 14a made during the first state. In addition, as noted above, in some embodiments, using the portfolio sample-based correction(s) 45 to calibrate or recalibrate the second spectroscopic analyzer 12b with the second analyzer controller 14b to achieve the standardization may require the analysis of significantly fewer samples (e.g., the second-state portfolio samples 44) as compared to the original calibration of the first spectroscopic analyzer 12a with first analyzer controller 14a during the first state. This may also significantly reduce the time required to calibrate or recalibrate the second spectroscopic analyzer 12b with second the analyzer controller 14b.

Figure 2A:
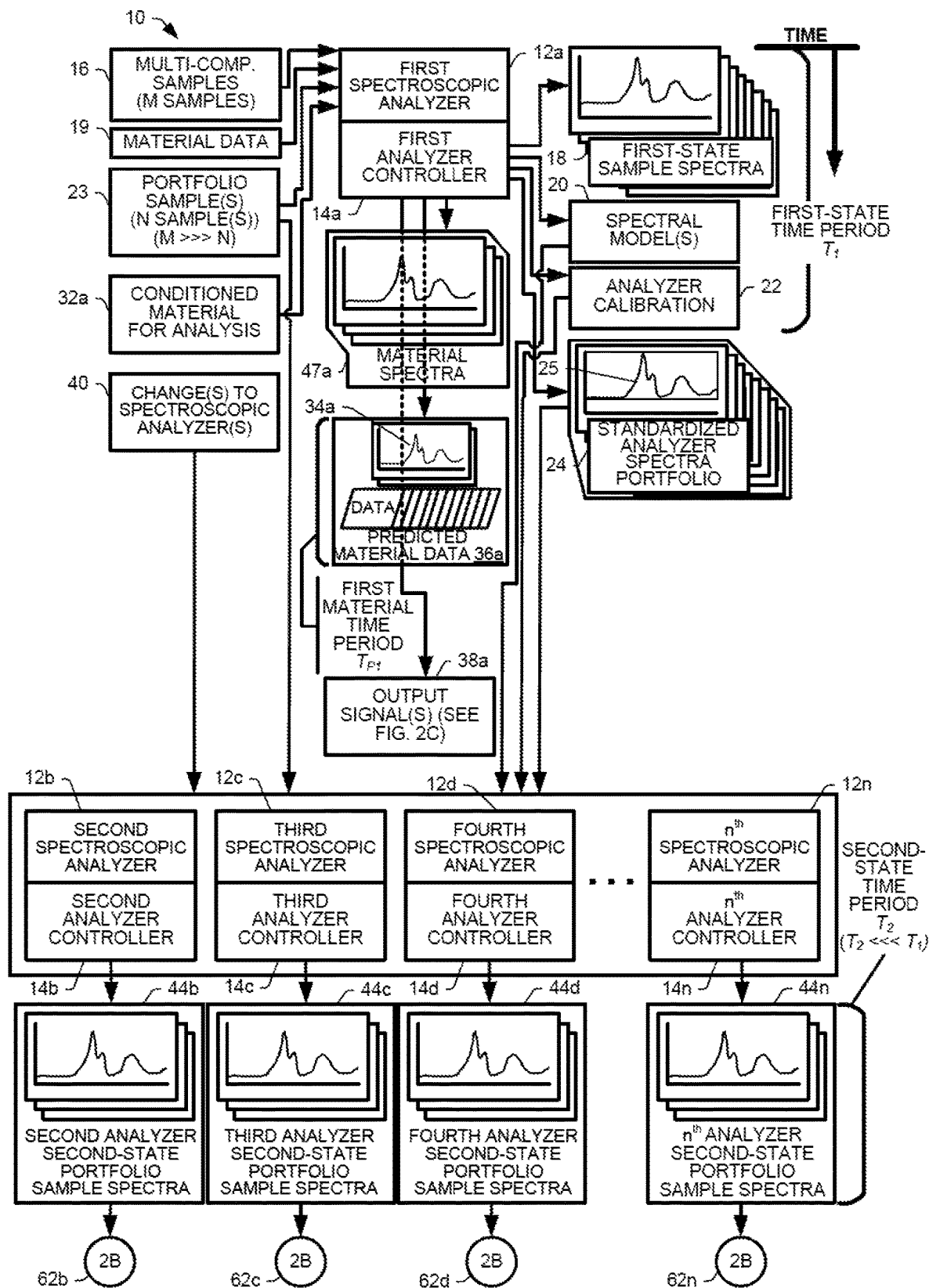
FIG. 2A is a block diagram of another spectroscopic analyzer assembly including a first standardized spectroscopic analyzer and a first analyzer controller configured to standardize a plurality of spectroscopic analyzers and showing example inputs and example outputs in relation to an example timeline, according to embodiments of the disclosure.
Figure 2B:
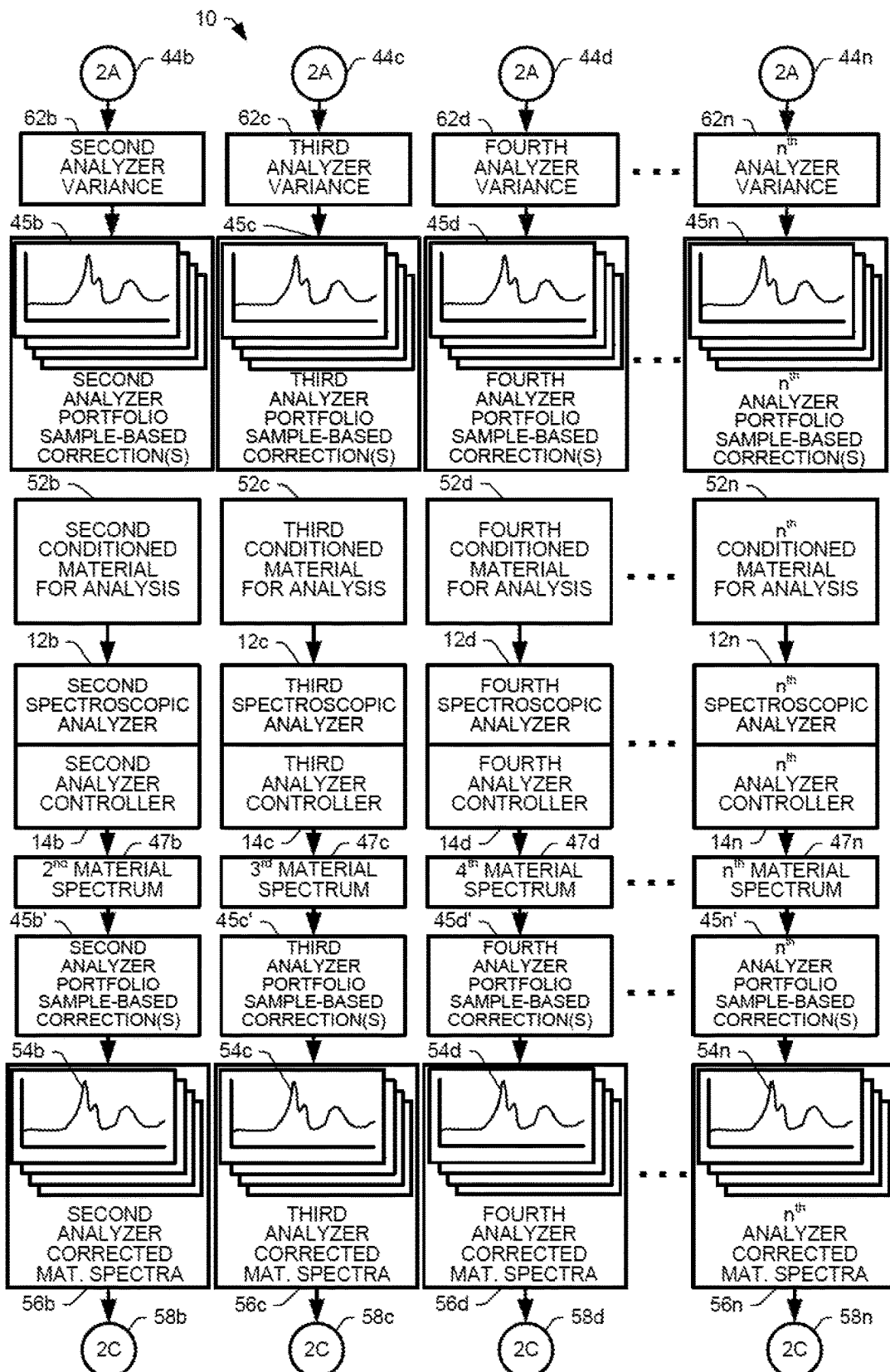
FIG. 2B is a continuation of the block diagram shown in FIG. 2A showing the plurality of example standardized spectroscopic analyzers outputting respective analyzer portfolio sample-based corrections based at least in part on respective variances, and analyzing conditioned materials for outputting respective corrected material spectra, according to embodiments of the disclosure.

FIG. 2A and FIG. 2B are a block diagram of another spectroscopic analyzer assembly 10 including a first standardized spectroscopic analyzer 12a and first analyzer controller 14a configured to standardize a plurality of spectroscopic analyzers and showing example inputs and example outputs in relation to an example timeline according to embodiments of the disclosure. FIG. 2B shows the plurality of example standardized spectroscopic analyzers and/or the analyzer controllers analyzing conditioned materials to output predicted (or determined) material data for the materials for use in example processes according to embodiments of the disclosure. In some embodiments, the spectroscopic analyzers and/or the analyzer controllers may analyze unconditioned materials and/or semi-conditioned materials to output predicted (or determined) material data for the materials for use in example processes.

In the example embodiments shown in FIGS. 2A and 2B, the spectroscopic analyzer assembly 10 may include a first spectroscopic analyzer 12a and a first analyzer controller 14a configured to determine and use standardized analyzer spectral responses to standardize spectral responses of one or more (e.g., each) of the plurality of spectroscopic analyzers (e.g., a second spectroscopic analyzer 12b, a third spectroscopic analyzer 12c, and a fourth spectroscopic analyzer 12d through an $n^{th}$ spectroscopic analyzer 12n), such that for a given material one or more of the plurality of spectroscopic analyzers outputs a plurality of signals indicative of a plurality of material properties of the material, the plurality of material properties of the material output by each of the plurality of spectroscopic analyzers being substantially consistent with one another. In some embodiments, the spectroscopic analyzer assembly 10 may further include a plurality of analyzer controllers (e.g., a second analyzer controller 14b, a third analyzer controller 14c, and a fourth analyzer controller 14d through an $n^{th}$ analyzer controller 14n), each associated with a corresponding spectroscopic analyzer.

In some embodiments, each of the analyzer controllers 14a-14n may be in communication with a respective one of the spectroscopic analyzers 12a-12n. For example, the analyzer controllers 14 may each be physically connected to the respective spectroscopic analyzer 12. In some such embodiments, the spectroscopic analyzers 12 may each include a housing and at least a portion of the respective analyzer controller 14 may be contained in the housing. In some such embodiments, the respective analyzer controllers 14 may be in communication with the respective spectroscopic analyzers 12 via a hard-wired and/or wireless communications link. In some embodiments, the respective analyzer controllers 14 may be physically separated from the respective spectroscopic analyzers 12 and may be in communication with the respective spectroscopic analyzers 12 via a hard-wired communications link and/or a wireless communications link. In some embodiments, physical separation may include being spaced from one another, but within the same building, within the same facility (e.g., located at a common manufacturing facility, such as a refinery), or being spaced from one another geographically (e.g., anywhere in the world). In some physically separated embodiments, both the spectroscopic analyzer 12 and/or the respective analyzer controller 14 may be linked to a common communications network, such as a hard-wired communications network and/or a wireless communications network. Such communications links may operate according to any known hard-wired and/or wireless communications protocols as will be understood by those skilled in the art. Although FIG. 2A schematically depicts each of the analyzer controllers 14a-14n being separate analyzer controllers, in some embodiments, one or more of the analyzer controllers 14a-14n may be part of a common analyzer controller configured to control one or more the spectroscopic analyzers 12a-12n.

In some embodiments, using the standardized analyzer spectra may include transferring one or more spectral models of the first spectroscopic analyzer 12a when in the first state to one or more of the second through $n^{th}$ spectroscopic analyzers 12b-12n with respective analyzer controllers 14b-14n after a change to the second through $n^{th}$ spectroscopic analyzers 12b-12n, such that, when in the second state, analysis by the second through $n^{th}$ spectroscopic analyzers 12b-12n of multi-component materials results in generation of second through $n^{th}$ material spectra 56b-56n that are consistent with a first-state material spectrum outputted by the first spectroscopic analyzer 12a, when in the first state, resulting from analysis of the first multi-component material 32a. Thus, in some embodiments, the first spectroscopic analyzer 12a and one or more of the second through $n^{th}$ spectroscopic analyzers 12b-12n will be capable of generating the substantially same spectrum after an event causing the need to calibrate (or recalibrate) one or more of the second through $n^{th}$ spectroscopic analyzers 12b-12n (e.g., a change to one or more of the second through $n^{th}$ spectroscopic analyzers 12b-12n, such as maintenance and/or component replacement). In some embodiments, this may improve one or more of the accuracy, reproducibility, or consistency of results outputted by the one or more of the second through $n^{th}$ spectroscopic analyzers 12b-12n after a change in state from the first state to the second state. For example, one or more of the second through $n^{th}$ spectroscopic analyzers 12b-12n with one or more of the respective second through $n^{th}$ analyzer controllers 14b-14n may be configured to analyze a multi-component material and output plurality of signals indicative of a plurality of material properties of the material based at least in part on a corrected material spectrum, such that the plurality of material properties of the material predicted (or determined) by one or more of the second through $n^{th}$ spectroscopic analyzers 12b-12n and/or one or more of the second through $n^{th}$ analyzer controllers 14b-14n are substantially consistent with (e.g., substantially the same as) a plurality of material properties outputted by the first spectroscopic analyzer 12a with first analyzer controller 14a in the first state. This may result in standardizing the one or more second through $n^{th}$ spectroscopic analyzers 12b-12n with the corresponding one or more of the second through $n^{th}$ analyzer controllers 14b-14n based at least in part on the first spectroscopic analyzer 12a with the first analyzer controller 14a.

As shown in FIG. 2A, in some embodiments, the first analyzer controller 14a may be configured to determine standardized analyzer spectra for calibration of the plurality of spectroscopic analyzer 12b-12n when one or more of the spectroscopic analyzers 12b-12n changes from a first state to a second state. For example, the first analyzer controller 14a, while in the first state and during a first-state time period $T_1$, may be configured to analyze a plurality of different multi-component samples 16 and, based at least in part on the multi-component samples 16, output first-state sample spectra 18 of the different multi-component samples 16. In some embodiments, each of the first-state sample spectra 18 may be collected and stored, for example, in a database. In some embodiments, each of the first-state sample spectra 18 may be associated with a corresponding different multi-component sample 16 and may be indicative of a plurality of different multi-component sample properties. In some embodiments, the first-state sample spectra 18, in combination with material data 19 associated with each of the multi-component samples 16, may be used to output (e.g., develop) one or more spectral model(s) 20, which, in turn, may be used to calibrate the first spectroscopic analyzer 12a with the first analyzer controller 14a, resulting in an analyzer calibration 22. The material data 19 may include any data related to one or more properties associated with one or more of the respective multi-component samples 16. The one or more spectral model(s) 20 may be indicative of relationships (e.g., correlations) between a spectrum or spectra of the first-state sample spectra 18 and one or more properties associated with one or more of respective multi-component samples 16, and the relationships may be used to provide the analyzer calibration 22. As noted previously herein, in some embodiments, as will be understood by those skilled in the art, the one or more spectral model(s) 20 may represent a univariate or multivariate regression (e.g., a least-squares regression, a multiple linear regression (MLR), a partial least squares regression (PLS), a principal component regression (PCR)), such as a regression of material data (e.g., one or more properties of the multi-component sample) against a corresponding spectrum of the first-state sample spectra 18. In some embodiments, the one or more spectral model(s) 20 may represent topological modeling by use of nearest neighbor positioning to calculate properties, based on the material data (e.g., one or more properties of the multi-component sample) against a corresponding spectrum of the first-state sample spectra 18, as also will be understood by those skilled in the art. This may facilitate prediction of one or more properties of a material analyzed by the spectroscopic analyzers 12a-12n, once calibrated, based at least in part on a spectrum associated with the material.

In some embodiments, the plurality of different multi-component samples 16 may include a relatively large number of samples, for example, as described previously herein with respect to FIG. 1B. For example, in some embodiments, in order to calibrate the first spectroscopic analyzer 12a with the first analyzer controller 14a to a desired level of accuracy and/or reproducibility, it may be necessary to analyze hundreds or thousands of multi-component samples 16 that have corresponding material data 19. Due to the relatively large number of multi-component samples 16 used for calibration, the first-state time period $T_1$, which may generally correspond to the time period during which the multi-component samples 16 are analyzed, may take a significant amount of time to complete, for example, as described previously herein with respect to FIG. 1B. For example, in some embodiments, in order to calibrate the first spectroscopic analyzer 12a with the first analyzer controller 14a to a desired level of accuracy and/or reproducibility, due to the relatively large number of samples analyzed, the first-state time period $T_1$ may take dozens of hours or longer to complete.

Following calibration of the first spectroscopic analyzer 12a with the first analyzer controller 14a, the spectral responses of the first spectroscopic analyzer 12a with the first analyzer controller 14a may be standardized, for example, by analyzing one or more first-state portfolio sample(s) 23 to output a standardized analyzer spectra portfolio 24 including one or more first-state portfolio sample spectra 25. For example, the first spectroscopic analyzer 12a with the first analyzer controller 14a, when in the first state, may be used to analyze one or more first-state portfolio sample(s) 23 to output a first-state portfolio spectrum 25 for each of the one or more first-state portfolio sample(s) 23. In some embodiments, the respective first-state portfolio sample spectrum 25 associated with a respective first-state portfolio sample 23 may be stored to develop the standardized analyzer spectra portfolio 24, which may be used to reduce a variance between a second-state portfolio sample spectrum (outputted during a second state) and a corresponding first-state portfolio sample spectrum 25 of the standardized analyzer spectra portfolio 24, for example, as described herein.

As shown in FIG. 2A, following calibration and/or standardization of the first spectroscopic analyzer 12a with the first analyzer controller 14a, the first spectroscopic analyzer 12a with the first analyzer controller 14a may be used to analyze multi-component materials to predict properties of the multi-component materials analyzed. For example, in some embodiments, the first spectroscopic analyzer 12a with the first analyzer controller 14a may be used as part of a manufacturing process, for example, as described herein with respect to FIGS. 2A, 2B, and 2C. For example, the first spectroscopic analyzer 12a with the first analyzer controller 14a may be used to analyze multi-component materials, and the corresponding material properties predicted (or determined) from the analyses may be used to assist with at least partial control of the manufacturing process or processes.

For example, as shown in FIG. 2A, a manufacturing process may result in generating conditioned materials for analysis 32a (e.g., fluids, such as gases and/or liquids) during the manufacturing process, and multi-component materials associated with the manufacturing process may be diverted for analysis by the first spectroscopic analyzer 12a with the first analyzer controller 14a. In some embodiments, for example, as shown in FIG. 2A, the multi-component material may be conditioned via material conditioning to output conditioned material for analysis 32a by the first spectroscopic analyzer 12a with the first analyzer controller 14a, for example, as described previously herein with respect to FIG. 1B. In some embodiments, material conditioning may include one or more of filtering particulates and/or fluid contaminants from the multi-component material, controlling the temperature of the multi-component material (e.g., reducing or increasing the temperature to be within a desired range of temperatures), or controlling the pressure of the multi-component material (e.g., reducing or increasing the pressure to be within a desired range of pressures). In some embodiments, the spectroscopic analyzers and/or the analyzer controllers may analyze unconditioned materials and/or semi-conditioned materials to output predicted (or determined) material data for the materials for use in example processes.

Upon analysis of the multi-component materials, which may be a feed to a processing unit and/or an output from a processing unit, the first spectroscopic analyzer 12a with the first analyzer controller 14a, using the analyzer calibration 22, may output a plurality of material spectra 34a and, based at least in part on the material spectra 34a, predict a plurality of material properties associated with the multi-component materials. In some embodiments, the material spectra 34a and the associated predicted or determined material properties may be stored in a database as predicted (or determined) material data 36a. It is contemplated that additional material data associated with the multi-component materials analyzed may also be included in the database to supplement the predicted or determined material properties. For example, the database may define a library including material data including correlations between the plurality of material spectra and the plurality of different material properties of the corresponding material.

In some embodiments, the analysis of the multi-component materials may occur during a first material time period TPI, as shown in FIG. 2A. As shown in FIG. 2A, in some embodiments, the first analyzer controller 14a (and/or one or more of the plurality of analyzer controllers 14b-14n, as explained herein) may also be configured to output one or more output signals 38a indicative of the multi-component material properties. The output signal(s) 38a may be used to at least partially control a manufacturing process, for example, as described with respect to FIGS. 2C and 6A (e.g., output signals 38a through 38n). Although the output signals 38a through 38n are shown as individually being communicated to the process controller(s) 64 independently of one another, in some examples, two or more of the output signals 38a through 38n may be combined prior to being communicated to the process controller(s) 64. For example, two or more (e.g., all) of the output signals 38a through 38n may be received at a single receiver, which in turn, communicates the two or more of the combined signals to the process controller(s) 64. In some examples, at least some of the output signal(s) 38a through 38n may be communicated to one or more output device(s) 72, either independently of communication to the process controller(s) 64 or via the process controller(s) 64, for example, following receipt of the output signals 38a through 38n by the process controller(s) 64. The output device(s) 72 may include display devices, such as, for example, a computer monitor and/or portable output devices, such as a laptop computer, a smartphone, a tablet computing device, etc., as will be understood by those skilled in the art. Such communication may be enabled by a communications link, such as a hard-wired and/or wireless communications link, for example, via one or more communications networks.

As referenced above, in some embodiments, the first analyzer controller 14a may be configured to use the first-state-portfolio sample spectra 25 of the standardized analyzer spectra portfolio 24 to calibrate or recalibrate one or more of the plurality of spectroscopic analyzers 12b-12n with the respective analyzer controllers 14a-14n. For example, as shown in FIGS. 2A, such change(s) 40 to the plurality of spectroscopic analyzers 12b-12n that might necessitate recalibration may include, but are not limited to, for example, maintenance performed on the plurality of spectroscopic analyzers 12b-12n, replacement of one or more components of the plurality of spectroscopic analyzers 12b-12n, cleaning of one or more components of the plurality of spectroscopic analyzers 12b-12n, re-orienting one or more components of the plurality of spectroscopic analyzers 12b-12n, a change in path length (e.g., relative to the path length for prior calibration), or preparing the plurality of spectroscopic analyzers 12b-12n for use, for example, prior to a first use and/or calibration (or recalibration) of the plurality of spectroscopic analyzers 12b-12n specific to the materials to which they are intended to analyze.

In some embodiments, as explained herein, using the respective portfolio sample-based correction(s) 45b-45n (see FIG. 2B) based at least in part on the standardized analyzer spectra portfolio 24 to calibrate or recalibrate the plurality of spectroscopic analyzers 12b-12n may result in the plurality of spectroscopic analyzers 12b-12n with the respective analyzer controllers 14b-14n outputting analyzed material spectra and/or predicting corresponding material properties in a manner substantially consistent with a plurality of material properties of the material outputted by the first spectroscopic analyzer 12a with the first analyzer controller 14a in the first state, for example, in a state prior to the change(s) 40 to the plurality of spectroscopic analyzers 12b-12n.

For example, as shown in FIG. 2A, in some embodiments, the plurality of analyzer controllers 14b-14n may be configured to analyze, via the respective spectroscopic analyzers 12b-12n, when in the second state, a selected plurality of portfolio sample(s) 23 to output second-state portfolio sample spectra 44 for the selected plurality of different second-state portfolio sample(s) 42. In some embodiments, the portfolio sample(s) 23 may be the first-state portfolio sample(s) 23 and/or the second-state portfolio sample(s) 42, for example, as described previously herein with respect to FIGS. 1A-1G. In some embodiments, each of the second-state portfolio sample spectra 44a-44n may be associated with a corresponding different portfolio sample 23. As shown in FIG. 2A, in some embodiments, as explained in more detail previously herein with respect to FIG. 1B, the portfolio sample(s) 23 may include a number of samples significantly lower than the number of samples of the plurality of multi-component samples 16. For example, in some embodiments, in order to calibrate or recalibrate the plurality of spectroscopic analyzers 12b-12n with the respective analyzer controllers 14b-14n after the change(s) 40 to achieve a desired level of accuracy and/or reproducibility, for example, an accuracy and/or reproducibility substantially equal to or better than the level of accuracy and/or reproducibility of the first spectroscopic analyzer 12a with the first analyzer controller 14a, in some embodiments, it may only be necessary to analyze as few as ten or fewer of the portfolio sample(s) 23, as explained in more detail herein.

As shown in FIG. 2A, in some embodiments, because it may be necessary to only analyze substantially fewer portfolio sample(s) 23 to achieve results substantially consistent with the results achieved prior to the change(s) 40, a second-state time period $T_2$ during which the portfolio sample(s) 23 or the portfolio sample(s) 42 (see FIGS. 1A-1G) are analyzed may be significantly less than the first-state time period $T_1$ during which the multi-component samples 16 are analyzed for the output (e.g., the development) of spectral model(s) 20 and analyzer calibration 22. For example, as noted above, in some embodiments, the first-state time period $T_1$ may exceed 100 hours, as compared with the second-state time period $T_2$, which may be less than 20 hours (e.g., less than 16 hours, less than 10 hours, less than 8 hours, less than 4 hours, or less than 2 hours) for each of the plurality of spectroscopic analyzers 12b-12n, for example, as described previously herein with respect to FIG. 1B.

Thus, in some embodiments, the plurality of spectroscopic analyzers 12b-12n with the respective analyzer controllers 14b-14n may be configured to be calibrated or recalibrated to achieve substantially the same accuracy and/or reproducibility of analysis as the first spectroscopic analyzer 12a with first analyzer controller 14a, while using significantly fewer samples to calibrate or recalibrate each of the plurality of spectroscopic analyzers 12b-12n with the respective analyzer controllers 14b-14n, as compared to the number of multi-component samples 16 used to calibrate or recalibrate the first spectroscopic analyzer 12a with the first analyzer controller 14a for the development of spectral model(s) 20 and analyzer calibration 22, thus requiring significantly less time for calibration or recalibration. In some embodiments, the calibrated or recalibrated plurality of spectroscopic analyzers 12b-12n and/or the plurality of analyzer controllers 14b-14n, calibrated or recalibrated in such a manner, may be capable of generating substantially the same spectra following calibration or recalibration as outputted by the first spectroscopic analyzer 12a with the first analyzer controller 14a, which may result in improved accuracy and/or reproducibility by the first spectroscopic analyzer 12a and each of the plurality of spectroscopic analyzers 12b-12n. Such accuracy and/or reproducibility may provide the ability to compare analysis results outputted by either the first spectroscopic analyzer 12a or the plurality of spectroscopic analyzers 12b-12n, which may result in the first spectroscopic analyzer 12a and the plurality of spectroscopic analyzers 12b-12n being relatively more useful, for example, when incorporated into a manufacturing process involving the processing of multi-component materials received from material sources, such as material sources 28 and 48 shown in FIG. 1A, for example, a petroleum refining-related process, a pharmaceutical manufacturing process, or other processes involving the processing of materials.

As shown in FIG. 2A, in some embodiments, each of the plurality of analyzer controllers 14b-14n also may be configured to compare one or more of the respective second-state portfolio sample spectra 44b-44n from the portfolio samples to the first-state portfolio sample spectra 25. Based at least in part on the comparison, the plurality of analyzer controllers 14b-14n further may be configured to determine for one or more of the respective second-state portfolio sample spectra 44b-44n, a variance 62 (e.g., respective variances 62b-62n) over a range of wavelengths, wavenumbers, and/or frequencies between the respective second-state portfolio sample spectra 44b-44n outputted by each of the respective spectroscopic analyzers 12b-12n and the first-state portfolio sample spectra 25 of the standardized analyzer spectra portfolio 24 outputted by the first spectroscopic analyzer 12a. For example, in some embodiments, the plurality of analyzer controllers 14b-14n may be configured to determine a difference in magnitude between each of the second-state portfolio sample spectra 44 and the first-state portfolio sample spectra 25 for each of a plurality of wavelengths, wavenumbers, and/or frequencies over one or more ranges of wavelengths, wavenumbers, and/or frequencies, respectively.

In some embodiments, each of the plurality of analyzer controllers 14b-14n may be configured to determine respective variances 62b-62n by determining a mean average variance, one or more ratios of variances at respective individual wavelengths, or a combination thereof, for a plurality of wavelengths, wavenumbers, and/or frequencies over a range of wavelengths, wavenumbers, and/or frequencies, respectively. In some embodiments, each of the plurality of analyzer controllers 14b-14n may be configured to determine a relationship for a plurality of wavelengths, wavenumbers, and/or frequencies over the range of wavelengths, wavenumbers, and/or frequencies, respectively, between the respective second-state portfolio sample spectra 44b-44n and the first-state portfolio sample spectra 25, and the relationship may include one or more of a ratio, an addition, a subtraction, a multiplication, a division, one or more derivatives, or an equation.

As shown in FIGS. 2A and 2B, in some embodiments, each of the plurality of analyzer controllers 14b-14n still further may be configured to reduce the respective variance 62b-62n (FIG. 2B) between the respective second-state portfolio sample spectra 44b-44n and the first-state portfolio sample spectra 25. For example, each of the plurality of analyzer controllers 14b-14n may be configured to use the respective analyzer portfolio sample-based correction(s) 45b-45n based at least in part on the previously outputted standardized analyzer spectra portfolio 24 to reduce the respective variances 62b-62n between the respective second-state portfolio sample spectra 44b-44n and the first-state portfolio sample spectra 25, so that each of the respective ones of the plurality of spectroscopic analyzers 12b-12n and/or the respective ones of the plurality of analyzer controllers 14b-14n is able to output, when in the second state following the change(s) 40 (e.g., during initial set-up or after maintenance), a plurality of signals indicative of a plurality of material properties of an analyzed multi-component material, such that the plurality of material properties of the multi-component material are substantially consistent with a plurality of material properties of the multi-component material that were, or would be, outputted by the first spectroscopic analyzer 12a with the first analyzer controller 14a in the first state. For example, as shown in FIG. 2B, the plurality of spectroscopic analyzers 12b-12n with the respective analyzer controllers 14b-14n may be configured to output respective portfolio sample-based correction(s) 45b-45n, which reduce or substantially eliminate the respective variance 62b-62n between the second-state portfolio sample spectra 44b-44n and the respective first-state portfolio sample spectra 25 (FIG. 2A), which, in turn, may reduce or substantially eliminate the respective variance between second-state multi-component material spectra 47 and first-state multicomponent spectra 18, for example, should the same sample be analyzed in both the first and second states.

As shown in FIG. 2B, in some embodiments, following the change(s) 40 to the plurality of spectroscopic analyzers 12b-12n and/or the plurality of analyzer controllers 14b-14n and the calibration or recalibration in the second state, the plurality of spectroscopic analyzers 12b-12n may be used to analyze a plurality of multi-component materials. For example, as shown in FIG. 2B, a manufacturing process may include a plurality of material sources for respective multi-component materials (e.g., fluids, such as gases and/or liquids) of the manufacturing process, and multi-component materials associated with the manufacturing process may be diverted for analysis by one or more of the plurality of spectroscopic analyzers 12b-12n with the respective analyzer controllers 14b-14n. In some embodiments, for example, as shown in FIG. 2B, the multi-component materials may be conditioned via material conditioning to output conditioned materials for analysis 52b-52n by the respective spectroscopic analyzers 12b-12n with the respective analyzer controllers 14b-14n. In some embodiments, material conditioning may include one or more of filtering particulates and/or fluid contaminants from the multi-component material, controlling the temperature of the multi-component material (e.g., reducing or increasing the temperature to be within a desired range of temperatures), or controlling the pressure of the multi-component material (e.g., reducing or increasing the pressure to be within a desired range of pressures). In some embodiments, the manufacturing processes, the material sources, the material conditioning, and/or the conditioned materials for analysis 52b-52n, may substantially correspond to the previously-discussed manufacturing process 26, material source(s) 28, material conditioning 30, and/or the conditioned material for analysis 52 (see, e.g., FIGS. 1A-1G). In some embodiments, the manufacturing processes, the material sources, the material conditioning, and/or the conditioned materials for analysis 52b-52n, may be substantially different than the manufacturing process 26, material source 28, material conditioning 30, and/or the conditioned material for analysis 32 previously discussed with respect to FIGS. 1A-1G.

In some embodiments, each of the plurality of spectroscopic analyzers 12b-12n with each of the respective analyzer controllers 14b-14n may be configured to analyze, when in the second state, the multi-component materials received from the respective material sources and output a material spectrum corresponding to the respective multi-component materials, for example, as described previously herein with respect to FIGS. 1A and 1B. As shown in FIG. 2B, the plurality of spectroscopic analyzers 12b-12n with the respective analyzer controllers 14b-14n also may be configured to use the second through $n^{th}$ material spectrum 47b-47n to output respective corrected material spectra 54b-54n, based at least in part on the standardized analyzer spectra portfolio 24, the respective portfolio sample-based correction(s) 45b'-45n', for each of the respective multi-component materials. In some embodiments, each of the corrected material spectra 54b-54n may include one or more of an absorption-corrected spectrum, a transmittance-corrected spectrum, a transflectance-corrected spectrum, a reflectance-corrected spectrum, or an intensity-corrected spectrum, for example, and/or a mathematical treatment of the material spectrum, such as, for example, a second derivative of the material spectrum. For example, based at least in part on the respective corrected material spectra 54b-54n, the respective analyzer controllers 14b-14n may be configured to output a plurality of signals indicative of a plurality of material properties of the respective multi-component materials, and the plurality of material properties may be substantially consistent with (e.g., substantially the same as) a plurality of material properties of the multi-component materials that would be outputted by the first spectroscopic analyzer 12a with the first analyzer controller 14a. Thus, in some such embodiments, the respective corrected material spectra 54b-54n may result in standardized spectra, such that the corrected material spectra 56b-56n have been standardized based at least in part on the standardized analyzer spectra portfolio 24, so that the respective corrected material spectra 56b-56n are the substantially the same material spectra that would be outputted by the first spectroscopic analyzer 12a with the first analyzer controller 14a.

In some embodiments, this may render it possible to directly compare the results of analysis by the plurality of spectroscopic analyzers 12b-12n with the respective analyzer controllers 14b-14n with results of analysis by the first spectroscopic analyzer 12a with the first analyzer controller 14a. In some embodiments, this may render it possible to directly compare the results of analysis by each of the plurality of spectroscopic analyzers 12b-12n with each of the respective analyzer controllers 14b-14n with one another. In addition, as noted above, in some embodiments, using the portfolio sample-based correction(s) 45b-45n to calibrate or recalibrate of the plurality of spectroscopic analyzers 12b-12n with the respective analyzer controllers 14b-14n to achieve the standardization may require the analysis of significantly fewer samples (e.g., the second-state portfolio samples 44) as compared to the original calibration of the first spectroscopic analyzer 12a with first analyzer controller 14a during the first state. This may also significantly reduce the time required to calibrate or recalibrate each of the plurality of spectroscopic analyzers 12b-12n with each of the respective analyzer controllers 14b-14n.

Upon analysis of the multi-component materials from the material source(s), which may be feed(s) to one or more processing units and/or an output(s) from one or more processing units, the plurality of spectroscopic analyzers 12b-12n with the respective analyzer controllers 14b-14n may establish a plurality of corrected material spectra 56b-56n and, based at least in part on the corrected material spectra 56b-56n, predict a plurality of material properties associated with the multi-component materials. In some embodiments, the corrected material spectra 56b-56n and the associated predicted or determined material properties may be stored in a database as respective predicted (or determined) material data 58b-58n. It is contemplated that additional material data associated with the multi-component materials analyzed may also be included in the database to supplement the predicted or determined material properties. For example, the database may define a library including material data and/or including correlations between the plurality of material spectra and the plurality of different material properties of the corresponding materials.

Figure 2C:
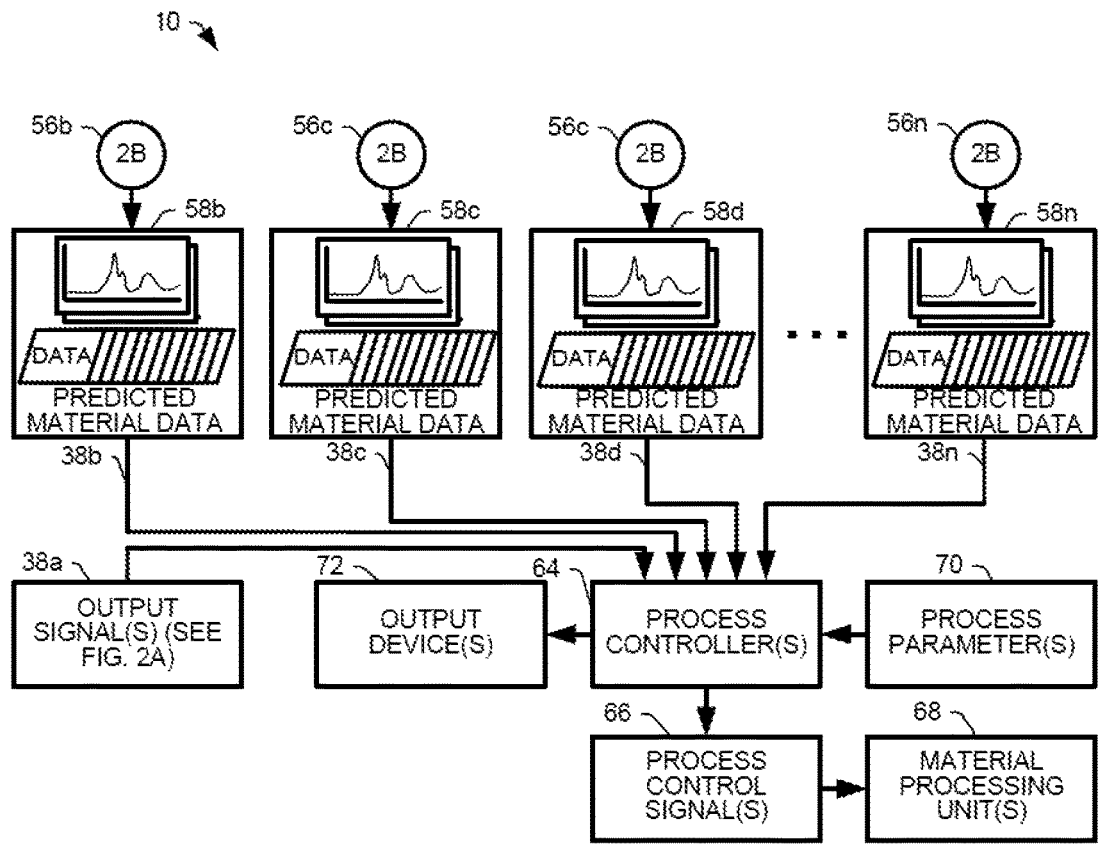
FIG. 2C is a continuation of the block diagrams shown in FIGS. 2A and 2B showing respective corrected material spectra output by the plurality of standardized spectroscopic analyzers used to output predicted (or determined) material data for the materials for use in an example process, according to embodiments of the disclosure.

As shown in FIG. 2C, in some embodiments, the plurality of analyzer controllers 14b-14n may also be configured to output one or more output signals 38b-38n indicative of the respective multi-component material properties. The output signal(s) 38a-38n may be used to at least partially control a manufacturing process. For example, as shown in FIG. 2C, the output signal(s) 38a-38n may be communicated to one or more process controllers 64 configured, based at least in part on the output signal(s) 38a-38n, to output one or more process control signals 66 for at least partially controlling operation of one or more material processing unit(s) 68 configured to process a multi-component material. In some embodiments, the process controller(s) 64 also may be configured to receive one or more process parameters 70 and based at least partially on the output signal(s) 38a-38n and/or the process parameter(s) 70, output the one or more process control signal(s) 66 to at least partially control operation of the one or more material processing unit(s) 68, for example, as described herein with respect to FIG. 6A. In some examples, at least some of the output signal(s) 38a-38n may be communicated to one or more output devices 72, such as, for example, printers, display devices, such as a computer monitor and/or portable output devices, such as a laptop computer, a smartphone, a tablet computing device, a printer, etc., as will be understood by those skilled in the art. Such communication may be enabled by one or more communications links, such as a hard-wired and/or wireless communications link, for example, via one or more communication networks.

In some embodiments, as explained herein, using the portfolio sample-based correction(s) 45b-45n to calibrate or recalibrate the plurality of spectroscopic analyzers 12b-12n may result in the plurality of spectroscopic analyzers 12b-12n with the respective analyzer controllers 14b-14n generating analyzed material spectra and/or predicting corresponding material properties in a manner substantially consistent with a plurality of material properties outputted by the first spectroscopic analyzer 12a with the first analyzer controller 14a.

Although not shown in FIGS. 2A and 2B, similar to FIGS. 1D-1G, in some embodiments, the plurality of analyzer controllers 14b-14n, based at least in part on the respective portfolio sample-based correction(s) 45b-45n, may be configured to output one or more gain signals for controlling one or more analyzer sources, analyzer detectors, and/or detector responses, such that the plurality of spectroscopic analyzers 12b-12n with the respective analyzer controllers 14b-14n, when analyzing a multi-component material, output a corrected material spectrum or spectra that are standardized according to the standardized analyzer spectra portfolio 24. Thus, in some embodiments, rather than generating a material spectrum when analyzing a multi-component material, and thereafter correcting the material spectrum based at least in part on the variance and the portfolio sample-based correction(s) 45 developed to reduce the variance to output a corrected material spectrum, the plurality of spectroscopic analyzers 12a-12n with the respective analyzer controllers 14b-14n may be configured to output a respective corrected material spectrum 54b-54n by adjusting the detector gain, for example, without prior generation of a material spectrum, which is thereafter corrected. Rather, in some embodiments, based at least in part on the respective variance(s) 62b through 62n, the plurality of spectroscopic analyzers 12b-12n with the plurality of analyzer controllers 14b-14n may be configured to adjust the gain associated with the respective analyzer sources, detectors, and/or detector responses, so that the plurality of spectroscopic analyzers 12b-12n with the respective analyzer controllers 14b-14n output corrected material spectra 56*b*-56*n* that reduces or substantially eliminates the respective variance(s) 62*b* through 62*n*.

Figure 3:
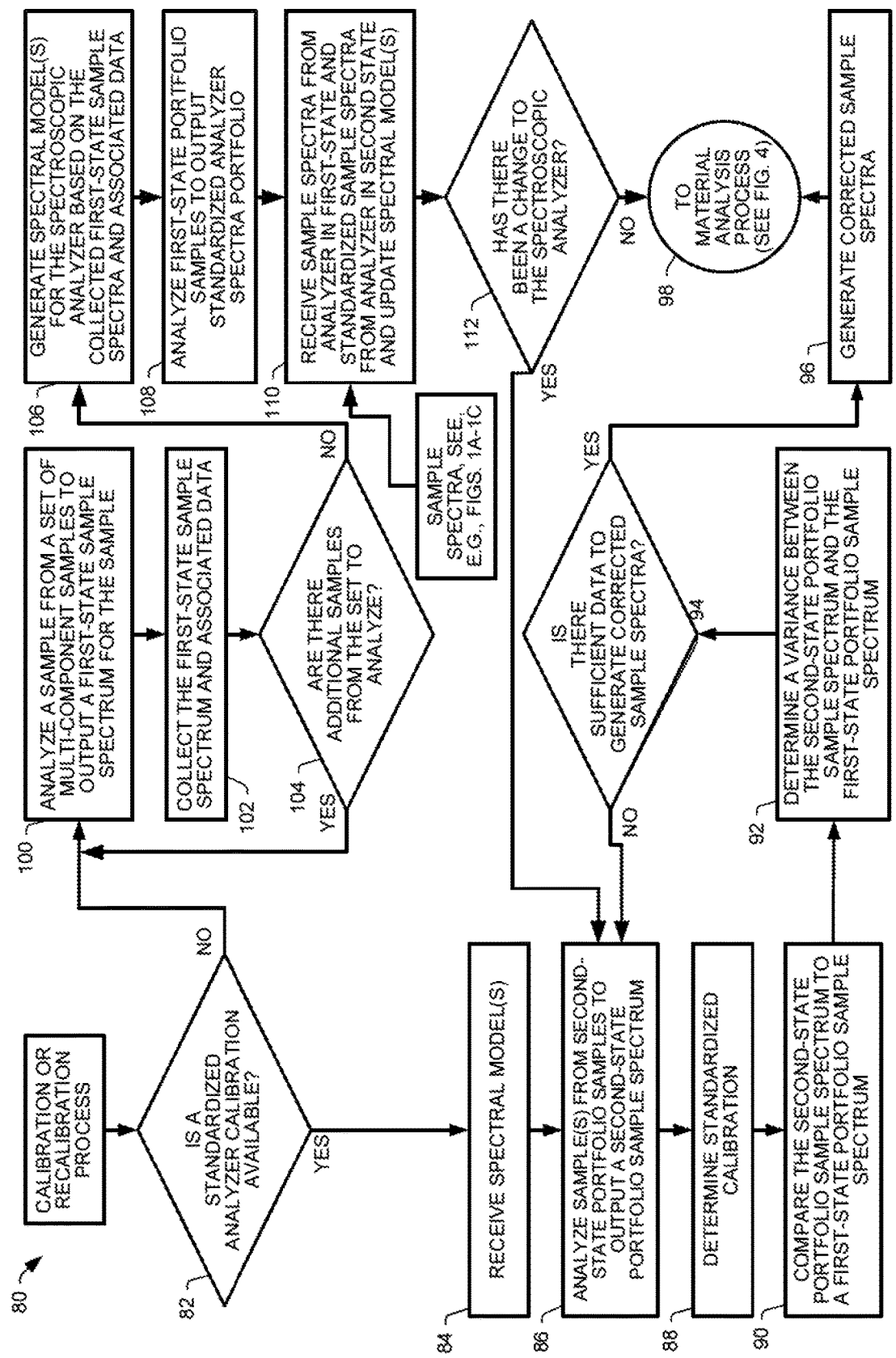
FIG. 3 is a process flow diagram illustrating an example calibration and/or recalibration process for standardizing spectroscopic analyzers, according to embodiments of the disclosure.
Figure 4:
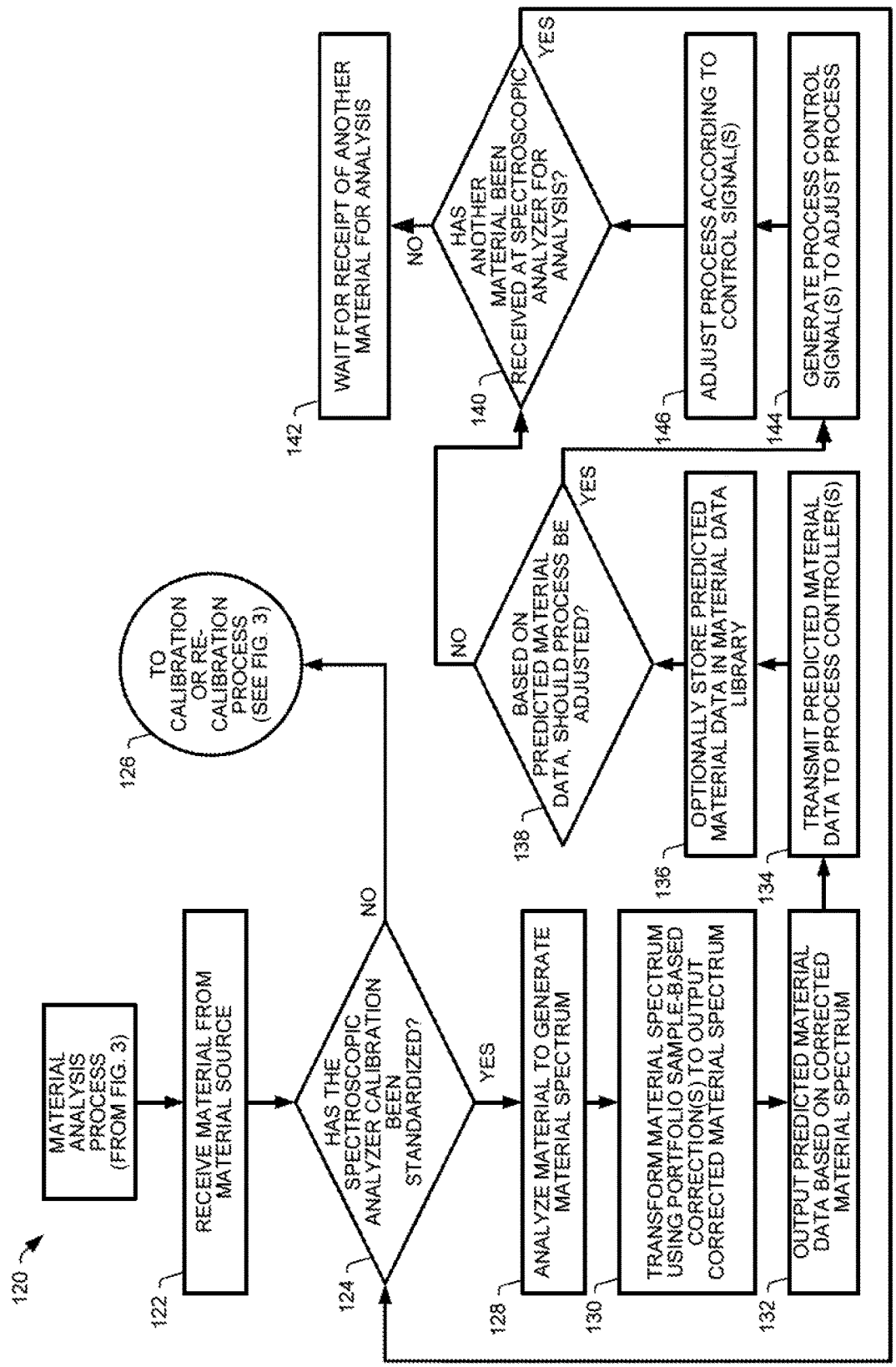
FIG. 4 is a process flow diagram illustrating an example material analysis process, according to embodiments of the disclosure.
Figure 5:
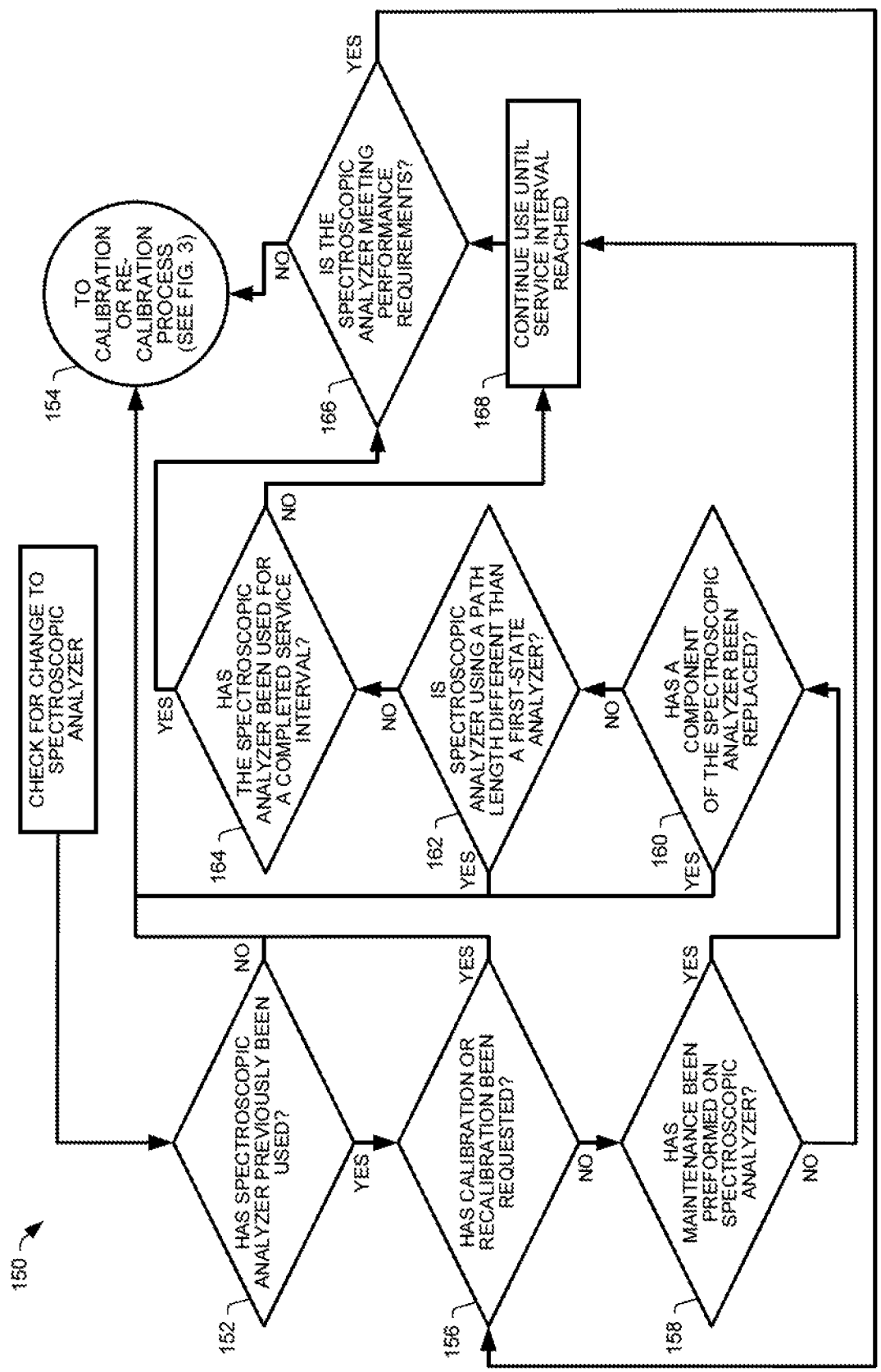
FIG. 5 is a process flow diagram illustrating an example process for checking for a change in a spectroscopic analyzer to determine whether to calibrate or recalibrate the spectroscopic analyzer, according to embodiments of the disclosure.

FIGS. 3-5 are process flow diagrams illustrating an example processes for standardizing spectroscopic analyzers according to embodiments of the disclosure, analyzing multi-component materials using standardized spectroscopic analyzers, and checking for changes to a spectroscopic analyzer that would result in a need to calibrate or recalibrate a spectroscopic analyzer according to embodiments of the disclosure, illustrated as a collection of blocks in a logical flow graph, which represent a sequence of operations. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 3 depicts a flow diagram of an example calibration and/or recalibration process 80 according to embodiments of the disclosure. For example, the example process 80 may be used to determine and use standardized analyzer spectral responses for calibration of a spectroscopic analyzer when a spectroscopic analyzer changes from a first state to a second state, the second state being defined as a period of time after a change to the spectroscopic analyzer causing a need to calibrate or recalibrate the spectroscopic analyzer, for example, as previously described herein.

The example process 80, at 82, may include determining whether a standardized calibration is available to be used to standardize spectral responses of a spectroscopic analyzer. For example, a spectroscopic analyzer may have undergone a change, so that it is in the second state and needs to be calibrated, for example, as described previously herein.

If, at 82, it is determined that a standardized calibration is available, the example process 80 may include, at 84, receiving spectral models for multi-component analysis, as described previously herein.

The example process 80, at 86, also may include analyzing one or more samples from a set of second-state portfolio samples to output a second-state portfolio sample spectrum, as described previously herein.

At 88, the example process 80 may include determining the standardized calibration based at least in part on the spectral models and/or the second-state portfolio sample spectra, for example, as previously described herein.

At 90, the example process 80 further may include comparing the second-state portfolio sample spectrum to a first-state portfolio sample spectrum, as described previously herein. In some examples, the first-state portfolio sample spectrum may have been previously outputted by another spectroscopic analyzer as a result of analyzing a set of first-state portfolio samples, as described previously herein.

At 92, the example process 80 also may include determining a variance between the second-state portfolio sample spectrum and a corresponding first-state portfolio sample spectrum. In some embodiments, the variance may be the difference in amplitude of the corresponding spectra at one or more wavelengths, wavenumbers, or frequencies, or at one or more ranges of wavelengths, wavenumbers, or frequencies. This may be performed as described previously herein.

The example process 80, at 94, may further include determining whether there is sufficient data to output portfolio sample-based corrections, as described previously herein. If not, the example process 80 may include returning to 86 and analyzing a sample from the set of second-state portfolio samples to output an additional second-state portfolio sample spectrum. Thereafter, the example process 80 may repeat 90 and 92, and at 94, determine again whether there is sufficient data to output portfolio sample-based corrections, for example, as described previously herein. This set of steps (e.g., 86-94) may be repeated until it is determined at 94 that there is sufficient data to output portfolio sample-based corrections.

If at 94, it is determined that there is sufficient data, at 96, the example process 80 may further include generating the portfolio sample-based corrections. Following 96, the example process 80 may proceed to 98, and the spectroscopic analyzer may be used in a material analysis process, for example, as shown in FIG. 4.

If, at 82, it is determined that a standardized calibration is not available, at 100, the example process 80 may include analyzing, with the spectroscopic analyzer that needs to be calibrated or recalibrated, a sample from a set of multi-component samples to output a first-state sample spectrum for the sample. This may be performed, as described previously herein.

The example process 80, at 102, may include collecting the first-state spectrum and associated data. Thereafter, the example, process 80 may include, at 104, determining whether there are additional samples from the set of multi-component samples to analyze. If so, the example process 80 may return to 100 to analyze more samples of the set of multi-component samples. If, or when, at 104, it is determined that there are no additional samples from the set of multi-component samples to analyze, the example process 80 may include, at 106, generating spectral models for the spectroscopic analyzer based on the collected first-state sample spectra and associated data.

At 108, the example process 80 may include analyzing via the spectroscopic analyzer first-state portfolio samples to output first-state portfolio sample spectra and collecting the first-state portfolio sample spectra to build a standardized analyzer spectra portfolio, for example, as previously described herein.

At 110, the example process 80 also may include receiving analyzer spectra in the first state and/or standardized analyzer spectra in the second state, and updating the spectral models based at least in part on the analyzer spectra in the first state and/or standardized analyzer spectra in the second state, for example, as described previously herein.

At 112, the example process 80 further may include determining whether there has been a change to the spectroscopic analyzer that would result in the need to calibrate or recalibrate the spectroscopic analyzer following generation of the spectral models. If, at 112, it is determined that no such change has occurred, the example calibration or recalibration process 80 may proceed to 98, and the spectroscopic analyzer may be used in a material analysis process, for example, as shown in FIG. 4.

If, at 112, however, it is determined that a change has occurred to the spectroscopic analyzer, the example process 80 may include proceeding to 86 and performing 86-96 and proceeding to 98, for example, as described above, so the spectroscopic analyzer may be used in a material analysis process, for example, as shown in FIG. 4.

FIG. 4 is a process flow diagram illustrating an example material analysis process 120 according to embodiments of the disclosure. At 122, the example process 120 may include receiving material from a material source. In some embodiments, the material may be a multi-component material. The material source, in some embodiments may be a feed to a process and/or an output from a process involving the multi-component material, for example, as previously described herein.

At 124, the example process 120 may include determining whether the spectroscopic analyzer being used for the analysis has a standardized calibration. If not, the example process 120 may proceed to 126, so the spectroscopic analyzer can be calibrated or recalibrated, for example, according to the example process 80 shown in FIG. 3. If, at 124, it is determined that the spectroscopic analyzer calibration has been standardized, the example process, at 128, may include analyzing the material using the spectroscopic analyzer to output a material spectrum, for example, as described previously herein.

At 130, the example process 120 may further include transforming the material spectrum using the portfolio sample-based correction(s) to output a corrected material spectrum for the analyzed material, for example, as described previously herein.

The example process 120, at 132, may further include outputting predicted (or determined) material data based at least in part on the corrected material spectrum and corresponding the spectral model(s) used, for example, as described previously herein.

The example process 120, at 134, may also include transmitting the predicted (or determined) material data to one or more process controllers. For example, a portion of the multi-component material may be supplied from a material source that is part of a manufacturing process including a material processing unit that receives the multi-component material as a feed and/or outputs the multi-component material. In some examples, a portion of the multi-component material may be supplied by or to a laboratory for analysis, for example, as described herein.

At 136, the example process 120 may also include optionally storing the predicted (or determined) material data in a material data library, which may include the corrected material spectrum, the predicted or determined material data, and in some examples, additional information about the analyzed material.

For example, the example process 120 shown in FIG. 4, at 138, may determine whether a process, either using the material as a feed or outputting the material, should be adjusted based at least in part on the predicted or determined material data outputted by the spectroscopic analyzer.

If, at 138, it is determined that the process should not be adjusted, the example process 120 proceeds to 140, which may include determining whether another material has been received by the spectroscopic analyzer for analysis. If not, at 142 the example process 120 may include waiting for receipt at the spectroscopic analyzer of an additional material for analysis. In some embodiments, the wait time may be substantially zero, for example, when analyzing material involved with a continuous or substantially continuous process, such as a hydrocarbon refining process. In some embodiments, the wait time may be significant, for example, in a laboratory setting or other setting in which the analysis may be conducted intermittently. If, at 140, it is determined that the spectroscopic analyzer has received another material for analyzing, the example process may return to 124, so the example process 120 may determine whether the spectroscopic analyzer being used for the analysis has a standardized calibration.

If, at 138, it is determined that the process should be adjusted, the example process 120 may include, at 144, generating one or more process control signals to adjust the process, for example, as described previously herein. At 146, the example process 120 may further include adjusting the process according to the one or more control signals outputted at 144. Thereafter, the example process 120 may proceed to 140 and continue as described above.

FIG. 5 is a process flow diagram illustrating an example process 150 for checking for a change in a spectroscopic analyzer to determine whether to calibrate or recalibrate the spectroscopic analyzer according to embodiments of the disclosure. For example, the example process 150 may be used to determine whether a spectroscopic analyzer is in the second state and needs to be calibrated or recalibrated, for example, when the spectroscopic analyzer has changed from a first state to a second state, the second state being defined as a period of time after a change to the spectroscopic analyzer causing a need to calibrate or recalibrate the spectroscopic analyzer, for example, as previously described herein.

The example process 150, at 152, may include determining whether the spectroscopic analyzer has been previously used. If not, this may be an indication that the spectroscopic analyzer has not been calibrated or recalibrated with a standardized calibration. Thus, if at 152, it is determined that the spectroscopic analyzer has not been used, the example process 150 may include proceeding to 154, and the spectroscopic analyzer may be calibrated or recalibrated according to the example process 80 for determining and using a standardized calibration to calibrate or recalibrate the spectroscopic analyzer, for example, as shown in FIG. 3.

If, at 152, it is determined that the spectroscopic analyzer has been used, at 156, the example process 150 may include determining whether a calibration has been requested. If so, the example process 150 may include proceeding to 154, and the spectroscopic analyzer may be calibrated or recalibrated according to the example process 80 for determining and using a standardized calibration to calibrate or recalibrate the spectroscopic analyzer, for example, as shown in FIG. 3.

If, at 156, it is determined that calibration or recalibration has not been requested, the example process 150, at 158, may include determining whether maintenance has been performed on the spectroscopic analyzer, which might indicate a change to the spectroscopic analyzer from the first state to the second state, as previously described herein. If, at 158, it is determined that maintenance has been performed, the example process 150 may include proceeding to 160.

At 160, the example process 150 may include determining whether a component of the spectroscopic analyzer has been replaced, such as a lamp, laser, detector, or grating. In some examples, such a replacement may be performed as a part of maintenance, although maintenance may include other actions not including component replacement. If, at 160, it is determined that a component has been replaced, this may be an indication that the spectroscopic analyzer has undergone a change consistent with the spectroscopic analyzer transitioning from the first state to the second state, and thus needs to be recalibrated. In such instances, the example process 150 may include proceeding to 154, and the spectroscopic analyzer may be calibrated or recalibrated according to the example process 80 for determining and using a standardized calibration to calibrate or recalibrate the spectroscopic analyzer, for example, as shown in FIG. 3.

If, at 160, it is determined that a component of the spectroscopic analyzer has not been replaced, at 162, the example process 150 may include determining whether the spectroscopic analyzer is using a path length different than a first-state spectroscopic analyzer. If so, it may be an indication that the spectroscopic analyzer needs to be calibrated or recalibrated, such that the difference in path length is accounted for in its calibration, and the example process 150 may include proceeding to 154, so the spectroscopic analyzer may be calibrated or recalibrated according to the example process 80 for determining and using a standardized calibration to calibrate or recalibrate the spectroscopic analyzer, for example, as shown in FIG. 3.

If, at 162, it is determined that the path length is the same as a first-state spectroscopic analyzer, at 164, the example process 150 may include determining whether the spectroscopic analyzer has been used for a service interval, for example, whether the spectroscopic analyzer has performed a predetermined number of analyses or been in operation for a predetermined amount of time. If so, the example process 150 may include proceeding to 166, at which it is determined whether the spectroscopic analyzer is meeting performance requirements. If so, the example process 150 may return to at 156 and repeat the process 150, beginning with determining whether a calibration of the spectroscopic analyzer has been requested.

If, at 166, it is determined that the spectroscopic analyzer is not meeting performance requirements, this may be an indication the spectroscopic analyzer may need to be serviced and/or recalibrated, the example process 150 may include proceeding to 154, and the spectroscopic analyzer may be calibrated or recalibrated according to the example process 80 for determining and using a standardized calibration to calibrate or recalibrate the spectroscopic analyzer, for example, as shown in FIG. 3.

If, at 164, it is determined that the spectroscopic analyzer has not been used for a completed or full service interval, at 168, the example process 150 may include continuing to use the spectroscopic analyzer until the service interval is reached and thereafter, at 166, determining whether the spectroscopic analyzer is meeting performance requirements, for example, as described above with respect to 166. In the above example manner, it may be determined whether the spectroscopic analyzer is in the second state, thus needing to be calibrated or recalibrated with a standardized analyzer calibration.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

Figure 6A:
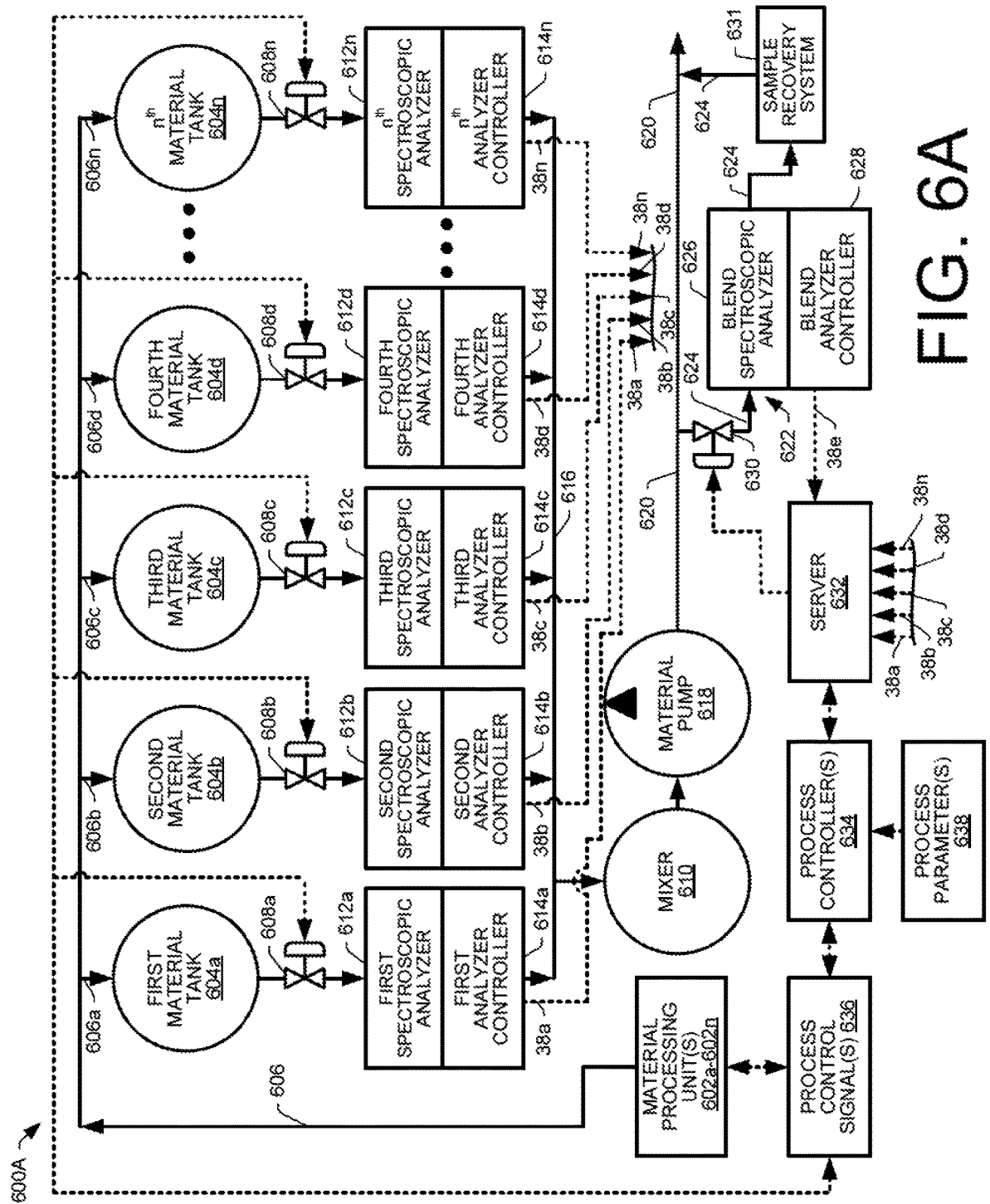
FIG. 6A is a schematic diagram of an example material processing arrangement using a plurality of example spectroscopic analyzers and respective analyzer controllers to prescriptively control the material processing arrangement, according to embodiments of the disclosure.

FIG. 6A is a schematic diagram of an example material processing arrangement 600A using a plurality of example spectroscopic analyzers and respective analyzer controllers to prescriptively control the material processing arrangement 600A according to embodiments of the disclosure. The example processing arrangement 600A shown in FIG. 6A may be used in relation to any process in which a plurality of multi-component materials is processed in separate processing units to achieve a blended multi-component resulting material. For example, the example material processing arrangement 600A shown in FIG. 6A may be used in a petroleum refining-related process, such as a gasoline blending process. Other processes are contemplated.

As shown FIG. 6A, in some embodiments, the plurality of spectroscopic analyzers (e.g., 612a through 612n) may be used to analyze the multi-component materials resulting from respective material processes, prior to blending and/or after blending (e.g., at blend spectroscopic analyzer 626), and the results of the analyses may be used prescriptively as an input to control one or more of the processing units performing each of the material processes, as well as an input to control the respective amounts (e.g., ratios) of each of the multi-component materials resulting from the respective material processes that are supplied to the blending process. In some embodiments, the spectroscopic analyzers may perform one or more of the respective analyses real-time, as the material processes are performed, to provide relatively more responsive control of the material processes, potentially resulting in increased efficiencies and blended multi-component materials having a material content closer to desired specifications.

As shown in in FIG. 6A, the example processing arrangement 600A may include one or more material processing unit(s) 602a through 602n, which may be supplied with multi-component material feeds of multi-component materials for processing by one or more of the respective material processing unit(s) 602a through 602n. In some embodiments, the material feeds for analysis may be supplied from a source remote from the manufacturing or processing facility at which the spectroscopic analyzers and controllers are present. The material processing unit(s) 602a through 602n may be in flow communication with respect to respective material tanks 604a through 604n via a plurality of respective conduits 606a through 606n for receiving processed multi-components materials resulting from material processing at each of the one or more material processing unit(s) 602a through 602n. Although only one conduit 606 is shown extending from the one or more material processing unit(s) 602a through 602n for clarity, conduit 606 may represent one or more conduits extending from respective material processing unit(s) 602a through 602n. As shown in FIG. 6A, the example processing arrangement 600A includes a first material tank 604a, a second material tank 604b, a third material tank 604c, and a fourth material tank 604d through an $n^{th}$ material tank 604n for receiving the processed materials from the respective processing unit(s) 602a through 602n via the conduits 606a through 606n.

In some embodiments, the processing arrangement 600A may include a valve 608a through 608n associated with respective processing tanks 604a through 604n that may be controlled independently of one another to selectively open to supply the processed multi-component material contained in the respective material tanks 604a through 604n to a mixer 610 (e.g., a blender) for blending with other processed multi-component materials supplied from the other material tanks of the plurality of material tanks 604a through 604n. For example, a first valve 608a may be associated with the first material tank 604a, a second valve 608b may be associated with the second material tank 604b, a third valve 608c may be associated with the third material tank 604c, a fourth valve 608d may be associated with the fourth material tank 604d, and an $n^{th}$ valve 608n may be associated with the $n^{th}$ material tank 604n. The valves may be manually controlled and/or automatically controlled, for example, via one or more control signals. In some embodiments, each of the valves 608a through 608n may be opened and closed via a valve actuator as will be understood by those skilled in the art, and as explained below.

As shown in FIG. 6A, in some embodiments, a spectroscopic analyzer 612a through 612n with a respective analyzer controller 614a through 614n may be provided at an output of each of the valves 608a through 608n to analyze a sample of the processed multi-component material from each of the respective material tanks 604a through 604n, for example, prior to blending at the mixer 610. As discussed previously herein, although the plurality of analyzer controllers 614a through 614n for clarity are shown as being separate analyzer controllers, in some embodiments, a single analyzer controller may function as a collective analyzer controller for one or more of the spectroscopic analyzers 612a through 612n. In addition, although analyzer controllers 614a through 614n are shown connected to the respective spectroscopic analyzers 612a through 612n, the analyzer controllers 614a through 614n may be located remotely from the respective spectroscopic analyzers 612a through 612n. In some embodiments, the spectroscopic analyzers 612a through 612n and analyzer controllers 614a through 614n may be in communication with one another via one or more hard-wired and/or wireless communications links according to known protocols, as will be understood by those skilled in the art.

As shown in FIG. 6A, the example processing arrangement 600A includes a first spectroscopic analyzer 612a and first analyzer controller 614a, a second spectroscopic analyzer 612b and second analyzer controller 614b, a third spectroscopic analyzer 612c and third analyzer controller 614c, a fourth spectroscopic analyzer 612d and fourth analyzer controller 614d, and an $n^{th}$ spectroscopic analyzer 612n and an $n^{th}$ analyzer controller 614n. The respective analyzer controllers 614a-614n may be configured to output respective output signals 38a-38n, for example, as previously described herein. In some embodiments, although not shown in FIG. 6A, samples of each of the processed multi-component materials from the respective material tanks 604a through 604n for analysis by the spectroscopic analyzers 612a through 612n may first be conditioned prior to analysis, for example, as previously discussed herein. In some embodiments, the materials may not be conditioned prior to being received at the spectroscopic analyzers 612a through 612n. This may improve the accuracy of the results of the analysis, as will be understood by those skilled in the art. In some embodiments, a material conditioning circuit may be provided, for example, between the valves 608a through 608n and the spectroscopic analyzers 612a through 612n, to condition samples of the processed multi-component materials prior to analysis by the spectroscopic analyzers 612a through 612n to improve accuracy of the analysis.

As shown in in FIG. 6A, a manifold 616 may be provided downstream of the spectroscopic analyzers 612a through 612n for conveying a supply of each of the processed multi-component materials from the respective material tanks 604a through 604n to the mixer 610, which may be configured to mix or blend each of the processed multi-component materials according to specifications of a blending process. Although only one conduit from the manifold 616 is shown extending from the respective spectroscopic analyzers 612a through 612n for clarity, the manifold 616 may include separate conduits extending from each of the respective spectroscopic analyzers 612a through 612n, for example, so that the materials from the respective materials tanks 604a through 604n remain separated until they reach the mixer 610. In some embodiments, the blended multi-component material may flow from the mixer 610 via a conduit 620 to additional processing units for downstream processing, to a finishing process, to storage tanks, to pipelines for transport, to marine vessels for transport, etc., for example, as will be understood by those skilled in the art. In some embodiments, a material pump 618 may be provided downstream from the mixer 610 to pump via the conduit 620 at least a portion of the blended multi-component material to additional processing units for downstream processing to a finishing process, to storage tanks, to pipelines for transport, to marine vessels for transport, etc., for example, as will be understood by those skilled in the art. In some embodiments, the material pump 618 may be provided to supply at least a portion of the blended multi-component material to a blended material analysis circuit 622, for example, as explained below.

As shown in FIG. 6A, the example processing arrangement 600A also may include the blended material analysis circuit 622 configured to facilitate analysis of the blended multi-component material downstream of the mixer 610. For example, an analysis conduit 624 may provide a flow path between the conduit 620, a blend spectroscopic analyzer 626 with an associated blend analyzer controller 628, and back to the conduit 620 via the analysis conduit 624. The blend analyzer controller 628 may be configured to communicate output signals 38e, for example, as described previously herein. A control valve 630 (manual and/or automatically actuated) may be provided in the analysis conduit 624 upstream of the blend spectroscopic analyzer 626 to selectively control flow to the blend spectroscopic analyzer 626. Some embodiments may not include a control valve 630. In some embodiments, a material conditioning circuit may be provided, for example, between the control valve 630 and the blend spectroscopic analyzer 626 to condition samples of the blended multi-component material prior to analysis by the blend spectroscopic analyzer 626 to improve accuracy of the analysis. Once a sample of the blended multi-component material has been analyzed by the blend spectroscopic analyzer 626, the sample may return to the conduit 620 via the analysis conduit 624, for example, to flow to additional processing units for downstream processing or to a finishing process. Some embodiments may include a sample recovery system 631 configured to facilitate return of any analyzed sample(s) to the conduit 620. For example, the sample recovery system 631 may include a reservoir configured to receive a portion of the analyzed sample(s) and/or a pump configured to pump a portion of the analyzed sample(s) back into the conduit 620. Other forms of sample recovery systems are contemplated.

In the example shown in FIG. 6A, each of the spectroscopic analyzers 612a through 612n, the analyzer controllers 614a through 614n, the blend spectroscopic analyzer 626, and/or the blend analyzer controller 628 may be in communication with a server 632, for example, via a hard-wired or wireless communications link according to known protocols, for example, such that the respective output signals 38a-38n (including 38e) may be communicated to the server 632. Although the output signals 38a through 38n are shown as individually being communicated to the server 632 independently of one another, in some examples, two or more of the output signals 38a through 38n may be combined prior to being communicated to the server 632. For example, two or more (e.g., all) of the output signals 38a through 38n may be received at a single receiver, which in turn, communicates the two or more of the combined signals to the server 632. The server 632 may be in communication with one or more process controllers 634, which may be configured to at least partially control the blending process, for example, by generating process control signals 636, which may be communicated to the one or more material processing units 602a through 602n to at least partially control the material processing units 602a through 602n for processing of the multi-component materials. In some embodiments, the process controller(s) 634 also may be configured to receive one or more process parameters 638 and based at least partially on the process control signal(s) 636 and/or the process parameter(s) 638, output one or more process control signal(s) 636 to at least partially control operation of the one or more material processing unit(s) 602a through 602n. As shown, in some embodiments, the process controller(s) 634 may be in communication with the valves 608a through 608n and/or the control valve 630 to selectively control dispensing of the processed multi-component materials from the respective material tanks 604a through 604n and/or to selectively control analysis of samples of the blended multi-component material.

In the example embodiment shown in FIG. 6A, the plurality of spectroscopic analyzers 612a through 612n may be used to analyze the multi-component materials resulting from respective material processes, prior to blending and/or after blending, and the results of the analyses may be used prescriptively as an input to control one or more of the material processing unit(s) 602a though 602n performing each of the material processes, as well as an input to control the respective amounts (e.g., ratios) of each of the multi-component materials resulting from the respective material processes that are supplied to the blending process. In some embodiments, the analysis may be conducted in a laboratory setting. In some embodiments, the spectroscopic analyzers 612a through 612n and/or 626 may perform one or more of the respective analyses real-time, as the material processes are performed, to provide relatively more responsive control of the material processes, potentially resulting in increased efficiencies and blended multi-component materials having a material content closer to desired specifications. In some embodiments, the spectroscopic analyzers 612a through 612n and/or the blend spectroscopic analyzer 626 may be calibrated according to the standardized calibration techniques described herein, which may improve the accuracy, reproducibility, and/or consistency of the analyses by the spectroscopic analyzers.

Figure 6B:
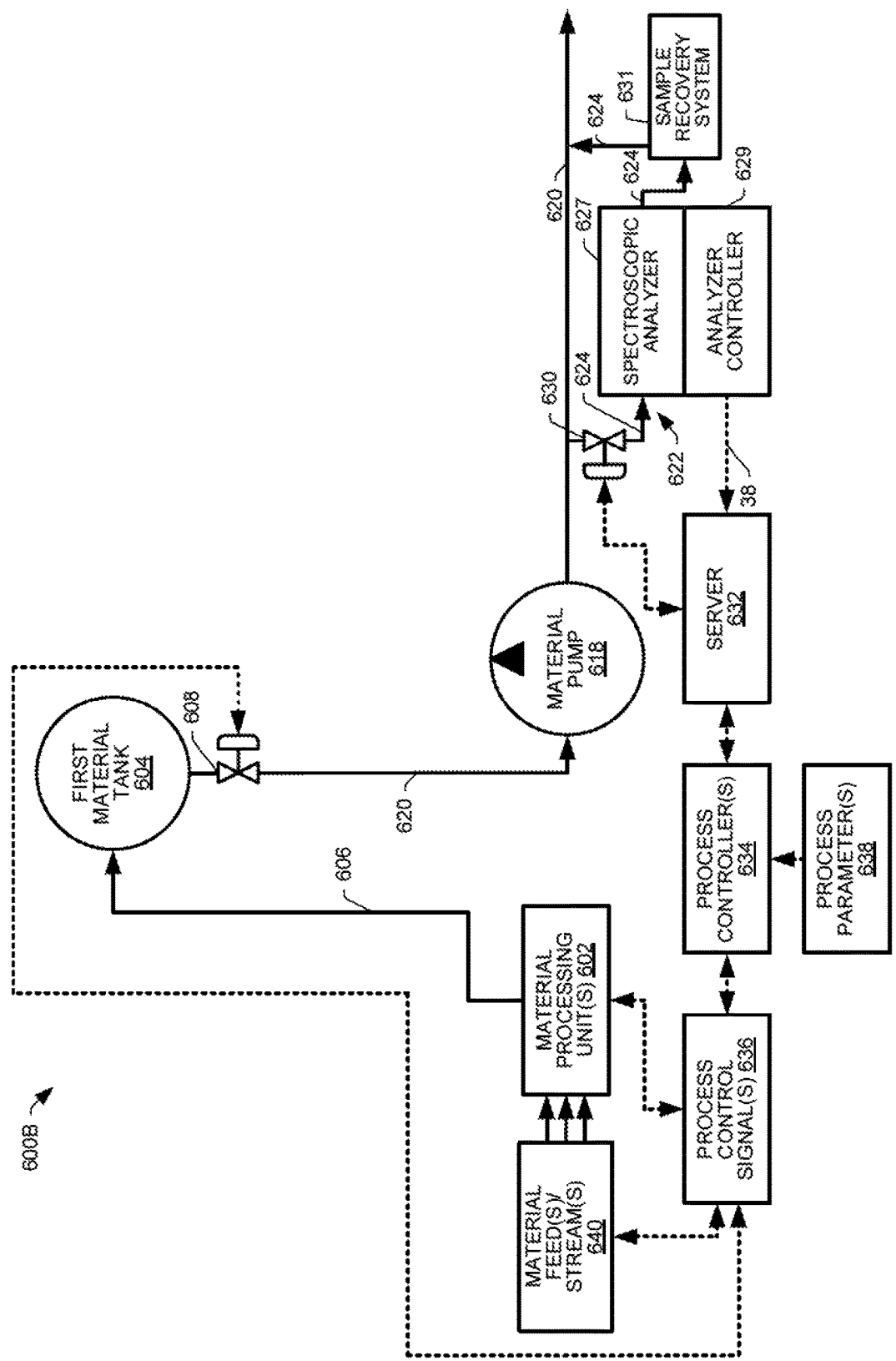
FIG. 6B is a schematic diagram of another example material processing arrangement using a plurality of example spectroscopic analyzers and respective analyzer controllers to prescriptively control the material processing arrangement, according to embodiments of the disclosure.

FIG. 6B is a schematic diagram of another example material processing arrangement 600B using an example spectroscopic analyzer 627 with an example analyzer controller 629 to prescriptively control the material processing arrangement 600B according to embodiments of the disclosure. Relative to the example arrangement 600A shown in FIG. 6A, the example arrangement 600B does not include a blending process, and thus, does not include a mixer or blender, and includes only a single material tank 604 that may be from a single or multiple material processing unit(s) 602, a spectroscopic analyzer 627 and a corresponding analyzer controller 629, for example, downstream relative to the material supply pump 618. Some embodiments may not include a control valve 630. In some embodiments, the one or more material processing unit(s) 602 may receive material from one or more material feeds and/or streams 640, for example, from one or more feed material processing units, and the one or more process control signal(s) 636 may be communicated to valve(s) associated with the one or more material feed(s)/stream(s) 640 to control the supply of the material to the material processing unit(s) 602, such as, for example, the ratio(s) of the material supplied by the one or more material feed(s)/stream(s) 640. In some embodiments, one or more of the material feed(s)/stream(s) 640 may be conveyed to the first material tank 604 without being received at the one or more material processing unit(s) 602. In some embodiments, one or more of the material processing unit(s) 602 may be upstream relative to the block 640 schematically depicted in FIG. 6B, and the one or more material feed(s)/stream(s) 640 may flow directly from the one or more upstream material processing unit(s) 602 to the first material tank 604. In some embodiments, the material supply pump 618 may be omitted. In other respects, the example processing arrangement 600B shown in FIG. 6B may be used to process and analyze multi-component materials in substantially the same way as the example arrangement 600A shown in FIG. 6A.

Test Results

Figure 7A:
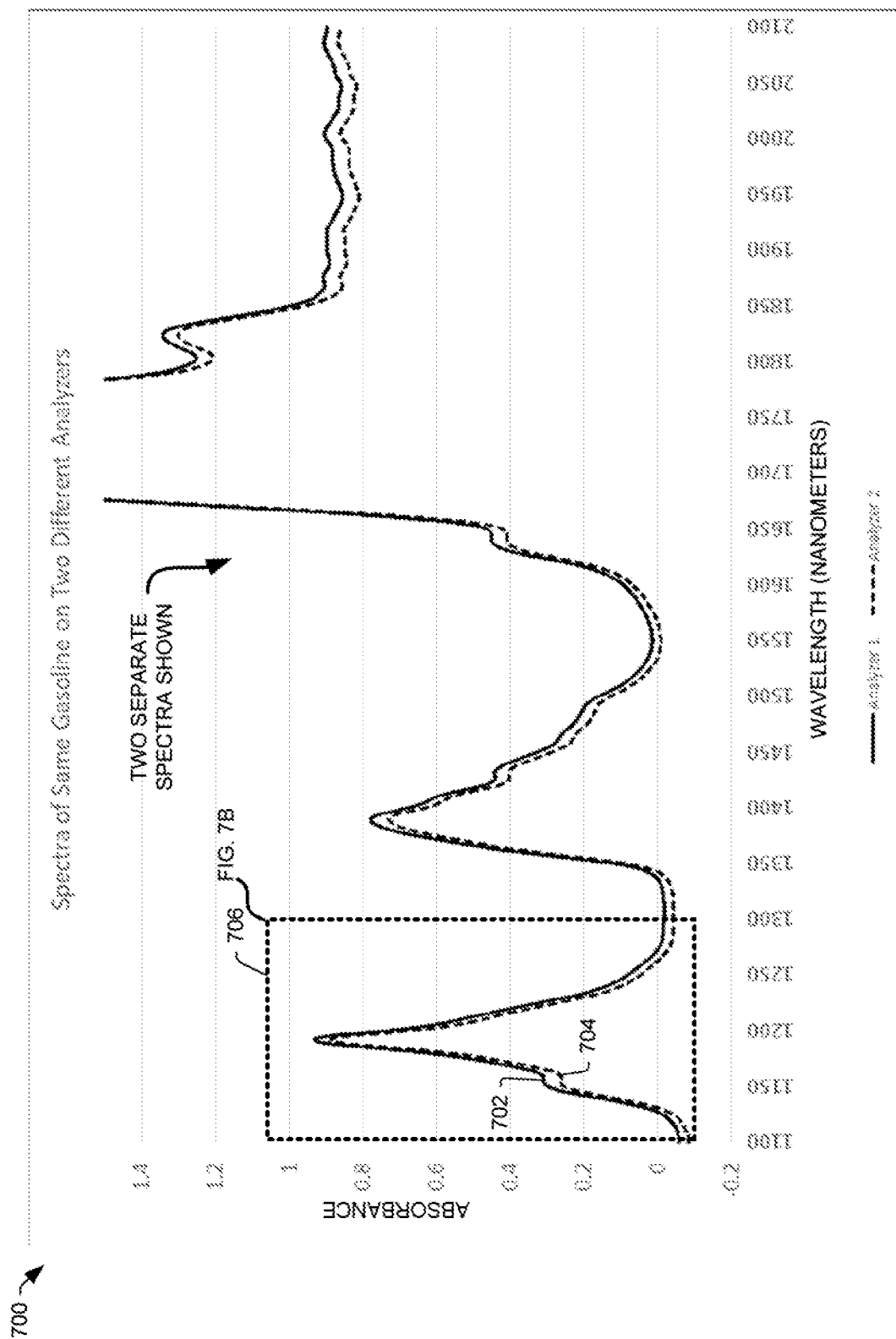
FIG. 7A is a graph illustrating an example first material spectrum outputted by a first spectroscopic analyzer of an example multi-component material and a second material spectrum outputted by a second spectroscopic analyzer of the same multi-component material overlaid onto the first material spectrum, according to embodiments of the disclosure.

FIG. 7A is a graph 700 illustrating an example first material spectrum 702 outputted by a first spectroscopic analyzer of an example multi-component material and a second material spectrum 704 outputted by a second spectroscopic analyzer of the same multi-component material overlaid onto the first material spectrum according to embodiments of the disclosure. The example graph 700 shows absorbance as a function of wavelength for each of the first and second material spectra 702 and 704. As shown in FIG. 7A, although the first spectroscopic analyzer and the second spectroscopic analyzer that outputted the first material spectrum 702 and the second material spectrum 704, respectively, have both been calibrated, and the example multi-component material, a gasoline blend, is the same for each spectrum, the first material spectrum 702 and the second material spectrum 704 are not substantially the same to the observed variance. The region 706 identified in FIG. 7A is shown in more detail in FIG. 7B to highlight differences between the first material spectrum 702 and the second material spectrum 704 in a region corresponding to wavelengths ranging from about 1100 to about 1300 nanometers.

Figure 7B:
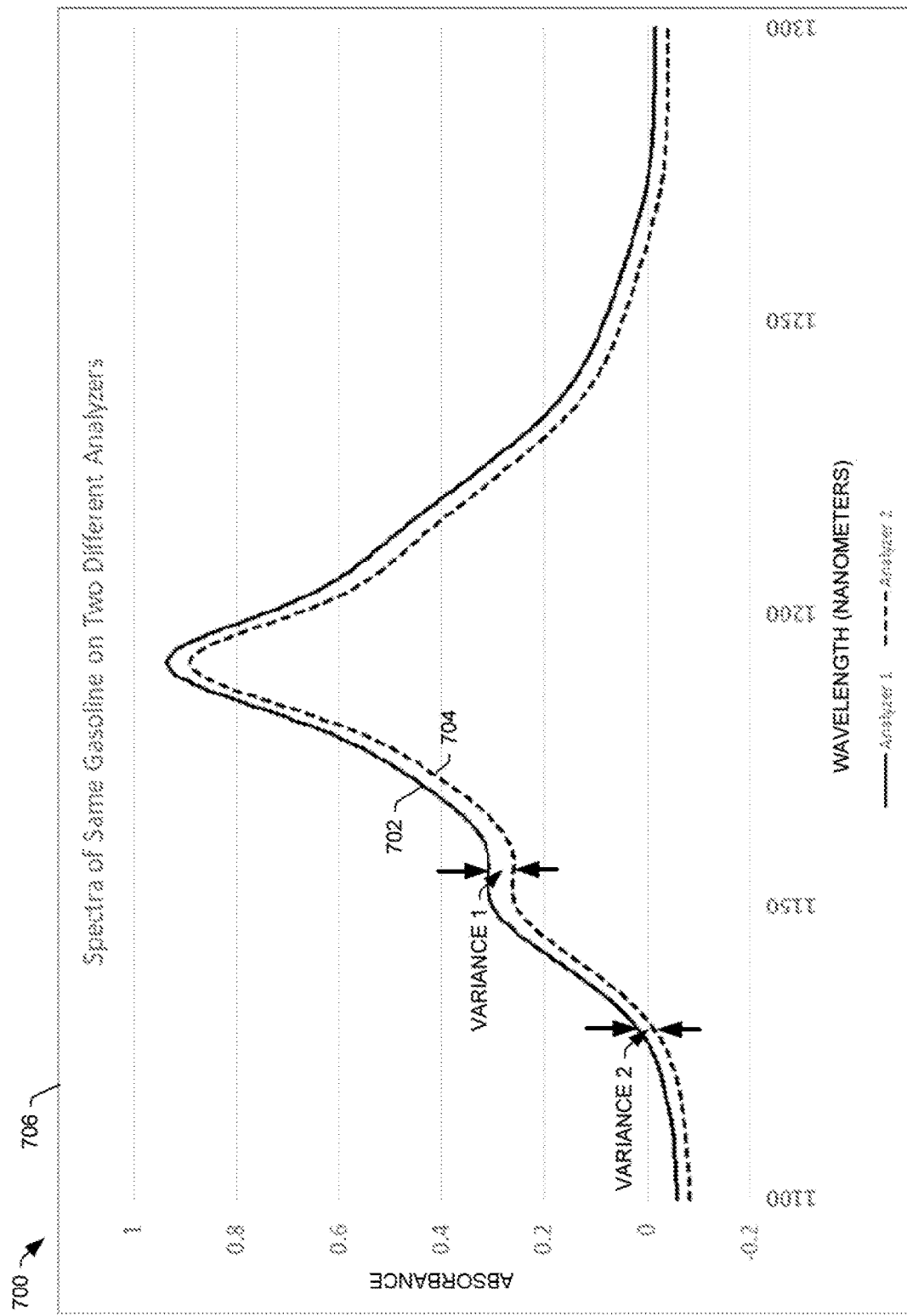
FIG. 7B is a blow-up view of an example range of wavelengths of a portion of the graph shown in FIG. 7A highlighting the variance between the two material spectra shown in FIG. 7A, according to embodiments of the disclosure.

FIG. 7B is a blow-up view of an example range of wavelengths of a portion of the graph 700 shown in FIG. 7A, highlighting the variance between the two material spectra 702 and 704 shown in FIG. 7A, according to embodiments of the disclosure. For example, as shown in FIG. 7B, at any given wavelength of the first and second spectra 702 and 704 for the highlighted range of wavelengths from about 1100 to about 1300 nanometers, the magnitude of the absorbance differs. As depicted in FIG. 7B, variance 1 shows the difference in absorbance magnitude between the first material spectrum 702 and the second material spectrum 704 at about 1152 nanometers, and variance 2 shows the difference in absorbance magnitude between the first material spectrum 702 and the second material spectrum 704 at about 1136 nanometers. As shown in FIG. 7B, the variance is not constant across the range of wavelengths of the spectra 702 and 704. As a result, the spectra 702 and 704 from the two spectroscopic analyzers are (1) different and thus not consistent with one another, and (2) may not be easily equated, for example, by simple addition or ratios, to directly compare the results of the two spectra 702 and 704. Moreover, because the spectra 702 and 704 may be used to determine properties of the multi-component material analyzed by both spectroscopic analyzers, the properties predicted (or determined) from the two spectra 702 and 704 may substantially differ from each other, even though they might be expected to be the same, since the same multi-component material was analyzed. As a result, if a manufacturing process is at least partially controlled based on results from a spectroscopic analysis, the resulting material obtained from the process may be different, depending on which of the two spectroscopic analyzers was used during the process.

Figure 8A:
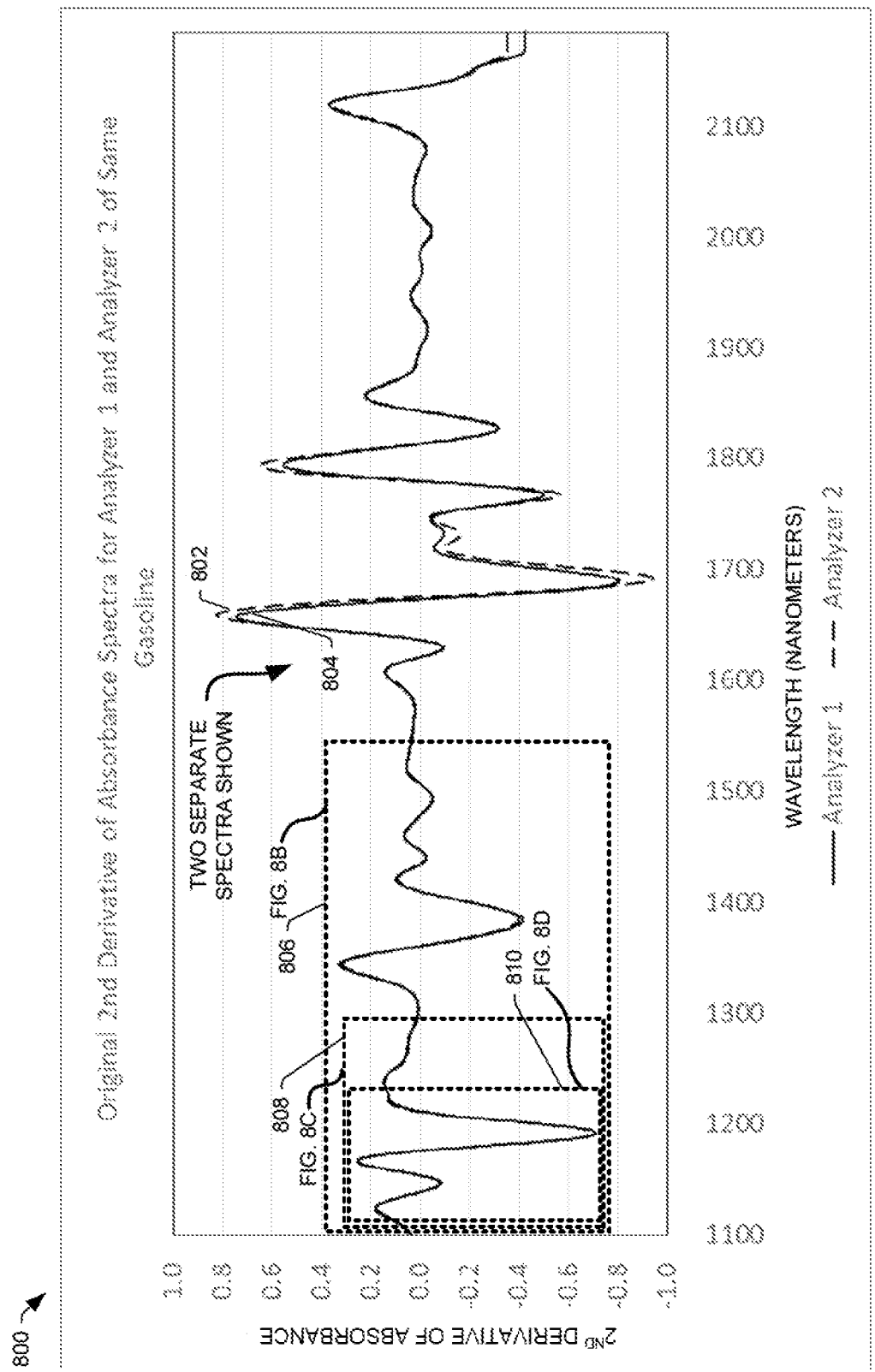
FIG. 8A is a graph illustrating an example first material second derivative spectrum (sometimes referred to as "the second derivative of the spectrum") outputted by a first spectroscopic analyzer of an example multi-component material and a second material spectrum outputted by a second spectroscopic analyzer of the same multi-component material overlaid onto the first material spectrum, according to embodiments of the disclosure.

FIG. 8A is a graph 800 illustrating another example first material second derivative spectrum 802 (sometimes referred to as "the second derivative of the spectrum) outputted by a first spectroscopic analyzer of an example multi-component material and a second material spectrum 804 outputted by a second spectroscopic analyzer of the same multi-component material overlaid onto the first material spectrum, according to embodiments of the disclosure. The example graph 800 shows the second derivative of the absorbance as a function of wavelength for each of the first and second material spectra 802 and 804. As shown in FIG. 8A, the example multi-component material, a gasoline blend (other materials are contemplated), is the same for each spectrum, but the first material second derivative spectrum 802 and the second material second derivative spectrum 804 are not the same. The regions 806, 808, and 810 identified in FIG. 8A are shown in more detail in FIGS. 8B, 8C, and 8D, respectively, to highlight differences between the first material second derivative spectrum 802 and the second material second derivative spectrum 804 in several regions of wavelengths.

Figure 8B:
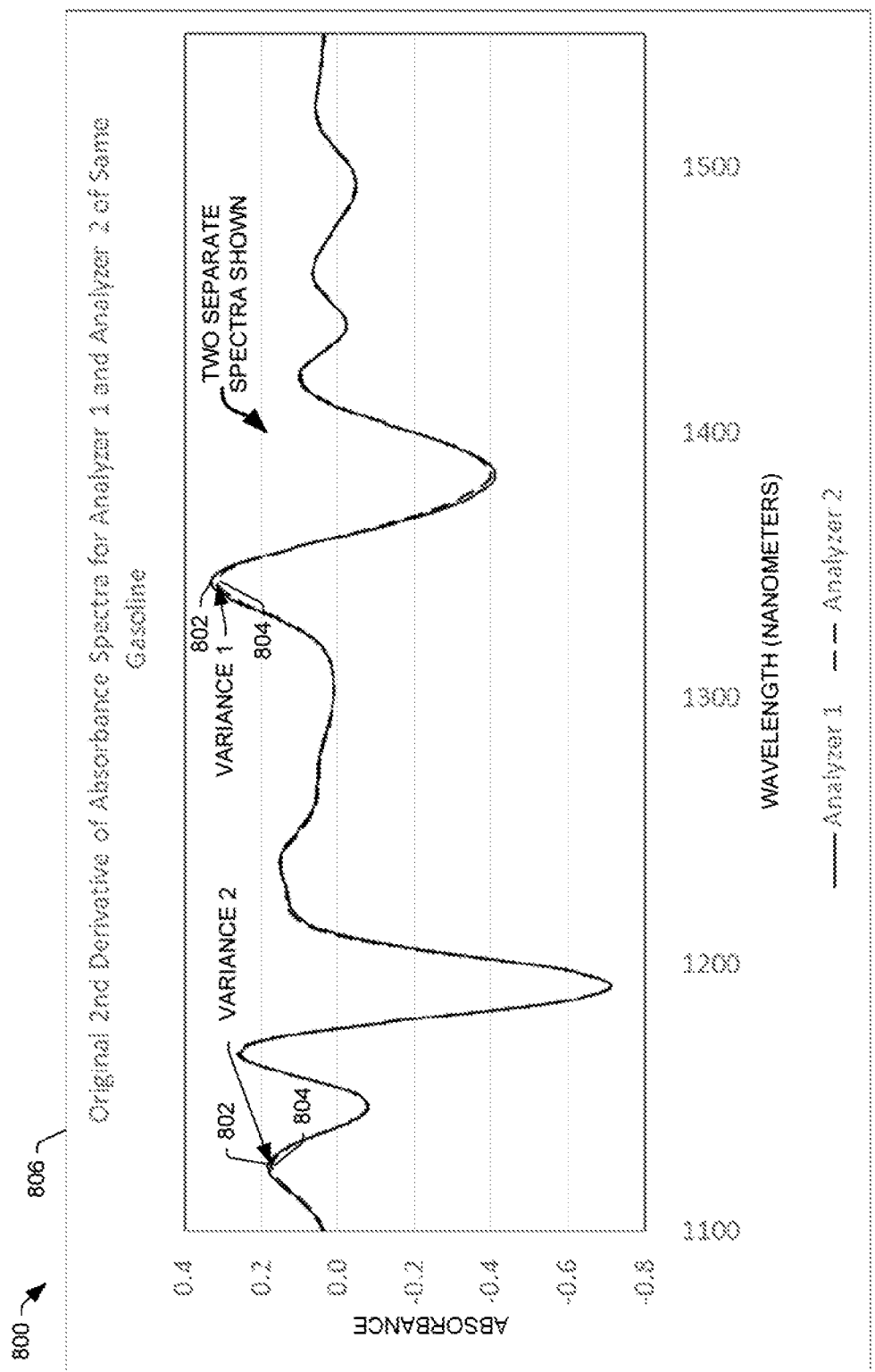
FIG. 8B is a blow-up view of an example range of wavelengths of a portion of the graph shown in FIG. 8A showing the second derivative spectrum and highlighting the variance between the two material spectra shown in FIG. 8A, according to embodiments of the disclosure.

FIG. 8B is a blow-up view of an example range of wavelengths from about 1100 to about 1540 nanometers of a portion of the graph 800 shown in FIG. 8A of the second derivative spectrum and highlighting the variance between the two material spectra 802 and 804 shown in FIG. 8A, according to embodiments of the disclosure. As shown in FIG. 8B, variance 1 is highlighted at a wavelength of about 1336 nanometers, and a variance 2 is highlighted at a wavelength of about 1126 nanometers. Similar to the example shown in FIGS. 7A and 7B, the variance (e.g., magnitude of intensity) differs as a function of wavelength.

Figure 8C:
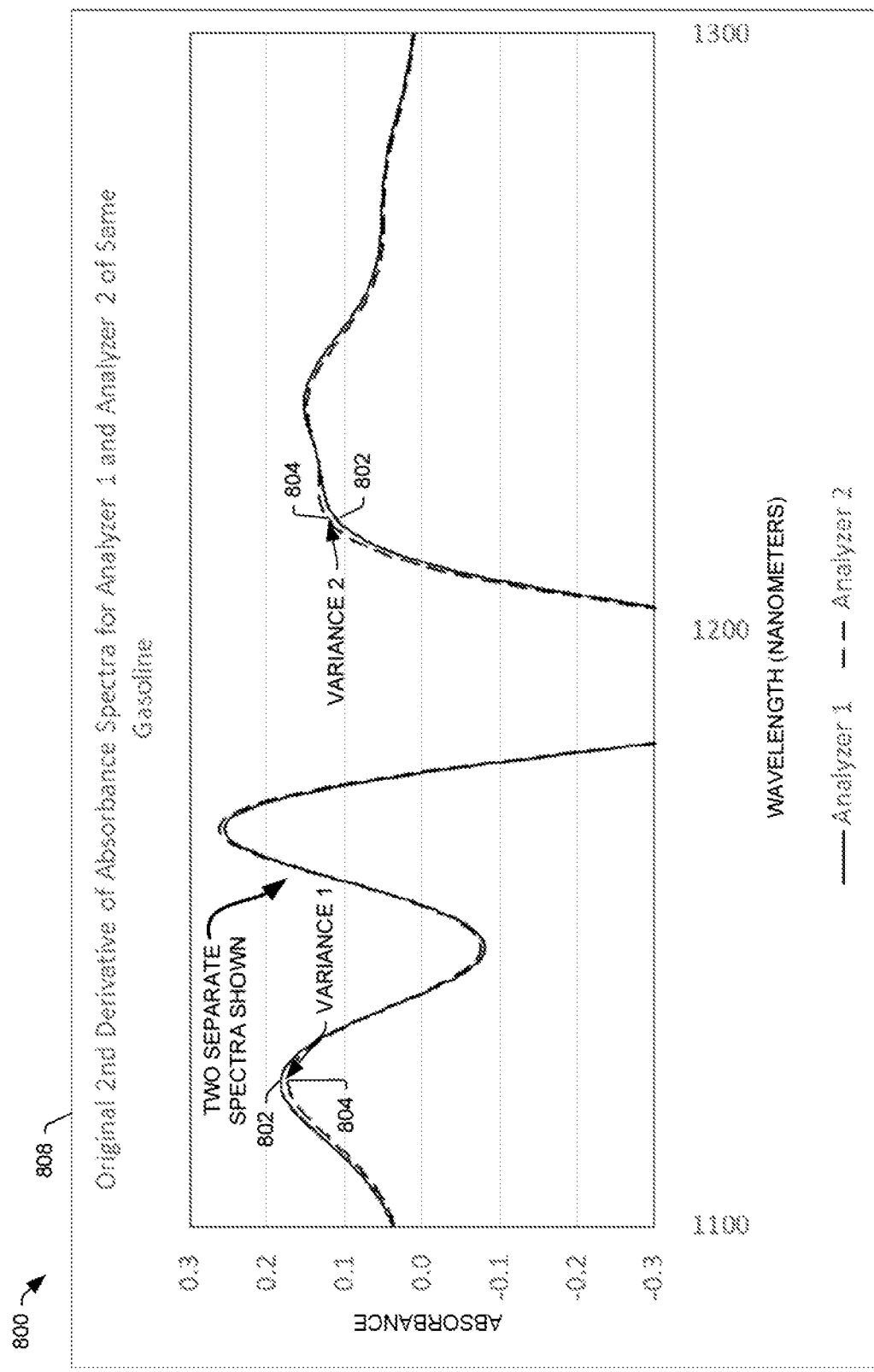
FIG. 8C is a blow-up view of another example range of wavelengths of a portion of the graph shown in FIG. 8A showing the second derivative spectrum and highlighting the variance between the two material spectra shown in FIG. 8A, according to embodiments of the disclosure.

FIG. 8C is a blow-up view of another example range of wavelengths from about 1100 to about 1300 nanometers of a portion of the graph 800 shown in FIG. 8A of the second derivative spectrum and highlighting the variance between the two material spectra 802 and 804 shown in FIG. 8A, according to embodiments of the disclosure. As shown in FIG. 8C, an example variance 1 is highlighted at a wavelength of about 1125 nanometers, and an example variance 2 is highlighted at a wavelength of about 1220 nanometers. Similar to the example shown in FIGS. 7A and 7B, the variance (e.g., magnitude of intensity) differs as a function of wavelength.

Figure 8D:
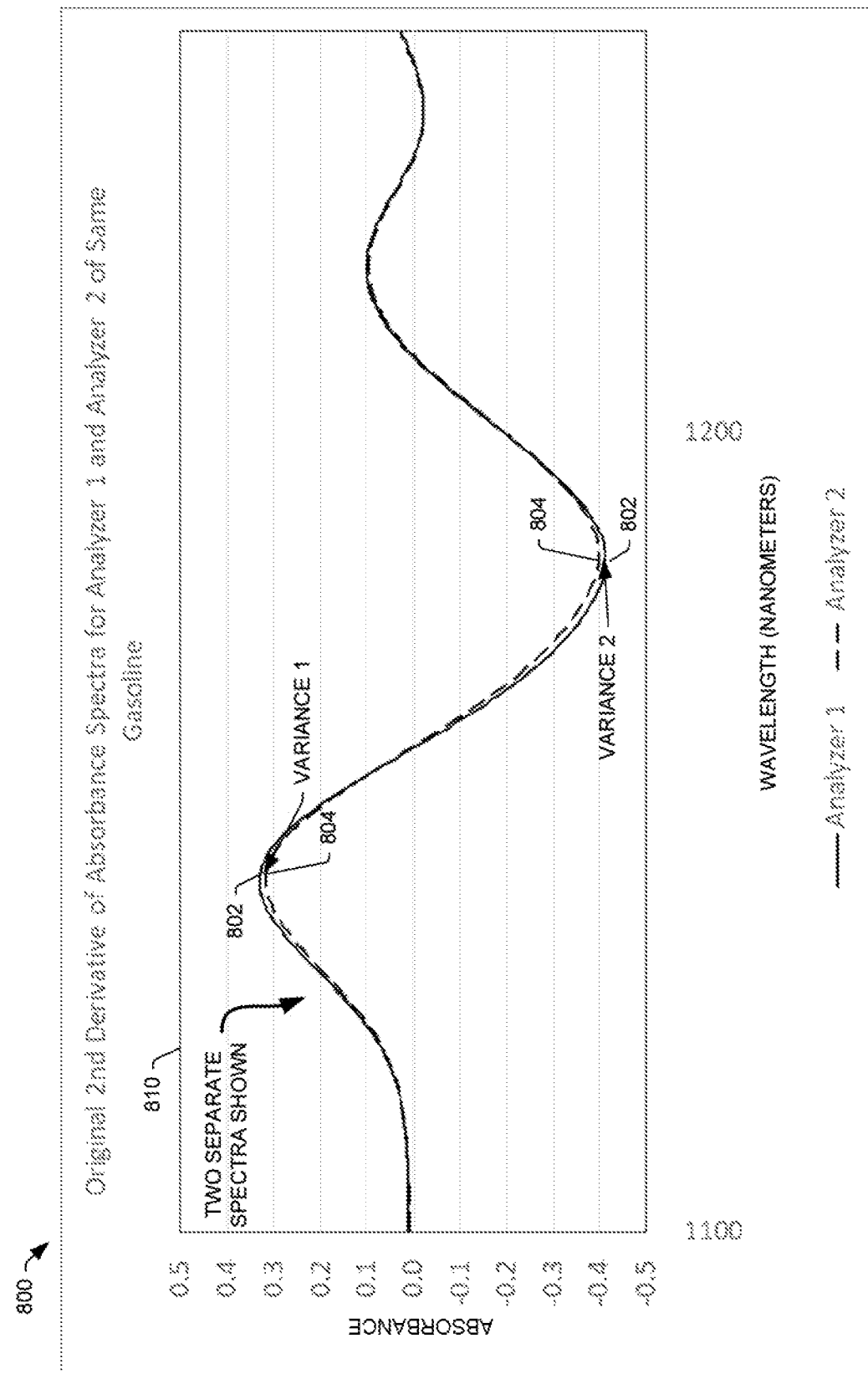
FIG. 8D is a blow-up view of yet another example range of wavelengths of a portion of the graph shown in FIG. 8A showing the second derivative spectrum and highlighting the variance between the two material spectra shown in FIG. 8A, according to embodiments of the disclosure.

FIG. 8D is a blow-up view of yet another example range of wavelengths from about 1100 to about 1250 nanometers of a portion of the graph 800 shown in FIG. 8A of the second derivative spectrum and highlighting the variance between the two material spectra shown in FIG. 8A, according to embodiments of the disclosure. In the example in FIG. 8D, the first material second derivative spectrum 802 and the second material second derivative spectrum 804 cross between variance 1 and variance 2 identified in FIG. 8D. In particular, the first material second derivative spectrum 802 has a higher intensity at about 1145 nanometers than the second material second derivative spectrum 804, while the second material second derivative spectrum 804 has a higher intensity at about 1185 nanometers than the first material second derivative spectrum 802. This highlights that the magnitude of the variance may fluctuate as a function of wavelength.

Figure 9A:
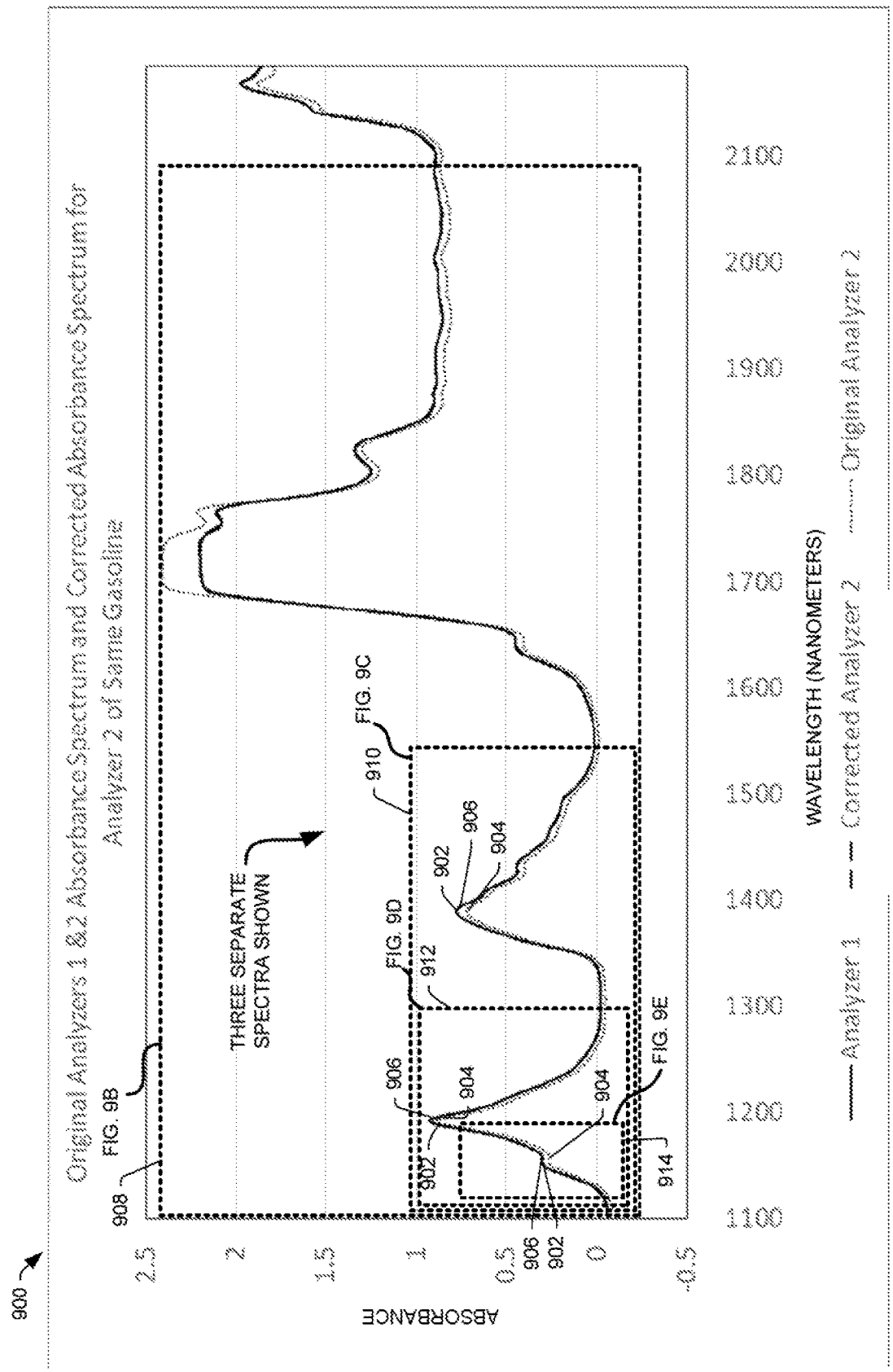
FIG. 9A is a graph illustrating examples of a first-state material spectrum and a second-state material spectrum output by a first-state and a second-state spectroscopic analyzer, respectively, of an example multi-component material, and a third (or corrected) material spectrum representing a corrected material spectrum output to cause the second-state material spectrum to be consistent with the first-state material spectrum, according to embodiments of the disclosure.

FIG. 9A is a graph 900 illustrating examples of first-state material spectrum 902 and a second-state material spectrum 904 outputted by a first-state and a second-state spectroscopic analyzer of an example multi-component material, and a third (or corrected) material spectrum 906 representing a corrected material spectrum outputted to cause the second-state material spectrum 904 to be consistent with the first-state material spectrum 902 according to embodiments of the disclosure. In some embodiments, the first-state material spectrum 902, the second-state material spectrum 904, and the third material spectrum 906 may be output by the same spectroscopic analyzer. For example, the first-state material spectrum 902 may be output by a spectroscopic analyzer following calibration and/or output of a standardized analyzer portfolio spectrum (e.g., as described previously herein), and the second-state material spectrum 904 may be output by the same spectroscopic analyzer following a change (e.g., such as service and/or part replacement) to the spectroscopic analyzer and subsequent analysis of second-state portfolio samples, for example, as previously described herein. In some embodiments, the first-state material spectrum 902 may be output by a first spectroscopic analyzer following calibration and/or output of a standardized analyzer portfolio spectrum (e.g., as described previously herein), and the second-state material spectrum 904 may be output by a second spectroscopic analyzer in the second state, for example, as previously described herein. The third material spectrum 906 may be output by the second spectroscopic analyzer following analysis of second-state portfolio samples and applying second portfolio sample-based corrections to the second-state material spectrum 904, for example, as previously described herein. The third material spectrum 906 is a second-state material spectrum 904 having the corrections applied to be consistent with (e.g., similar to, substantially match, be substantially equivalent to, or be substantially the same as) the first-state material spectrum 902. The example multi-component material may be the same material (e.g., one, two, or three samples of the same material) analyzed to result in output of the first-state material spectrum 902, the second-state material spectrum 904, and the third material spectrum 906.

The example graph 900 shows absorbance as a function of wavelength for each of the first-state material, second-state material, and third material spectra 902, 904, and 906. In the examples shown, the second spectroscopic analyzer has been provided with a standardized calibration based on the calibration of the first spectroscopic analyzer, for example, in a manner consistent with embodiments disclosed herein. In the examples shown in FIGS. 9A-9E, it is difficult to distinguish the between the first-state material spectrum 902 and the third (or corrected) material spectrum 906 in the usable ranges, as can be easily identified by those skilled in the art. The third material spectrum 906 has been outputted according some embodiments described herein by standardizing calibration of the second spectroscopic analyzer based on the calibration of the first spectroscopic analyzer to provide second spectroscopic analyzer results consistent with the first spectroscopic analyzer, as shown by the third (or corrected) material spectrum 906 substantially matching the first material spectrum 902.

Figure 9B:
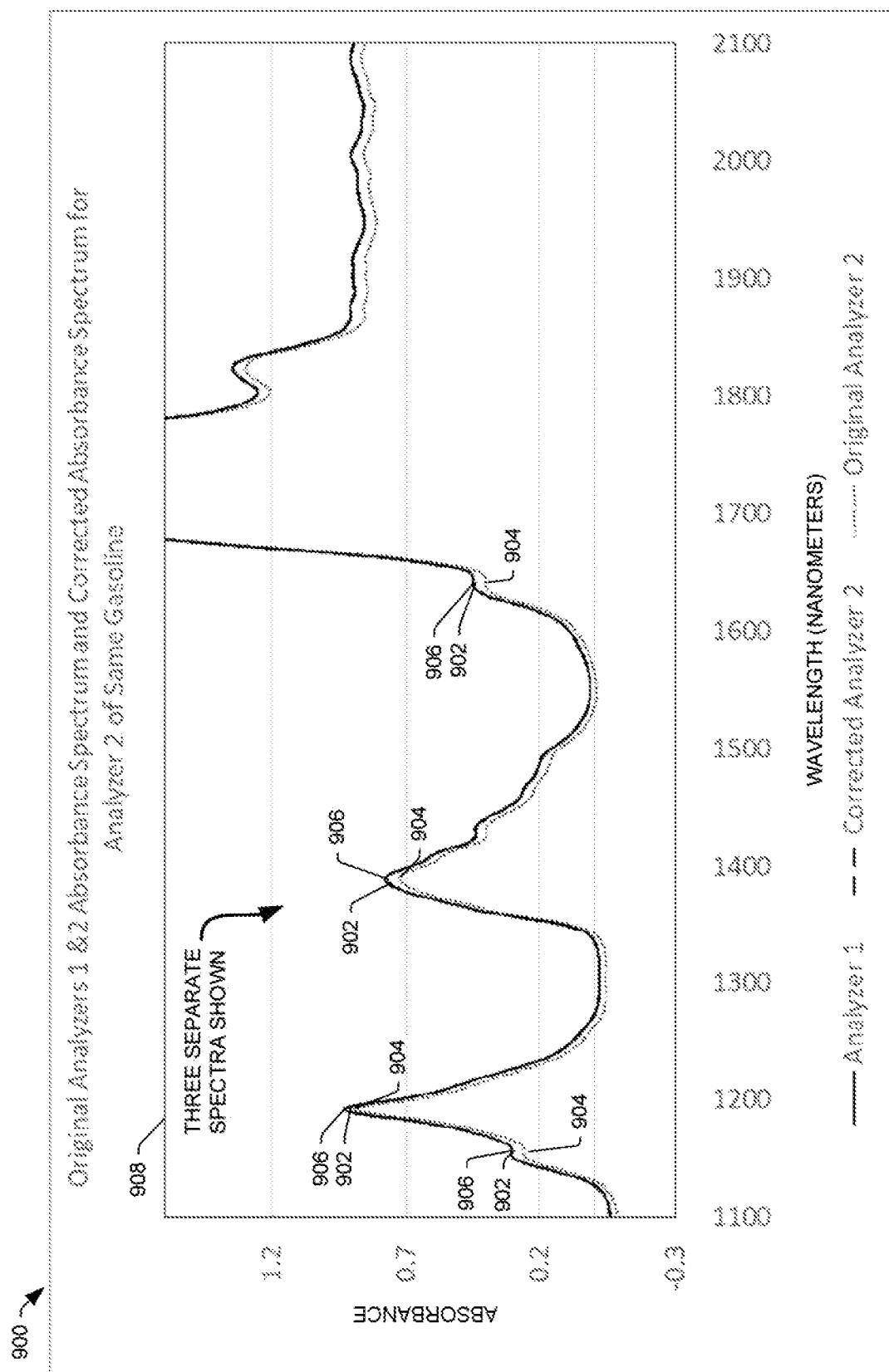
FIG. 9B is a blow-up view of an example range of absorbances of a portion of the graph shown in FIG. 9A highlighting the variance between the first-state and second-state material spectra shown in FIG. 9A and the similarity of the third material spectrum corrected to be consistent with the first-state material spectrum, according to embodiments of the disclosure.

For example, FIG. 9B is a blow-up view of an example range of wavelengths from about 1100 to about 2100 nanometers of a portion 908 of the graph 900 shown in FIG. 9A, highlighting the variance between the first-state material spectrum 902 and the second-state material spectrum 904 shown in FIG. 9A, and showing the similarity of the third material spectrum 906 to the first-state material spectrum 902, according to embodiments of the disclosure. The second-state material spectrum 904 deviates or varies from the first-state material spectrum 902 as shown at various wavelength locations along the spectra 902 and 904. As noted above, the third material spectrum 906 substantially matches the first-state material spectrum 902, indicating the correction to the second-state material spectrum 904 results in the "corrected" second-state material spectrum 904 (i.e., the third material spectrum 906) being consistent with (e.g., substantially the same as) the first-state material spectrum 902.

Figure 9C:
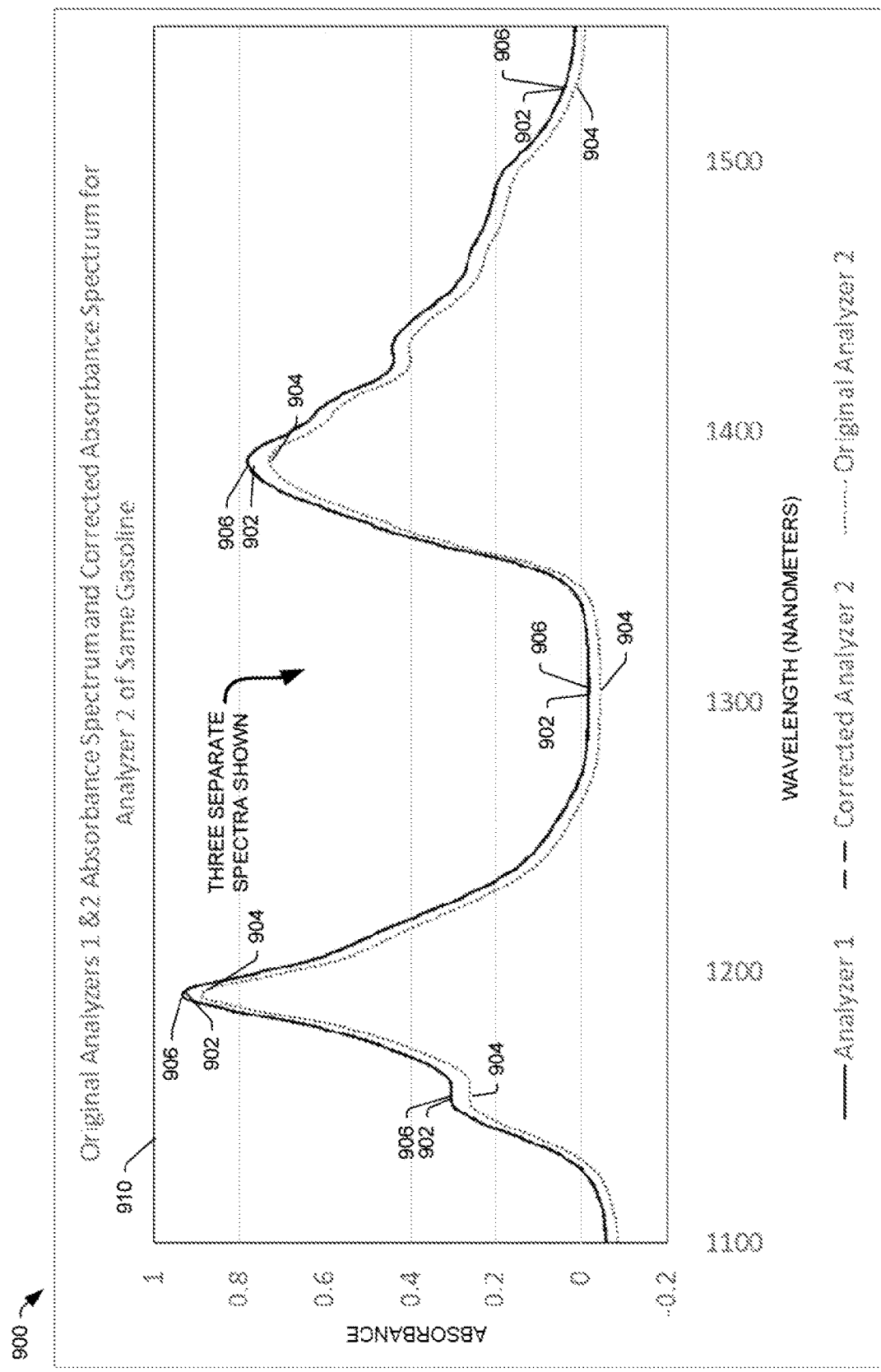
FIG. 9C is a blow-up view of an example range of wavelengths of a portion of the graph shown in FIG. 9A highlighting the variance between the first-state and second-state material spectra shown in FIG. 9A and the similarity of the third material spectrum corrected to be consistent with the first-state material spectrum, according to embodiments of the disclosure.

FIG. 9C is a blow-up view of an example range of wavelengths from about 1100 to about 1550 nanometers of a portion 910 of the graph 900 shown in FIG. 9A highlighting the variance between the first-state material spectrum 902 and the second-state material spectrum 904 shown in FIG. 9A, and the similarity of the third material spectrum 906 to the first-state material spectrum 902, according to embodiments of the disclosure.

Figure 9D:
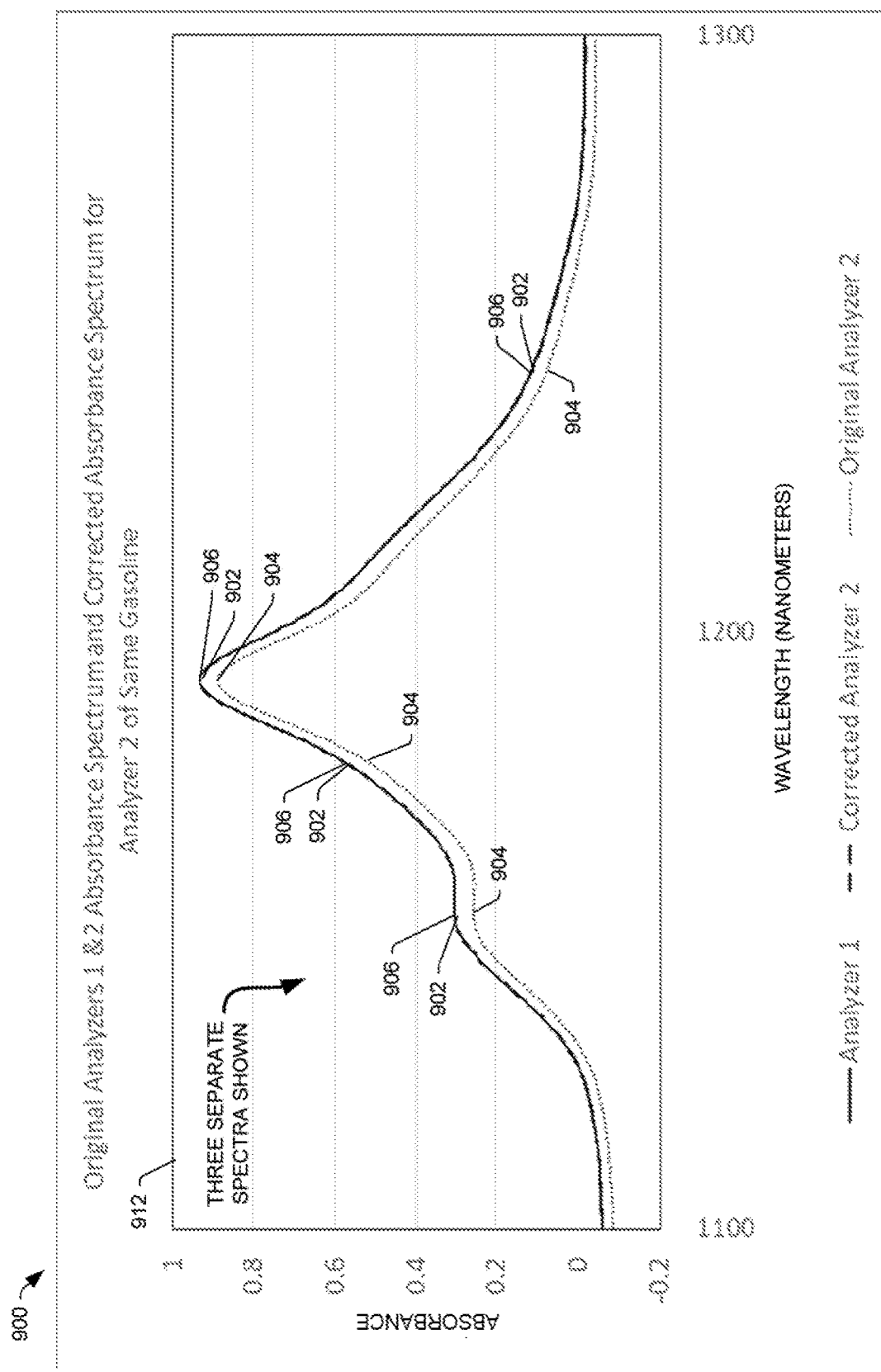
FIG. 9D is a blow-up view of another example range of wavelengths of a portion of the graph shown in FIG. 9A highlighting the variance between the first-state and second-state material spectra shown in FIG. 9A and the similarity of the third material spectrum corrected to be consistent with the first-state material spectrum, according to embodiments of the disclosure.

FIG. 9D is a blow-up view of another example range of wavelengths from about 1100 to about 1300 nanometers of a portion 912 of the graph 900 shown in FIG. 9A, highlighting the variance between the first-state material spectrum 902 and the second-state material spectrum 904 shown in FIG. 9A, and the similarity of the third material spectrum 906 to the first-state material spectrum 902, according to embodiments of the disclosure. In this portion 912 of the graph 900, the variance between the second-state material spectrum 904 and the first-state material spectrum 902, while the first-state material spectrum 902 and the third material spectrum 906 are substantially indistinguishable, and thus are consistent with one another.

Figure 9E:
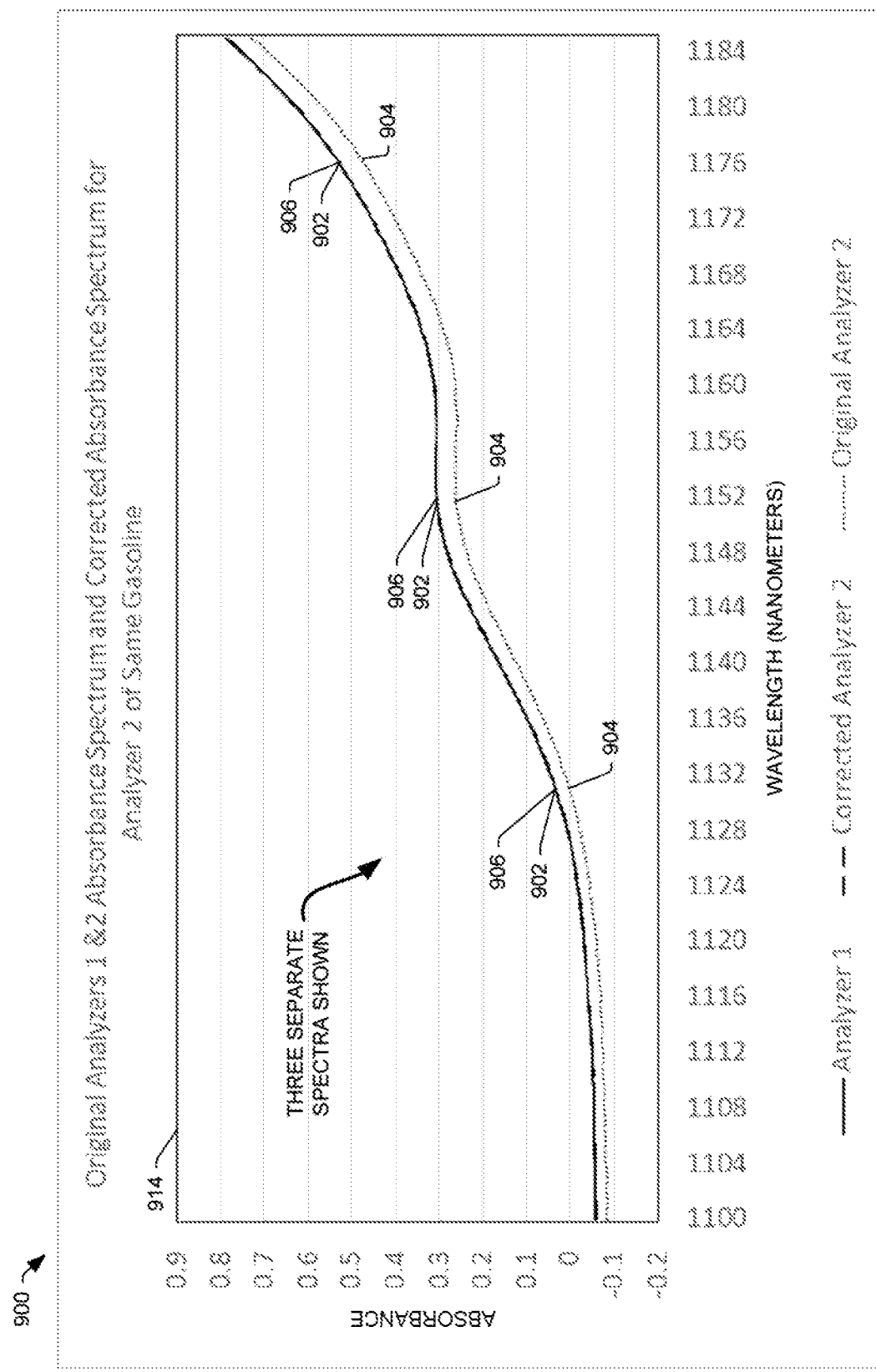
FIG. 9E is a blow-up view of the first-state material spectrum, the second-state material spectrum, and the third material spectrum (a corrected material spectrum) of another example range of wavelengths of a portion of the graph shown in FIG. 9A highlighting the variance between the first-state and second-state material spectra and the similarity of the third material spectrum corrected to be consistent with the first-state material spectrum, according to embodiments of the disclosure.

FIG. 9E is a blow-up view of the first-state material spectrum 902, the second-state material spectrum 904, and the third material spectrum 906 of another example range of wavelengths from about 1100 to about 1184 nanometers of a portion 914 of the graph 900 shown in FIG. 9A, according to embodiments of the disclosure. FIG. 9E highlights the variance between the first-state material spectrum 902 and the second-state material spectrum 904, and the similarity of the third material spectrum 906 to the first-state material spectrum 902.

Figure 10A:
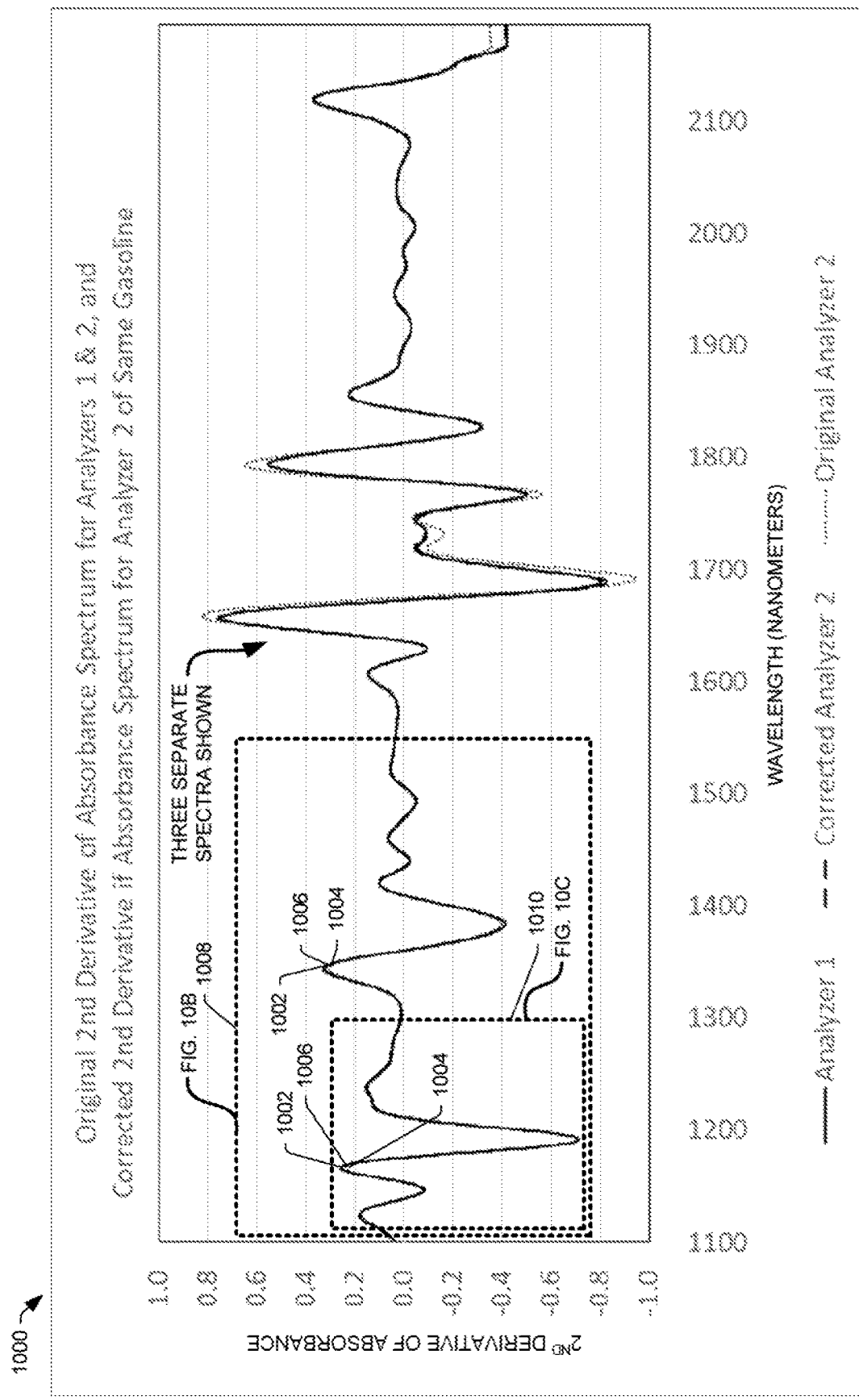
FIG. 10A is a graph illustrating examples of a first-state material second derivative spectrum and a second-state material second derivative spectrum outputted by a first-state and a second-state spectroscopic analyzer of another example multi-component material, and a third (or corrected) material second derivative spectrum (a corrected second derivative spectrum) representing a corrected material spectrum outputted to cause the second-state material second derivative spectrum to substantially match the first-state material second derivative spectrum, according to embodiments of the disclosure.

FIG. 10A is a graph 1000 illustrating examples of a first-state material second derivative spectrum 1002 and a second-state material second derivative spectrum 1004 output by respective first and second spectroscopic analyzers of another example multi-component material, and a third (or corrected) material second derivative spectrum 1006 representing a corrected material second derivative spectrum output to cause the second-state material second derivative spectrum 1004 to substantially match the first-state material second derivative spectrum 1002, according to embodiments of the disclosure. The example graph 1000 shows the second derivative of the absorbance as a function of wavelength for each of the first-state material second derivative, second-state material second derivative, and third material second derivative spectra 1002, 1004, and 1006. In the examples shown, the second spectroscopic analyzer has been provided with spectral models based on the calibration of the first spectroscopic analyzer, for example, in a manner consistent with embodiments disclosed herein.

Figure 10B:
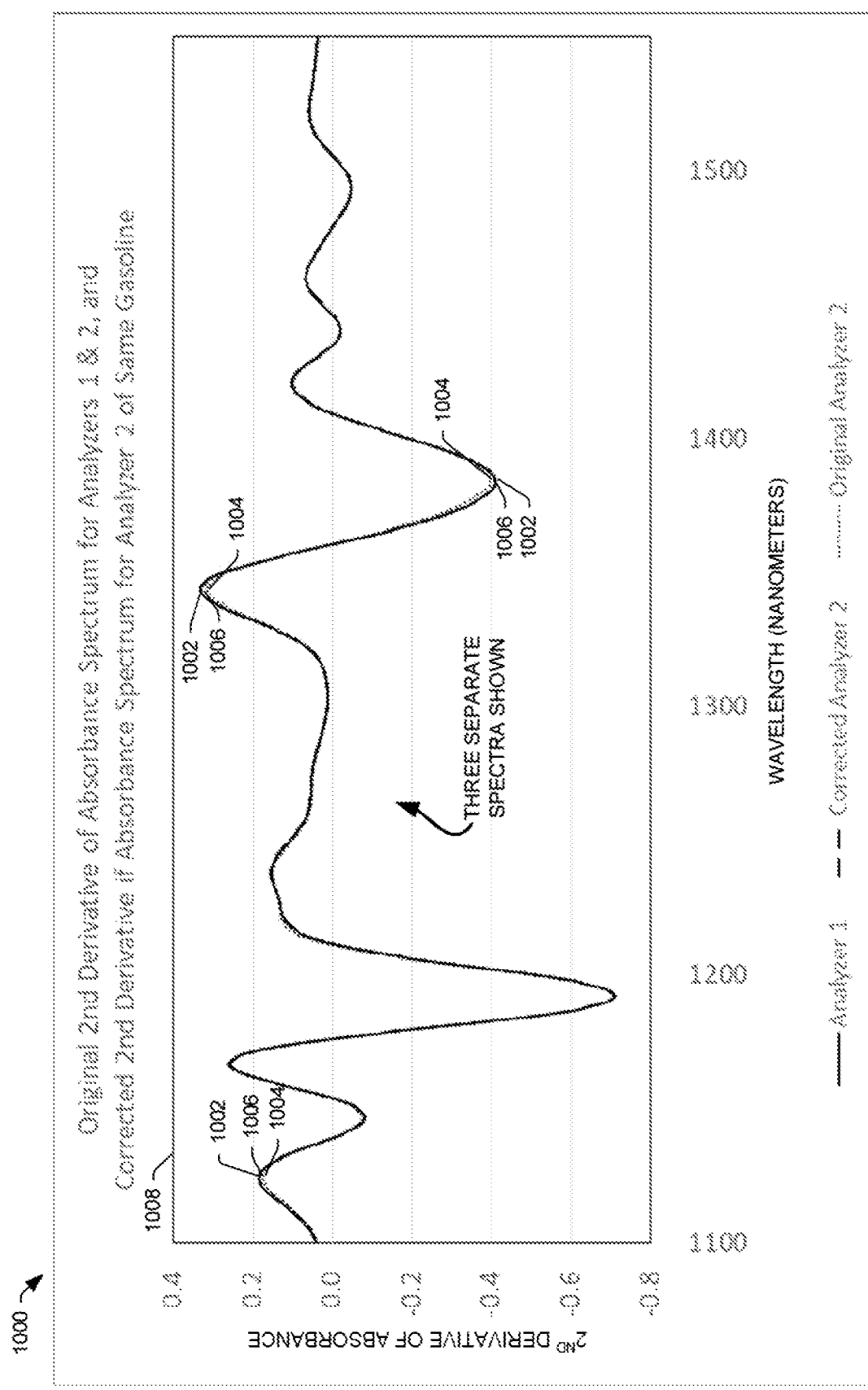
FIG. 10B is a blow-up view of an example range of wavelengths of a portion of the graph shown in FIG. 10A of the first-state material second derivative spectrum, the second-state material second derivative spectrum, and the third material second derivative spectrum (a corrected second derivative spectrum) and highlighting the variance between the first-state and second-state material second derivative spectra shown in FIG. 10A and the similarity of the third material second derivative spectrum to the first-state material second derivative spectrum, according to embodiments of the disclosure.

FIG. 10B is a blow-up view of an example range of wavelengths from about 1100 to about 1550 of a portion 1008 of the graph 1000 shown in FIG. 10A of the second derivative spectrum, according to embodiments of the disclosure. FIG. 10B highlights the variance between the first-state material second derivative spectrum 1002 and the second-state material second derivative spectrum 1004 shown in FIG. 10A, and the similarity of the third material second derivative spectrum 1006 to the first-state material second derivative spectrum 1002.

FIG. 10C is a blow-up view of another example range of wavelengths from about 1100 to about 1300 of a portion 1010 of the graph 1000 shown in FIG. 10A of the second derivative spectra. FIG. 10C highlights the variance between the first-state material second derivative spectrum 1002 and the second-state material second derivative spectrum 1004 shown in FIG. 10A, and the similarity of the third material second derivative spectrum 1006 to the first-state material second derivative spectrum 1002, according to embodiments of the disclosure.

Figure 11A:
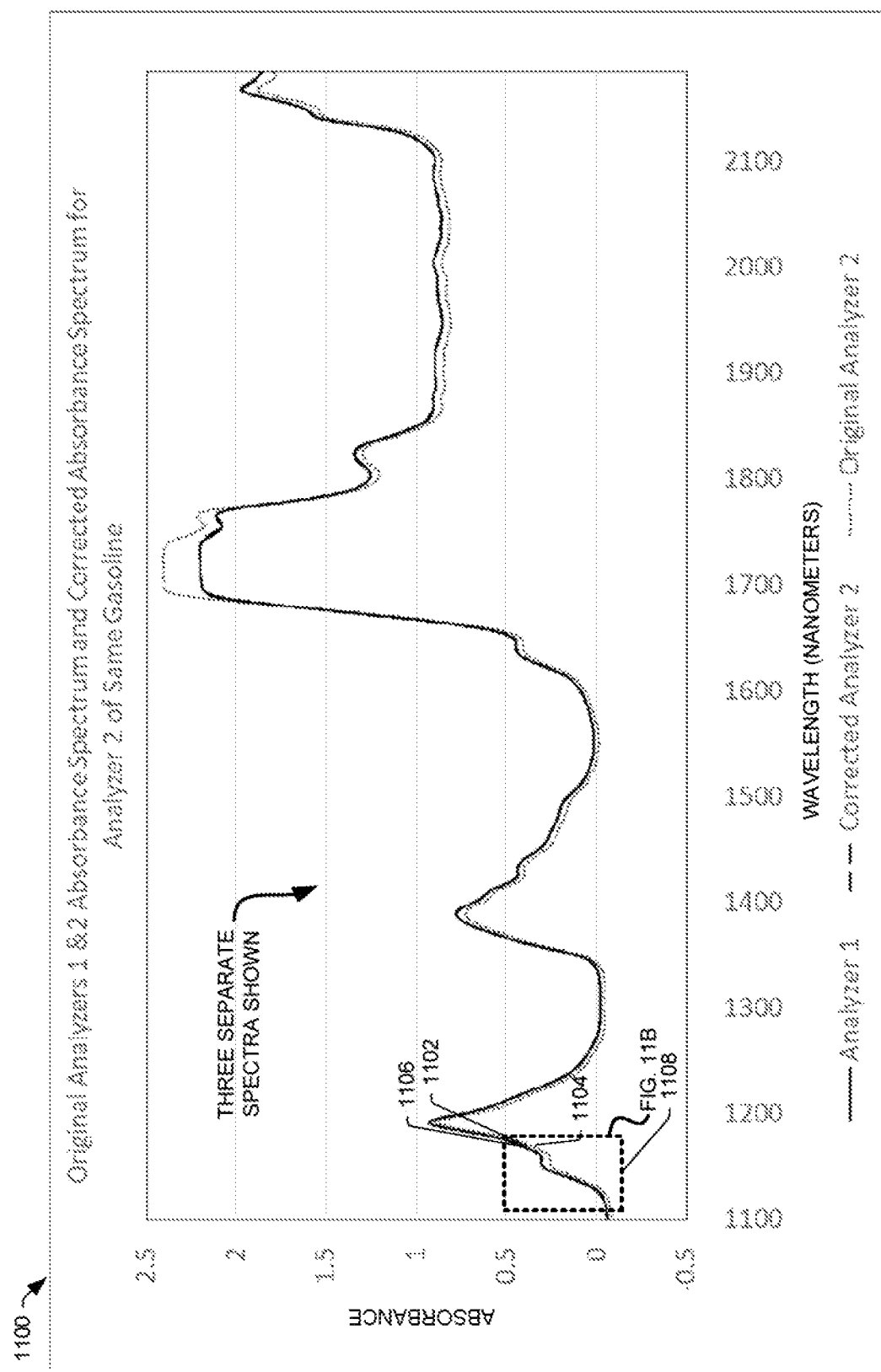
FIG. 11A is a graph illustrating examples of a first-state material spectrum and a second-state material spectrum outputted by a first-state and a second-state spectroscopic analyzer, respectively, of another example multi-component material, and a third (or corrected) material spectrum representing a corrected material spectrum outputted to cause the second-state material spectrum to substantially match the first-state material spectrum, according to embodiments of the disclosure.

FIG. 11A is a graph 1100 illustrating examples of first-state and second-state material spectra 1102 and 1104 outputted by respective first and second spectroscopic analyzers of another example multi-component material, and a third (or corrected) material spectrum 1106 representing a corrected material spectrum outputted to cause the second-state material spectrum 1104 to be consistent with the first-state material spectrum 1102, according to embodiments of the disclosure. The example graph 1100 shows absorbance as a function of wavelength for each of the first-state material spectrum 1102, the second-state material spectrum 1104, and third material spectrum 1106. In the examples shown, the second spectroscopic analyzer has been provided with one or more spectral models based on the calibration of the first spectroscopic analyzer, for example, in a manner consistent with embodiments disclosed herein. In the examples shown in FIGS. 11A and 111B, it is difficult to distinguish between the first-state material spectrum 1102 and the third (or corrected) material spectrum 1106. The third material spectrum 1106 has been corrected by the portfolio sampled-based corrections determined, for example, according to some embodiments described herein, such that the second spectroscopic analyzer provides results consistent with the first spectroscopic analyzer, as shown by the third (or corrected) material spectrum 1106 substantially matching the first-state material spectrum 1102.

Figure 11B:
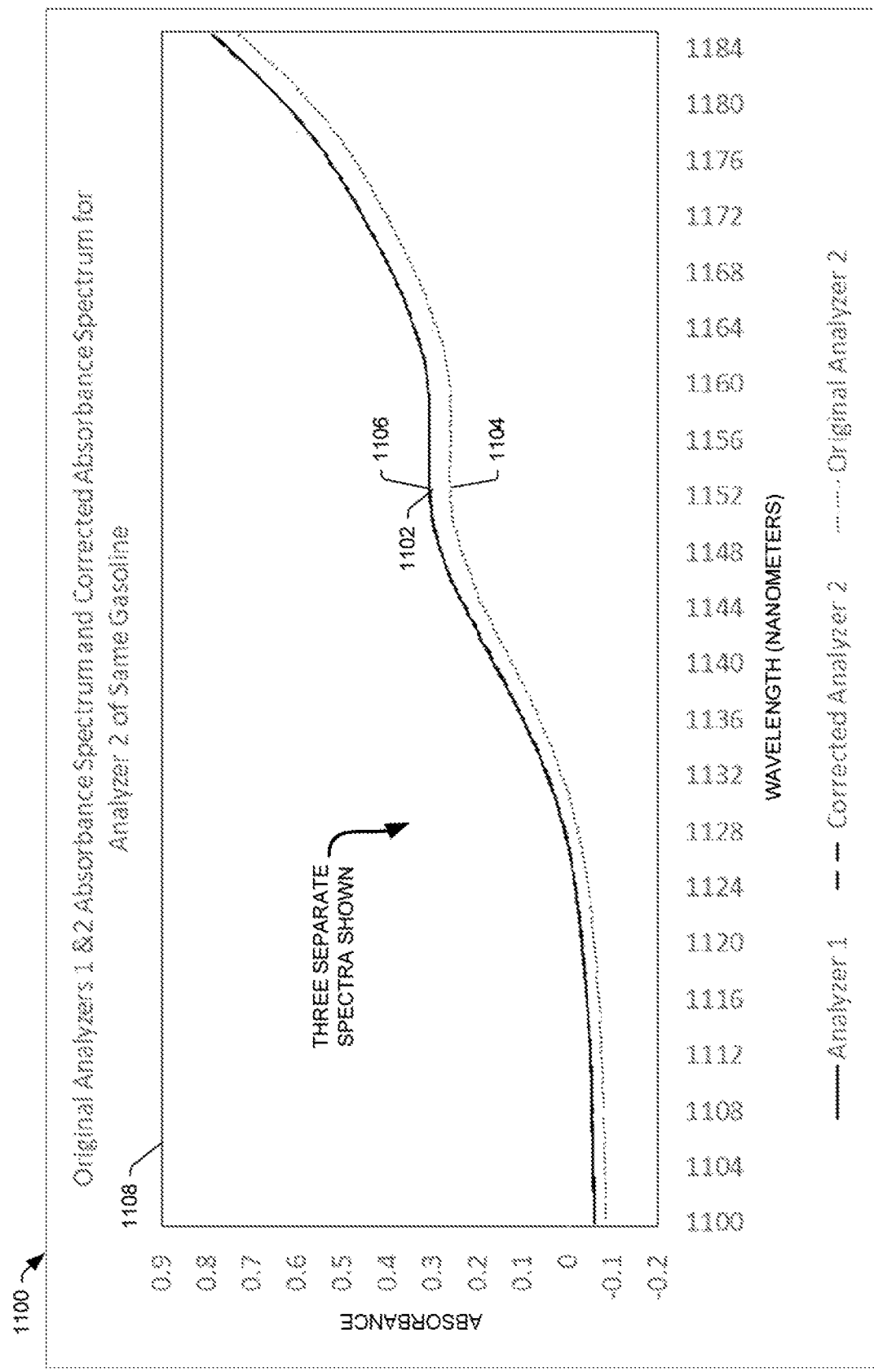
FIG. 11B is a blow-up view of the first-state material spectrum, the second-state material spectrum, and third material spectrum (a corrected material spectrum) of another example range of wavelengths of a portion of the graph shown in FIG. 11A highlighting the variance between the first-state and second-state material spectra and the similarity of the third material spectrum to the first-state material spectrum, according to embodiments of the disclosure.

FIG. 11B is a blow-up view of the first-state material spectrum 1102, the second-state material spectrum 1104, and the third material spectrum 1106 of another example range of wavelengths from about 1100 to about 1184 nanometers of a portion 1108 of the graph 1100 shown in FIG. 11A. FIG. 11B highlights the variance between the first-state material spectrum 1102 and the second-state material spectrum 1104, and the similarity of the third material spectrum 1106 to the first-state material spectrum 1102, according to embodiments of the disclosure.

Applicant tested the methods and assemblies according to at least some embodiments described herein by first analyzing a plurality of samples of the same multi-component material, gasoline (both the research octane number (RON) and the motor octane number (MON)), in five different spectroscopic analyzers, each calibrated by analyzing a first set of different multi-component samples in a first-state to determine the differences between the spectra outputted by each of the five analyzers, even though the multi-component material tested was the same for each of the spectroscopic analyzers.

Thereafter, each of the second through fifth spectroscopic analyzers was provided with one or more spectral models based on the calibration of the first spectroscopic analyzer in the first state, with the first spectroscopic analyzer acting as a primary spectroscopic analyzer. In particular, each of the second through fifth spectroscopic analyzers used a standardized analyzer spectra portfolio to determine portfolio sample-based corrections, and each of the second through fifth spectroscopic analyzers analyzed a second set of multi-component samples to output respective second-state portfolio sample spectra. Thereafter, each of the second through fifth spectroscopic analyzers outputted respective portfolio sample-based corrections based on the standardized analyzer spectra portfolio of the first spectroscopic analyzer (e.g., based on variances between the respective first-state portfolio sample spectra of the standardized analyzer spectra portfolio and the second-state portfolio sample spectra), resulting in the second through fifth spectroscopic analyzers being capable of analyzing multi-component materials and generating corrected spectral responses and/or corrected material spectra outputted for each of the multi-component materials analyzed.

Table 1 below provides testing results comparing the performance of the first spectroscopic analyzer with the performance of the second spectroscopic analyzer when analyzing gasoline samples for RON. Each of the first spectroscopic analyzer and the second spectroscopic analyzer analyzed eleven samples (A-K). The column with the heading "First-State Analyzer 1" shows the testing results for the first spectroscopic analyzer for each of the eleven samples tested. The column with the heading "Analyzer 2 Uncorrected" shows the testing results for the second spectroscopic analyzer calibrated by analyzing the first set of multi-component samples according to at least some embodiments described herein to place the second spectroscopic analyzer in the first state. The column with the heading "Difference" shows the difference between the predicted or determined result using the spectrum outputted by the first spectroscopic analyzer for the indicated sample in the first state and the corresponding predicted or determined result using the spectrum outputted by the second spectroscopic analyzer for the indicated sample while in the second state. The column with the heading "Analyzer 2 Corrected" shows the testing results for the second spectroscopic analyzer in the second state based on the standardized analyzer spectra portfolio, and the column with the heading "Difference (Corrected)" shows the difference between the predicted or determined result using the spectrum outputted by the first spectroscopic analyzer for the indicated sample and the corresponding predicted or determined result using the spectrum outputted by the second spectroscopic analyzer in the second state after the correction is applied (e.g., the portfolio sample-based corrections).

Tables 2-4 provide similar corresponding testing results for the third through fifth spectroscopic analyzers when testing the same eleven gasoline samples for RON, and Tables 5-8 provide similar corresponding testing results for the second through fifth spectroscopic analyzers when testing the same eleven gasoline samples for MON.

As shown in Table 1 below, when provided with the portfolio sample-based correction(s), the difference between the testing results for RON provided by the first and second spectroscopic analyzers was significantly reduced. For example, with the conventional model transfer, the difference between the results for the two analyzers ranged from 0.98 to 1.23. By comparison, following receipt of the standardized calibration based on the calibration of the first spectroscopic analyzer, and using the portfolio sample-based correction(s), the difference between the results for the two analyzers ranged from −0.07 to 0.18. This represents a reduction in the difference between the predicted or determined results from the two spectroscopic analyzers, showing substantially consistent results between the two spectroscopic analyzers, for example, based on the statistical errors associated with a given property, which is Research Octane Number (RON) in this example. Spectral variance may affect each model in its own capacity. In some embodiments, spectral variance, which may affect the performance of a given spectral model beyond the expected consistency, may be reduced or eliminated, for example, when compared to the first-state portfolio sample spectra, and/or consistency in results may mean having results agree within an expected statistical error for a given property.

TABLE 1

| RON Sample | First-State Analyzer 1 | Analyzer 2 Uncorrected | Difference | Analyzer 2 Corrected | Difference (Corrected) |
|---|---|---|---|---|---|
| A | 92.6 | 93.67 | 1.07 | 92.62 | 0.02 |
| B | 92.72 | 93.72 | 1.00 | 92.67 | −0.05 |
| C | 84.65 | 85.64 | 0.99 | 84.58 | −0.07 |
| D | 84.51 | 85.59 | 1.08 | 84.54 | 0.03 |
| E | 84.35 | 85.58 | 1.23 | 84.53 | 0.18 |
| F | 82.82 | 83.89 | 1.07 | 82.84 | 0.02 |
| G | 85.74 | 86.81 | 1.07 | 85.76 | 0.02 |
| H | 87.19 | 88.32 | 1.13 | 87.27 | 0.08 |
| I | 87.82 | 88.8 | 0.98 | 87.75 | −0.07 |
| J | 89.75 | 90.86 | 1.11 | 89.81 | 0.06 |
| K | 91.08 | 92.16 | 1.08 | 91.11 | 0.03 |

In some embodiments, a variance may exist when the difference (e.g., positive or negative), at one or more wavelengths and/or over a range of wavelengths, between the magnitude of the first-state portfolio sample spectra and the magnitude of the second-state portfolio sample spectra is greater than or equal to about 0.05% of the magnitude of the first-state portfolio sample spectra, for example, greater than or equal to about 0.15% of the magnitude of the first-state portfolio sample spectra, greater than or equal to about 0.25% of the magnitude of the first-state portfolio sample spectra, greater than or equal to about 0.50% of the magnitude of the first-state portfolio sample spectra, greater than or equal to about 0.75% of the magnitude of the first-state portfolio sample spectra, greater than or equal to about 1.00% of the magnitude of the first-state portfolio sample spectra, greater than or equal to about 2.00% of the magnitude of the first-state portfolio sample spectra, greater than or equal to about 5.00% of the magnitude of the first-state portfolio sample spectra, greater than or equal to about 7.50% of the magnitude of the first-state portfolio sample spectra, or greater than or equal to about 10.00% of the magnitude of the first-state portfolio sample spectra. In some embodiments, reducing the variance at the one or more wavelengths and/or over the range of wavelengths, such that the magnitude of the first-state portfolio sample spectra and the magnitude of the second-state portfolio sample spectra are substantially consistent with one another, may result in the variance being reduced by greater than or equal to about 2%, for example, greater than or equal to about 5%, greater than or equal to about 10%, greater than or equal to about 20%, greater than or equal to about 30%, greater than or equal to about 40%, greater than or equal to about 50%, greater than or equal to about 65%, greater than or equal to about 75%, greater than or equal to about 80%, greater than or equal to about 85%, greater than or equal to about 90%, greater than or equal to about 95%, or greater than or equal to about 98%.

In some embodiments, the above-noted example variances and/or example variance reductions may apply to the first-state portfolio sample spectra and the second-state portfolio sample spectra when transformed, for example, via mathematical manipulation. For example, the above-noted example variances and/or example variance reductions may apply when the first-state portfolio sample spectra and the second-state portfolio sample spectra have been transformed by, for example, addition, multiplication, taking one or more derivatives thereof, and/or other mathematically-derived relationships.

As shown in Table 2 below, when provided with the portfolio sample-based correction(s), the difference between the testing results for RON provided by the first and third spectroscopic analyzers was significantly reduced. For example, with the conventional model transfer, the difference between the results for the two analyzers ranged from 2.05 to 2.39. By comparison, following receipt of the standardized calibration based on the calibration of the first spectroscopic analyzer, and using the portfolio sample-based correction(s), the difference between the results for the two analyzers ranged from −0.42 to −0.08. This represents a reduction in the difference between the predicted or determined results from the two spectroscopic analyzers, showing substantially consistent results between the two spectroscopic analyzers.

TABLE 2

| RON Sample | First-State Analyzer 1 | Analyzer 3 Uncorrected | Difference | Analyzer 3 Corrected | Difference (Corrected) |
|---|---|---|---|---|---|
| A | 92.60 | 94.68 | 2.08 | 92.21 | −0.39 |
| B | 92.72 | 94.77 | 2.05 | 92.30 | −0.42 |
| C | 84.65 | 86.93 | 2.28 | 84.45 | −0.20 |
| D | 84.51 | 86.90 | 2.39 | 84.43 | −0.08 |
| E | 84.35 | 86.69 | 2.34 | 84.21 | −0.14 |
| F | 82.82 | 85.18 | 2.36 | 82.70 | −0.12 |
| G | 85.74 | 88.06 | 2.32 | 85.59 | −0.15 |
| H | 87.19 | 89.55 | 2.36 | 87.08 | −0.11 |
| I | 87.82 | 89.95 | 2.13 | 87.47 | −0.35 |
| J | 89.75 | 91.89 | 2.14 | 89.41 | −0.34 |
| K | 91.08 | 93.18 | 2.10 | 90.71 | −0.37 |

As shown in Table 3 below, when provided with the portfolio sample-based correction(s), the difference between the testing results for RON provided by the first and fourth spectroscopic analyzers was significantly reduced. For example, with the conventional model transfer, the difference between the results for the two analyzers ranged from −0.93 to −1.17. By comparison, following receipt of the standardized calibration based on the calibration of the first spectroscopic analyzer, and using the portfolio sample-based correction(s), the difference between the results for the two analyzers ranged from −0.25 to 0. This represents a reduction in the difference between the predicted or determined results from the two spectroscopic analyzers, showing substantially consistent results between the two spectroscopic analyzers

TABLE 3

| RON Sample | First-State Analyzer 1 | Analyzer 4 Uncorrected | Difference | Analyzer 4 Corrected | Difference (Corrected) |
|---|---|---|---|---|---|
| A | 92.60 | 91.50 | −1.10 | 92.43 | −0.17 |
| B | 92.72 | 91.55 | −1.17 | 92.48 | −0.24 |
| C | 84.65 | 83.68 | −0.97 | 84.60 | −0.05 |
| D | 84.51 | 83.58 | −0.93 | 84.51 | 0.00 |
| E | 84.35 | 83.38 | −0.97 | 84.31 | −0.04 |
| F | 82.82 | 81.83 | −0.99 | 82.76 | −0.06 |
| G | 85.74 | 84.72 | −1.02 | 85.64 | −0.10 |
| H | 87.19 | 86.19 | −1.00 | 87.12 | −0.07 |
| I | 87.82 | 86.65 | −1.17 | 87.57 | −0.25 |
| J | 89.75 | 88.64 | −1.11 | 89.57 | −0.18 |
| K | 91.08 | 89.92 | −1.16 | 90.85 | −0.23 |

As shown in Table 4 below, when provided with the portfolio sample-based correction(s), the difference between the testing results for RON provided by the first and fifth spectroscopic analyzers was reduced. For example, with the conventional model transfer, the difference between the results for the two analyzers ranged from 1.28 to 2.29. By comparison, following receipt of the standardized calibration based on the calibration of the first spectroscopic analyzer, and using the portfolio sample-based correction(s), the difference between the results for the two analyzers ranged from −0.86 to 0.16. This represents an observed reduction in the difference between the predicted or determined results from the two spectroscopic analyzers. The relatively mild reduction in the difference when compared to the second through fourth spectroscopic analyzers (Analyzer 2, Analyzer 3, and Analyzer 4) may be at least partially attributed the fifth spectroscopic analyzer being a different type of analyzer than the first through fourth spectroscopic analyzers.

TABLE 4

| RON Sample | First-State Analyzer 1 | Analyzer 5 Uncorrected | Difference | Analyzer 5 Corrected | Difference (Corrected) |
|---|---|---|---|---|---|
| A | 92.60 | 94.87 | 2.27 | 92.74 | 0.14 |
| B | 92.72 | 95.01 | 2.29 | 92.88 | 0.16 |
| C | 84.65 | 86.04 | 1.39 | 83.91 | −0.74 |
| D | 84.51 | 86.02 | 1.51 | 83.89 | −0.62 |
| E | 84.35 | 85.72 | 1.37 | 83.59 | −0.76 |
| F | 82.82 | 84.10 | 1.28 | 81.96 | −0.86 |
| G | 85.74 | 87.29 | 1.55 | 85.15 | −0.59 |
| H | 87.19 | 88.92 | 1.73 | 86.79 | −0.4 |
| I | 87.82 | 89.38 | 1.56 | 87.24 | −0.58 |
| J | 89.75 | 91.67 | 1.92 | 89.54 | −0.21 |
| K | 91.08 | 93.14 | 2.06 | 91.01 | −0.07 |

As shown in Table 5 below, when provided with the portfolio sample-based correction(s), the difference between the testing results for MON provided by the first and second spectroscopic analyzers was significantly reduced. For example, with the conventional model transfer, the difference between the results for the two analyzers ranged from 1.3 to 1.5. By comparison, following receipt of the standardized calibration based on the calibration of the first spectroscopic analyzer, and using the portfolio sample-based correction(s), the difference between the results for the two analyzers ranged from −0.08 to 0.13. This represents a reduction in the difference between the predicted or determined results from the two spectroscopic analyzers, showing substantially consistent results between the two spectroscopic analyzers.

TABLE 5

| MON Sample | First-State Analyzer 1 | Analyzer 2 Uncorrected | Difference | Analyzer 2 Corrected | Difference (Corrected) |
|---|---|---|---|---|---|
| A | 86.45 | 87.84 | 1.39 | 86.46 | 0.01 |
| B | 86.47 | 87.82 | 1.35 | 86.44 | −0.03 |
| C | 78.37 | 79.72 | 1.35 | 78.34 | −0.03 |
| D | 78.86 | 80.20 | 1.34 | 78.82 | −0.04 |
| E | 78.35 | 79.83 | 1.48 | 78.45 | 0.10 |
| F | 78.11 | 79.47 | 1.36 | 78.09 | −0.02 |
| G | 79.76 | 81.06 | 1.30 | 79.68 | −0.08 |
| H | 81.38 | 82.79 | 1.41 | 81.41 | 0.03 |
| I | 82.31 | 83.64 | 1.33 | 82.26 | −0.05 |
| J | 83.52 | 85.02 | 1.50 | 83.65 | 0.13 |
| K | 84.97 | 86.43 | 1.46 | 85.06 | 0.09 |

As shown in Table 6 below, when provided with the portfolio sample-based correction(s), the difference between the testing results for MON provided by the first and third spectroscopic analyzers was significantly reduced. For example, with the conventional model transfer, the difference between the predicted or determined results from the two analyzers ranged from 2.96 to 3.41. By comparison, following receipt of the standardized calibration based on the calibration of the first spectroscopic analyzer, and using the portfolio sample-based correction(s), the difference between the results for the two analyzers ranged from −0.48 to −0.02. This represents a reduction in the difference between the predicted or determined results from the two spectroscopic analyzers, showing substantially consistent results between the two spectroscopic analyzers.

TABLE 6

| MON Sample | First-State Analyzer 1 | Analyzer 3 Uncorrected | Difference | Analyzer 3 Corrected | Difference (Corrected) |
|---|---|---|---|---|---|
| A | 86.45 | 89.42 | 2.97 | 85.99 | −0.46 |
| B | 86.47 | 89.43 | 2.96 | 85.99 | −0.48 |
| C | 78.37 | 81.78 | 3.41 | 78.34 | −0.03 |
| D | 78.86 | 82.27 | 3.41 | 78.84 | −0.02 |
| E | 78.35 | 81.76 | 3.41 | 78.32 | −0.03 |
| F | 78.11 | 81.43 | 3.32 | 78.00 | −0.11 |
| G | 79.76 | 83.02 | 3.26 | 79.59 | −0.17 |
| H | 81.38 | 84.67 | 3.29 | 81.23 | −0.15 |
| I | 82.31 | 85.37 | 3.06 | 81.94 | −0.37 |
| J | 83.52 | 86.63 | 3.11 | 83.20 | −0.32 |
| K | 84.97 | 87.97 | 3.00 | 84.54 | −0.43 |

As shown in Table 7 below, when provided with the portfolio sample-based correction(s), the difference between the testing results for MON provided by the first and fourth spectroscopic analyzers was not substantially improved, as the initial difference between the predicted or determined results before correction was small. For example, with the conventional model transfer, the difference between the predicted or determined results from the two analyzers ranged from −0.05 to 0.21. By comparison, following receipt of the standardized calibration based on the calibration of the first spectroscopic analyzer, and using the portfolio sample-based correction(s), the difference between the predicted or determined results from the two analyzers ranged from −0.23 to 0.03.

TABLE 7

| MON Sample | First-State Analyzer 1 | Analyzer 4 Uncorrected | Difference | Analyzer 4 Corrected | Difference (Corrected) |
|---|---|---|---|---|---|
| A | 86.45 | 86.43 | −0.02 | 86.25 | −0.20 |
| B | 86.47 | 86.42 | −0.05 | 86.24 | −0.23 |
| C | 78.37 | 78.57 | 0.20 | 78.39 | 0.02 |
| D | 78.86 | 79.07 | 0.21 | 78.89 | 0.03 |
| E | 78.35 | 78.54 | 0.19 | 78.36 | 0.01 |
| F | 78.11 | 78.28 | 0.17 | 78.09 | −0.02 |
| G | 79.76 | 79.80 | 0.04 | 79.62 | −0.14 |
| H | 81.38 | 81.47 | 0.09 | 81.29 | −0.09 |
| I | 82.31 | 82.26 | −0.05 | 82.08 | −0.23 |
| J | 83.52 | 83.52 | 0.00 | 83.34 | −0.18 |
| K | 84.97 | 84.92 | −0.05 | 84.74 | −0.23 |

As shown in Table 8 below, when provided with the portfolio sample-based correction(s), the difference between the testing results for MON provided by the first and fifth spectroscopic analyzers was reduced. For example, with the conventional model transfer, the difference between the predicted or determined results from the two analyzers ranged from −1.98 to −1.11. By comparison, following receipt of the standardized calibration based on the calibration of the first spectroscopic analyzer, and using the portfolio sample-based correction(s), the difference between the predicted or determined results from the two analyzers ranged from −0.55 to 0.33. This represents a reduction in the difference between the predicted or determined results of the two spectroscopic analyzers, showing substantially consistent results between the two spectroscopic analyzers.

TABLE 8

| MON Sample | First-State Analyzer 1 | Analyzer 5 Uncorrected | Difference | Analyzer 5 Corrected | Difference (Corrected) |
|---|---|---|---|---|---|
| A | 86.45 | 85.31 | −1.14 | 86.74 | 0.29 |
| B | 86.47 | 85.36 | −1.11 | 86.80 | 0.33 |
| C | 78.37 | 76.43 | −1.94 | 77.86 | −0.51 |
| D | 78.86 | 76.99 | −1.87 | 78.43 | −0.43 |
| E | 78.35 | 76.37 | −1.98 | 77.80 | −0.55 |
| F | 78.11 | 76.13 | −1.98 | 77.56 | −0.55 |
| G | 79.76 | 77.91 | −1.85 | 79.35 | −0.41 |
| H | 81.38 | 79.72 | −1.66 | 81.15 | −0.23 |
| I | 82.31 | 80.60 | −1.71 | 82.03 | −0.28 |
| J | 83.52 | 82.13 | −1.39 | 83.56 | 0.04 |
| K | 84.97 | 83.69 | −1.28 | 85.12 | 0.15 |

The graphs shown in FIGS. 12A-12F and FIGS. 13A-13F depict overlaying spectra of a single sample analyzed on five different spectroscopic analyzers (i.e., sample A in each of Tables 1-8). The predicted or determined results are included in Tables 1-8 above.

Figure 12A:
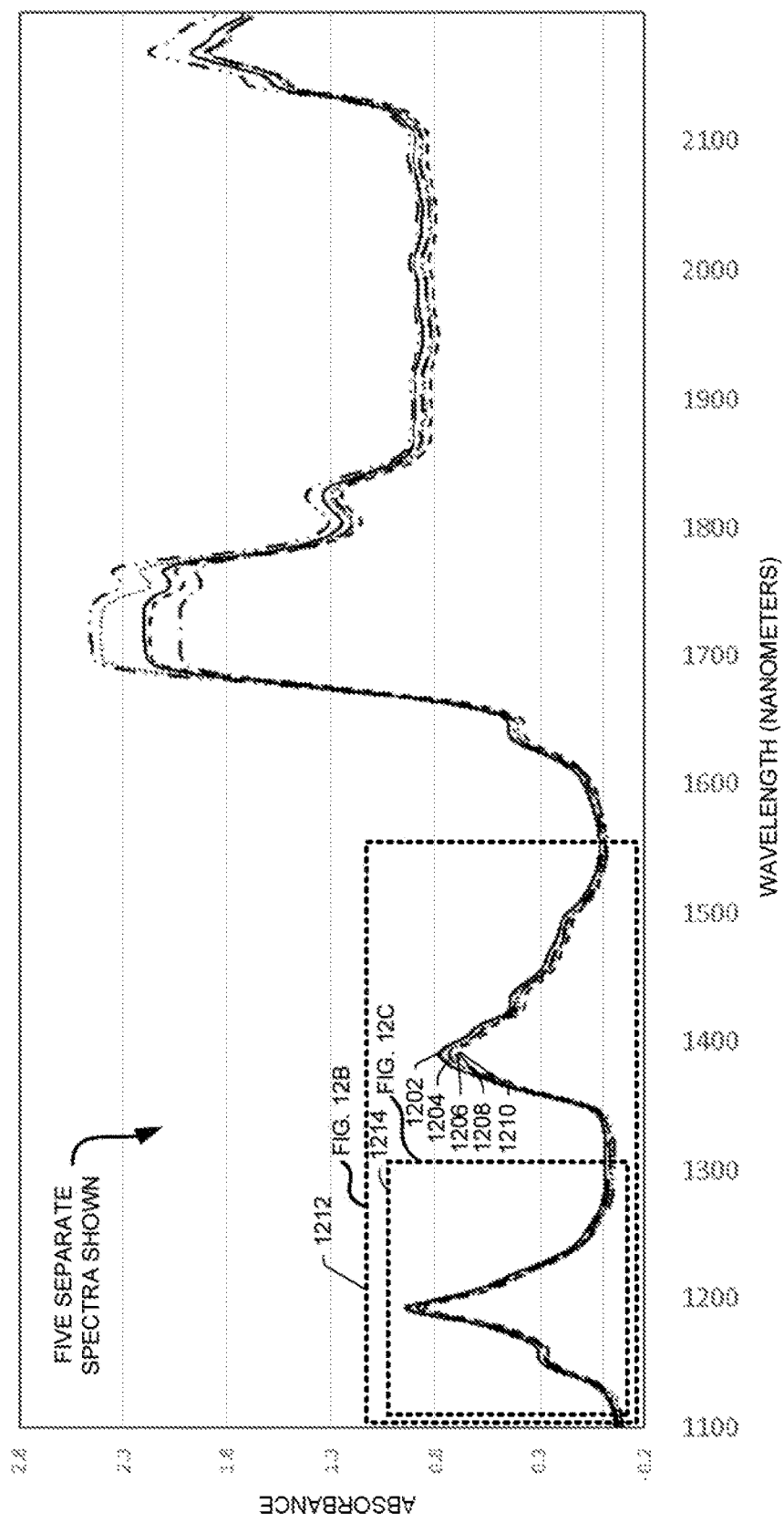
FIG. 12A is a graph illustrating examples of material spectra outputted by respective spectroscopic analyzers of another example multi-component material, gasoline, according to embodiments of the disclosure.

FIG. 12A is a graph 1200 illustrating examples of first through fifth material spectra 1202 through 1210 output by respective first through fifth spectroscopic analyzers of an example multi-component material, gasoline. In this example, the first material spectrum 1202 is a first-state material spectrum output by a first spectroscopic analyzer in the first state. The second through fifth material spectra 1204-1210 are second-state material spectra output by the respective second through fifth spectroscopic analyzers, each in the second state. The first through fourth of the spectroscopic analyzers are of a first type of spectroscopic analyzer, and the fifth spectroscopic analyzer is an analyzer of a different type than the first type of analyzer. The example graph 1200 shows absorbance as a function of wavelength for each of the first through fifth material spectra 1202 through 1210. As shown in FIG. 12A, although the first through fifth spectroscopic analyzers have been calibrated, and the example multi-component material, gasoline, is the same for each spectrum (i.e., taken from the same gasoline sample), the first through fifth material spectra 1202 through 1210 are not the same, exhibiting variance across the range of wavelengths shown.

Figure 12B:
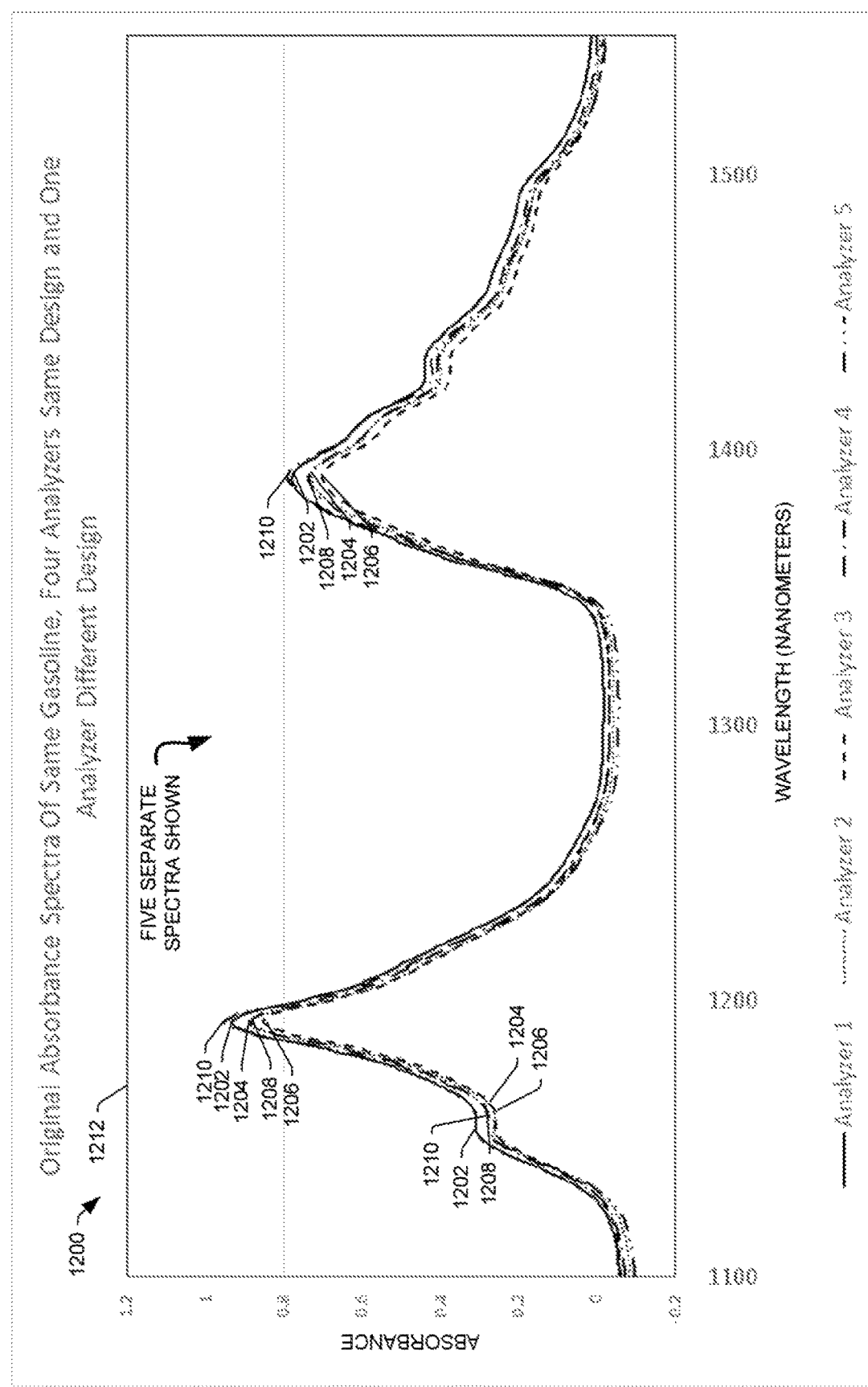
FIG. 12B is a blow-up view of an example range of wavelengths of a portion of the graph shown in FIG. 12A, according to embodiments of the disclosure.

FIG. 12B is a blow-up view of an example range of wavelengths from about 1100 to about 1550 of a portion 1212 of the graph 1200 shown in FIG. 12A, according to embodiments of the disclosure. FIG. 12B highlights the variances between material spectra 1202 through 1210 outputted respectively by the first through fifth spectroscopic analyzers shown in FIG. 12A.

Figure 12C:
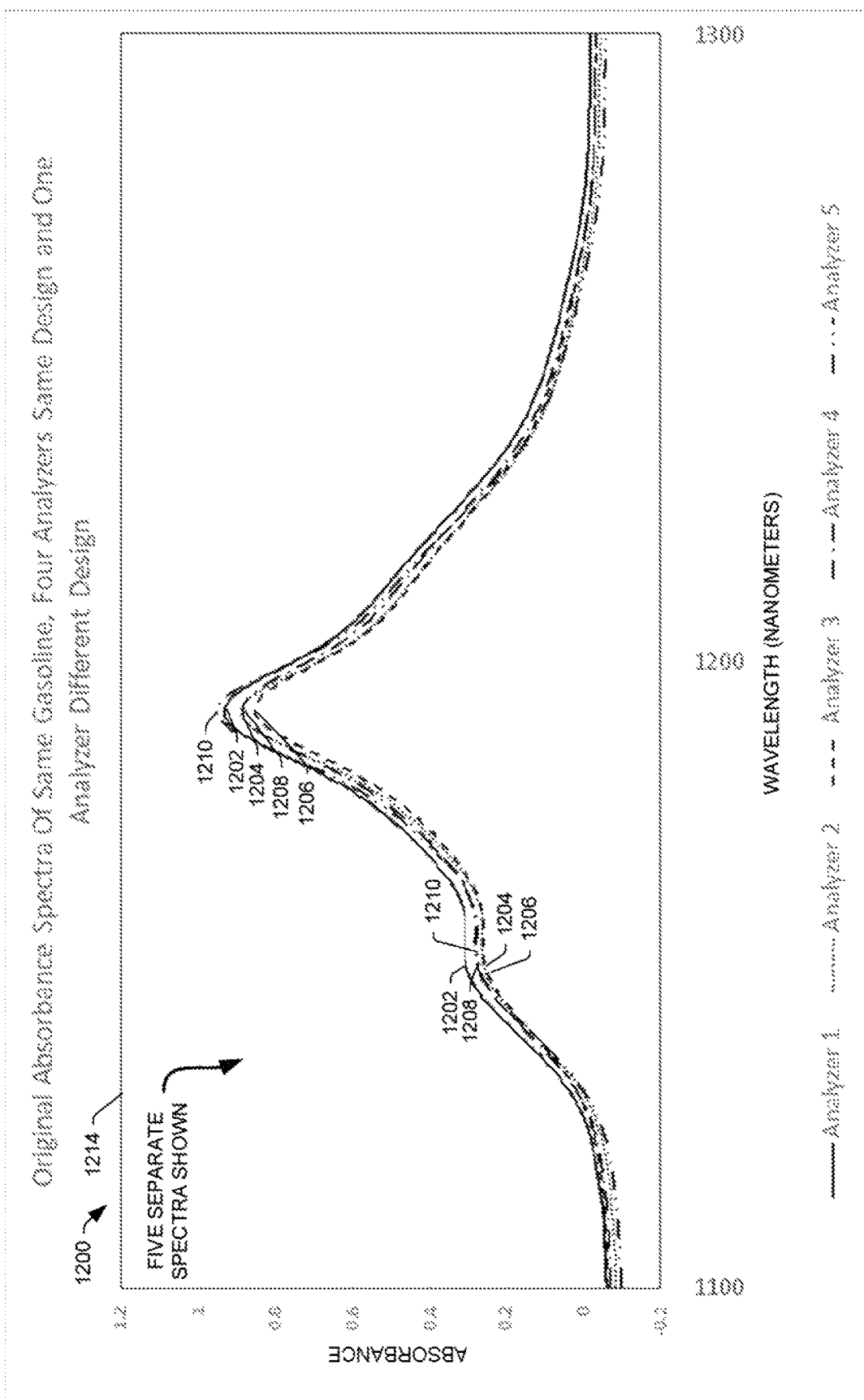
FIG. 12C is a blow-up view of an example range of wavelengths of a portion of the graph shown in FIG. 12A, according to embodiments of the disclosure.

FIG. 12C is a blow-up view of an example range of wavelengths from about 1100 to about 1300 of a portion 1214 of the graph 1200 shown in FIG. 12A, according to embodiments of the disclosure. FIG. 12C further highlights the variances between material spectra 1202 through 1210 outputted respectively by the first through fifth spectroscopic analyzers shown in FIG. 12A.

Figure 12D:
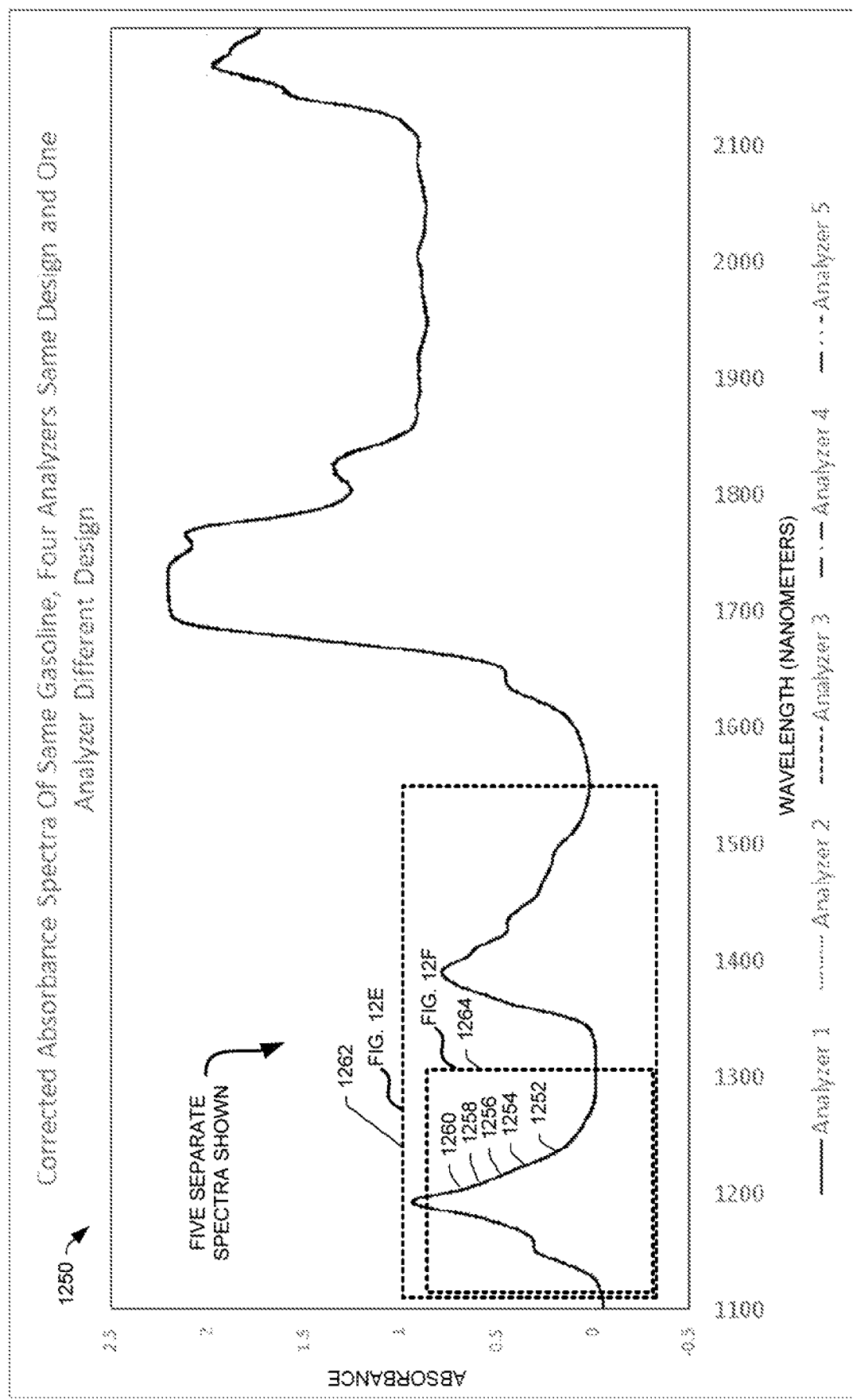
FIG. 12D is a graph illustrating examples of material spectra outputted by a first-state spectroscopic analyzer and multiple second-state spectroscopic analyzers, respectively, of the same example multi-component material of FIGS. 12A-12C, gasoline, corrected to be consistent with the first-state material spectrum, according to embodiments of the disclosure.

FIG. 12D is a graph 1250 illustrating examples of a material spectra 1252 through 1260 outputted by the respective first through fifth spectroscopic analyzers of the same example multi-component material of FIGS. 12A-12C, gasoline, wherein the spectral responses of each of the second through fifth spectroscopic analyzers have been standardized with the spectral response of the first spectroscopic analyzer using respective portfolio sample-based correction(s), according to at least some embodiments described previously herein. As shown in FIG. 12D, the second through fifth spectroscopic analyzers, once provided with the respective portfolio sample-based correction(s), output respective spectra that are generally consistent with the spectrum output by the first spectroscopic analyzer and the respective spectra output by one another (e.g., without significant variance), for example, such the respective spectra 1252 through 1260 are indistinguishable from one another for most wavelengths and/or ranges of wavelengths (e.g., wavelengths and/or ranges of wavelengths that would be applicable as identified by those skilled in the art).

Figure 12E:
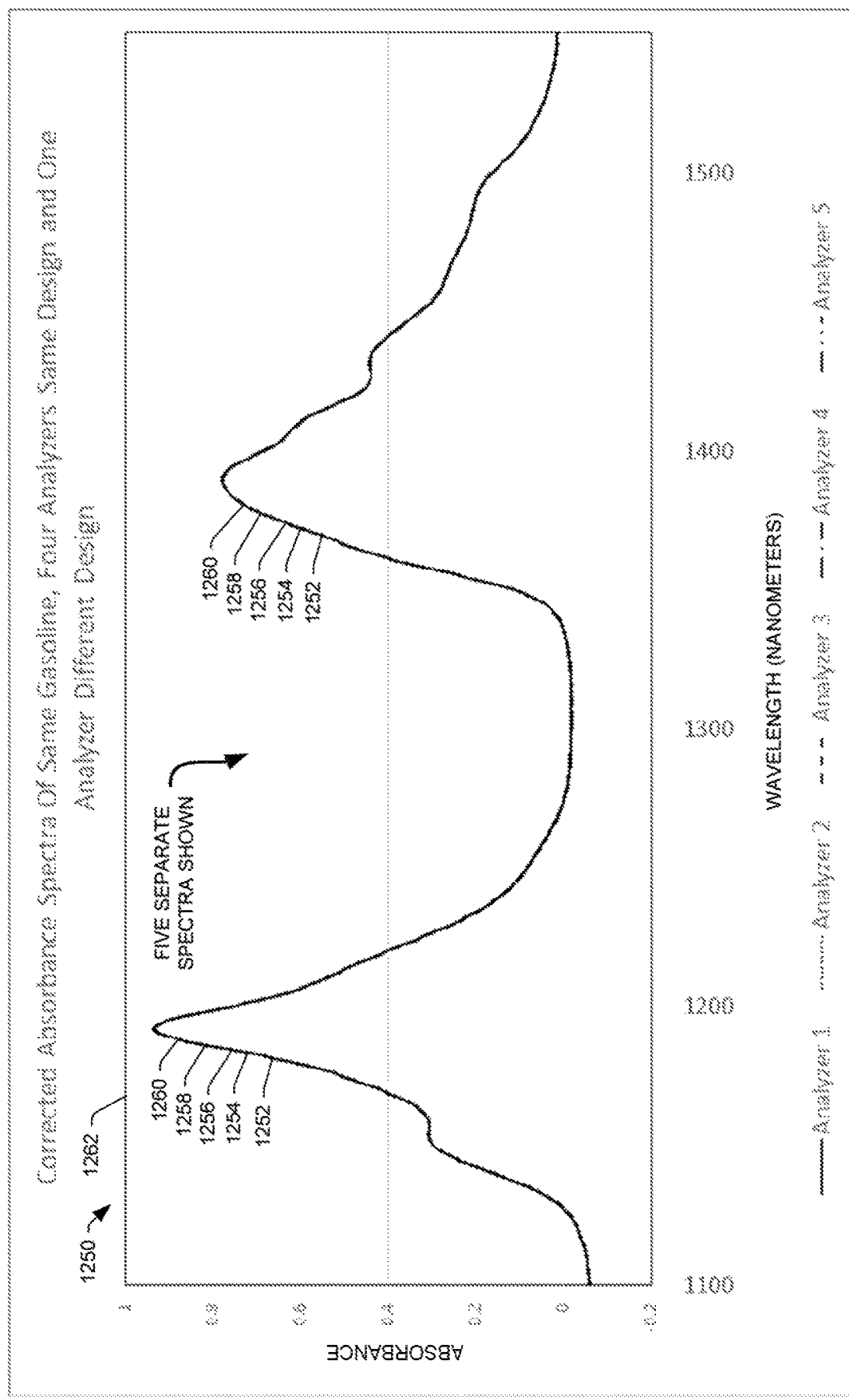
FIG. 12E is a blow-up view of an example range of wavelengths of a portion of the graph shown in FIG. 12D, according to embodiments of the disclosure.

FIG. 12E is a blow-up view of an example range of wavelengths from about 1100 to about 1550 of a portion 1262 of the graph 1250 shown in FIG. 12D, according to embodiments of the disclosure. FIG. 12E highlights the relative lack of variance between material spectra 1252 through 1260 outputted respectively by the first through fifth material spectroscopic analyzers through the range of wavelengths shown in FIG. 12D.

Figure 12F:
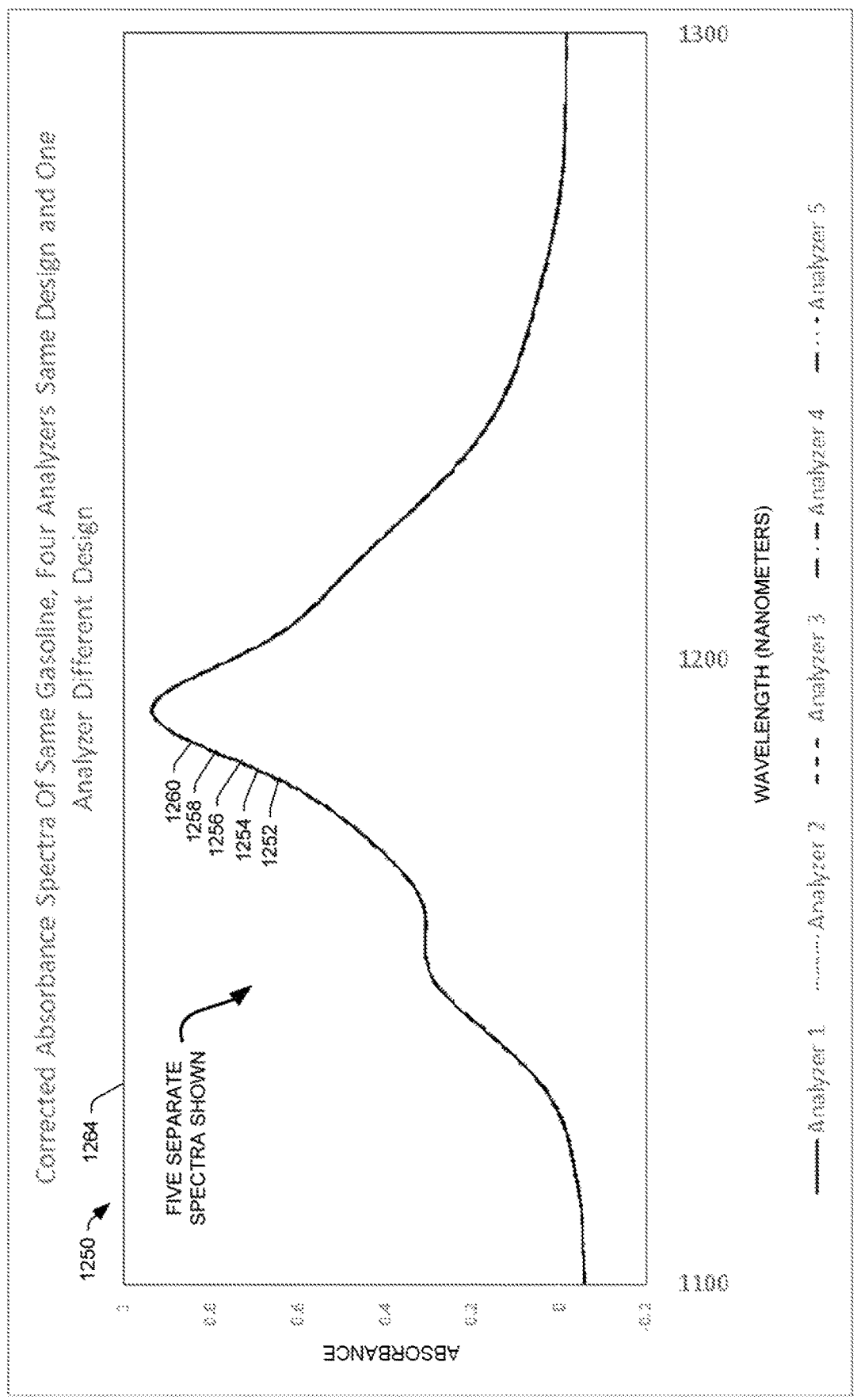
FIG. 12F is a blow-up view of an example range of wavelengths of a portion of the graph shown in FIG. 12D, according to embodiments of the disclosure.

FIG. 12F is a blow-up view of an example range of wavelengths from about 1100 to about 1300 of a portion 1264 of the graph 1250 shown in FIG. 12D, according to embodiments of the disclosure. Once again, FIG. 12F highlights the relative lack of variance between material spectra 1252 through 1260 outputted respectively by the first through fifth spectroscopic analyzers through the range of wavelengths shown in FIG. 12F.

Figure 13A:
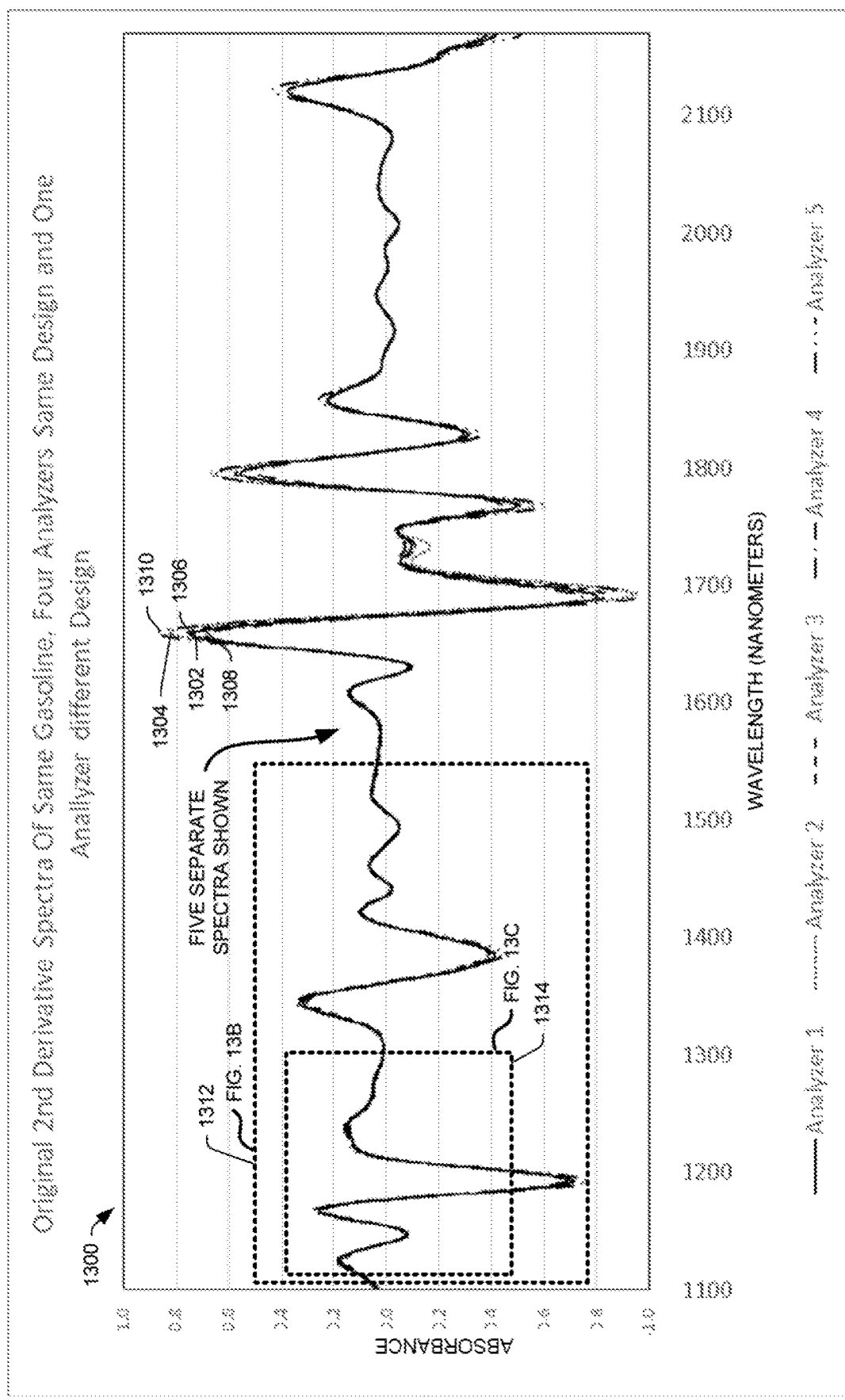
FIG. 13A is a graph illustrating the respective second derivative spectra of the examples of material spectra of FIGS. 12A through 12E outputted by the respective spectroscopic analyzers, according to embodiments of the disclosure.

FIG. 13A is a graph 1300 illustrating the respective second derivative spectra of a material spectra 1202 through 1210 of FIGS. 12A through 12C outputted by the respective first through fifth spectroscopic analyzers. The respective second derivative first through fifth spectra are identified in FIGS. 13A through 13C as 1302 through 1310, respectively. The example graph 1300 shows the second derivative of absorbance as a function of wavelength for each of the material spectra 1302 through 1310 outputted respectively by the first through fifth spectroscopic analyzers. As shown in FIG. 13A, although the first spectroscopic analyzer and respective analyzer controller has been calibrated, and the second through fifth spectroscopic analyzers and respective analyzer controllers have been provided with a common spectral model, and the example multi-component material, gasoline, is the same for each spectrum (i.e., taken from the same gasoline sample), the second derivative first through fifth spectra 1302 through 1310 are not the same, exhibiting variance across the range of wavelengths shown.

Figure 13B:
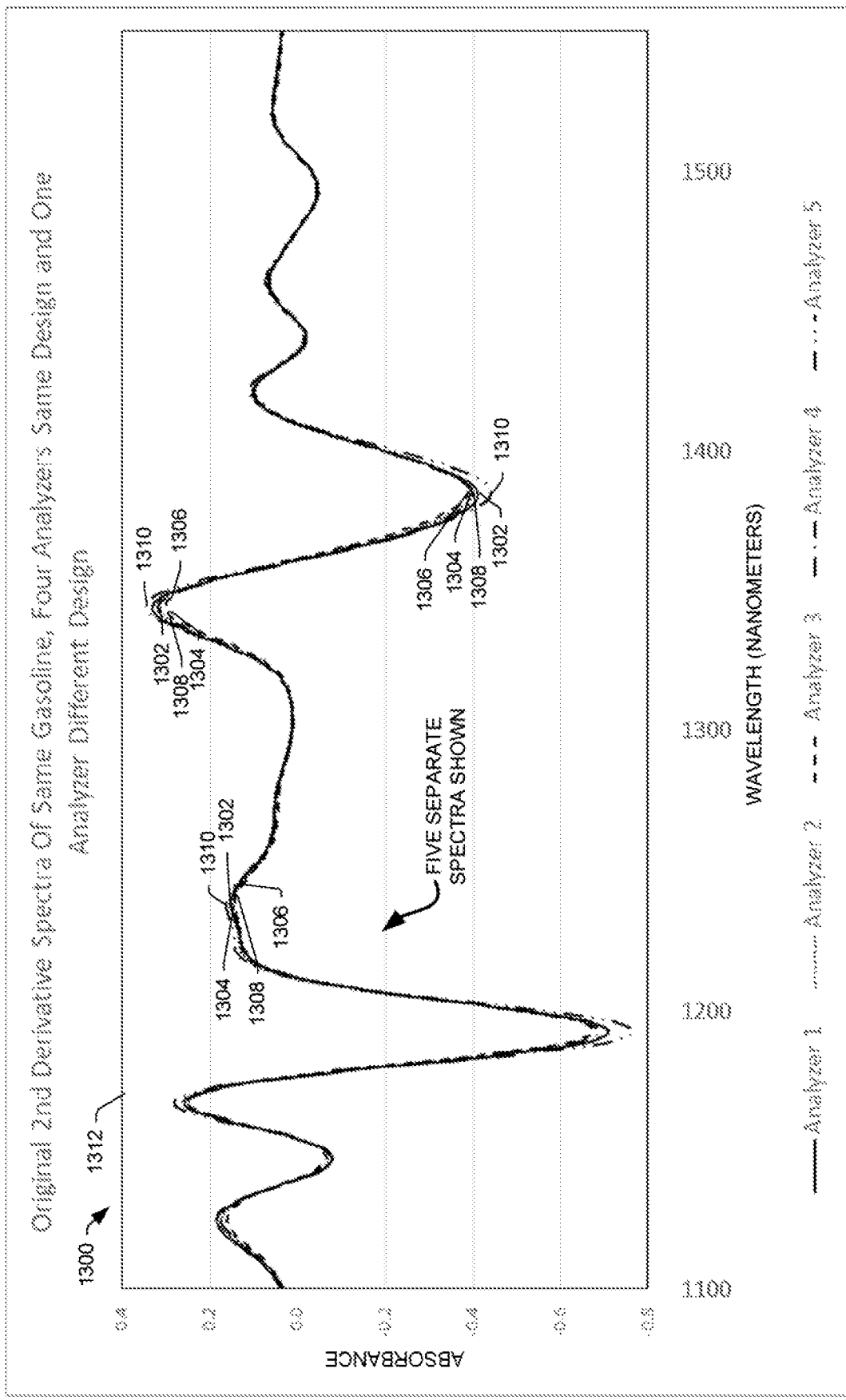
FIG. 13B is a blow-up view of an example range of wavelengths of a portion of the graph shown in FIG. 13A, according to embodiments of the disclosure.

FIG. 13B is a blow-up view of an example range of wavelengths from about 1100 to about 1550 of a portion 1312 of the graph 1300 shown in FIG. 13A, according to embodiments of the disclosure. FIG. 13B highlights the variances between the second derivative of the first through fifth spectra 1302 through 1310 shown in FIG. 13A.

Figure 13C:
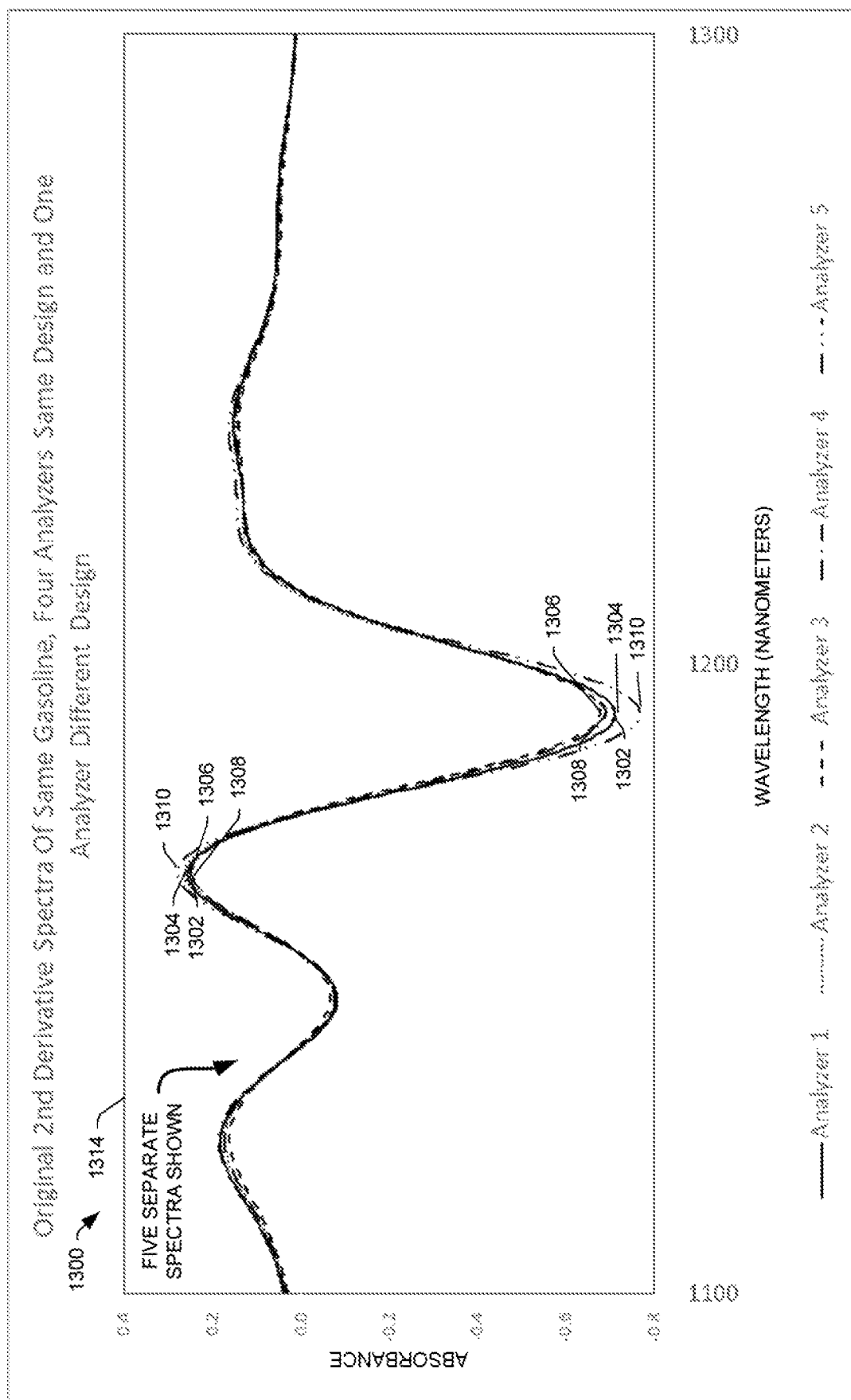
FIG. 13C is a blow-up view of an example range of wavelengths of a portion of the graph shown in FIG. 13A, according to embodiments of the disclosure.

FIG. 13C is a blow-up view of an example range of wavelengths from about 1100 to about 1300 of a portion 1314 of the graph 1300 shown in FIG. 13A, according to embodiments of the disclosure. FIG. 13C further highlights the variances between the second derivative of the first through fifth spectra 1302 through 1310 shown in FIG. 13A.

Figure 13D:
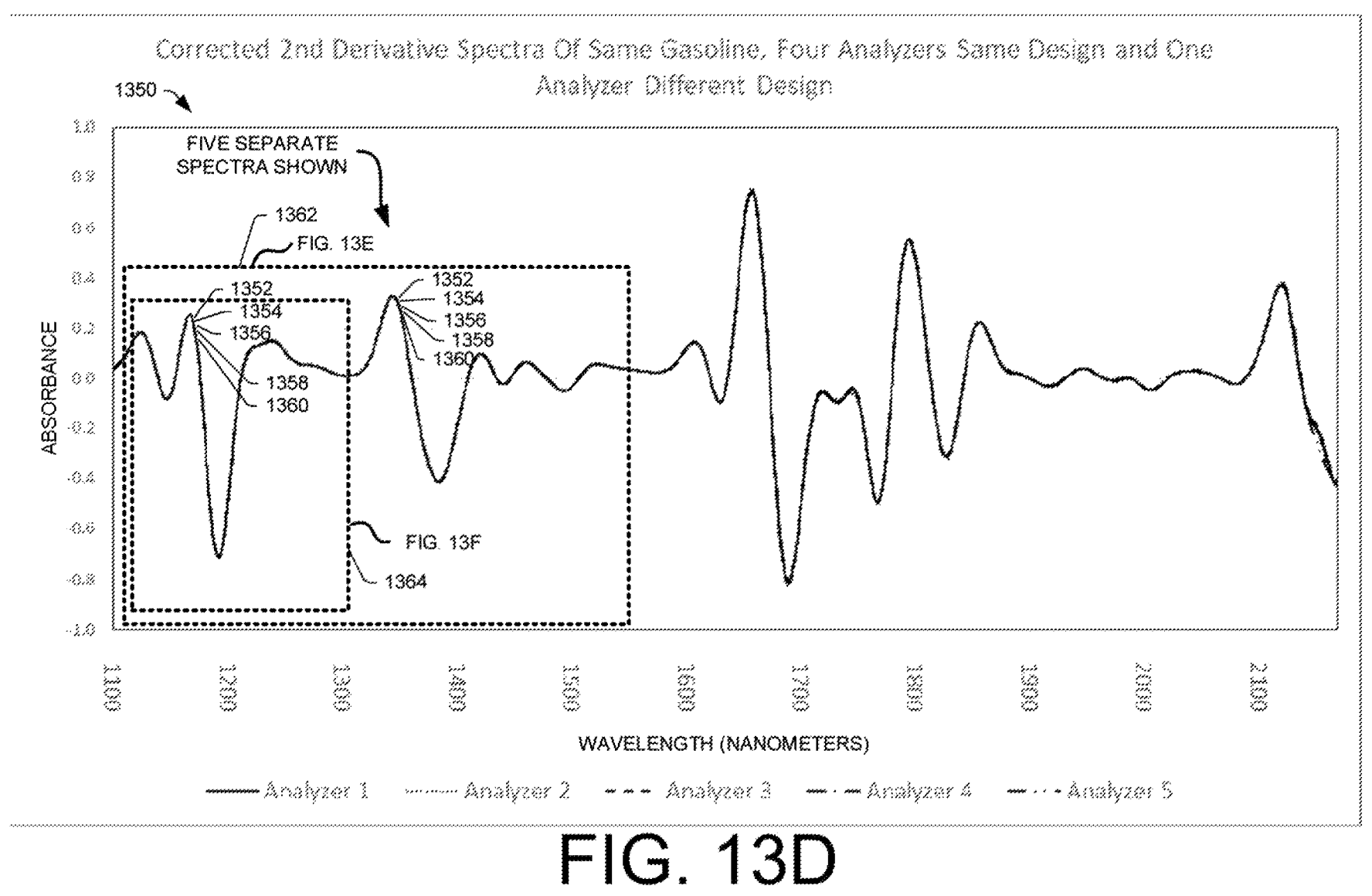

FIG. 13D is a graph 1350 illustrating examples of the second derivative material spectra 1352 through 1360 outputted by respective first through fifth spectroscopic analyzers of the same example multi-component material of FIGS. 13A-13C, gasoline, wherein each of the respective second through fifth spectroscopic analyzers standardized with the spectral response of the first spectroscopic analyzer using respective portfolio sample-based correction(s), according to at least some embodiments described previously herein. As shown in FIG. 13D, the second through fifth spectroscopic analyzers, once provided with the respective portfolio sample-based correction(s), output respective spectra that are generally consistent with the spectrum output by the first spectroscopic analyzer and the respective spectra output by one another, for example, such the respective spectra 1352 through 1360 are indistinguishable from one another for most wavelengths and/or ranges of wavelengths (e.g., wavelengths and/or ranges of wavelengths that would be applicable as identified by those skilled in the art).

Figure 13E:
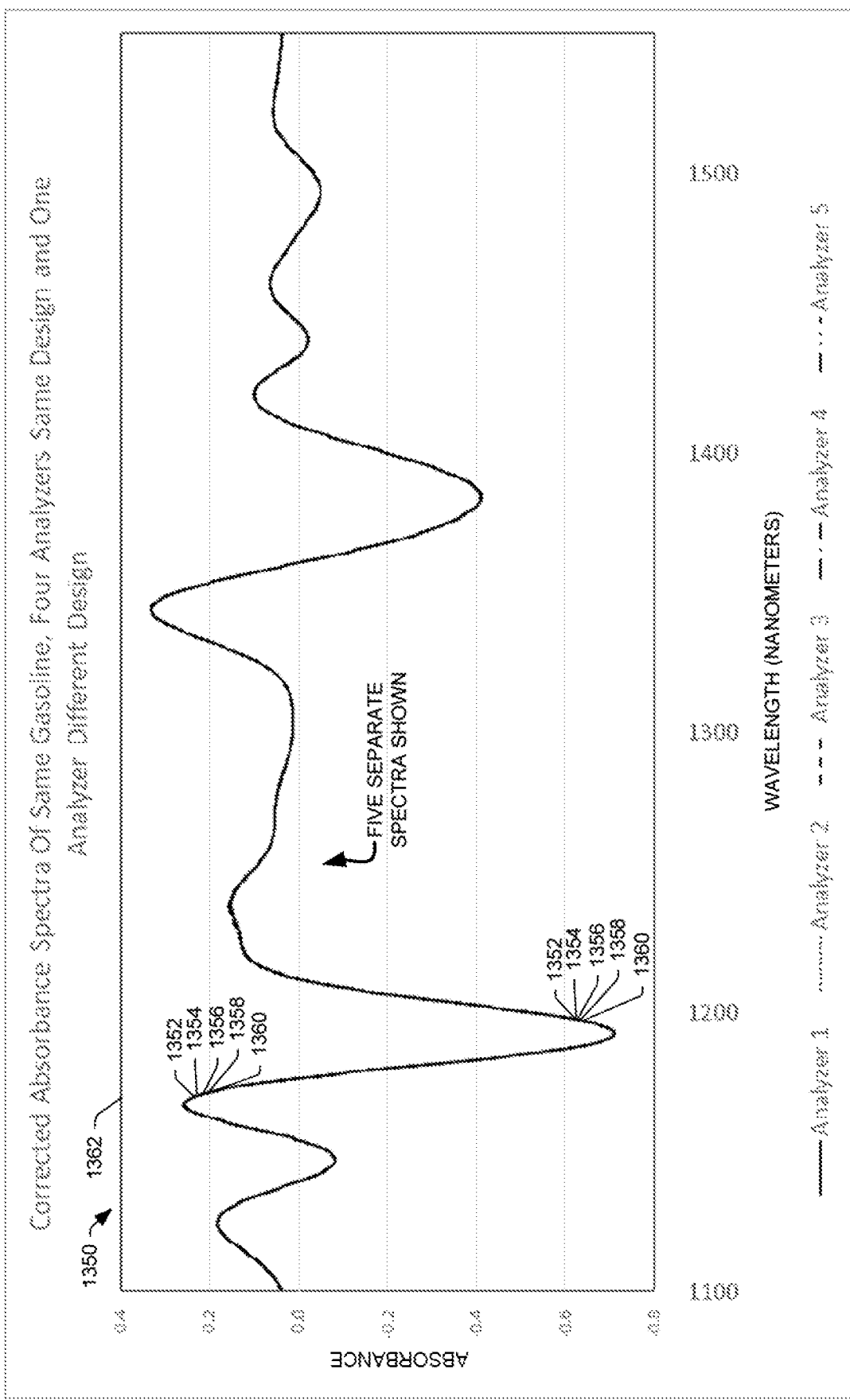
FIG. 13E is a blow-up view of an example range of wavelengths of a portion of the graph shown in FIG. 13D, according to embodiments of the disclosure.

FIG. 13E is a blow-up view of an example range of wavelengths from about 1100 to about 1550 of a portion 1362 of the graph 1350 shown in FIG. 13D, according to embodiments of the disclosure. FIG. 13E highlights the relative lack of variance between the second derivative first through fifth spectra 1352 through 1360 through the range of wavelengths shown in FIG. 13D.

Figure 13F:
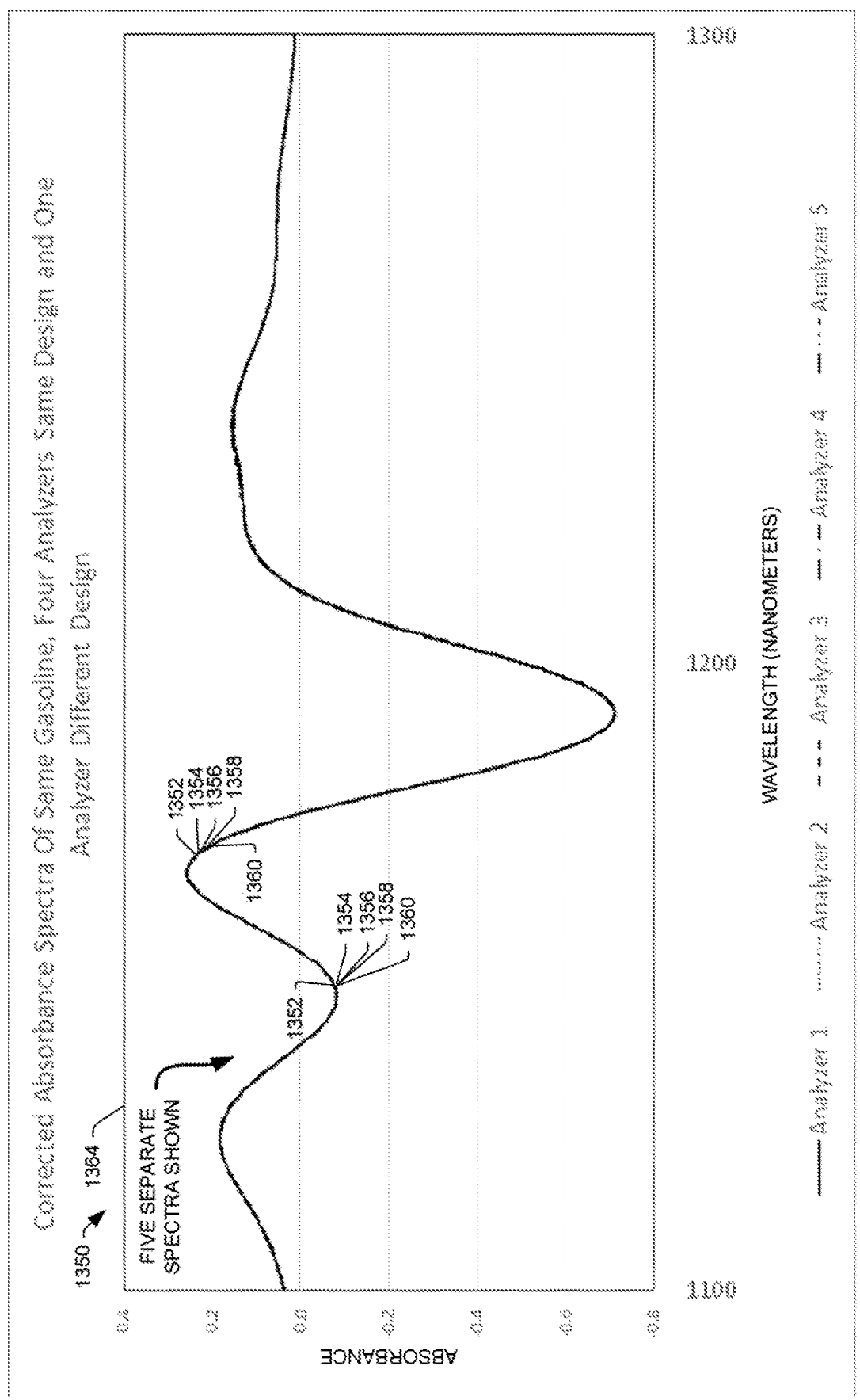
FIG. 13F is a blow-up view of an example range of wavelengths of a portion of the graph shown in FIG. 13D, according to embodiments of the disclosure.

FIG. 13F is a blow-up view of an example range of wavelengths from about 1100 to about 1300 of a portion 1364 of the graph 1350 shown in FIG. 13D, according to embodiments of the disclosure. Once again, FIG. 13F highlights the relative lack of variance between the second derivative first through fifth spectra 1352 through 1360 through the range of wavelengths shown in FIG. 13F.

FIGS. 14A, 14B, 15A, 15B, 16A, 16B, and 16C are process flow diagrams illustrating example processes for determining and using standardized analyzer spectral responses for calibration of one or more spectroscopic analyzers according to embodiments of the disclosure, illustrated as collections of blocks in logical flow graphs, which represent respective example sequences of operations. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

Figure 14A:
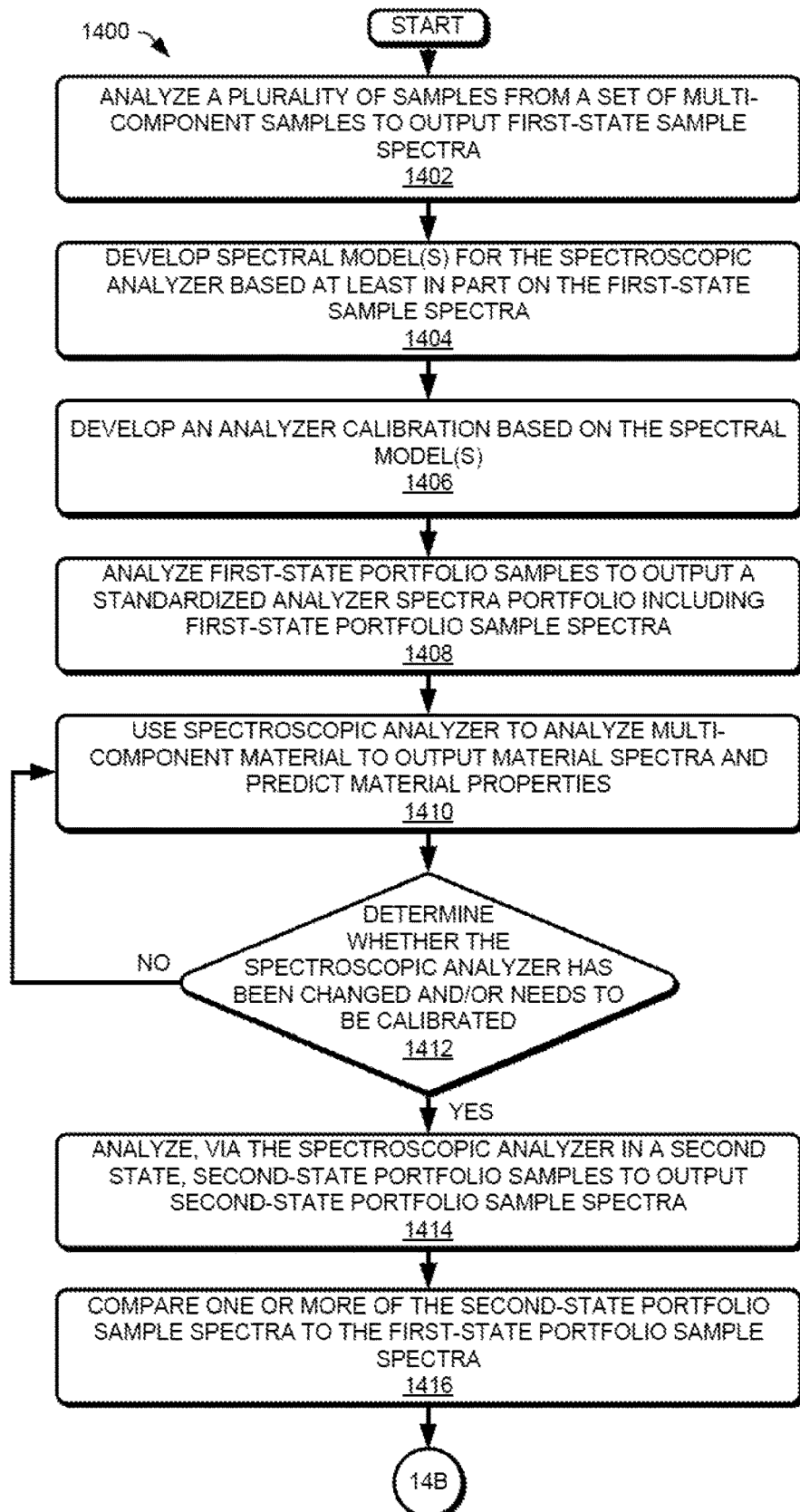
FIG. 14A and FIG. 14B show a block diagram of an example method for determining and using standardized analyzer spectral responses for calibration of a spectroscopic analyzer when a spectroscopic analyzer changes from a first state to a second state, according to embodiments of the disclosure.
Figure 14B:
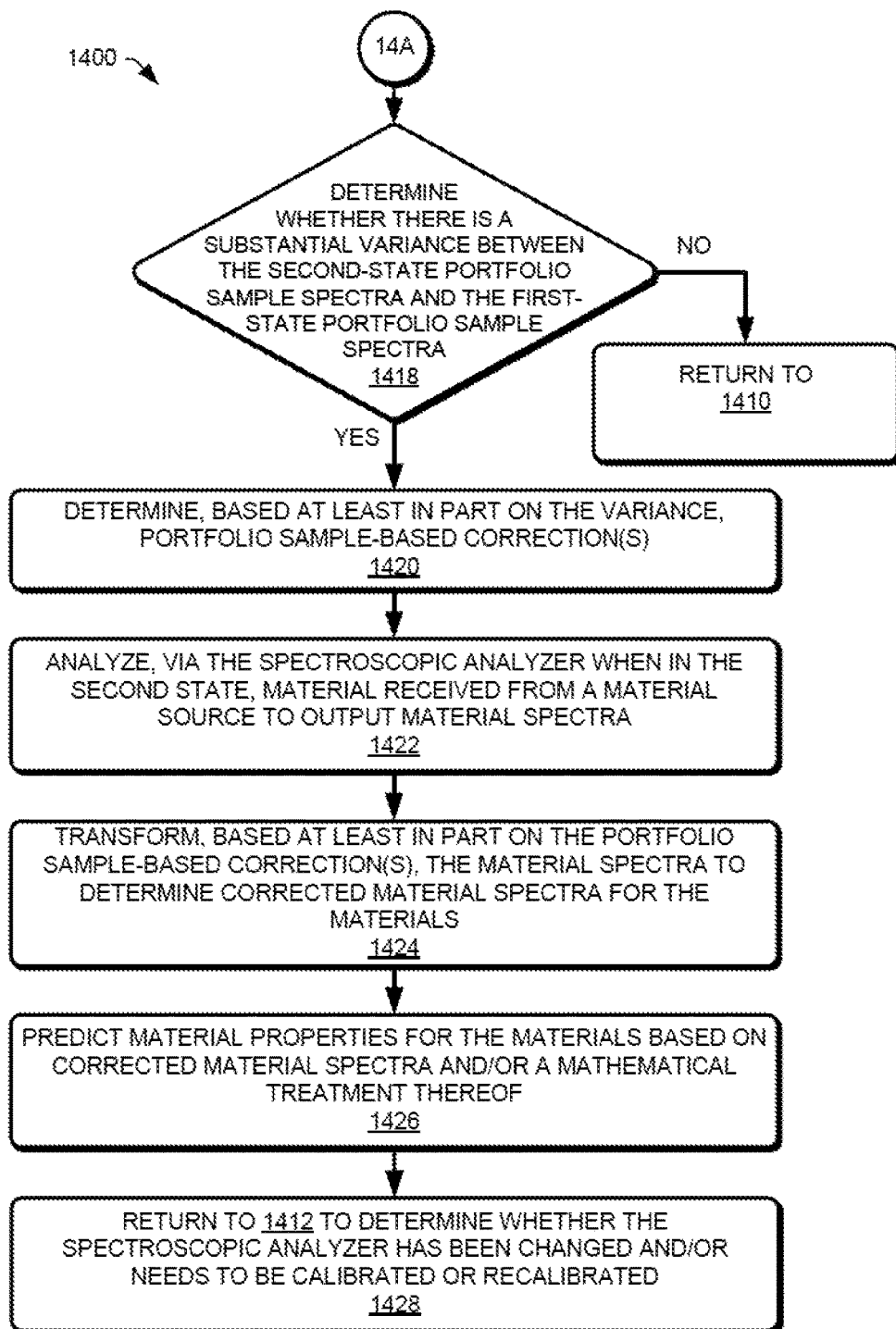

FIG. 14A and FIG. 14B show a block diagram of an example method 1400 for determining and using standardized analyzer spectral responses for calibration of a spectroscopic analyzer when a spectroscopic analyzer changes from a first state to a second state according to embodiments of the disclosure.

As shown in FIG. 14A, at 1402, the example process 1400 may include analyzing, via the spectroscopic analyzer, a plurality of samples from a set of multi-component samples to output first-state sample spectra, for example, as previously described herein.

The example process 1400, at 1404, may further include developing one or more spectral models for the spectroscopic analyzer based at least in part on the first-state sample spectra and corresponding sample data, for example, as previously described herein.

At 1406, the example process 1400 still further may include outputting or developing an analyzer calibration based at least in part on the spectral model(s), for example, as previously described herein. In some examples, development of the spectral models and development of the analyzer calibration may be substantially concurrent and/or indistinguishable from one another.

The example process 1400, at 1408, also may include analyzing first-state portfolio samples to output a standardized analyzer spectra portfolio including one or more first-state portfolio sample spectra, for example, as previously described herein.

At 1410, the example process 1400 further may include using the spectroscopic analyzer to analyze multi-component material to output material spectra and predict material properties associated with the analyzed multi-component material, for example, as previously described herein.

The example process 1400, at 1412, still further may include determining whether the spectroscopic analyzer has been changed and/or needs to be calibrated or recalibrated, for example, as previously described herein. If at 1412 it is determined that the spectroscopic analyzer has not been changed and/or does not need calibration or recalibration, the example process 1400 may return to 1410 to be used to analyze multi-component materials. If at 1412 it is determined that the spectroscopic analyzer has been changed and/or needs calibration or recalibration, the example process 1400 may proceed to 1414 (see FIG. 14A) for calibration or recalibration of the spectroscopic analyzer.

At 1414, the example process 1400 further may include analyzing, via the spectroscopic analyzer in a second state, second-state portfolio samples to output second-state portfolio sample spectra, for example, as previously described herein.

The example process 1400, at 1416, also may include comparing one or more of the second-state portfolio sample spectra to the first-state portfolio sample spectra (see FIG. 14A, 1408), for example, as previously described herein.

As shown in FIG. 14B, which depicts an example continuation of the example process 1400 shown in FIG. 14A, at 1418, the example process 1400 further may include determining whether there is a substantial variance between the second-state portfolio sample spectra and the first-state portfolio sample spectra, for example, as previously described herein. In some embodiments, the variance may be determined over one or more ranges of wavelengths, ranges of frequencies, and/or ranges of wavenumbers between the second-state portfolio sample spectra and the first-state portfolio sample spectra.

If at 1418, it is determined that there is no substantial variance, the example process 1400 may return to 1410 (see FIG. 14A), and the spectroscopic analyzer may be used to analyze multi-component materials. If at 1418, it is determined that there is a substantial variance, the example process 1400 may proceed to 1420.

The example process 1400, at 1420, may include determining and/or outputting, based at least in part on the variance between the second-state portfolio sample spectra and the first-state portfolio sample spectra, portfolio sample-based correction(s) to reduce the variance between the second-state portfolio sample spectra and the first-state portfolio sample spectra, for example, as previously described herein.

At 1422, the example process 1400 also may include analyzing, via the spectroscopic analyzer when in the second state, material (e.g., multi-component material) received from a material source to output material spectra, for example, as previously described herein.

At 1424, the example process 1400 further may include transforming, based at least in part on the portfolio sample-based correction(s), the material spectra to determine corrected material spectra for the materials, for example, as previously described herein.

The example process 1400, at 1426 also may include predicting one or more material properties for the materials based at least in part on the corrected material spectra and/or a mathematical treatment thereof, for example, as previously described herein.

At 1428, the example process 1400 further may include returning to 1412 (see FIG. 14A) to determine whether the spectroscopic analyzer has been changed and/or needs to be calibrated or recalibrated, for example, as previously described herein.

Figure 15A:
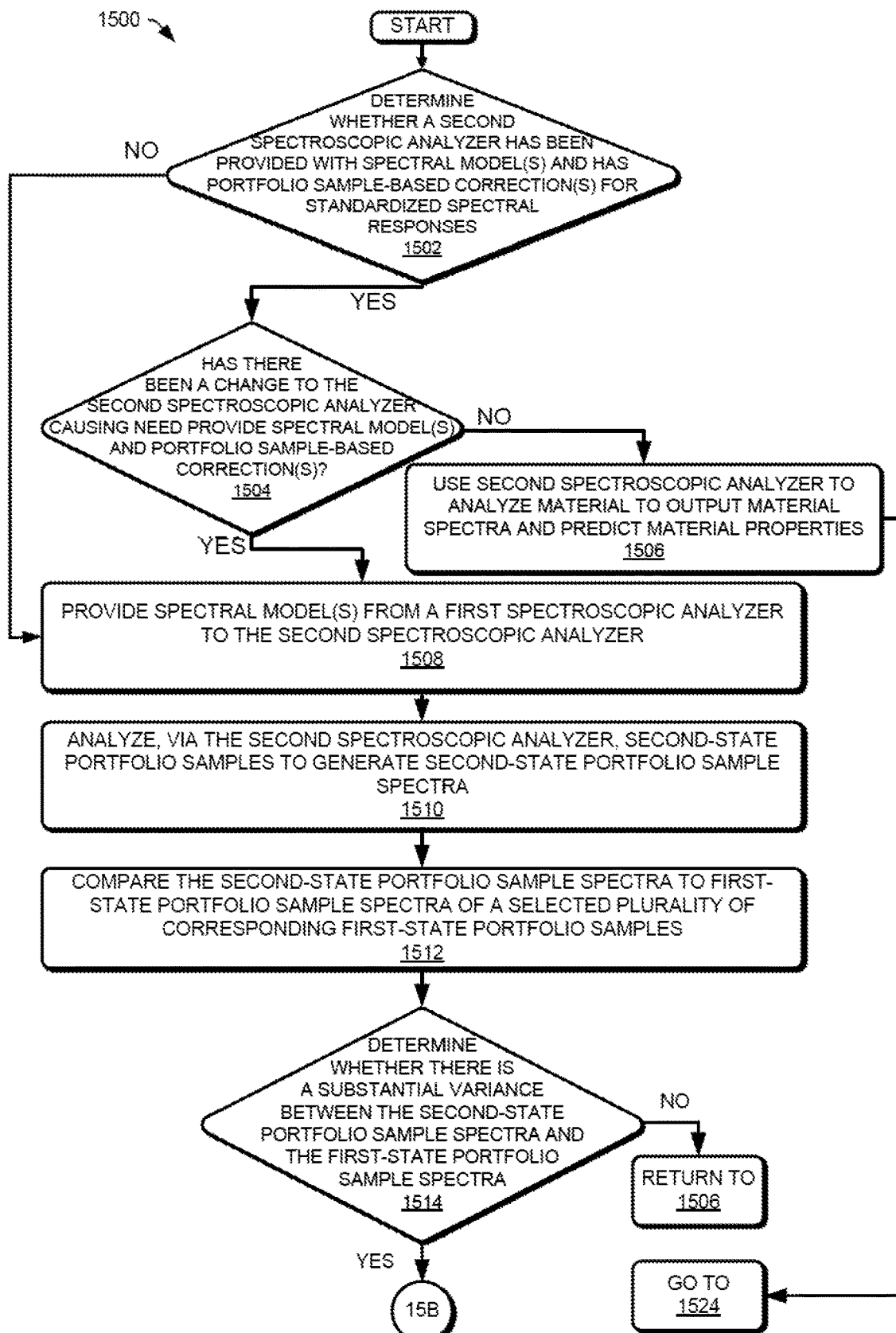
FIG. 15A and FIG. 15B show a block diagram of an example method for using standardized analyzer spectral responses from a first spectroscopic analyzer for calibration of a second spectroscopic analyzer, according to embodiments of the disclosure.
Figure 15B:
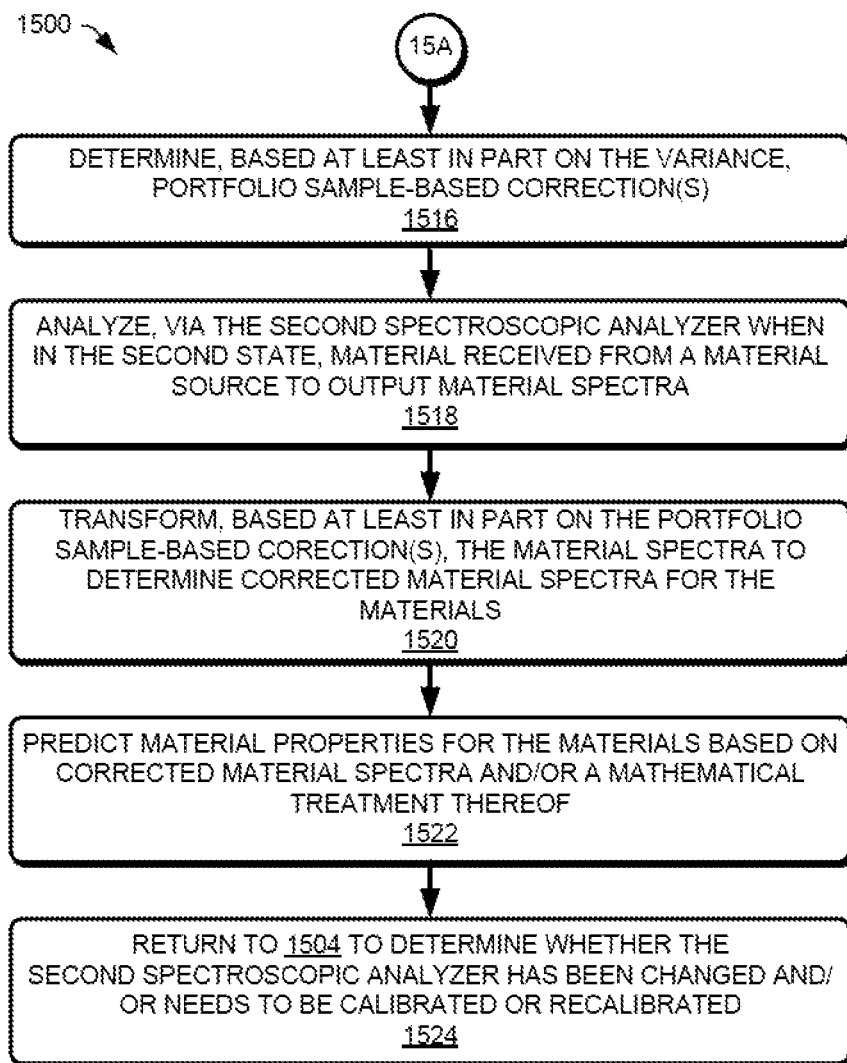

FIG. 15A and FIG. 15B show a block diagram of an example method 1500 for using standardized analyzer spectral responses from a first spectroscopic analyzer for calibration or recalibration of a second spectroscopic analyzer in the second state according to embodiments of the disclosure.

As shown in FIG. 15A, at 1502, the example process 1500 may include determining whether a second spectroscopic analyzer has been provided with spectral mode(s) and has portfolio sample-based correction(s), so that spectral responses of the second spectroscopic analyzer are standardized with the spectral responses of a first spectroscopic analyzer (and/or other spectroscopic analyzers), for example, as previously described herein. For example, a first spectroscopic analyzer may be calibrated and may have standardized spectral responses based on analysis of first-state portfolio samples, as previously described herein. In some embodiments, the example process 1500 may include using the standardized spectral responses of the first spectroscopic analyzer to standardize the spectral responses of a second spectroscopic analyzer using portfolio sample-based correction(s), for example, as previously described herein.

If at 1502, it is determined that the second spectroscopic analyzer has been provided with spectral model(s) and has portfolio sample-based correction(s), so that spectral responses of the second spectroscopic analyzer are standardized with the spectral responses of a first spectroscopic analyzer, the example process 1500, at 1504, may include determining whether there has been a change to the second spectroscopic analyzer causing a need to provide the second spectroscopic analyzer with spectral model(s) and/or to develop portfolio sample-based correction(s) for the second spectroscopic analyzer, for example, as previously described herein. If at 1504, it is determined that there has not been such a change, at 1506, the example process 1500 may include using the second spectroscopic analyzer to analyze material to output material spectra and predict material properties based at least in part of the material spectra, for example, as previously described herein. Thereafter, the example process 1500 may include proceeding to 1524 (see FIG. 15B) to determine whether the second spectroscopic analyzer has been changed and/or needs to be provided with spectral model(s) and/or needs to develop portfolio sample-based correction(s), which may include returning to 1504 (see FIG. 15A). If at 1502, it is determined that the second spectroscopic analyzer needs spectral model(s) and/or needs to develop portfolio sample-based correction(s), the example process 1500, may proceed to 1508.

If at 1504, it is determined that there has been a change, at 1508, the example process 1500 may include providing spectral model(s), for example, from a first spectroscopic analyzer to the second spectroscopic analyzer, for example, as previously described herein.

At 1510, the example process 1500 also may include analyzing, via the second spectroscopic analyzer, second-state portfolio samples to output second-state portfolio sample spectra, for example, as previously described herein.

The example process 1500, at 1512, further may include comparing the second-state portfolio sample spectra to first-state portfolio sample spectra of a selected plurality of corresponding first-state portfolio samples analyzed by the first spectroscopic analyzer, for example, as previously described herein.

At 1514, the example process 1500 also may include determining whether there is a substantial variance between the second-state portfolio sample spectra and the first-state portfolio sample spectra, for example, as previously described herein. If at 1514 it is determined that there is no substantial variance, the example process 1500 may include returning to 1506 and using the second spectroscopic analyzer to analyze material, output material spectra, and predict material properties based at least in part on the material spectra, for example, as previously described herein. If at 1514 it is determined that there is a substantial variance, the example process 1500 may include proceeding to 1516 (see FIG. 15B).

As shown in FIG. 15B, which depicts an example continuation of the example process 1500 shown in FIG. 15A, at 1516, the example process 1500 still further may include determining and/or outputting portfolio sample-based correction(s) based at least in part on the standardized analyzer spectra portfolio to reduce the variance. For example, as previously described herein, the first spectroscopic analyzer may have analyzed one or more first-state portfolio samples to output a plurality of respective first-state portfolio sample spectra, which may be collected to form a standardized analyzer spectra portfolio. In some embodiments, the standardized analyzer spectra portfolio may be transferred to the second spectroscopic analyzer and may be used to determine portfolio sample-based corrections, for example, as previously described herein. For example, the second spectroscopic analyzer may analyze one or more second-state portfolio samples, which, in some examples, may be the same as the first-state portfolio samples analyzed by the first spectroscopic analyzer to develop the standardized analyzer spectra portfolio, which includes the first-state portfolio spectra. A variance, if any, may be determined between the second state portfolio spectra (output by the second spectroscopic analyzer) and respective first-state portfolio spectra (output by the first spectroscopic analyzer), and the variance may be used to determine and/or output portfolio sample-based corrections for the second spectroscopic analyzer.

At 1518, the example process 1500 also may include analyzing, via the second spectroscopic analyzer when in the second state, material received from a material source to output material spectra, for example, as previously described herein.

The example process 1500, at 1520, still further may include transforming, based at least in part on the portfolio sample-based correction(s), the material spectra to determine corrected material spectra for the materials, for example, as previously described herein.

At 1522, the example process 1500 also may include predicting material properties for the materials based at least in part on the corrected material spectra and/or a mathematical treatment thereof, for example, as previously described herein.

At 1524, the example process 1500 also may include returning to 1504 (see FIG. 15A) to determine whether the second spectroscopic analyzer has been changed and/or needs to be calibrated or recalibrated, for example, as previously described herein.

Figure 16A:
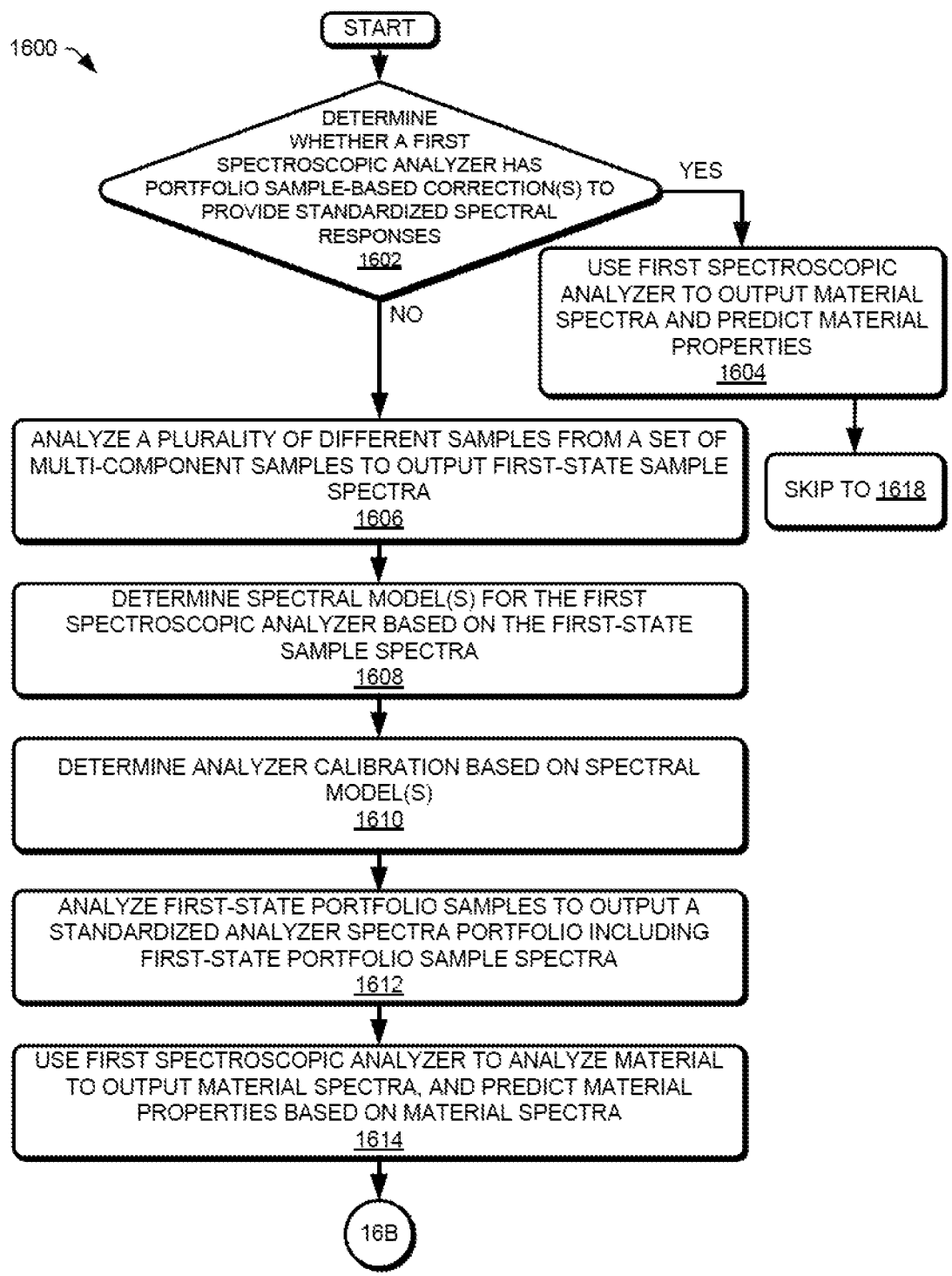
FIG. 16A, FIG. 16B, and FIG. 16C show a block diagram of an example method for determining and using standardized analyzer spectral responses to calibrate a plurality of spectroscopic analyzers, such that for a given material each of the plurality of spectroscopic analyzers outputs a plurality of signals indicative of a plurality of material properties of the material that are consistent with one another, according to embodiments of the disclosure.
Figure 16B:
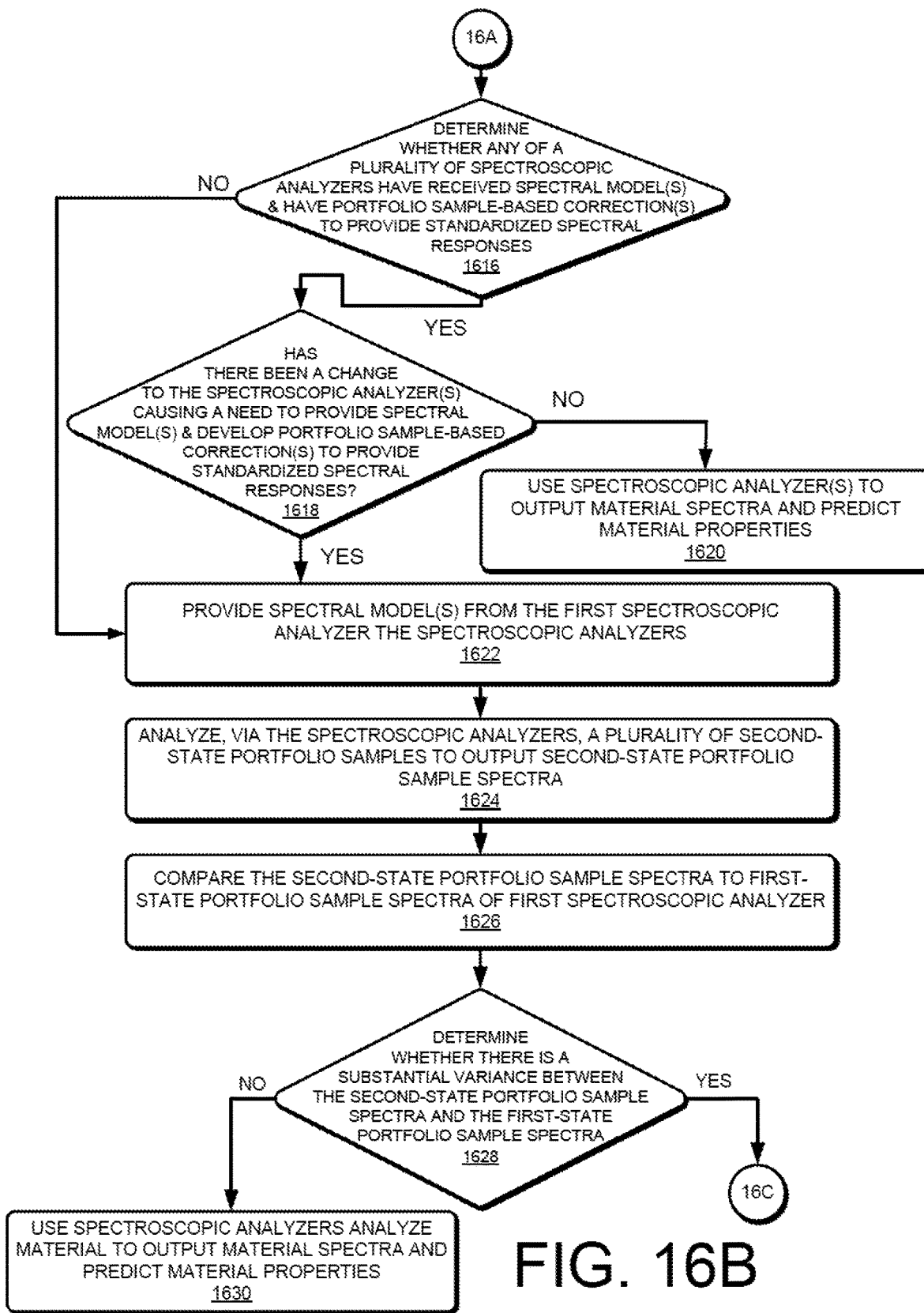
Figure 16C:
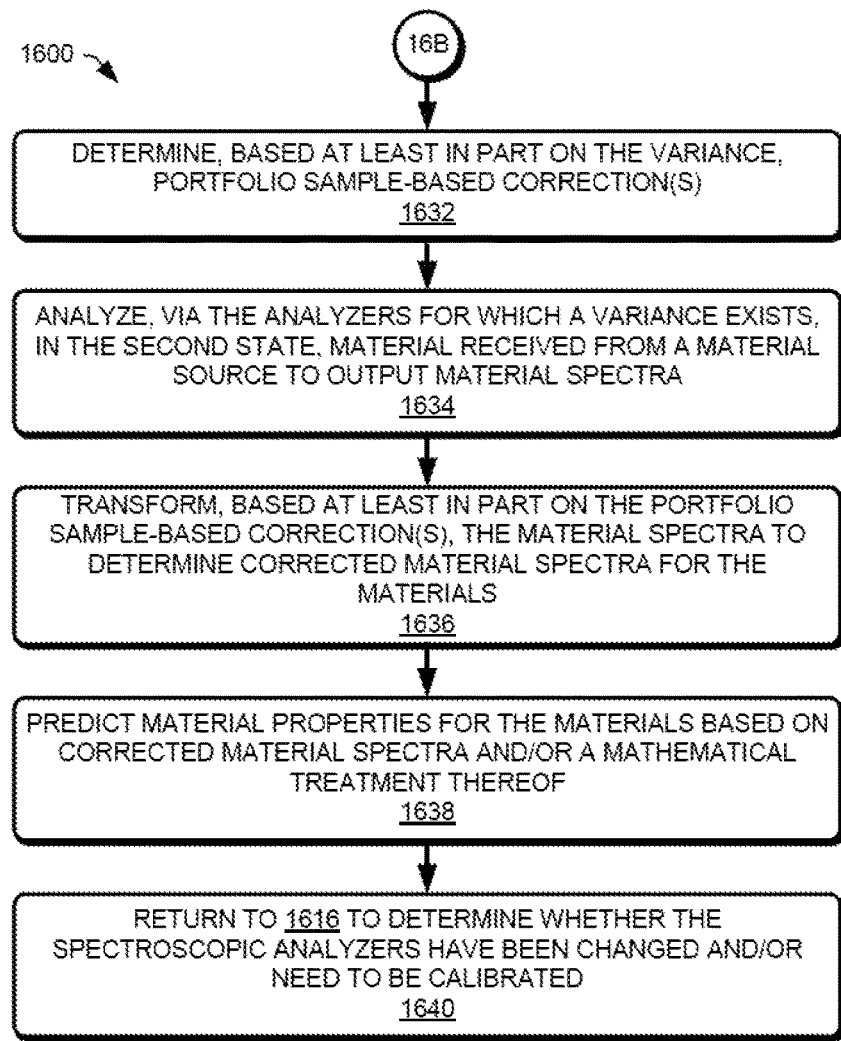

FIG. 16A, FIG. 16B, and FIG. 16C show a block diagram of an example method 1600 for determining and using standardized analyzer spectral responses for calibration of a plurality of spectroscopic analyzers, such that for a given material each of the plurality of spectroscopic analyzers outputs respective spectral responses, based at least in part on which a plurality of material properties of the material may be predicted or determined that are substantially consistent with one another according to embodiments of the disclosure.

As shown in FIG. 16A, at 1602, the example process 1600 may include determining whether a first spectroscopic analyzer has been calibrated and has analyzed first-state portfolio samples to develop portfolio sample-based correction(s) (e.g., by analyzing the first-state portfolio samples), so that spectral responses of the first spectroscopic analyzer are standardized, for example, as previously described herein. For example, a first spectroscopic analyzer may be calibrated, as previously described herein. In some embodiments, the example process 1600 may include using the standardized spectral responses of the first spectroscopic analyzer to calibrate and/or standardize the spectral responses of a plurality of spectroscopic analyzers (e.g., using the portfolio sample-based correction(s)) to provide respective corrected standardized spectral responses, for example, as previously described herein.

If at 1602, it is determined that the first spectroscopic analyzer (e.g., in the second state) has developed portfolio sample-based correction(s) (e.g., by analyzing first-state portfolio samples), so that spectral responses of the first spectroscopic analyzer are standardized, at 1604, the example process 1600 may include using the first spectroscopic analyzer to output material spectra and predict material properties, for example, as previously described herein. Thereafter, in some embodiments, the example process 1600 may proceed to 1618 (see FIG. 16B).

If at 1602, it is determined that the first spectroscopic analyzer has not been provided with portfolio sample-based correction(s), and the spectral responses of the first spectroscopic analyzer have not been standardized, at 1604, the example process 1600 may include analyzing, via the first spectroscopic analyzer, a plurality of different samples from a set of multi-component samples to output first-state sample spectra, for example, as previously described herein.

At 1608, the example process 1600 also may include determining one or more spectral models for the first spectroscopic analyzer based at least in part on the first-state sample spectra and corresponding sample data, for example, as previously described herein.

The example process 1600, at 1610, also may include determining the analyzer calibration based at least in part on the one or more spectral models, for example, as previously described herein. In some examples, development of the spectral models and development of the analyzer calibration may be substantially concurrent and/or substantially indistinguishable from one another.

At 1612, the example process 1600 further may include analyzing, via the first spectroscopic analyzer, first-state portfolio samples to output a standardized analyzer spectra portfolio including first-state portfolio sample spectra, for example, as previously described herein. In some embodiments, it may be possible for 1612 to occur before or at 1608. For example, the first-state portfolio samples may be analyzed prior to determining spectral models.

The example process 1600, at 1614, still further may include using the first spectroscopic analyzer to analyze material to output material spectra and predict material properties based at least in part on the material spectra, for example, as previously described herein.

As shown in FIG. 16B, which depicts an example continuation of the example process 1600 shown in FIG. 16A, at 1616, the example process 1600 still further may include determining whether any of a plurality of other spectroscopic analyzers have received spectral models and/or have portfolio sample-based correction(s) to provide standardized spectral responses (e.g., standardized with respect to the spectral responses of the first spectroscopic analyzer). If at 1616, it is determined that at least some of the other spectroscopic analyzers have not received spectral models and/or do not have portfolio sample-based correction(s), the example process 1600 may proceed to 1622. If at 1616 it is determined that at least some of the other spectroscopic analyzers have received spectral models and have portfolio sample-based correction(s), the example process 1600 may proceed to 1618 to determine whether any such spectroscopic analyzers have been changed, such that they need to be provided with spectral model(s) and/or portfolio sample-based correction(s) (e.g., by analyzing second-state portfolio samples). If at 1618 it is determined that such spectroscopic analyzers have not been changed in such a way, at 1620, the example process 1600 also may include using the spectroscopic analyzers to analyze materials to output material spectra, and predict material properties based at least in part on the material spectra, for example, as previously described herein. If at 1618 it is determined that such spectroscopic analyzers have been changed in such a way, at 1622, the example process 1600 may include providing such spectroscopic analyzers with spectral model(s), for example, from the first spectroscopic analyzer, for example, as previously described herein. In some embodiments, the spectral model(s) may be provided from an origin other than the first spectroscopic analyzer. It is contemplated that in some embodiments, the spectral model(s) may already be present. For example, the spectral model(s) may have already been provided.

At 1624, the example process 1600 also may include analyzing, via the spectroscopic analyzer(s) lacking respective portfolio sample-based correction(s), one or more second-state portfolio samples to output second-state portfolio sample spectra, for example, as previously described herein.

The example process 1600, at 1626, still further may include comparing the second-state portfolio sample spectra of the respective spectroscopic analyzers to first-state portfolio sample spectra of first spectroscopic analyzer, for example, as previously described herein.

At 1628, the example process 1600 further still may include determining whether there is a substantial variance between the respective second-state portfolio sample spectra and the first-state portfolio sample spectra, for example, as previously described herein. If not, at 1630, the example process 1600 may include using the spectroscopic analyzers to analyze material to output material spectra, and predict material properties based at least in part on the material spectra, for example, as previously described herein. If at 1628, a substantial variance is determined, the example process 1600 may include, at 1632 (see FIG. 16C), determining and/or outputting respective portfolio sample-based correction(s) for each of the spectroscopic analyzers for which a variance exists using the standardized analyzer spectra portfolio to reduce the variance, for example, as previously described herein.

At 1634, the example process 1600 further may include analyzing, via the analyzers for which a variance exists, in the second state, material received from a material source to output respective material spectra, for example, as previously described herein.

The example process 1600, at 1636, may still further include transforming, based at least in part on the respective portfolio sample-based correction(s), the respective material spectra to determine respective corrected material spectra for the materials, for example, as previously described herein.

At 1638, the example process 1600 also may include predicting respective material properties for the respective materials based at least in part on the respective corrected material spectra and/or a mathematical treatment thereof, for example, as previously described herein.

The example process 1600, at 1640, still further may include returning to 1616 (see FIG. 16B) to determine whether any of the spectroscopic analyzers have been changed and/or need to be calibrated or recalibrated, for example, as previously described herein.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems and techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This is a continuation of U.S. Non-Provisional application Ser. No. 17/988,239, filed Nov. 16, 2022, titled "METHODS AND ASSEMBLIES FOR DETERMINING AND USING STANDARDIZED SPECTRAL RESPONSES FOR CALIBRATION OF SPECTROSCOPIC ANALYZERS," which is a continuation of U.S. Non-Provisional application Ser. No. 17/652,431, filed Feb. 24, 2022, titled "METHODS AND ASSEMBLIES FOR DETERMINING AND USING STANDARDIZED SPECTRAL RESPONSES FOR CALIBRATION OF SPECTROSCOPIC ANALYZERS," which claims priority to and the benefit of U.S. Provisional Application No. 63/153,452, filed Feb. 25, 2021, titled "METHODS AND ASSEMBLIES FOR DETERMINING AND USING STANDARDIZED SPECTRAL RESPONSES FOR CALIBRATION OF SPECTROSCOPIC ANALYZERS," and U.S. Provisional Application No. 63/268,456, filed Feb. 24, 2022, titled "ASSEMBLIES AND METHODS FOR ENHANCING CONTROL OF FLUID CATALYTIC CRACKING (FCC) PROCESSES USING SPECTROSCOPIC ANALYZERS," the disclosures of all of which are incorporated herein by reference in their entireties.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present disclosure as set forth in the appended claims.

What is claimed is:

1. A method for determining and using standardized analyzer spectral responses to enhance a process for calibration of a spectroscopic analyzer when a spectroscopic analyzer changes from a first state to a second state, the second state being defined as a period of time after a change to the spectroscopic analyzer, the method comprising:
   determining one or more spectral models based at least in part on a first-state sample spectra and corresponding sample data;
   analyzing, via the spectroscopic analyzer when in the first state, a selected one or more first-state portfolio samples to output a standardized analyzer spectra portfolio for the selected one or more first-state portfolio samples, the standardized analyzer spectra portfolio comprising a first-state portfolio sample spectrum for each of the first-state portfolio samples;
   analyzing, via a spectroscopic analyzer when in the second state, a selected one or more second-state portfolio samples to output second-state portfolio sample spectra for the selected one or more second-state portfolio samples, each of the second-state portfolio sample spectra being associated with a corresponding second-state portfolio sample, the analyzing of the selected one or more second-state portfolio samples occurring during a second-state time period, the multi-component samples including a greater number of samples than a number of samples included in the second-state portfolio samples, and the second-state time period for analyzing the second-state portfolio samples being less than the first-state time period;
   comparing one or more of the second-state portfolio sample spectra for the selected one or more second-state portfolio samples to one or more of the first-state portfolio sample spectra of the standardized analyzer spectra portfolio corresponding to first-state portfolio samples of the spectroscopic analyzer as analyzed and output when in the first state during the first-state time period;
   determining for the one or more of the selected one or more second-state portfolio samples of the second-state portfolio sample spectra, a variance at one or more of a plurality of wavelengths or over a range of wavelengths between the second-state portfolio sample spectra output by the spectroscopic analyzer when in the second state and the first-state portfolio sample spectra of the standardized analyzer spectra portfolio, the standardized analyzer spectra portfolio to be used to reduce the variance between the second-state portfolio sample spectra and the first-state portfolio sample spectra;
   analyzing, via the spectroscopic analyzer when in the second state, a material received from a material source to output a material spectrum, the material received from the material source comprising one of a feed to a material processing unit or a product of a material processing unit;
   transforming, based at least in part on the standardized analyzer spectra portfolio, the material spectrum to output a corrected material spectrum for the material when in the second state, the corrected material spectrum including one or more of an absorption-corrected spectrum, a transmittance-corrected spectrum, a transflectance-corrected spectrum, a reflectance-corrected spectrum, or an intensity-corrected spectrum and defining a standardized spectrum; and
   predicting, based at least in part on the corrected material spectrum, material data associated with the material.

2. The method of claim 1, wherein the material processing unit comprises part of one of a petroleum refining-related processing facility, a pharmaceutical manufacturing process site, or a processing site involving processing of one or more of materials or chemicals.

3. The method of claim 1, wherein outputting the first-state portfolio sample spectra and outputting the second-state portfolio sample spectra occur at a common location, the common location comprising one of a refinery site, a petroleum refining-related process site, a pharmaceutical manufacturing process site, or a processing site involving processing of one or more of materials or chemicals.

4. The method of claim 1, wherein outputting the first-state portfolio sample spectra and outputting the second-state portfolio sample spectra occur at different geographic locations.

5. The method of claim 1, wherein outputting the first-state portfolio sample spectra and outputting the second-state portfolio sample spectra occur at a temperature within five degrees Fahrenheit of a common temperature.

6. The method of claim 5, wherein the common temperature comprises a temperature associated with one or more of an environment surrounding the spectroscopic analyzer, the first-state portfolio samples, the second-state portfolio samples, or the spectroscopic analyzer, the common temperature ranging from about 50 degrees Fahrenheit to about 200 degrees fahrenheit.

7. The method of claim 5, further comprising:
analyzing the material by one or more spectroscopic analyzers at the temperature to determine a plurality material properties of the material, the analyzing includes:
one or more of measuring absorbance, measuring transmission, measuring transflectance, measuring reflectance, or measuring scattering intensity associated with the material,
outputting one or more spectra of the material at one or more wavelength bands,
periodically or continuously outputting one or more signals indicative of the measured absorbance, transmission, transflectance, reflectance, or scattering intensity associated with the material, and
converting the output of one or more signals to one or more output signals indicative of the material properties of the material.

8. The method of claim 1, wherein outputting the first-state portfolio sample spectra and outputting the second-state portfolio sample spectra occur at substantially equal pressures.

9. The method of claim 1, wherein the material received from the material source comprises a product of a material processing unit, and the method further comprises supplying the product to a second processing unit as a material feed.

10. The method of claim 1, wherein using standardized analyzer spectral responses for calibration of a spectroscopic analyzer comprises:
using one or more spectral models from a first spectroscopic analyzer when in the first state to calibrate a second spectroscopic analyzer, and
determining portfolio sample-based corrections for the second spectroscopic analyzer based at least in part on the standardized analyzer spectra portfolio and second-state portfolio sample spectra, so as to define the second spectroscopic analyzer as being in the second state.

11. The method of claim 10, wherein using standardized analyzer spectral responses follows a change to the second spectroscopic analyzer causing a need to calibrate or recalibrate the second spectroscopic analyzer.

12. The method of claim 10, wherein each of the one or more spectral models comprises indication of relationships between a spectrum or spectra and one or more properties associated with one or more of a respective multi-component sample or a respective multi-component material.

13. The method of claim 10, wherein the corrected material spectrum is output by the second spectroscopic analyzer, and the method further comprises:

adding the corrected material spectrum output by the second spectroscopic analyzer to the first-state sample spectra; and
updating the one or more spectral models based at least in part on the first-state sample spectra including the corrected material spectrum output by the second spectroscopic analyzer.

14. The method of claim 1, wherein the spectroscopic analyzer comprises one of a near-infrared spectroscopic analyzer, a mid-infrared spectroscopic analyzer, a combination of a near-infrared spectroscopic analyzer and a mid-infrared spectroscopic analyzer, or a Raman spectroscopic analyzer.

15. A spectroscopic analyzer assembly to determine and use standardized analyzer spectral responses to enhance a process for calibration of a spectroscopic analyzer when a spectroscopic analyzer changes from a first state to a second state, the second state being defined as a period of time after a change to a spectroscopic analyzer, the spectroscopic analyzer assembly comprising:
a spectroscopic analyzer; and
an analyzer controller in communication with the spectroscopic analyzer, the analyzer controller being configured to:
determine one or more spectral models based at least in part on a first-state sample spectra and corresponding sample data,
output, based at least in part on one or more signals received from the spectroscopic analyzer when in the first state, a standardized analyzer spectra portfolio for a selected one or more first-state portfolio samples, the standardized analyzer spectra portfolio comprising a first-state portfolio sample spectrum for each of the first-state portfolio samples,
output, based at least in part on one or more signals received from the spectroscopic analyzer when in the second state during a second-state time period, a second-state portfolio spectrum for each of a selected one or more second-state portfolio samples, each of the second-state portfolio sample spectra being associated with a corresponding second-state portfolio sample, the multi-component samples including a greater number of samples than a number of samples included in the second-state portfolio samples, and the second-state time period for analyzing the second-state portfolio samples being less than the first-state time period,
compare one or more of the second-state portfolio sample spectra for the selected one or more second-state portfolio samples to a first-state sample spectra of a selected plurality of corresponding first-state portfolio samples of the spectroscopic analyzer as analyzed and output when in the first state during the first-state time period, each of the first-state portfolio sample spectra being associated with a corresponding first-state portfolio sample,
determine, based at least in part on the comparing, for the one or more of the selected one or more second-state portfolio samples of the second-state portfolio sample spectra, a variance at one or more of a plurality of wavelengths or over a range of wavelengths between the second-state portfolio sample spectra output by the spectroscopic analyzer when in the second state and the first-state portfolio sample spectra of the standardized analyzer spectra portfolio, the standardized analyzer spectra portfolio to be used to reduce the variance between the second-state portfolio sample spectra and the first-state portfolio sample spectra, analyze, when in the second state, a material received from a material source to output a material spectrum, the material received from the material source comprising one of a feed to a material processing unit or a product of a material processing unit, transform, based at least in part on the standardized analyzer spectra portfolio, the material spectrum to output a corrected material spectrum for the material when in the second state, the corrected material spectrum including one or more of an absorption-corrected spectrum, a transmittance-corrected spectrum, a transflectance-corrected spectrum, a reflectance-corrected spectrum, or an intensity-corrected spectrum and defining a standardized spectrum, and predict, based at least in part on the corrected material spectrum, material data associated with the material.

16. The spectroscopic analyzer assembly of claim 15, wherein the material processing unit comprises part of one of a petroleum refining-related processing facility, a pharmaceutical manufacturing process site, or a processing site involving processing of one or more of materials or chemicals.

17. The spectroscopic analyzer assembly of claim 15, wherein outputting the second-state portfolio sample spectra occurs at a location comprising one of a refinery site, a petroleum refining-related process site, a pharmaceutical manufacturing process site, or a processing site involving processing of one or more of materials or chemicals.

18. The spectroscopic analyzer assembly of claim 15, wherein outputting the second-state portfolio sample spectra occurs at a temperature within five degrees Fahrenheit of a common temperature.

19. The spectroscopic analyzer assembly of claim 18, wherein the common temperature comprises a temperature associated with one or more of an environment surrounding the spectroscopic analyzer, the first-state portfolio samples, the second-state portfolio samples, or the spectroscopic analyzer, the common temperature ranging from about 50 degrees Fahrenheit to about 200 degrees Fahrenheit.

20. The spectroscopic analyzer assembly of claim 18, wherein the analyzer controller further is configured to analyze the material at the temperature to determine the plurality material properties of the material, the analyzing to include:
one or more of measuring absorbance, measuring transmission, measuring transflectance, measuring reflectance, or measuring scattering intensity associated with the material,
outputting one or more spectra of the material at one or more wavelength bands,
periodically or continuously outputting one or more signals indicative of the measured absorbance, transmission, transflectance, reflectance, or scattering intensity associated with the material, and
converting the output of one or more signals to one or more output signals indicative of the material properties of the material.

21. The spectroscopic analyzer assembly of claim 15, wherein the analyzer controller further is configured to output, when the spectroscopic analyzer is in the second state, a plurality of signals indicative of the plurality of material properties of the material based at least in part on the corrected material spectrum, the plurality of material properties of the material being substantially consistent with a plurality of material properties of the material output by the spectroscopic analyzer in the first state.

22. The spectroscopic analyzer assembly of claim 15, wherein outputting the plurality of signals indicative of the plurality of material properties comprises outputting the plurality of signals indicative of the plurality of material properties to a display in communication with the spectroscopic analyzer.

23. The spectroscopic analyzer assembly of claim 15, wherein:
the spectroscopic analyzer comprises a first spectroscopic analyzer and the analyzer controller comprises a first analyzer controller,
the spectroscopic analyzer assembly further includes a second spectroscopic analyzer in communication with one or more of the first analyzer controller or a second analyzer controller, and
the first analyzer controller is configured to:
transfer one or more spectral models from the first spectroscopic analyzer when in
the first state to the second analyzer controller, and
determine portfolio sample-based corrections for the second spectroscopic analyzer based at least in part on the standardized analyzer spectra portfolio and the second-state portfolio sample spectra, so as to define the second spectroscopic analyzer as being in the second state.

24. The spectroscopic analyzer assembly of claim 23, wherein the first analyzer controller further is configured to transfer the one or more spectral models and determine the portfolio sample-based corrections following a change to the second spectroscopic analyzer causing a need to recalibrate the second spectroscopic analyzer.

25. The spectroscopic analyzer assembly of claim 23, wherein the one or more spectral models comprises indication of relationships between a spectrum or spectra and one or more properties associated with one or more of a respective multi-component sample or a respective multi-component material.

26. The spectroscopic analyzer assembly of claim 15, wherein the analyzer controller further is configured to use standardized analyzer spectra for calibration of the spectroscopic analyzer when in the first state after a change to the same spectroscopic analyzer causing a need to calibrate or recalibrate the same spectroscopic analyzer and so as to define the same spectroscopic analyzer as being in the second state.

27. The spectroscopic analyzer assembly of claim 15, wherein the analyzer controller further is configured to, prior to outputting the second-state portfolio sample spectra for each of a selected one or more second-state portfolio samples, when in a first material time period, output a plurality of material spectra for a material received from a material source, each of the material spectra being associated with a corresponding material sample from the material and comprising indication of a plurality of material sample properties of the corresponding material sample.

28. The spectroscopic analyzer assembly of claim 27, wherein the analyzer controller further is configured to one or more of create a material database, supplement an existing material database, or access an existing material database, thereby to define a library comprising material data including correlations between the plurality of material spectra and the plurality of material sample properties of the corresponding material sample.

29. The spectroscopic analyzer assembly of claim 15, wherein the analyzer controller further is configured to determine a relationship for a plurality of wavelengths over the range of wavelengths between the second-state portfolio sample spectra and the first-state sample spectra, the relationship comprising one or more of a ratio, an addition, a subtraction, a multiplication, a division, one or more derivatives, or an equation.

30. The spectroscopic analyzer assembly of claim 15, wherein the change to the spectroscopic analyzer between the first state and the second state comprises one or more of maintenance performed on the spectroscopic analyzer, replacement of one or more components of the spectroscopic analyzer, cleaning of one or more components of the spectroscopic analyzer, re-orienting one or more components of the spectroscopic analyzer, a change to a connection between a source of a substance being analyzed and the spectroscopic analyzer, a change in path length, or preparing the spectroscopic analyzer for use.

\* \* \* \* \*